United States Patent
Farokhzad et al.

(10) Patent No.: US 12,478,589 B2
(45) Date of Patent: Nov. 25, 2025

(54) CO-DELIVERY OF NUCLEIC ACIDS FOR SIMULTANEOUS SUPPRESSION AND EXPRESSION OF TARGET GENES

(71) Applicant: The Brigham and Women's Hospital, Inc., Boston, MA (US)

(72) Inventors: Omid Farokhzad, Waban, MA (US); Xiaoding Xu, Malden, MA (US); Jinjun Shi, Newton, MA (US)

(73) Assignee: The Brigham and Women's Hospital, Inc., Boston, MA (US)

( * ) Notice: Subject to any disclaimer, the term of this patent is extended or adjusted under 35 U.S.C. 154(b) by 181 days.

(21) Appl. No.: 16/923,938

(22) Filed: Jul. 8, 2020

(65) Prior Publication Data
US 2021/0299060 A1 Sep. 30, 2021

Related U.S. Application Data

(63) Continuation of application No. 16/470,506, filed as application No. PCT/US2017/067090 on Dec. 18, 2017, now abandoned.

(60) Provisional application No. 62/435,171, filed on Dec. 16, 2016.

(51) Int. Cl.
| | |
|---|---|
| A61K 9/51 | (2006.01) |
| A61K 31/7088 | (2006.01) |
| A61K 38/46 | (2006.01) |
| A61K 45/06 | (2006.01) |
| A61K 47/60 | (2017.01) |
| A61K 47/62 | (2017.01) |
| A61K 47/69 | (2017.01) |
| A61K 48/00 | (2006.01) |
| A61P 35/00 | (2006.01) |
| C12N 15/113 | (2010.01) |

(52) U.S. Cl.
CPC ........ *A61K 9/5146* (2013.01); *A61K 31/7088* (2013.01); *A61K 38/465* (2013.01); *A61K 45/06* (2013.01); *A61K 47/60* (2017.08); *A61K 47/62* (2017.08); *A61K 47/6935* (2017.08); *A61K 48/0041* (2013.01); *A61P 35/00* (2018.01); *C12N 15/113* (2013.01); *C12Y 301/03048* (2013.01); *C12N 2310/14* (2013.01); *C12N 2310/141* (2013.01); *C12N 2310/351* (2013.01); *C12N 2320/31* (2013.01); *C12N 2320/32* (2013.01)

(58) Field of Classification Search
None
See application file for complete search history.

(56) References Cited

U.S. PATENT DOCUMENTS

| | | |
|---|---|---|
| 5,034,506 A | 7/1991 | Summerton |
| 5,142,047 A | 8/1992 | Summerton |
| 5,166,315 A | 11/1992 | Summerton |
| 5,217,866 A | 6/1993 | Summerton |
| 5,356,802 A | 10/1994 | Chandrasegaran |
| 5,436,150 A | 7/1995 | Chandrasegaran |
| 5,487,994 A | 1/1996 | Chandrasegaran |
| 5,506,337 A | 4/1996 | Summerton |
| 5,521,063 A | 5/1996 | Summerton |
| 5,527,675 A | 6/1996 | Coull |
| 5,539,082 A | 7/1996 | Nielsen |
| 5,571,711 A | 11/1996 | Van Der Bruggen |
| 5,623,049 A | 4/1997 | Loebberding |
| 5,683,886 A | 11/1997 | Van Der Bruggen |
| 5,698,685 A | 12/1997 | Summerton |
| 5,714,331 A | 2/1998 | Buchardt |
| 5,736,336 A | 4/1998 | Buchardt |
| 5,773,571 A | 6/1998 | Nielsen |
| 5,786,571 A | 7/1998 | Bethel |
| 6,140,081 A | 10/2000 | Barbas |
| 6,453,242 B1 | 9/2002 | Eisenberg |
| 6,534,261 B1 | 3/2003 | Cox, III |
| 6,610,512 B1 | 8/2003 | Barbas |
| 6,673,545 B2 | 1/2004 | Faris |

(Continued)

FOREIGN PATENT DOCUMENTS

| | | |
|---|---|---|
| EP | 2742944 | 6/2014 |
| GB | 2241703 | 9/1991 |

(Continued)

OTHER PUBLICATIONS

Abrams, et al., "Evaluation of efficacy, biodistribution, and inflammation for a potent siRNA nanoparticle: effect of dexamethasone co-treatment.", Molecular Therapy, 18(1):171-80 (2010).
Adema, et al., "Molecular characterization of the melanocyte lineage-specific antigen gp100",J. Biol. Chem., 269(31):20126-33 (1994).
Akinc, et al., "A combinatorial library of lipid-like materials for delivery of RNAi therapeutics", Nat. Biotechnol., 2(5):561-9 (2008).
Alfthan, et al., "Elevation of free ß subunit of human choriogonadotropin and core ß fragment of human choriogonadotropin in the serum and urine of patients with malignant pancreatic and biliary disease", Cancer Res., 52:4628-33 (1992).

(Continued)

*Primary Examiner* — Jennifer Chin
(74) *Attorney, Agent, or Firm* — Pabst Patent Group LLP

(57) ABSTRACT

Nanoparticulate pharmaceutical formulations and methods for co-delivery of two or more species of nucleic acids for simultaneous suppression and expression of target genes in a cell, are provided. The nanoparticles encapsulate two or more nucleic acid species. The first nucleic acid suppresses expression of a gene or product thereof, e.g., inhibitory nucleic acid, such as antisense, siRNA, miRNA, Dicer siRNA, piRNA, etc. The second nucleic acid increases expression of, or encodes, an endogenous or exogenous protein or polypeptide, e.g., an mRNA. The first and second nucleic acid species simultaneously target or affect the same or different cellular processes within a cell including communication, senescence, DNA repair, gene expression, metabolism, necrosis, and apoptosis.

16 Claims, 22 Drawing Sheets

Specification includes a Sequence Listing.

(56) References Cited

U.S. PATENT DOCUMENTS

| | | |
|---|---|---|
| 6,677,157 B1 | 1/2004 | Cohen |
| 6,699,475 B1 | 3/2004 | Panicali |
| 6,746,838 B1 | 6/2004 | Choo |
| 6,866,997 B1 | 3/2005 | Choo |
| 7,067,617 B2 | 6/2006 | Barbas, III |
| 8,039,587 B2 | 10/2011 | Khan |
| 8,062,891 B2 | 11/2011 | Khan |
| 8,133,733 B2 | 3/2012 | Khan |
| 2002/0165356 A1 | 11/2002 | Barbas |
| 2004/0197892 A1 | 10/2004 | Moore |
| 2007/0154989 A1 | 7/2007 | Barbas, III |
| 2007/0213269 A1 | 9/2007 | Barbas, III |
| 2011/0145940 A1 | 6/2011 | Voytas |
| 2014/0356384 A1 | 12/2014 | Hubbell |
| 2019/0255143 A1* | 8/2019 | Tabas ............... A61K 31/7105 |

FOREIGN PATENT DOCUMENTS

| | | | |
|---|---|---|---|
| WO | 9640039 | 12/1996 | |
| WO | 9853059 | 11/1998 | |
| WO | 0050900 | 8/2000 | |
| WO | 0244321 | 6/2002 | |
| WO | 2003016496 | 2/2003 | |
| WO | 2004058801 | 7/2004 | |
| WO | 2009114487 | 9/2009 | |
| WO | 2010056143 | 5/2010 | |
| WO | 2011072246 | 6/2011 | |
| WO | 2013103972 | 7/2013 | |
| WO | 2013176772 | 11/2013 | |
| WO | 2014018423 | 1/2014 | |
| WO | 2014047350 | 3/2014 | |
| WO | WO-2016044663 A1 * | 3/2016 | .......... A61K 31/713 |
| WO | 2016179001 | 11/2016 | |

OTHER PUBLICATIONS

Ando, et al., "Ganglioside GM2 on the K562 cell line is recognized as a target structure by human natural killer cells", Int. J. Cancer, 40:12-17 (1987).
Araki, et al., "mTOR regulates memory CD8 T cell differentiation", Nature, 460(7251):108-112 (2009).
Assumpção, et al., "The role of piRNA and its potential clinical implications in cancer", Epigenomics, 7(6):975-84 (2015).
Balkwill, et al., "The tumor microenvironment at a glance", J Cell Sci,* 125(23):5591-6 (2012).
Barnd, et al., "Specific, major histocompatibility complex-unrestricted recognition of tumor-associated mucins by human cytotoxic T cells", PNAS, 86(18):7159-63 (1989).
Bartel, et al., "MicroRNAs: genomics, review biogenesis, mechanism, and function", Cell, 116:281-97 (2004).
Bast, et al., "A radioimmunoassay using a monoclonal antibody to monitor the course of epithelial ovarian cancer", N. Eng. J. Med., 309:883-7 (1983).
Bernstein, et al., "Role for a bidentate ribonuclease in the initiation step of RNA interference", Nature, 409:363-6 (2001).
Bertrand, et al., "Cancer nanotechnology: the impact of passive and active targeting in the era of modern cancer biology", Adv Drug Deliv Rev, 66:2-25 (2014).
Braasch, et al., "Locked nucleic acid (LNA): fine-tuning the recognition of DNA and RNA", Chem. Biol., 8(1):1-7 (2001).
Brown, et al., "Structural characterization of human melanoma-associated antigen p97 with monoclonal antibodies", J. Immunol., 127:539-46 (1981).
Buckley, et al., "Proresolving lipid mediators and mechanisms in the resolution of acute inflammation", Immunity. 40(3):315-27 (2014).
Burnett, "Current progress of siRNA/shRNA therapeutics in clinical trials", Biotechnol. J., 6:(9)1130-46 (2011).
Cermak, et al., "Efficient design and assembly of custom TALEN and other TAL effector-based constructs for DNA targeting", Nucl. Acids Res., 39(12):1-11 (2011).
Chan, et al., "Spatiotemporal controlled delivery of nanoparticles to injured vasculature", PNAS, 107:2213-8 (2010).

Chang, et al., "Characterization of the antigen (CAK1) recognized by monoclonal antibody K1 present on ovarian cancers and normal mesothelium", Cancer Res., 52:181-6 (1992a).
Chang, et al., "Frequent expression of the tumor antigen CAK1 in squamous-cell carcinomas", Int. J. Cancer, 51(4):548-54 (1992c).
Chang, et al., "Isolation and characterization of a monoclonal antibody, K1, reactive with ovarian cancers and normal mesothelium", Int. J. Cancer, 50(3):373-81 (1992b).
Chang, et al., "Molecular cloning of mesothelin, a differentiation antigen present on mesothelium, mesotheliomas, and ovarian cancers", PNAS, 93:136-40 (1996).
Chen, et al., "Construction of surfactant-like tetra-tail amphiphilic peptide with RGD ligand for encapsulation of porphyrin for photodynamic therapy", Biomaterials, 32(6):1678-84 (2011).
Chen, et al., "Multi-functional envelope-type nanoparticles assembled from amphiphilic peptidic prodrug with improved anti-tumor activity", ACS Appl Mater Interfaces, 6 (1):593-8 (2014).
Cheng, et al., "Multifunctional triblock copolymers for intracellular messenger RNA delivery", Biomaterials, 33(28):6868-76 (2012).
Chowdhury, et al., "Isolation of a high-affinity stable single-chain Fv specific for mesothelin from DNA-immunized mice by phage display and construction of a recombinant immunotoxin with anti-tumor activity", PNAS, 95(2):669-74 (1998).
Cong, "Multiplex genome engineering using CRISPR/Cas systems", Science, 15:339(6121):819-23 (2013).
Cook, et al., "Cellular Glutathione and Thiol Measurements from Surgically Resected Human Lung Tumor and Normal Lung Tissue", Cancer Res, 51:4287-94 (1991).
Cooray, et al., "Ligand-specific conformational change of the G-protein-coupled receptor ALX/FPR2 determines proresolving functional responses", PNAS; 110:18232-7 (2013).
Costin, et al., "Viroporin potential of the lentivirus lytic peptide (LLP) domains of the HIV-1 gp41 protein", Virol. J., 4:123 (2007).
Cougot, et al., "Cap-tabolism'.", Trends Biochem. Sci., 29(8):436-44 (2004.).
Czech, et al., "One Loop to Rule Them All: The Ping-Pong Cycle and piRNA-Guided Silencing", Trends Biochem. Sci., S0968-0004(15)00258-3 (2016).
Datta, et al., "Sensitive detection of occult breast cancer by the reverse-transcriptase polymerase chain reaction", J. Clin. Oncol., 12:475-82 (1994).
De Fougerolles, "Interfering with disease: a progress report on siRNA-based therapeutics", Nat. Rev. Drug Discov, 6(6):443-53 (2007).
Dhar, et al., "Targeted delivery of cisplatin to prostate cancer cells by aptamer functionalized Pt(IV) prodrug-PLGA-PEG nanoparticles", PNAS, 105(45):17356-61 (2008).
Disis, et al., "Existent T-Cell and Antibody Immunity to HER-2/neu Protein in Patients with Breast Cancer", Canc. Res., 54:16-20 (1994).
Dissmeyer, et al., "PROTEOSTASIS: A European Network to Break Barriers and Integrate Science on Protein Homeostasis", Trends Biochem Sci., 44(5):383-7 (2019).
Dominsnka, et al., "Breaking Down the Barriers: siRNA Delivery and Endosome Escape", J. Cell Science, 123:1183-1189 (2010).
Elango, et al., "Optimized transfection of mRNA transcribed from a d(A/T)100 tail-containing vector", Biochim. Biophys. Res. Commun., 330:958-66 (2005).
Elbashir, et al., "RNA interference is mediated by 21- and 22-nucleotide RNAs", Genes Dev., 15:188-200 (2001).
Farokhzad, et al., "Targeted Nanoparticle-Aptamer Bioconjugates for Cancer Chemotherapy in vivo", Proceedings of the National Academy of Sciences, 103(16):6315-6320 (2006).
Fiore, et al., "Identification of a human cDNA encoding a functional high affinity lipoxin A4 receptor", J. Exp. Med., 180:253-60 (1994).
Fire, et al., "Potent and specific genetic interference by double-stranded RNA in Caenorhabditis elegans", Nature, 391:806-11 (1998).
Fischer, et al., "RNAi, a New Therapeutic Strategy Against Viral Infection", Cell Research, 14:460-466 (2004).
Fredman, et al., "Targeted nanoparticles containing the proresolving peptide Ac2-26 protect against advanced atherosclerosis in

(56) References Cited

OTHER PUBLICATIONS hypercholesterolemic mice", Sci Transl Med., 7(275): 275ra20 doi:10.1126/scitranslmed.aaa1065 (2015).
Gebauer, et al., "Tumor marker concentrations in normal and malignant tissues of colorectal cancer patients and their prognostic relevance", Anticancer Res., 17(4B):2939-42 (1997).
Getts, et al., "Have we overestimated the benefit of human(ized) antibodies", MAbs, 2(6):682-4 (2010).
Gold, et al., "Demonstration of tumor-specific antigens in human colonic carcinomata by immunological tolerance and absorption techniques", J. E.9-62 (1985).
Gonzalez, et al., "Viroporins", FEBS Lett. 552, 28-34 (2003).
Grinstein, et al., "Regulation of cytoplasmic pH in phagocytic cell function and dysfunction", Clin. Biochem. 24:241-7 (1991).
Guo, et al., "Recent advances in nonviral vectors for gene delivery", Acc Chem Res., 45(7):971-9 (2012).
Hammond, et al., "An RNA-directed nuclease mediates post-transcriptional gene silencing in *Drosophila* cells", Nature, 404:293-6 (2000).
Hannon, "RNA interference", Nature, 418:244-51 (2002).
Hasturk, et al., "RvE1 protects from local inflammation and osteoclast—mediated bone destruction in periodontitis", FASEB J., 20:401-3 (2006).
Hatakameya, et al., A pH-sensitive fusogenic peptide facilitates endosomal escape and greatly enhances the gene silencing of siRNA-containing nanoparticles in vitro and in vivo. J. Control. Release, 139:127-32 (2009).
Hatakeyama, et al., "Development of a novel systemic gene delivery system for cancer therapy with a tumor-specific cleavable PEG-lipid", Gene Ther., 14:68-77 (2007).
Haworth, et al., "Resolvin E1 regulates interleukin 23, interferon-gamma and lipoxin A4 to promote the resolution of allergic airway inflammation", Nat. Immunol., 9:873-9 (2008).
Hirokawa, et al., "Neuroblastoma in an adult with a high serum level of carbohydrate antigen, CA125: report of a case", Surg. Today, 28:349-54 (1998).
Hoon, et al., "Ganglioside GM2 expression on human melanoma cells correlates with sensitivity to lymphokine-activated killer cells", Int. J. Cancer, 43:857-62 (1989).
Horton, et al., "Mitochondria-Penetrating Peptides", Chem. Biol., 15(4):375-82 (2008).
International Search Report for corresponding PCT application PCT/US2017/067090 dated Apr. 3, 2018.
Islam, et al., "Biomaterials for mRNA delivery", Biomater. Sci. 3:1519-33 (2015).
Israel, et al., "Molecular Cloning of a Complementary DNA Encoding a Prostate-specific Membrane Antigen", Cancer Res, 53(2):227-30 (1993).
Jager, et al., "Antigen-specific immunotherapy and cancer vaccines", Int. J. Cancer, 106:817-20 (2003).
Jinek, et al., "A programmable dual-RNA-guided DNA endonuclease in adaptive bacterial immunity", Science, 337(6096):816-21 (2012).
Kamaly, et al., "Targeted Interleukin-10 Nanotherapeutics Developed With a Microfluidic Chip Enhance Resolution of Inflammation in Advanced Atherosclerosis", ACS Nano, 10:5280-5292 (2016).
Kato, et al., "Acidic extracellular microenvironment and cancer", Cancer Cell Intl, 13(89):1-8 (2013).
Kawakami, et al., "Cloning of the gene coding for a shared human melanoma antigen recognized by autologous T cells infiltrating into tumor", PNAS, 91:3515-9 (1994).
Kelley, et al., "Development of Novel Peptides for Mitochondrial Drug Delivery: Amino acids Featuring Delocalized Lipophilic Cations", Pharm Res., (2011).
Kennedy, et al., "A role for antibodies in tumor immunity", Int. Rev. Immunol., 22:141-72 (2003).
Kim, et al., "Chimeric restriction endonuclease",. PNAS. 91:883-7 (1994a).
Kim, et al., "Insertion and Deletion Mutants of FokI Restriction Endonuclease", J. Biol. Chem., 269:31978-82 (1994b).

Kim, et al., "Targeted delivery of siRNA to macrophages for anti-inflammatory treatment", Molecular Therapy, 18(5):993-1001 (2010).
Knop, K et al., "Poly(ethylene glycol) in Drug Delivery: Pros and Cons as Well as Potential Alternatives", Chem Int Ed, 49(36):6288-308 (2010).
Kraus, et al., "Implications of acidic tumor microenvironment for neoplastic growth and cancer treatmeAngew nt: a computer analysis", Tumour Biol, 17:133-54 (1996).
Krishnamoorthy, et al., "Resolvin D1 Binds human Phagocytes With evidence for Proresolving Receptors", Proc. Natl. Acad. Sci. USA., 107:1660-1665 (2010).
Kudoh, et al., "Preoperative determination of several serum tumor markers in patients with primary epithelial ovarian carcinoma", Gynecol. Obstet. Invest., 47:52-7 (1999).
Kwon, et al., "Application of an HIV gp41-derived peptide for enhanced intracellular trafficking of synthetic gene and siRNA delivery vehicles", Bioconjugate Chem., 19:920-7 (2008).
Lardner, et al., "The effects of extracellular pH on immune function", J Leukoc Bio, 69(4):522-30 (2001).
Laroui, et al., "Targeting intestinal inflammation with CD98 siRNA/PEI-loaded nanoparticles", Mol Ther; 22(1):69-80 (2014).
Lehmann, et al., "Discrimination between Benign and Malignant Cells of Melanocytic Lineage by Two Novel Antigens, a Glycoprotein with a Molecular Weight of 113,000 and a Protein with a Molecular Weight of 76,000", Cancer Res., 47:841-45 (1987).
Lehmann, et al., "MUC18, a marker of tumor progression in human melanoma, shows sequence similarity to the neural cell adhesion molecules of the immunoglobulin superfamily", PNAS, 86:9891-5 (1989).
Leuschner, et al., "Therapeutic siRNA silencing in inflammatory monocytes in mice", Nature Biotechnol, 29(11):1005-10 (2011).
Li, et al. "Functional domains in Fok I restriction endonuclease", PNAS, 89:4275-9 (1992).
Li, et al., "Alteration of the cleavage distance of Fok I restriction endonuclease by insertion mutagenesis", PNAS, 90:2764-8 (1993).
Lim, et al., "Controlled bioactive nanostructures from self-assembly of peptide building blocks", Angew Chem Int Ed, 46:9011-14(2007).
Lloyd, et al., "Isolation and characterization of ovarian cancer antigen CA 125 using a new monoclonal antibody (VK-8): identification as a mucin-type molecule", Int. J. Canc., 71:842-50 (1997).
Love, et al., "Lipid-like materials for low-dose, in vivo gene silencing", PNAS; 107(5):1864-9 (2010).
Mahmoodzadeh, et al., "Induction of tolerogenic murine dendritic cells by downregulating the co-stimulatory molecule of CD40 using lentivirus vector", Journal of Zanjan University of Medical Sciences and Health Services, 22(94):1-11 (2014).
Martinez, et al., "Single-stranded antisense siRNAs guide target RNA cleavage in RNAi", Cell, 110:563-74 (2002).
McManus, et al., "Human chorionic gonadotropin in human neoplastic cells", Cancer Res., 36:3476-81 (1976).
Meier, et al., "Prognostic significance of CA125 in patients with ovarian cancer and secondary debulking surgery", Anticancer Res., 17(4B):2945-7 (1997).
Miller, et al., "A TALE Nuclease Architecture for Efficient Genome Editing", Nature Biotechnol., 29:143 (2011).
Murphy, et al., "Current evaluation of the tissue localization and diagnostic utility of prostate specific membrane antigen", Cancer, 83(11):2259-69 (1998).
Napoli, et al., "Introduction of a Chimeric Chalcone Synthase Gene into Petunia Results in Reversible Co-Suppression of Homologous Genes in trans", Plant Cell, 2:279-89 (1990).
Natali, et al., "Immunohistochemical detection of antigen in human primary and metastatic melanomas by the monoclonal antibody 140.240 and its possible prognostic significance", Cancer, 59:55-63 (1987).
Nykanen, et al., "ATP requirements and small interfering RNA structure in the RNA interference pathway", Cell, 107:309-21 (2001).
Oliveira, et al., "Fusogenic peptides enhance endosomal escape improving siRNA-induced silencing of oncogenes.", Int. J. Pharm. 331:211-4 (2007).

(56) References Cited

OTHER PUBLICATIONS

Opal, et al., "Anti-inflammatory cytokines", Chest, 117(4): 1162-72 (2000).
Pascolo, "Vaccination with messenger RNA (mRNA)", Handb. Exp. Pharmacol., 183: 221-35 (2008).
Pauley, et al., "RNAi Therapeutics in Autoimmune Disease", Pharmaceuticals, 6(3):287-94 (2013).
Pearce, et al., "Enhancing CD8-T cell Memory by Modulating Fatty Acid Metabolism", Nature, 460:103-107 (2009).
Perretti, et al., "Annexin A1 and glucocorticoids as effectors of the resolution of inflammation", Nat. Rev. Immunol., 9:62-70 (2009b).
Perretti, et al., "Endogenous lipid- and peptide-derived anti-inflammatory pathways generated with glucocorticoid and aspirin treatment activate the lipoxin A4 receptor", Nat. Med, 8:1296-1302 (2002).
Perretti, et al., "Exploiting the Annexin A1 pathway for the development of novel anti-inflammatory therapeutics", Br. J. Pharmacol .; 158:936-46 (2009a).
Plowman, et al., "Heregulin induces tyrosine phosphorylation of HER4/p180erbB4", Nature, 366:473-5 (1993).
Ponnappa, "siRNA for inflammatory diseases", Curr Opin Investig Drugs., 10(5):418-24 (2009).
Priya, et al., "Smart polymers for the controlled delivery of drugs—a concise overview", Acta Pharma. Sinica B, 4(2):120-7 (2014).
Rose, et al., "Primary structure of the human melanoma-associated antigen p97 (melanotransferrin) deduced from the mRNA sequence", PNAS, 83:1261-5 (1986).
Sarandakou, et al., Tumour-associated antigens CEA, CA125, SCC and TPS in gynaecological cancer. Eur. J. Gynaecol. Oncol., 19:73+7 (1998).
Sarandakou, et al., "Vaginal fluid and serum CEA, CA125 and SCC in normal conditions and in benign and malignant diseases of the genital tract", Acta Oncol., 36:755-9 (1997).
Scanlan, et al., "The cancer/testis genes: Review, standardization, and commentary",. Cancer Immun., 4:1-15 (2004).
Semple, et al., "Rational design of cationic lipids for siRNA delivery", Nat. Biotechnol., 28(2):172-6 (2010).
Stefanadis, Increased temperature of malignant urinary bladder tumors in vivo: the application of a new method based on a catheter technique JCO, 19(3):676-81 (2001).
Stepinski, et al., "Synthesis and properties of mRNAs containing the novel "anti-reverse" cap analogs 7-methyl(3'-O-methyl)GpppG and 7-methyl (3'-deoxy)GpppG", RNA, 7:1468-95 (2001).
Sterchak, et al., "Uncharged stereoregular nucleic acids analogs. 1. Synthesis of a cytosine-containing oligomer with carbamate internucleoside linkages", Organic Chem., 52:4202 (1987).
Sugahara, et al., "Tissue-penetrating delivery of compounds and nanoparticles into tumors", Cancer Cell, 16:510-20 (2009).
Tabas, et al., "Anti-inflammatory therapy in chronic disease: challenges and opportunities", Science. 339(6116):166-72 (2003).
Tan, et al., "RNAi, a new therapeutic strategy against viral infection", Cell Research, 14, 460-6 (2004).
Topalian, et al., "Human CD4+ T cells specifically recognize a shared melanoma-associated antigen encoded by the tyrosinase gene", PNAS, 91:9461-5 (1994).
Towbridge, "Human cell surface glycoprotein related to cell proliferation is the receptor for transferrin", PNAS, 78(5):3039-43 (1981).
Traverso, et al., "Role of Glutathione in Cancer Progression and Chemoresistance", Oxidative Medicine and Cellular Longevity, vol. 2013:972913 10 pages (2013).
Tsuchida, et al., "Gangliosides of human melanoma: GM2 and tumorigenicity", J. Natl. Cancer, 78:55-60 (1987b).
Tsuchida, et al., "Gangliosides of human melanoma", J. Natl. Cancer, 78:45-54 (1987a).
Turnquist, et al., "Rapamycin-conditioned dendritic cells are poor stimulators of allogeneic CD4+ T cells, but enrich for antigen-specific Foxp3+ T regulatory cells and promote organ transplant tolerance", J Immunol. 178(11):7018-31(2007).
Urano, et al., "Selective molecular imaging of viable cancer cells with pH-activatable fluorescence probes", Nat. Med., 15:104-109 (2009).
Van den Bruggen, et al., "A gene encoding an antigen recognized by cytolytic T lymphocytes on a human melanoma", Science, 254:1643-7 (1991).
Vijayasardahi, et al., "The melanoma antigen gp75 is the human homologue of the mouse b (brown) locus gene product", J. Exp. Med., 171:1375-80 (1990).
Vranic, et al., "Deciphering the mechanisms of cellular uptake of engineered nanoparticles by accurate evaluation of internalization using imaging flow cytometry", Particle and Fibre Toxicology, 10(2):1-16 (2013).
Wagner, et al., "Targeting of Polyplexes: Toward Synthetic Virus Vector Systems", Adv. Gen., 53:333-354 (2005).
Walker, et al., "Monoallelic Expression Determines Oncogenic Progression and Outcome in Benign and Malignant Brain Tumors", Cancer Res., 72(2):636-44 (2012).
Wang, et al., "A Broad Nanoparticle-Based Strategy for tumor Imaging by Nonlinear Amplification of Microenvironment Signals", Nat. Mater., 13:204-212 (2014).
Weber, et al., "Tumor immunity and autoimmunity induced by immunization with homologous DNA", J. Clin. Invest, 102:1258-64 (1998).
Weide, "Results of the first phase I/II clinical vaccination trial with direct injection of mRNA", J. Immunother., 31(2):180-8 (2008).
Whitehead, et al., "Knocking Down Barriers: Advances in siRNA Delivery", Nat. Rev. Drug Discovery, 8(2), 129-138 (2009).
Whitehead, et al., "Degradable lipid nanoparticles with predictable in vivo siRNA delivery activity", Nat. Commun., 5:4277doi: 10.1038/ncomms5277 (2014).
Xu, et al., "Enhancing Tumor Cell response to Chemotherapy Through Nanoparticle-Mediated Codelivery of siRNA and Cisplatin Prodrug", Proc. Natl. Acad. Sci. USA, 110:18638-18643 (2013).
Xu, et al., "mTOR, linking metabolism and immunity.", Semin Immunol. 24(6):429-35(2012).
Yamaguchi, et al., "Human chorionic gonadotropin in colorectal cancer and its relationship to prognosis", Br. J. Cancer, 60:382-4 (1989).
Yoshimura, et al., "Assessment of urinary beta-core fragment of human chorionic gonadotropin as a new tumor marker of lung cancer", Cancer, 73:2745-52 (1994a).
Yoshino, et al., "Association of HER2/neu expression with sensitivity to tumor-specific CTL in human ovarian cancer", J. Immunol., 152:2393 (1994b).
Yousif, et al., "Targeting Mitochondria with Organelle☐Specific Compounds: Strategies and Applications", Chembiochem., 10(13):1939-50 (2009).
Yu, et al., "Overcoming endosomal barrier by amphotericin B-loaded dual pH-responsive PDMA-b-PDPA micelleplexes for siRNA delivery", ACS Nano, 5:9246-55 (2011).
Zhou, et al., "Tunable, Ultrasensitive pH☐Responsive Nanoparticles Targeting Specific Endocytic Organelles in Living Cells", Angewandte Chemie Int Ed, 50:6109-14 (2011).
Zhu, et al., "Long-circulating siRNA nanoparticles for validating Prohibitin1-targeted non-small cell lung cancer treatment", Proceedings of the National Academy of Sciences USA, 112(25):7779-7784 (2015).

\* cited by examiner

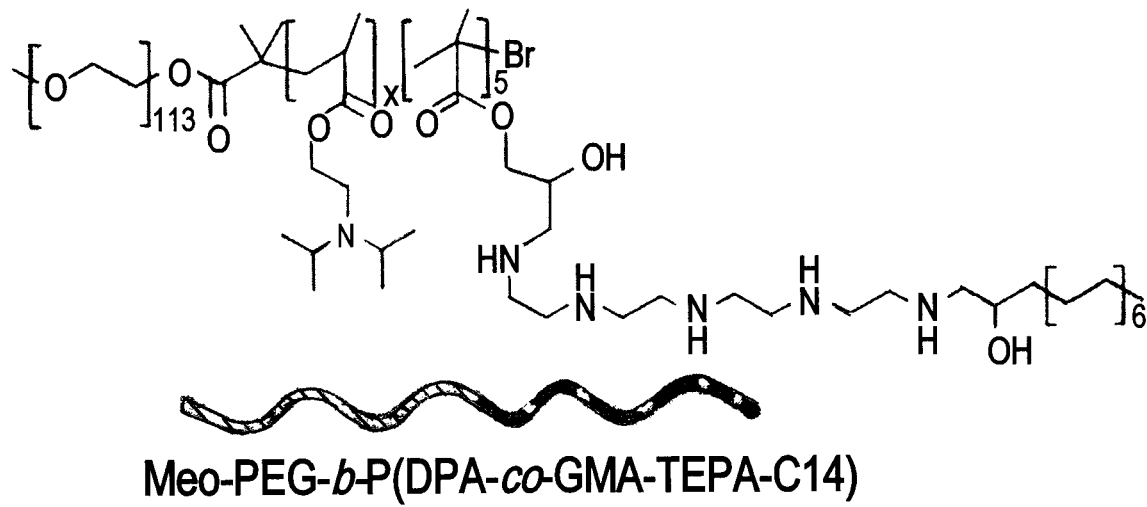
Meo-PEG-b-P(DPA-co-GMA-TEPA-C14)
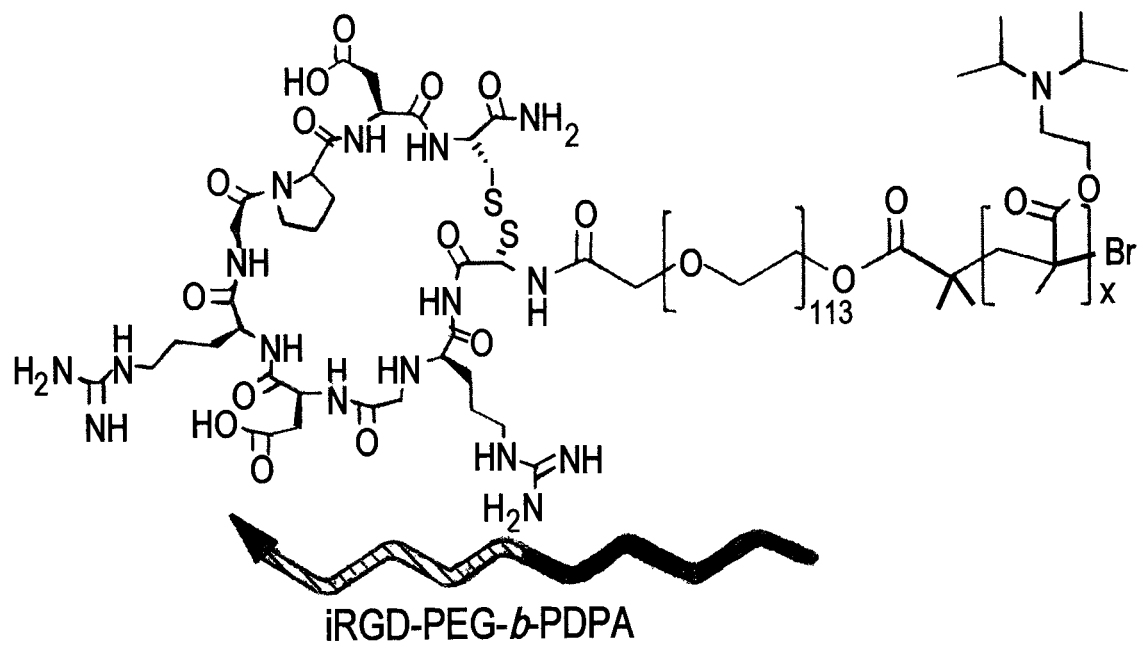
iRGD-PEG-b-PDPA
FIG. 6A

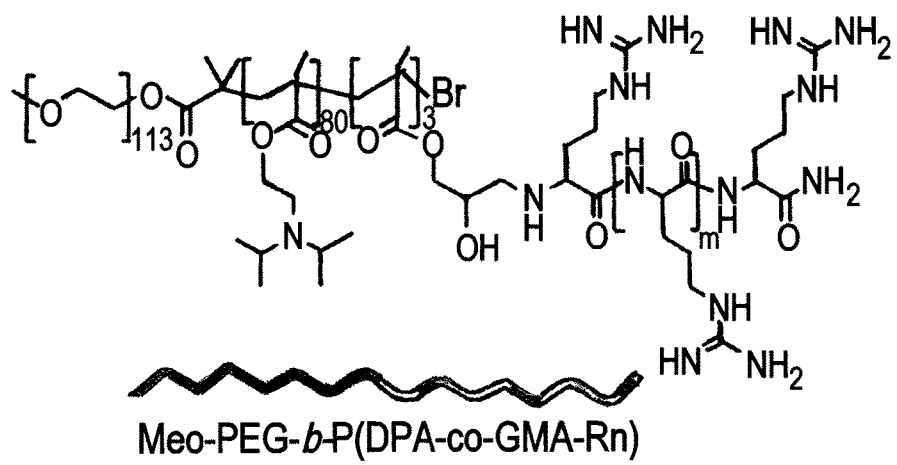
Meo-PEG-b-P(DPA-co-GMA-Rn)
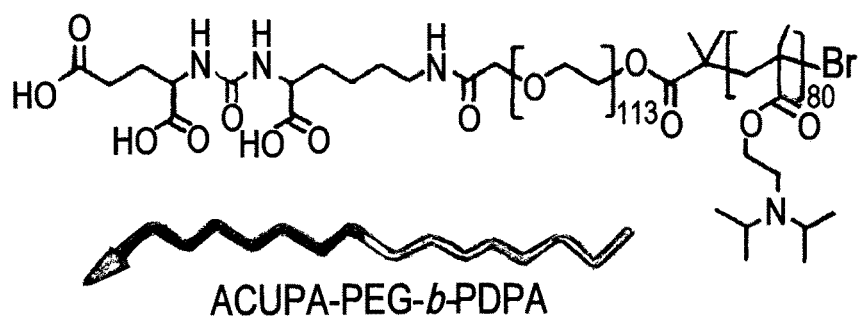
ACUPA-PEG-b-PDPA
FIG. 11A
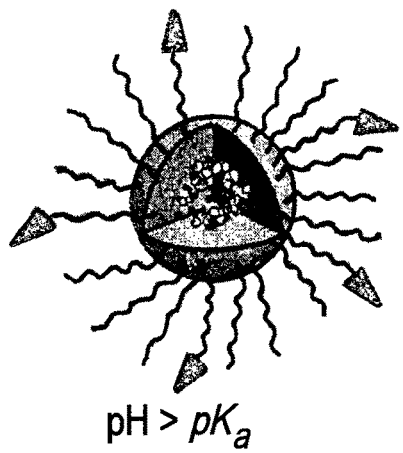
pH > $pK_a$
FIG. 11B
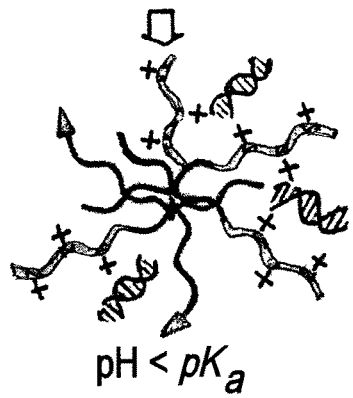
pH < $pK_a$

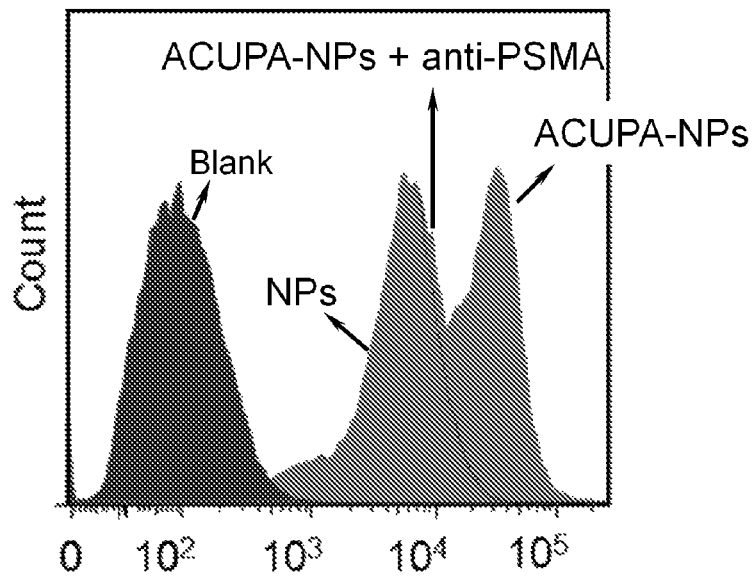
FIG. 15
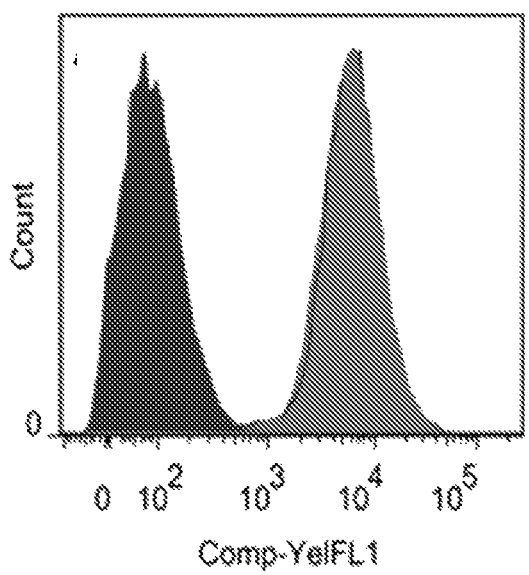 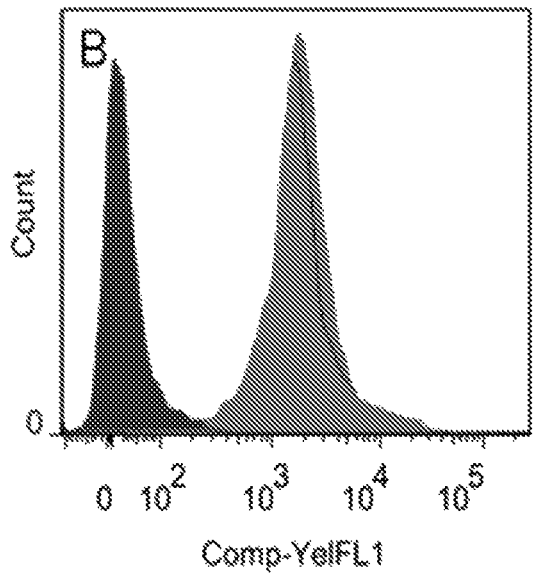
FIGs. 16A      FIG. 16B

CO-DELIVERY OF NUCLEIC ACIDS FOR SIMULTANEOUS SUPPRESSION AND EXPRESSION OF TARGET GENES

CROSS-REFERENCE TO RELATED APPLICATIONS

This application is a continuation of U.S. application Ser. No. 16/470,506, filed Jun. 17, 2019, which is a National Phase application under 35 U.S.C. § 371 of PCT/US2017/067090, filed Dec. 18, 2017, which claims the benefit of and priority to U.S. Application No. 62/435,171, filed on Dec. 16, 2016, which are incorporated by reference herein in their entirety.

STATEMENT REGARDING FEDERALLY SPONSORED RESEARCH OR DEVELOPMENT

This invention was made with Government support under CA200900, EB015419, and HL127464 awarded by the National Institutes of Health. The government has certain rights in the invention.

REFERENCE TO SEQUENCE LISTING

The Sequence Listing submitted Dec. 18, 2017 as a text file named "BWH_23932_ST25.txt," created on Dec. 14, 2017, and having a size of 2,000 bytes, is hereby incorporated by reference pursuant to 37 C.F.R. § 1.52 (e) (5).

FIELD OF THE INVENTION

This invention is generally in the field of pharmaceutical compositions including one or more inhibitory nucleic acids and one or more nucleic acids encoding a protein or polypeptide or stimulating expression of a protein or peptide, and methods of use thereof.

BACKGROUND OF THE INVENTION

Use of nucleic acid in therapeutic and vaccine applications is on the rise. For example, inhibitory RNAs such as siRNA can be used to reduce gene expression, while mRNA can be used to increase expression of an endogenous or exogenous protein. Efficient delivery of RNA (e.g., siRNA or mRNA) or DNA remains the key challenge for broad applications of nucleic acid-based pharmaceuticals in vivo (Whitehead K A et al., Nat. Rev. Drug Discovery, 8 (2), 129-138 (2009); Islam M A et al., Biomater. Sci. 3:1519-1533 (2015)).

Drug delivery systems have become an important tool in many industries including healthcare. For example, lipid and polymer nanoparticles have been used to deliver siRNA or mRNA (Akinc, et al., Nat. Biotechnol., 26 (5), 561-9 (2008), Semple, et al., Nat. Biotechnol., 28 (2), 172-6 (2010), Cheng and Bryers, Biomaterials, 33 (28), 6868-76 (2012)). Some nanoparticles for siRNA delivery have advanced to clinical trials to treat diverse diseases (Pascolo, Handb. Exp. Pharmacol., 183, 221-235 (2008)), Burnett, Biotechnol. J., 6: (9), 1130-46 (2011)), de Fougerolles, Nat. Rev. Drug Discovery, 6 (6): 443-53 (2007), and Weide, J. Immunother., 31 (2): 180-8 (2008)).

It is therefore an object of the present invention to provide pharmaceutical compositions and methods of use thereof for simultaneous stimulation of production of a protein or gene and inhibition of expression of gene.

It is a further object of the invention to provide nanoparticles with increased efficacy in getting to the targeted tissue and deliver one or more inhibitory nucleic acids in combination with one or more nucleic acids encoding proteins or increasing expression thereof.

SUMMARY OF THE INVENTION

Pharmaceutical formulations and methods of use thereof for co-delivery of two or more species of nucleic acids for suppression of target genes and increasing expression of genes or proteins in the same cell are provided. In preferred embodiments, the pharmaceutical formulations are in the form of nanoparticles. Nanoparticles can be polymeric particles, non-polymeric particles, liposomes, micelles, hybrids thereof, and/or combinations thereof, optionally with at least one moiety responsive to an environmental stimulus, and/or at least one targeting moiety. The nanoparticle is not a virus, or a virus-like particle.

The nanoparticles include at least two nucleic acid species. The first nucleic acid species directly suppresses expression of one or more genes, or a gene product thereof such as mRNA, within a target cell. The first nucleic acid species can be, for example, a functional nucleic acid or an expression construct, such as a vector, encoding a functional nucleic acid. In preferred embodiments, the first nucleic acid species is an inhibitory nucleic acid, for example, antisense, siRNA, miRNA, shRNA, Dicer siRNA or piRNA. The functional nucleic acid can specifically target the gene or gene product.

The second nucleic acid species can induce or increase expression of an endogenous or exogenous protein or polypeptide, or a functional non-coding RNA molecule such as transfer RNA, ribosomal RNA, or regulatory RNA. For example, the second nucleic acid species can be mRNA or a functional non-coding RNA molecule. In preferred embodiments, the second nucleic acid species is an mRNA encoding a protein or polypeptide, although the nucleic acid species can also be a molecule that turns on or increases gene expression. The protein or polypeptide can be endogenous or exogenous to the target cell. The protein or polypeptide can be heterologous.

As a result of co-delivery to the same cell by the nanoparticles, the desired effect from the biological activity of the first nucleic acid species in the cells is greater when delivered by the co-loaded nanoparticles, than when the first nucleic acid species is delivered in the absence of the second nucleic acid species. The desired effect from the biological activity of the second nucleic acid species in the cells is greater when delivered by the co-loaded nanoparticles, than when the second nucleic acid species is delivered in the absence of the first nucleic acid species.

The first and second nucleic acid species can target or affect the same or different cellular processes within a cell. Cellular processes include, but are not limited to, cell communication, cellular senescence, DNA repair, gene expression, metabolism, necrosis, and programmed cell death (apoptosis). In some embodiments the first and second nucleic acid species target or affect the biological functions of immune cells, such as leukocytes. Exemplary leukocytes include neutrophils, basophils, eosinophils, lymphocytes, monocytes, and macrophages. Exemplary biological activities of immune effector cells include activation, differentiation, proliferation, suppression and apoptosis of the immune cell. In some embodiments, the first and second nucleic acid species are selected to target one or more cellular pathways that contribute to one or more symptoms of a disease. The compositions can be used to treat a disease or disorder by delivering to a cell two nucleic acid species that affect the same or different cellular processes in target cells in an effective amount to reduce one or more symptoms of the disease or disorder. For example, if the disease or disorder is cancer, target cellular processes can be, but are not limited to, apoptosis, cell survival signaling, proliferation, sensitivity to anticancer agents, a DNA damage and repair pathway or signaling cascade, cellular metabolism, and combinations thereof. In this example, the inhibitory nucleic acid inhibits the proliferation of the cancer cells while at the same time as enhancing the expression of cytolytic proteins.

Methods of using the nanoparticles are also provided. For example, a method of simultaneously delivering two nucleic acid species (siRNA and mRNA) to cells can include contacting target cells with nanoparticles encapsulating the two nucleic acid species. The contacting can occur in vitro or in vivo. In some embodiments, the contacting occurs in vivo following administration of the nanoparticles to a subject in need thereof. The subject can have a disease or disorder, for example, cancer, an infection, inflammation, or an autoimmune disease or disorder. In some embodiments, the target cells for the nanoparticles are antigen-presenting cells such as dendritic cells, B-lymphocytes, or macrophages, including subcapsular macrophages.

Methods of using nanoparticles encapsulating or otherwise associated with two or more species of nucleic acids for modulating an immunological response towards a target antigen in a subject are also provided. In some embodiments, one nucleic acid species carries the genetic material encoding the target antigen while the second or further nucleic acid species upregulates and/or downregulates a target gene or product thereof. Exemplary target molecules on antigen presenting cells include those associated with the mammalian target of rapamycin (mTOR) pathway, and costimulatory molecules such as B7-1, B7-2, B7-H3, B7-H4, CD40, OX40L, ICOS-L (or B7-H2), PD-L1 (or B7-H1), PD-L2 (or B7-DC), LIGHT, CD70, 4-1BBL, CD30L, RelB, and SLAM, or others such as TLR3, TLR4, IL-6, and IL-23.

siRNAs can be used to reduce or prevent the expression or function of one or more co-stimulatory proteins, and thereby mediate developmental and/or immunological activities of the target cells. In some embodiments, nanoparticles encapsulate nucleic acids that provide immunological tolerance to one or more target antigens. These nanoparticles can be targeted to dendritic cells to provide tolerogenic therapies. The nanoparticles induce immunogenic tolerance through the delivery of inhibitory RNA that preclude or otherwise moderate the maturation of dendritic cells to produce semi-mature (i.e., tolerogenic) dendritic cell phenotype. The nanoparticles simultaneously deliver one or more mRNAs encoding a target antigen, to which immunological tolerance is desired. In some embodiments, the target antigen is expressed within the tolerogenic dendritic cells, which subsequently induce regulatory T leukocytes (T-regs), and/or induce clonal deletion of T cells within the host. An exemplary target antigen is a viral capsid protein, for example, associated with viruses used as vectors for gene therapy. Therefore, in certain embodiments, the nanoparticles induce tolerogenic dendritic cells to enhance the efficacy of gene therapy. Exemplary viral vector capsids include capsid proteins from Lentiviruses, Retroviruses, adeno-associated virus (AAV) serotypes AAV1, AAV2, AAV3, AAV4, AAV5, AAV6, AAV7, AAV8, AAV9, AAV10, or AAV11. Exemplary capsid proteins include VP1, VP2, or VP3 capsid proteins.

In other embodiments, the nanoparticles deliver mRNAs and inhibitory RNAs that simultaneously treat and prevent one or more cancers. The nanoparticles induce expression of one or more tumor suppressors, and simultaneously inhibit or reduce one or more oncogenes and/or tumorigenic drivers. Nanoparticles effective for treatment and prevention of cancer are loaded with mRNAs and siRNAs specific to the cancer that is to be treated. For example, in some embodiments, nanoparticles deliver siRNA to reduce or block expression or function of the Androgen Receptor, and mRNA that reconstitutes one or more lost tumor suppressor genes such as PTEN, or RB and/or P53 for the treatment of prostate cancers. In other embodiments, nanoparticles deliver siRNA to reduce or block expression or function of the EGFR and/or KRAS, and mRNA that reconstitutes one or more of p53, RB genes, p16 gene, or FHIT gene for the treatment of lung cancers.

BRIEF DESCRIPTION OF THE DRAWINGS

(FIG. 5B) biodistribution of PDSA8-1 NPs in the tumors and main organs of the PC3 xenograft tumor-bearing nude mice sacrificed 24 h post-injection of DY677-siRNA loaded PDSA8-1 NPs.

FIGS. 6A and 6B are schematics showing (FIG. 6A) molecular structures of the ultra pH-responsive polymer, Meo-PEG-b-P(DPA-co-GMA-TEPA-C14), and the tumor-penetrating polymer, iRGD-PEG-b-PDPA; (FIG. 6B) ultra pH-responsive and tumor-penetrating nanoplatform for nucleic acid loading and release.

(FIG. 7B) in vitro nucleic acid release at a pH of 7.4 (■), and 6.0 (●) over time (hours) from the NPs of PDPA80 at 37° C.

(FIG. 10B) Biodistribution of NPs in the PC3 xenograft tumor-bearing mice sacrificed at 24 h post-injection of naked siRNA, and siRNA-loaded NPs.

FIGS. 11A and 11B are schematic illustrations of (FIG. 11A) molecular structures of the oligoarginine-functionalized sharp pH-responsive polymer, Meo-PEG-b-P(DPA-co-GMA-Rn), and PCa-specific polymer, ACUPA-PEG-b-

PDPA; (FIG. 11B) the multifunctional envelope-type NP platform for in vivo PCa-specific nucleic acid delivery and therapy.

(FIG. 12B) Zeta potential (ζ) and encapsulation efficiency (EE %) of GL3 siRNA loaded NPs of Meo-PEG-b-P(DPA-co-GMA-Rn); and (FIG. 12C) In vitro release of DY745-siRNA from the NPsR10 at a pH of 6.0 (■) and 7.4 (●).

FIG. 15 is a flow cytometry profile of Luc-HeLa cells incubated with the DY547-siRNA-loaded NPsR10 and ACUPA-NPsR10 for 4 h.

FIGS. 16A-16B are flow cytometry profiles of PC3 (FIG. 16A) and DU145 cells (FIG. 16B) incubated with the DY547-siRNA-loaded NPsR10 and ACUPA-NPsR10 for 4 h.

(FIG. 17B) biodistribution of the NPs quantified from (FIG. 17C).

DETAILED DESCRIPTION OF THE INVENTION

I. Definitions

Figure 1A:
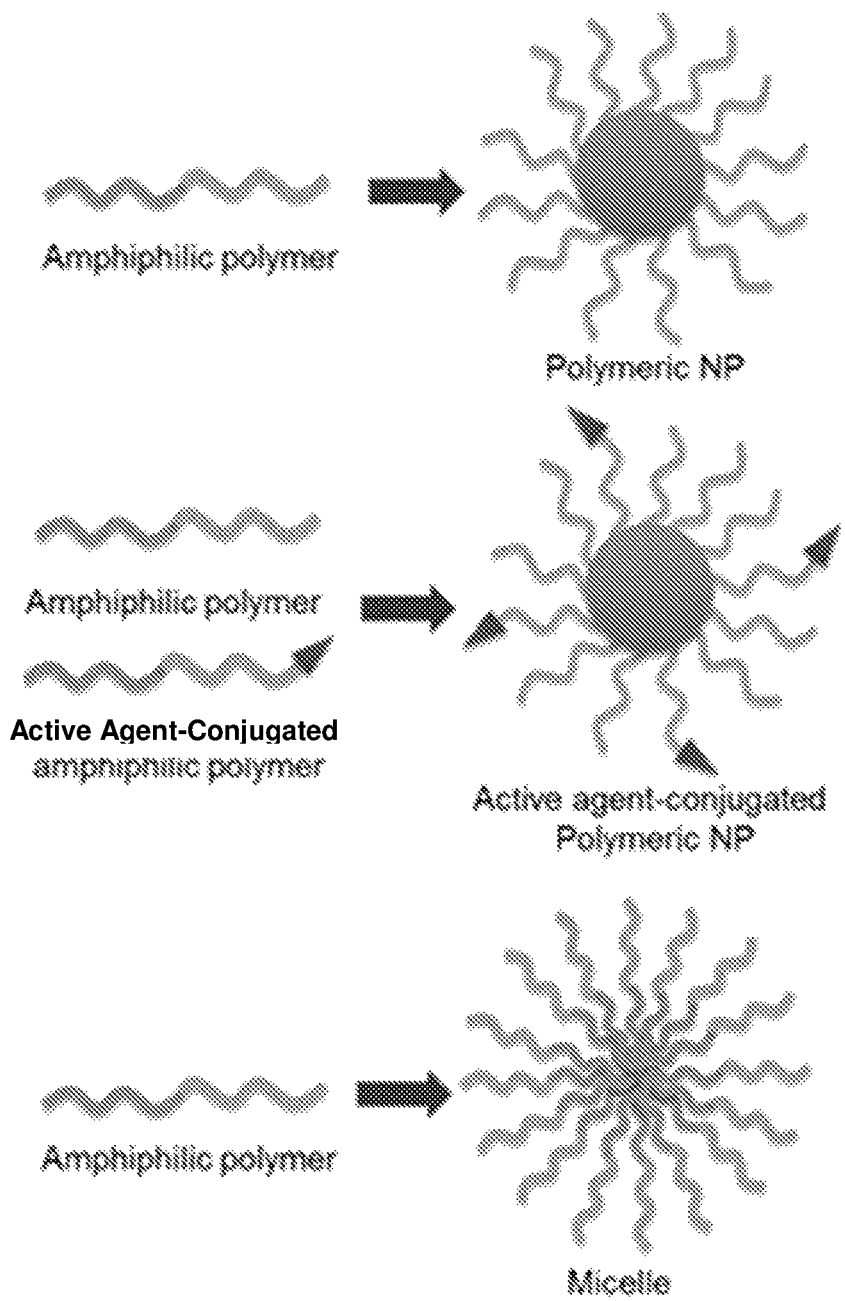
FIG. 1 is a schematic illustration of the polymeric nanoparticles, micelles (FIG. 1A), lipid/polymer hybrid nanoparticles, PEGylated lipid/polymer hybrid nanoparticles (FIG. 1B), and lipid micelles, liposomes and PEGylated liposomes (FIG. 1C).
Figure 1B:
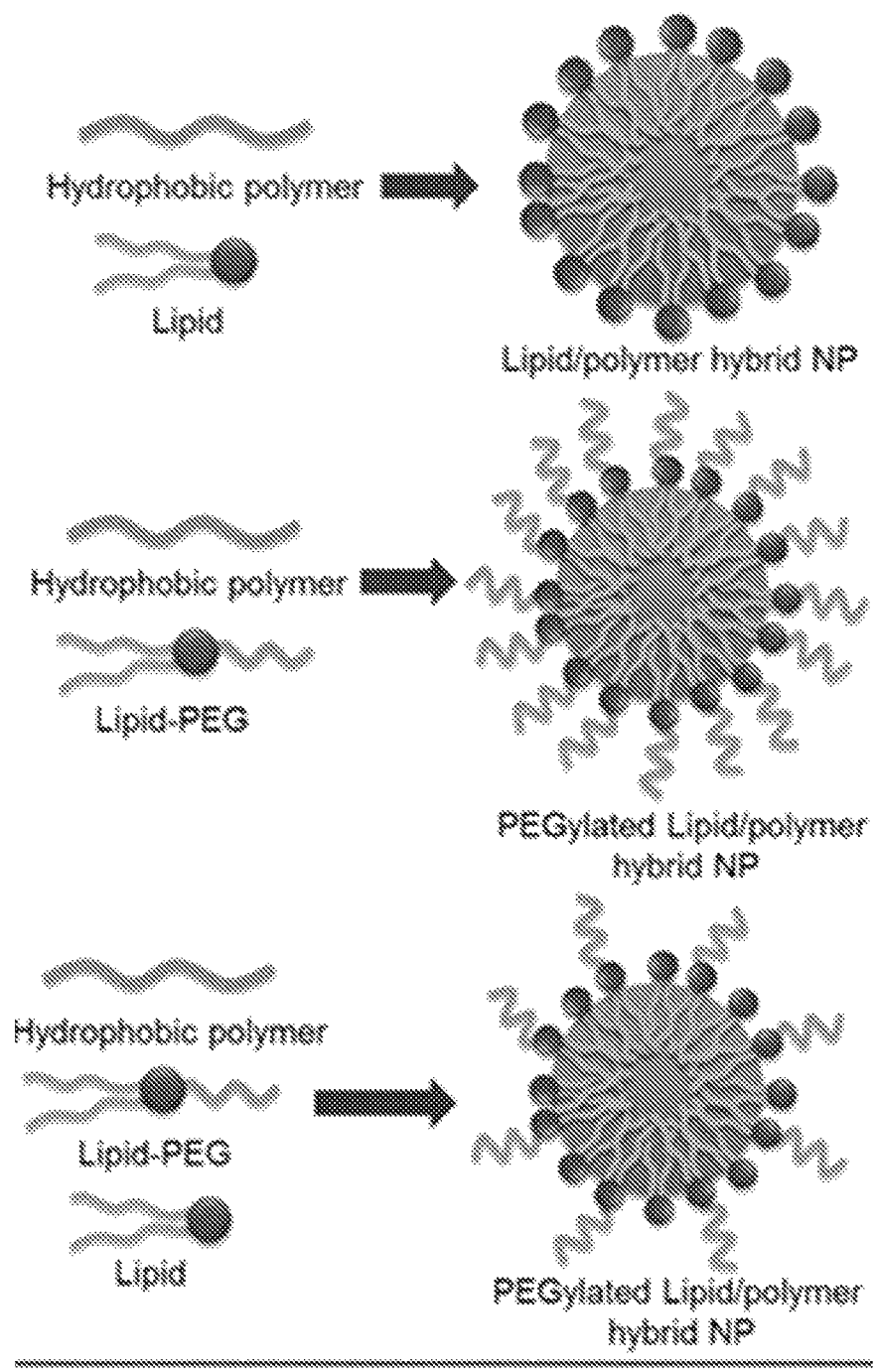
Figure 1C:
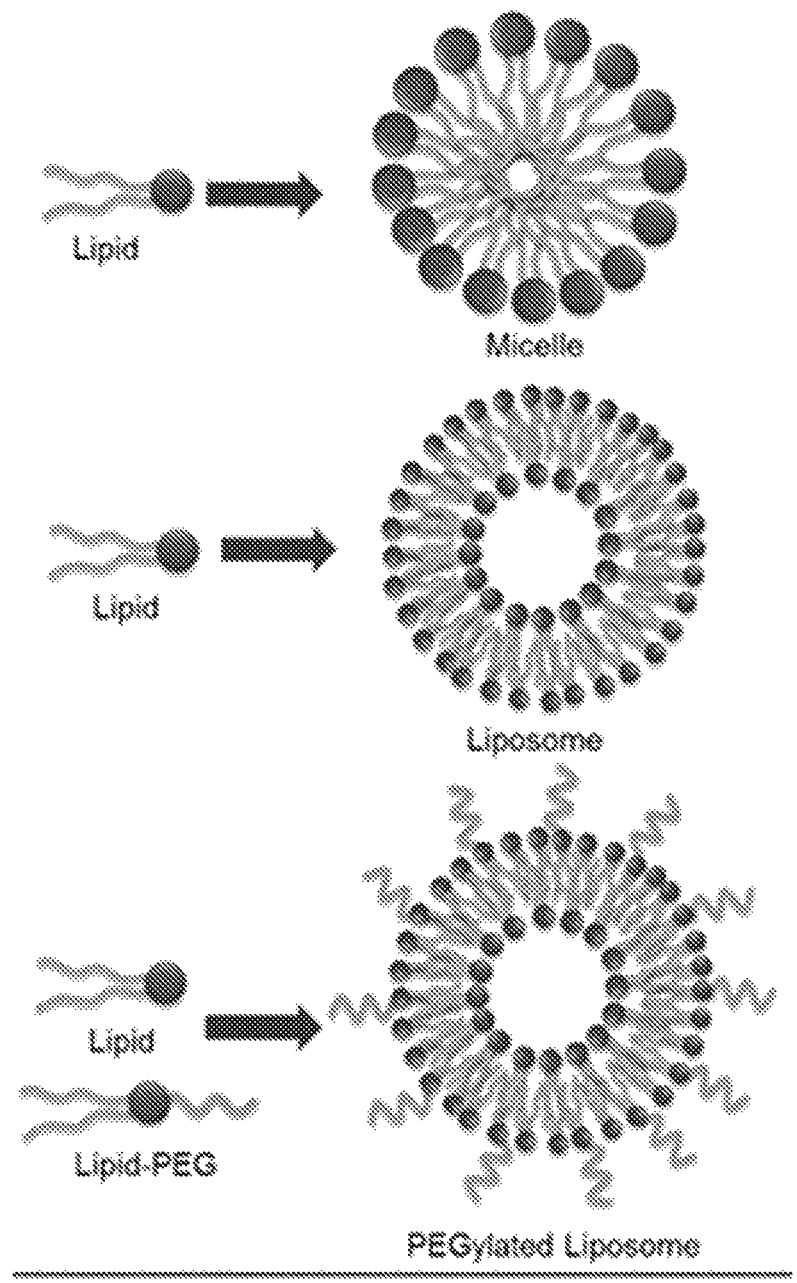
Figure 2:
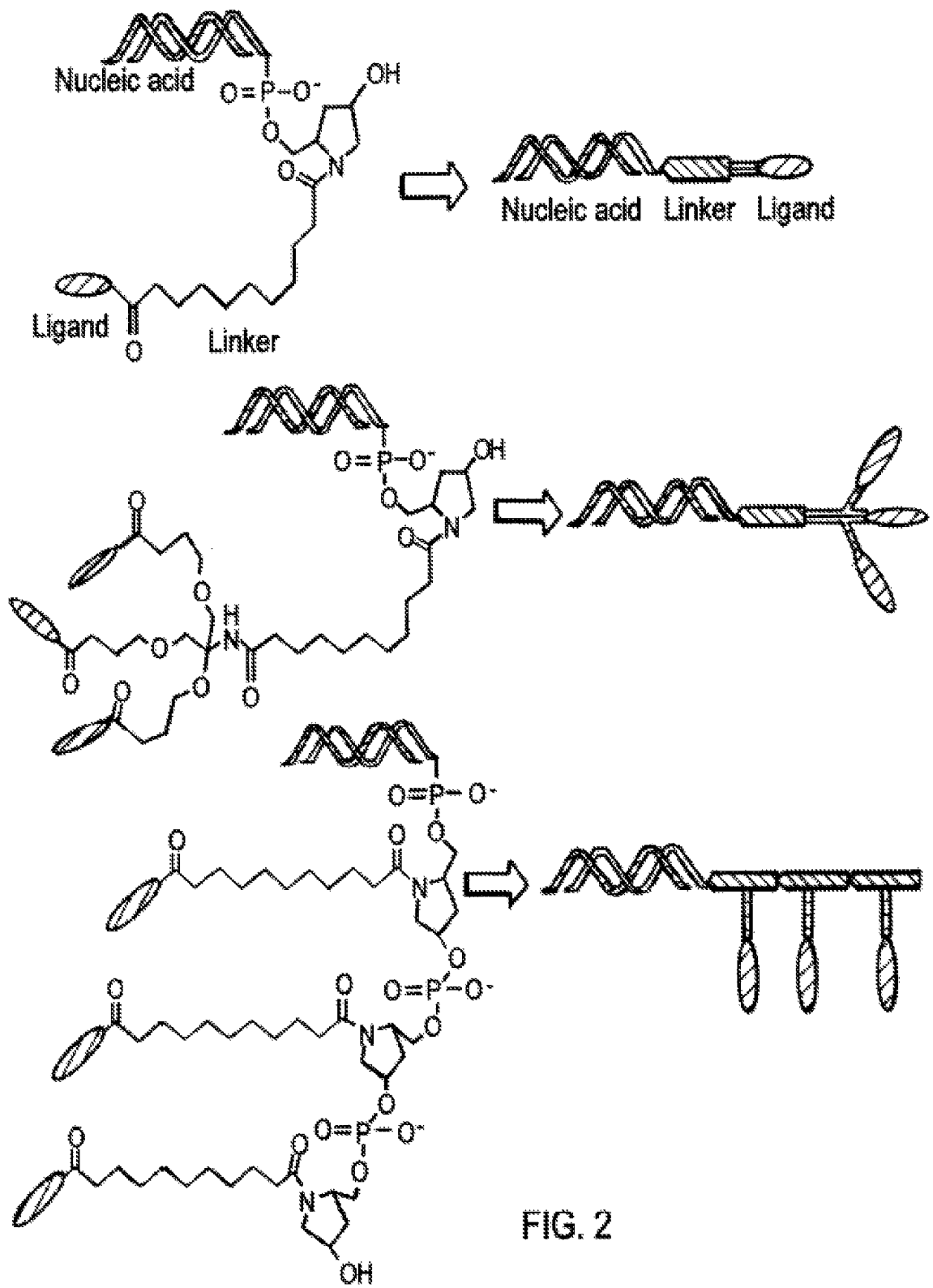
FIG. 2 is a schematic illustration of the modification of nucleic acids by a ligand.

Binding" refers to the interaction between a corresponding pair of molecules or portions thereof that exhibit mutual affinity or binding capacity, typically due to specific or non-specific binding or interaction, including, but not limited to, biochemical, physiological, and/or chemical interactions. "Binding partner" refers to a molecule that can undergo binding with a particular molecule. "Biological binding" defines a type of interaction that occurs between pairs of molecules including proteins, peptides, nucleic acids, glycoproteins, carbohydrates, or endogenous small molecules. "Specific binding" refers to molecules, such as polynucleotides, that are able to bind to or recognize a binding partner (or a limited number of binding partners) to a substantially higher degree than to other, similar biological entities.

"Encapsulation efficiency" (EE) is the fraction of initial drug that is encapsulated by the nanoparticles (NPs). "Loading" as used herein refers to the mass fraction of encapsulated agent in the NPs.

A "polymer," is given its ordinary meaning as used in the art, i.e., a molecular structure including one or more repeat units (monomers), connected by covalent bonds. A "biocompatible polymer" is used here to refer to a polymer that does not typically induce an adverse response when inserted or injected into a living subject, for example, without significant inflammation and/or acute rejection of the polymer by the immune system, for instance, via a T-cell response. A "copolymer" refers to a polymer formed of two or more different monomers. The different units may be arranged in a random order, in an alternating order, or as a "block" copolymer, i.e., including one or more regions each including a first repeat unit (e.g., a first monomer or block of monomers), and one or more regions each including a second repeat unit (e.g., a second block), etc. Block copolymers may have two (a diblock copolymer), three (a triblock copolymer), or more numbers of distinct blocks.

The term "amphiphilic" refers to a molecule has both a polar portion and a non-polar portion. In some embodiments, the polar portion is soluble in water, while the non-polar portion is insoluble in water. The polar portion may have either a formal positive charge, or a formal negative charge. Alternatively, the polar portion may have both a formal positive and a negative charge, and be a zwitterion or inner salt.

A "particle" refers to a particle, microcapsule, or microsphere. As used herein, nanoparticles typically have a longest dimension (e.g., diameter) of 1000 nm or less. In some embodiments, nanoparticles have a diameter of between 40 and 500 nm, more preferably 50 to 300 nm. In preferred embodiments, polymeric particles can be formed using a solvent emulsion, spray drying, or precipitation in bulk or microfluids, wherein the solvent is removed to no more than an insignificant residue, leaving a solid (which may, or may not, be hollow or have a liquid filled interior) polymeric particle, unlike a micelle whose form is dependent upon being present in an aqueous solution.

The term "carrier" or "excipient" refers to an organic or inorganic ingredient, natural or synthetic inactive ingredient in a formulation, with which one or more active ingredients are combined.

The term "pharmaceutically acceptable" means a non-toxic material that does not interfere with the effectiveness of the biological activity of the active ingredients.

The terms "sufficient" and "effective", are used interchangeably, and refer to an amount (e.g. mass, volume, dosage, concentration, and/or time period) needed to achieve one or more desired result(s). The term "therapeutically effective amount" means a dosage sufficient to alleviate one or more symptoms of a disorder, disease, or condition being treated, or to otherwise provide a desired pharmacologic and/or physiologic effect. The precise dosage will vary according to a variety of factors such as subject-dependent variables (e.g., age, immune system health, etc.), the disease or disorder being treated, as well as the route of administration and the pharmacokinetics of the agent being administered.

The term "modulate" refers to the ability of a compound to change an activity in some measurable way as compared to an appropriate control. As a result of the presence of compounds in the assays, activities can increase or decrease as compared to controls in the absence of these compounds.

The terms "inhibit" and "reduce" mean to reduce or decrease in activity or expression. This can be a complete inhibition or reduction of activity or expression, or a partial inhibition or reduction. Inhibition or reduction can be compared to a control or to a standard level.

The term "prevention" or "preventing" means to administer a composition to a subject or a system at risk for or having a predisposition for one or more symptom caused by a disease or disorder to cause cessation of a particular symptom of the disease or disorder, a reduction or prevention of one or more symptoms of the disease or disorder, a reduction in the severity of the disease or disorder, the complete ablation of the disease or disorder, stabilization or delay of the development or progression of the disease or disorder.

The terms "bioactive agent" and "active agent", are used interchangeably and include physiologically or pharmacologically active substances that act locally or systemically in the body. A bioactive agent is a substance used for the treatment (e.g., therapeutic agent), prevention (e.g., prophylactic agent), diagnosis (e.g., diagnostic agent), cure or mitigation of disease or illness, a substance which affects the structure or function of the body, or pro-drugs, which become biologically active or more active after they have been placed in a predetermined physiological environment.

The term "protein" "polypeptide" or "peptide" refers to a natural or synthetic molecule comprising two or more amino acids linked by the carboxyl group of one amino acid to the alpha amino group of another.

The term "polynucleotide" or "nucleic acid sequence" refers to a natural or synthetic molecule comprising two or more nucleotides linked by a phosphate group at the 3' position of one nucleotide to the 5' end of another nucleotide. The polynucleotide is not limited by length, and thus the polynucleotide can include deoxyribonucleic acid (DNA) or ribonucleic acid (RNA).

II. Particle Delivery Vehicles

Synthetic nanoparticles for co-delivery of one or more nucleic acids for suppressing one or more target genes, and one or more nucleic acids for over-expression of target genes or a protein in parallel are provided. Preferred vehicles include polymeric nanoparticles, micelles, lipid micelles, liposomes, and hybrid lipid-polymer nanoparticles. As demonstrated in the following examples, co-delivery can be obtained using polymeric or lipid-polymer hybrid nanoparticles wherein the polymer can be either responsive (like the presented data) or non-responsive.

A. Polymeric Particles

Nanoparticles can be formed of biodegradable, biocompatible polymers for co-delivery of the nucleic acids.

Typically the nanoparticles are formed of one or more hydrophobic polymers, optionally including amphiphilic polymers in the form of a blend where the hydrophilic polymers orient to the exterior of the nanoparticle, and/or hydrophilic polymers on the surface to avoid uptake by the reticuloendothelial system and enhance phagocytosis. Cationic polymers may be utilized to increase encapsulation of the nucleic acids.

Hydrophobic cationic material, hydrophobic polymer and/or the hydrophobic portion of amphiphilic materials provide a non-polar polymer matrix for loading non-polar drugs, protect and promoting siRNA molecule retention inside the NP core, and control drug release. The hydrophilic portion of the amphiphilic material can form a corona around the particle which prolongs circulation of the particles in the blood stream and decreases uptake by the RES. In one embodiment, the amphiphilic material is a hydrophobic, biodegradable polymer terminated with a hydrophilic block.

Biocompatible polymers include, but are not limited to, polyamides, polycarbonates, polyalkylenes, polyalkylene glycols, polyalkylene oxides, polyalkylene terepthalates, polyvinyl alcohols, polyvinyl ethers, polyvinyl esters, polyvinyl halides, polyvinylpyrrolidone, polylactides, polyglycolides, polysiloxanes, polyurethanes and copolymers thereof, celluloses including alkyl cellulose, hydroxyalkyl celluloses, cellulose ethers, cellulose esters, nitro celluloses, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, and cellulose sulphate sodium salt; polyacrylic acid polymers such as polymers of acrylic and methacrylic esters such as poly(methyl methacrylate), poly(ethylmethacrylate), poly(butylmethacrylate), poly (isobutylmethacrylate), poly(hexlmethacrylate), poly(isodecylmethacrylate), poly(lauryl methacrylate), poly(phenyl methacrylate), poly(methyl acrylate), poly(isopropyl acrylate), poly(isobutyl acrylate), poly(octadecyl acrylate), polyalkylenes such as polyethylene, polypropylene poly(ethylene glycol), poly(ethylene oxide), and poly(ethylene terephthalate), poly(vinyl alcohols), poly(vinyl acetate), poly vinyl chloride polystyrene and polyvinylpryrrolidone, derivatives thereof, linear and branched copolymers and block copolymers thereof, and blends thereof.

Exemplary biodegradable polymers include, but are not limited to, polyesters, poly(ortho esters), poly(ethylene imines), poly(caprolactones), poly(hydroxybutyrates), poly(hydroxyvalerates), polyanhydrides, poly(acrylic acids), polyglycolides, poly(urethanes), polycarbonates, polyphosphate esters, polyphosphazenes, derivatives thereof, linear and branched copolymers and block copolymers thereof, and blends thereof. In particularly preferred embodiments the polymeric core contains biodegradable hydrophobic polyesters such as poly(lactic acid), poly(glycolic acid), and poly(lactic-co-glycolic acid), and/or these polymers conjugated to polyalkylene oxides such as polyethylene glycol or block copolymers such as the polypropylene oxide-polyethylene oxide PLURONICS®.

The molecular weight of the biodegradable oligomeric or polymeric segment or polymer can be varied to tailor the properties of the polymer. Exemplary molecular weights include between about 150 Da and about 100 kDa, more preferably between about 1 kDa and about 75 kDa, most preferably between about 5 kDa and about 50 kDa.

In some embodiments, the hydrophilic polymers or segment(s) or block(s) include, but are not limited to, homo polymers or copolymers of polyalkene glycols, such as poly(ethylene glycol), poly(propylene glycol), poly(butylene glycol), and acrylates and acrylamides, such as hydroxyethyl methacrylate and hydroxypropyl-methacrylamide. The hydrophilic polymer segment typically has a molecular weight of between about 150 Da and about 20 kDa, more preferably between about 500 Da and about 10 kDa, most preferably between about 1 kDa and about 5 kDa.

The nanoparticles can be formed of a mixture or blend of polymers. In preferred embodiments, these are a blend of amphiphilic polymers, preferably copolymers of modified polyethylene glycol (PEG) and polyesters, such as various forms of PLGA-PEG or PLA-PEG copolymers, collectively referred to herein as "PEGylated polymers", some hydrophobic polymer such as PLGA, PLA or PGA, and/or some may be hydrophilic polymer such as a PEG or PEG derivative. Some may be modified by conjugation to a targeting agent, a cell adhesion or a cell penetrating peptide.

In some embodiments, the cationic material is a material that is cationic at the time the hydrophobic cationic material is prepared or becomes cationic under physiological conditions. In some embodiments, the cationic material contains one or more amine containing moieties, such as amine containing small molecules, amine-containing polymers, such as PEI, and amine-containing macromolecules, such as dendrimers (see the structures below). The cationic moieties are functionalized with one or more hydrophobic/lipid moieties, such as lipophilic alkyl chains (e.g., $C_6$-$C_{30}$, preferably $C_6$-$C_{24}$, more preferably $C_6$-$C_{18}$), cholesterol, saturated or unsaturated fatty acids, etc. The cationic moiety promotes retention of the siRNA in the core through electrostatic interaction while the hydrophobic moiety provides controlled release of the siRNA as well as any active agents in the shell.

Stimuli responsive polymers are well known in the art. Stimuli responsive amphiphilic polymers are responsive to a stimulus such as a pH change, redox change, temperature change, exposure to light or other stimuli, including binding to a target. Stimuli responsive polymers are reviewed by James, et al., Acta Pharma. Sinica B 4 (2): 120-127 (2014). The following is a list of exemplary polymers categorized by responsive to various stimuli: Temperature: POLOXAMERS, poly(N-alkylacrylamide) s, poly(N-vinylcaprolactam) s, cellulose, xyoglucan, and chitosan; pH: poly(methacrylic acid) s, poly(vinylpyridine) s, and poly(vinylimmidazole)s; light: modified poly(acrylamide) s; electric field: sulfonated polystyrenes, poly(thiophene) s, and poly(ethyloxazoline) s; ultrasound: ethylenevinylacetate.

Exemplary pH dependent polymers include dendrimers formed of poly(lysine), poly(hydroxyproline), PEG-PLA, Poly(propyl acrylic acid), Poly(ethacrylic acid), CARBOPOLL®, Polysilamine, EUDRAGIT® S-100 EUDRAGIT® L-100, Chitosan, PMAA-PEG copolymer, sodium alginate (Ca2+). The ionic pH sensitive polymers are able to accept or release protons in response to pH changes. These polymers contain acid groups (carboxylic or sulfonic) or basic groups (ammonium salts) so that the pH sensitive polymers are polyelectrolytes that have in their structure acid or basic groups that can accept or release protons in response to pH changes in the surrounding environment. pH values from several tissues and cell compartments can be used to trigger release in these tissues. For example, the pH of blood is 7.4-7.5; stomach is 1.0-3.0; duodenum is 4.8-8.2; colon is 7.0-7.5; lysosome is 4.5-5.0; Golgi complex is 6.4; tumor—extracellular medium is 6.2-7.2. pH is typically lower in areas of infection or inflammation. Examples of thermosensitive polymers include the poly(N-substituted acrylamide) polymers such as poly(N-isopoprylacrilamide) (PNIPAAm), poly(N,N'-diethyl acrylamide), poly(dimethylamino ethyl methacrylate and poly(N-(L)-(1-hydroxymethyl) propyl methacrylamide).

Biologically responsive polymer systems are increasingly important in various biomedical applications. The major advantage of bioresponsive polymers is that they can respond to the stimuli that are inherently present in the natural system. Bioresponsive polymeric systems mainly arise from common functional groups that are known to interact with biologically relevant species, and in other instances the synthetic polymer is conjugated to a biological component. Bioresponsive polymers include antigen-responsive polymers, glucose-sensitive polymers, and enzyme-responsive polymers.

B. Lipid-Based Delivery Vehicles

Nanoparticles may include one or more lipids, may be in the form of a liposome, may include a lipid monolayer or bilayer, or be formed of micelles. In some embodiments, nanoparticles include a polymeric core surrounded by a lipid layer (e.g., lipid bilayer, lipid monolayer, etc.). In some embodiments, a nanoparticle includes a non-polymeric core (e.g., metal particle, quantum dot, ceramic particle, bone particle, etc.) surrounded by a lipid layer (e.g., lipid bilayer, lipid monolayer, etc.).

The percent of lipid in the nanoparticles can be from greater than 0% to 99% by weight, inclusive, from 10% to 99% by weight, from 25% to 99% by weight, from 50% to 99% by weight, or from 75% to 99% by weight. In some embodiments, the percent of lipid in nanoparticles is approximately 1% by weight, approximately 2% by weight, approximately 3% by weight, approximately 4% by weight, approximately 5% by weight, approximately 10% by weight, approximately 15% by weight, approximately 20% by weight, approximately 25% by weight, or approximately 30% by weight.

In some embodiments, lipids are biocompatible oils. Suitable oils for use include plant oils and butyl stearate, caprylic triglyceride, capric triglyceride, cyclomethicone, diethyl sebacate, dimethicone 360, isopropyl myristate, mineral oil, octyldodecanol, oleyl alcohol, silicone oil, and combinations thereof.

Oils may include one or more fatty acid groups or salts thereof. In some embodiments, a fatty acid group is digestible, long chain (e.g., C8-C50), substituted or unsubstituted hydrocarbons. In some embodiments, a fatty acid group is a C10-C20 fatty acid, C15-C20 fatty acid, or C15-C25 fatty acid or salt thereof. The fatty acid group can be unsaturated, monounsaturated, or polyunsaturated. In some embodiments, a double bond of an unsaturated fatty acid group is in the cis conformation. In some embodiments, a double bond of an unsaturated fatty acid is in the trans conformation.

In some embodiments, a fatty acid group is one or more of butyric, caproic, caprylic, capric, lauric, myristic, palmitic, stearic, arachidic, behenic, or lignoceric acid. In some embodiments, a fatty acid group is one or more of palmitoleic, oleic, vaccenic, linoleic, alpha-linolenic, gamma-linoleic, arachidonic, gadoleic, arachidonic, eicosapentaenoic, docosahexaenoic, or erucic acid. In some embodiments, the oil is a liquid triglyceride.

In some embodiments, a lipid is a steroid (e.g., cholesterol, bile acid), vitamin (e.g. vitamin E), phospholipid (e.g. phosphatidyl choline), sphingolipid (e.g. ceramides), or lipoprotein (e.g. apolipoprotein). In some embodiments, a lipid is a lipid-like material (also called lipidoid). See Akinc, et al., *Nat Biotechnol.*, 2008; 26 (5): 561-9; Love, et al., *Proc Natl Acad Sci USA.* 2010; 107 (5): 1864-9; and Whitehead, et al., *Nat. Commun.*, 2014; 5:4277.

In certain embodiments, the lipid is phosphatidylcholine, lipid A, cholesterol, dolichol, sphingosine, sphingomyelin, ceramide, glycosylceramide, cerebroside, sulfatide, phytosphingosine, phosphatidyl-ethanolamine, phosphatidylglycerol, phosphatidylinositol, phosphatidylserine, cardiolipin, phosphatidic acid, and/or lyso-phophatides.

In some embodiments, nanoparticle-stabilized liposomes are used to deliver the disclosed nucleic acid content. By allowing small charged nanoparticles (1 nm-30 nm) to adsorb on liposome surface, liposome-nanoparticle complexes have not only the merits of bare liposomes, but also tunable membrane rigidity and controllable liposome stability. When small charged nanoparticles approach the surface of liposomes carrying either opposite charge or no net charge, electrostatic or charge-dipole interaction between nanoparticles and membrane attracts the nanoparticles to stay on the membrane surface, being partially wrapped by lipid membrane. This induces local membrane bending and globule surface tension of liposomes, both of which enable tuning of membrane rigidity. Adsorbed nanoparticles form a charged shell which protects liposomes against fusion, thereby enhancing liposome stability. In certain embodiments, small nanoparticles are mixed with liposomes under gentle vortex, and the nanoparticles stick to liposome surface spontaneously.

C. Lipid-Polymer Delivery Vehicles

In some embodiments, nanoparticles include one or more polymers associated covalently, or non-covalently with one or more lipids, preferably phospholipids.

In some embodiments, a polymeric matrix can be surrounded by a lipid coating layer (e.g., liposome, lipid monolayer, micelle, etc.). The lipid monolayer shell can include an amphiphilic compound. In another embodiment, the amphiphilic compound is lecithin. The lipid monolayer can be stabilized.

Phospholipids which may be used include, but are not limited to, phosphatidic acids, phosphatidyl cholines with both saturated and unsaturated lipids, phosphatidyl ethanolamines, phosphatidylglycerols, phosphatidylserines, phosphatidylinositols, lysophosphatidyl derivatives, cardiolipin, and β-acyl-y-alkyl phospholipids. In a particular embodiment, an amphiphilic component that can be used to form an amphiphilic layer is lecithin, and, in particular, phosphatidylcholine. Lecithin is an amphiphilic lipid and, as such, forms a phospholipid bilayer having the hydrophilic (polar) heads facing their surroundings, which are oftentimes aqueous, and the hydrophobic tails facing each other. Lecithin has an advantage of being a natural lipid that is available from, e.g., soybean, and already has FDA approval for use in other delivery devices.

Examples of phospholipids include, but are not limited to, phosphatidylcholines such as dioleoylphosphatidylcholine, dimyristoylphosphatidylcholine, dipentadecanoylphosphatidylcholine dilauroylphosphatidylcholine, dipalmitoylphosphatidylcholine (DPPC), distearoylphosphatidylcholine (DSPC), diarachidoylphosphatidylcholine (DAPC), dibehenoylphosphatidylcho-line (DBPC), ditricosanoylphosphatidylcholine (DTPC), dilignoceroylphatidylcholine (DLPC); and phosphatidylethanolamines such as dioleoylphosphatidylethanolamine or 1-hexadecyl-2-palmitoylglycerophosphoethanolamine, incorporated at a ratio of between 0.01-60 (weight lipid/w polymer), most preferably between 0.1-30 (weight lipid/w polymer). Synthetic phospholipids with asymmetric acyl chains (e.g., with one acyl chain of 6 carbons and another acyl chain of 12 carbons) may also be used.

By covering the polymeric nanoparticles with a thin film of small molecule amphiphilic compounds, the nanoparticles have merits of both polymer- and lipid-based nanoparticles, while excluding some of their limitations. The amphiphilic compounds form a tightly assembled monolayer around the polymeric core. This monolayer effectively prevents the carried agents from freely diffusing out of the nanoparticle, thereby enhancing the encapsulation yield and slowing drug release. Moreover, the amphiphilic monolayer also reduces water penetration rate into the nanoparticle, which slows the hydrolysis rate of the biodegradable polymers, thereby increasing particle stability and lifetime.

In some embodiments, the nanoparticle include a polymeric matrix, wherein the polymeric matrix includes a lipid-terminated polymer such as polyalkylene glycol and/or a polyester. In some embodiments, the nanoparticle includes an amphiphilic lipid-terminated polymer, where a cationic and/or an aniotic lipid is conjugated to a hydrophobic polymer. In one embodiment, the polymeric matrix includes lipid-terminated PEG. In some embodiments, the polymeric matrix includes lipid-terminated copolymer. In another embodiment, the polymeric matrix includes lipid-terminated PEG and PLGA. In one embodiment, the lipid is 1,2 distearoyl-sn-glycero-3-phosphoethanolamine (DSPE), and salts thereof. In a preferred embodiment, the polymeric matrix includes DSPE-terminated PEG. The lipid-terminated PEG can then, for example, be mixed with PLGA to form a nanoparticle.

In some embodiments, long-circulating, optionally cell-penetrating, and stimuli-responsive nanopaticles for effective in vivo delivery of therapeutic, prophylactic and/or diagnostic agents are used. In the preferred embodiment, the NPs are made of an amphiphilic polymer, most preferably a PEGylated polymer, which shows a response to a stimulus such as pH, temperature, or light, such as an ultra pH-responsive characteristic with a pKa close to the endosomal pH (6.0-6.5) (Wang Y et al, *Nat Mater,* 13, 204-212 (2014)). The polymer may include a targeting or cell penetrating or adhesion molecule such as a tumor-penetrating peptide iRGD.

III. Therapeutic, Prophylactic and Diagnostic Agents

The nanoparticles contain both an inhibitory nucleic acid, such as antisense, siRNA, miRNA, piRNA, etc., and a nucleic acid stimulating or enhancing production of a gene product such as a mRNA encoding an exogenous or endogenus antigen that is being expressed for immune stimulation or immune tolerance. In another example, the mRNA can be tumor suppressor-encoded mRNA which suppresses cancer proliferation, metastasis, viability or genes therein.

The experiments below show that when siRNA and mRNA are delivered into a cell using a nanoparticle co-loaded with both the siRNA and the mRNA, suppression of gene expression targeted by the siRNA and expression of protein encoded by the mRNA are both increased. Inhibition of expression of the target of siRNA was reduced to a greater degree when co-delivered in combination with mRNA, than when delivered alone using the same nanoparticle composition. Similarly, protein expressed by the mRNA was higher when delivered in combination with the siRNA, then when delivered alone using the same nanoparticle composition.

In some embodiments, the NPs contain between about 1% and about 70% weight/weight of cargo. Preferably, the NPs contain between about 5% and about 50% weight/weight, most preferably between about 10% and about 30% weight/weight of cargo.

Exemplary nucleic acid-based active agents are discussed in greater detail below. However, it will be appreciated that in addition to nucleic acid-based active agents, the particles can further include other active agent cargos. Additionally or alternatively nucleic acid-containing particles can be co-delivered to a subject in combination with (i) particles containing other active agents, or (ii) with other active agents not contained in particles, or combination thereof. Active agent cargos to be delivered include therapeutic, nutritional, diagnostic, and prophylactic agents. The active agents can be small molecule active agents or biomacromolecules, such as proteins, polypeptides, sugars or carbohydrates, lipids, nucleic acids or small molecule compounds (typically 1 kD or less, but may be larger). Suitable small molecule active agents include organic and organometallic compounds. The small molecule active agents can be a hydrophilic, hydrophobic, or amphiphilic compound.

Active agents include synthetic and natural proteins (including enzymes, peptide-hormones, receptors, growth factors, antibodies, signaling molecules), and synthetic and natural nucleic acids (including RNA, DNA, anti-sense RNA, triplex DNA, inhibitory RNA (RNAi), and oligonucleotides), and biologically active portions thereof. Suitable active agents have a size greater than about 1,000 Da for small peptides and polypeptides, more typically at least about 5,000 Da and often 10,000 Da or more for proteins. Nucleic acids are more typically listed in terms of base pairs or bases (collectively "bp"). Nucleic acids with lengths above about 10 bp are typically used. More typically, useful lengths of nucleic acids for probing or therapeutic use will be in the range from about 20 bp (probes; inhibitory RNAs, etc.) to tens of thousands of bp for genes and vectors. The active agents may also be hydrophilic molecules, preferably having a low molecular weight.

In other embodiments, the nanoparticle contains only one nucleic acid molecule which inhibits expression or function of a co-stimulatory molecule to induce tolerance to an antigen within an antigen presenting cell, or which expresses or up-regulates a molecule which acts as an inhibitor of the expression or function of a co-stimulatory molecule within an antigen presenting cell. The down-regulation, silencing or blocking of the function of one or more co-stimulatory molecules drives the antigen presenting cell towards a tolerognic phenotype. For example, in some embodiments, nanoparticles containing single nucleic acid species induce potential tolerogenic dendritic cell. Simulataneous administration of an antigen, either systemically or locally, in solution or in particles administered as a suspension (e.g., in the form of nanoparticles containing a single mRNA encoding the target antigen), or by co-adminsitration of the target antigen to the same host by other means (e.g., in the form of a conventional vaccine), induces immunological tolerance to the target antigen in the host.

In some embodiments, pharmaceutical formulations for inducing tolerance to a target antigen include a combination of (i) nanoparticles encapsulating a single inhibitory RNA species (e.g., siRNA) that down-regulates or silences a costimulatory molecule; and (ii) a tolerogenic antigen in a non-nanparticle form for administration to a subject in vivo. In other embodiments, pharmaceutical formulations for inducing tolerance to a target antigen include a combination of (i) nanoparticles encapsulating a single mRNA species that encodes a protein that down-regulates or silences a costimulatory molecule; and (ii) a tolerogenic antigen in a non-nanparticle form for administration to a subject in vivo.

In further embodiments, the nanoparticles are formulated in a solution or adminsitration to a subject in combination with on or more additional non-nucleic-acid based active agents. The non-nucleic-acid based active agents can be therapeutic, prophylactic or diagnostic agents. The non-nucleic-acid based active agents are encapsulated within the nanoparticles, or otherwise encoproprated into the core, or shell, or onto the surface of the particles, or combinations thereof. In some embodiments, the non-nucleic acid active agents are not associated with the nanoparticles, for example, they are administered as a solution, gel or other mixture that also includes the particles, or formulated for administration as a separate solution, solid or powder, or for admisitration through a separate route to that of the nanoparticles.

A. Nucleic Acid-Based Agents

An isolated nucleic acid can be, for example, a DNA, an RNA, or a nucleic acid analog. Nucleic acid analogs can be modified at the base moiety, sugar moiety, or phosphate backbone. Such modification can improve, for example, stability, hybridization, solubility, or targeting of the nucleic acid. Exemplary modifications include, 2'O-methyl, 2' methoxyethyl, phosphoramidate, methylphosphonate, and/or phosphorothioate backbone chemistry. In some embodiments, nucleic acids are modified to acquire one or more properties selected from the group consisting of increase nuclease resistance, enhanced membrane permeability, and reduced immunogenicity. In some embodiments, a targeting moiety is conjugated with nucleic acid.

The chemical modifications include chemical modification of nucleobases, sugar moieties, nucleotide linkages, or combinations thereof. As used herein 'modified nucleotide" or "chemically modified nucleotide" defines a nucleotide that has a chemical modification of one or more of the heterocyclic base, sugar moiety or phosphate moiety constituents. In some embodiments, the charge of the modified nucleotide is reduced compared to DNA or RNA oligonucleotides of the same nucleobase sequence. For example, the oligonucleotide can have low negative charge, no charge, or positive charge.

Typically, nucleoside analogs support bases capable of hydrogen bonding by Watson-Crick base pairing to standard polynucleotide bases, where the analog backbone presents the bases in a manner to permit such hydrogen bonding in a sequence-specific fashion between the oligonucleotide analog molecule and bases in a standard polynucleotide (e.g., single-stranded RNA or single-stranded DNA). In some embodiments, the analogs have a substantially uncharged, phosphorus containing backbone. Chemical modifications of heterocyclic bases or heterocyclic base analogs may be effective to increase the binding affinity or stability in binding a target sequence. Chemically-modified heterocyclic bases include, but are not limited to, inosine, 5-(1-propynyl) uracil (pU), 5-(1-propynyl) cytosine (pC), 5-methylcytosine, 8-oxo-adenine, pseudocytosine, pseudoisocytosine, 5 and 2-amino-5-(2'-deoxy-.beta.-D-ribofuranosyl) pyridine (2-aminopyridine), and various pyrrolo- and pyrazolopyrimidine derivatives.

Sugar moiety modifications include, but are not limited to, 2'-O-aminoetoxy, 2'-O-amonioethyl (2'-OAE), 2'-O-methoxy, 2'-O-methyl, 2-guanidoethyl (2'-OGE), 2'-0,4'-C-methylene (LNA), 2'-O-(methoxyethyl) (2'-OME) and 2'-O—(N-(methyl) acetamido) (2'-OMA).

In some embodiments, the functional nucleic acid is a morpholino oligonucleotide. Morpholino oligonucleotides are typically composed of two more morpholino monomers containing purine or pyrimidine base-pairing moieties effective to bind, by base-specific hydrogen bonding, to a base in a polynucleotide, which are linked together by phosphorus-containing linkages, one to three atoms long, joining the morpholino nitrogen of one monomer to the 5' exocyclic carbon of an adjacent monomer. The purine or pyrimidine base-pairing moiety is typically adenine, cytosine, guanine, uracil or thymine. The synthesis, structures, and binding characteristics of morpholino oligomers are detailed in U.S. Pat. Nos. 5,698,685, 5,217,866, 5,142,047, 5,034,506, 5,166,315, 5,521,063, and 5,506,337.

Important properties of the morpholino-based subunits typically include: the ability to be linked in a oligomeric form by stable, uncharged backbone linkages; the ability to support a nucleotide base (e.g. adenine, cytosine, guanine, thymidine, uracil or inosine) such that the polymer formed can hybridize with a complementary-base target nucleic acid, including target RNA, with high $T_m$, even with oligomers as short as 10-14 bases; the ability of the oligomer to be actively transported into mammalian cells; and the ability of an oligomer: RNA heteroduplex to resist RNAse degradation.

Modifications to the phosphate backbone of DNA or RNA oligonucleotides may increase the binding affinity or stability oligonucleotides, reduce the susceptibility of oligonucleotides nuclease digestion, or increase membrane permeability. Cationic modifications, including, but not limited to, diethyl-ethylenediamide (DEED) or dimethyl-aminopropylamine (DMAP) may be especially useful due to decrease electrostatic repulsion between the oligonucleotide and a target. Modifications of the phosphate backbone may also include the substitution of a sulfur atom for one of the non-bridging oxygens in the phosphodiester linkage. This substitution creates a phosphorothioate internucleoside linkage in place of the phosphodiester linkage. Oligonucleotides containing phosphorothioate internucleoside linkages have been shown to be more stable in vivo.

Examples of modified nucleotides with reduced charge include modified internucleotide linkages such as phosphate analogs having achiral and uncharged intersubunit linkages (e.g., Sterchak, E. P. et al., *Organic. Chem.*, 52:4202, (1987)), and uncharged morpholino-based polymers having achiral intersubunit linkages (see, e.g., U.S. Pat. No. 5,034,506), as discussed above. Some internucleotide linkage analogs include morpholidate, acetal, and polyamide-linked heterocycles.

The oligonucleotides can be locked nucleic acids. Locked nucleic acids (LNA) are modified RNA nucleotides (see, for example, Braasch, et al., *Chem. Biol.*, 8 (1): 1-7 (2001)). LNAs form hybrids with DNA which are more stable than DNA/DNA hybrids, a property similar to that of peptide nucleic acid (PNA)/DNA hybrids. Therefore, LNA can be used just as PNA molecules would be. LNA binding efficiency can be increased in some embodiments by adding positive charges to it. Commercial nucleic acid synthesizers and standard phosphoramidite chemistry are used to make LNAs.

In some embodiments, the oligonucleotides are composed of peptide nucleic acids. Peptide nucleic acids (PNAs) are synthetic DNA mimics in which the phosphate backbone of the oligonucleotide is replaced in its entirety by repeating N-(2-aminoethyl)-glycine units and phosphodiester bonds are typically replaced by peptide bonds. The various heterocyclic bases are linked to the backbone by methylene carbonyl bonds. PNAs maintain spacing of heterocyclic bases that is similar to conventional DNA oligonucleotides, but are achiral and neutrally charged molecules. Peptide nucleic acids are formed of peptide nucleic acid monomers.

Other backbone modifications include peptide and amino acid variations and modifications. Thus, the backbone constituents of oligonucleotides such as PNA may be peptide linkages, or alternatively, they may be non-peptide peptide linkages. Examples include acetyl caps, amino spacers such as 8-amino-3,6-dioxaoctanoic acid (referred to herein as O-linkers), amino acids such as lysine are particularly useful if positive charges are desired in the PNA, and the like. Methods for the chemical assembly of PNAs are well known. See, for example, U.S. Pat. Nos. 5,539,082, 5,527,675, 5,623,049, 5,714,331, 5,736,336, 5,773,571 and 5,786,571.

Oligonucleotides optionally include one or more terminal residues or modifications at either or both termini to increase stability, and/or affinity of the oligonucleotide for its target. Commonly used positively charged moieties include the amino acids lysine and arginine, although other positively charged moieties may also be useful. Oligonucleotides may further be modified to be end capped to prevent degradation using a propylamine group. Procedures for 3' or 5' capping oligonucleotides are well known in the art.

The functional nucleic acid can be single stranded or double stranded.

The nucleic acid molecule can exist as a separate molecule independent of other sequences (e.g., a chemically synthesized nucleic acid, or a cDNA or genomic DNA fragment produced by PCR or restriction endonuclease treatment), as well as recombinant DNA that is incorporated into a vector, an autonomously replicating plasmid, etc. The nucleic acid can be an engineered nucleic acid such as a recombinant DNA molecule that is part of a hybrid or fusion nucleic acid. In some embodiments, the nucleic acids contain a fraction of AAV genome for enhanced packaging and delivery, for example a 5' AAV inverted terminal repeat (ITR), a 3' AAV inverted terminal repeat (ITR), a promoter and optional enhancer, a polyadenylation signal. In some embodiments, the nucleic acid includes AAV vector for example, a VP1, VP2, or VP3 capsid selected from any serotype of AAV1, AAV2, AAV3, AAV4, AAV5, AAV6, AAV7, AAV8, AAV9, AAV10, AAV11, or mixtures, variants or derivatives thereof.

1. Functional Nucleic Acid Molecules

Functional nucleic acids are nucleic acid molecules that have a specific function, such as binding a target molecule or catalyzing a specific reaction. As discussed in more detail below, functional nucleic acid molecules can be divided into the following non-limiting categories: antisense molecules, RNAi including siRNA, miRNA, shRNA, Dicer siRNA, and piRNA, aptamers, ribozymes, triplex forming molecules, external guide sequences, and gene editing compositions. The functional nucleic acid molecules can act as effectors, inhibitors, modulators, and stimulators of a specific activity possessed by a target molecule, or the functional nucleic acid molecules can possess a de novo activity independent of any other molecules.

Functional nucleic acid molecules can interact with any macromolecule, such as DNA, RNA, polypeptides, or carbohydrate chains. Thus, functional nucleic acids can interact with the mRNA or the genomic DNA of a target polypeptide or they can interact with the polypeptide itself. Often functional nucleic acids are designed to interact with other nucleic acids based on sequence homology between the target molecule and the functional nucleic acid molecule. In other situations, the specific recognition between the functional nucleic acid molecule and the target molecule is not based on sequence homology between the functional nucleic acid molecule and the target molecule, but rather is based on the formation of tertiary structure that allows specific recognition to take place.

The functional nucleic acids can be antisense molecules. Antisense molecules are designed to interact with a target nucleic acid molecule through either canonical or non-canonical base pairing. The interaction of the antisense molecule and the target molecule is designed to promote the destruction of the target molecule through, for example, RNAse H mediated RNA-DNA hybrid degradation. Alternatively the antisense molecule is designed to interrupt a processing function that normally would take place on the target molecule, such as transcription or replication. Antisense molecules can be designed based on the sequence of the target molecule. There are numerous methods for optimization of antisense efficiency by finding the most accessible regions of the target molecule. Exemplary methods include in vitro selection experiments and DNA modification studies using DMS and DEPC. It is preferred that antisense molecules bind the target molecule with a dissociation constant ($K_d$) less than or equal to $10^{-6}$, $10^{-8}$, $10^{-10}$, or $10^{-12}$ M.

The functional nucleic acids can be aptamers. Aptamers are molecules that interact with a target molecule, preferably in a specific way. Typically aptamers are small nucleic acids ranging from 15-50 bases in length that fold into defined secondary and tertiary structures, such as stem-loops or G-quartets. Aptamers can bind small molecules, such as ATP and theophiline, as well as large molecules, such as reverse transcriptase and thrombin. Aptamers can bind very tightly with $K_d$'s from the target molecule of less than 10-12 M. It is preferred that the aptamers bind the target molecule with a $K_d$ less than $10^{-6}$, $10^{-8}$, $10^{-10}$, or $10^{-12}$ M. Aptamers can bind the target molecule with a very high degree of specificity. For example, aptamers have been isolated that have greater than a 10,000 fold difference in binding affinities between the target molecule and another molecule that differ at only a single position on the molecule. It is preferred that the aptamer have a $K_d$ with the target molecule at least 10, 100, 1000, 10,000, or 100,000 fold lower than the $K_d$ with a background binding molecule. It is preferred when doing the comparison for a molecule such as a polypeptide, that the background molecule be a different polypeptide.

The functional nucleic acids can be ribozymes. Ribozymes are nucleic acid molecules that are capable of catalyzing a chemical reaction, either intramolecularly or intermolecularly. It is preferred that the ribozymes catalyze intermolecular reactions. There are a number of different types of ribozymes that catalyze nuclease or nucleic acid polymerase type reactions which are based on ribozymes found in natural systems, such as hammerhead ribozymes. There are also a number of ribozymes that are not found in natural systems, but which have been engineered to catalyze specific reactions de novo. Preferred ribozymes cleave RNA or DNA substrates, and more preferably cleave RNA substrates. Ribozymes typically cleave nucleic acid substrates through recognition and binding of the target substrate with subsequent cleavage. This recognition is often based mostly on canonical or non-canonical base pair interactions. This property makes ribozymes particularly good candidates for target specific cleavage of nucleic acids because recognition of the target substrate is based on the target substrates sequence.

The functional nucleic acids can be triplex forming molecules. Triplex forming functional nucleic acid molecules are molecules that can interact with either double-stranded or single-stranded nucleic acid. When triplex molecules interact with a target region, a structure called a triplex is formed in which there are three strands of DNA forming a complex dependent on both Watson-Crick and Hoogsteen base-pairing. Triplex molecules are preferred because they can bind target regions with high affinity and specificity. It is preferred that the triplex forming molecules bind the target molecule with a $K_d$ less than $10^{-6}$, $10^{-8}$, $10^{-10}$, or $10^{-12}$ M.

The functional nucleic acids can be external guide sequences. External guide sequences (EGSs) are molecules that bind a target nucleic acid molecule forming a complex, which is recognized by RNase P, which then cleaves the target molecule. EGSs can be designed to specifically target an RNA molecule of choice. RNAse P aids in processing transfer RNA (tRNA) within a cell. Bacterial RNAse P can be recruited to cleave virtually any RNA sequence by using an EGS that causes the target RNA: EGS complex to mimic the natural tRNA substrate. Similarly, eukaryotic EGS/RNAse P-directed cleavage of RNA can be utilized to cleave desired targets within eukarotic cells. Representative examples of how to make and use EGS molecules to facilitate cleavage of a variety of different target molecules are known in the art.

In some embodiments, the functional nucleic acids induce gene silencing through RNA interference. Gene expression can also be effectively silenced in a highly specific manner through RNA interference (RNAi), which can generally be divided into three major classes based on their processing mechanisms and partner Argonaute proteins: micro RNAs (miRNAs), small interfering RNAs (siRNAs), dicer siRNA, shRNA, and PIWI-interacting RNA (piRNAs) (Czech and Hannon, *Trends Biochem Sci.*, 2016 Jan. 19. pii: S0968-0004 (15) 00258-3. doi: 10.1016/j.tibs.2015.12.008.

RNAi silencing was originally observed with the addition of double stranded RNA (dsRNA) (Fire, et al. (1998) Nature, 391:806-11; Napoli, et al. (1990) Plant Cell 2:279-89; Hannon, (2002) Nature, 418:244-51). Once dsRNA enters a cell, it is cleaved by an RNase III-like enzyme, Dicer, into double stranded small interfering RNAs (siRNA) 21-23 nucleotides in length that contains 2 nucleotide overhangs on the 3' ends (Elbashir, et al. (2001) Genes Dev., 15:188-200; Bernstein, et al. (2001) Nature, 409:363-6; Hammond, et al. (2000) Nature, 404:293-6). In an ATP dependent step, the siRNAs become integrated into a multi-subunit protein complex, commonly known as the RNAi induced silencing complex (RISC), which guides the siRNAs to the target RNA sequence (Nykanen, et al. (2001) Cell, 107:309-21). At some point the siRNA duplex unwinds, and it appears that the antisense strand remains bound to RISC and directs degradation of the complementary mRNA sequence by a combination of endo and exonucleases (Martinez, et al. (2002) Cell, 110:563-74). However, the effect of iRNA or siRNA or their use is not limited to any type of mechanism.

Short Interfering RNA (siRNA) is a double-stranded RNA that can induce sequence-specific post-transcriptional gene silencing, thereby decreasing or even inhibiting gene expression. In one example, a siRNA triggers the specific degradation of homologous RNA molecules, such as mRNAs, within the region of sequence identity between both the siRNA and the target RNA. For example, WO 02/44321 discloses siRNAs capable of sequence-specific degradation of target mRNAs when base-paired with 3' overhanging ends.

Sequence specific gene silencing can be achieved in mammalian cells using synthetic, short double-stranded RNAs that mimic the siRNAs produced by the enzyme dicer. siRNA can be chemically or in vitro-synthesized or can be the result of short double-stranded hairpin-like RNAs (shRNAs) that are processed into siRNAs inside the cell. Synthetic siRNAs are generally designed using algorithms and a conventional DNA/RNA synthesizer. The production of siRNA from a vector is more commonly done through the transcription of a short hairpin RNAse (shRNAs).

Micro RNAs (abbreviated miRNA) are small non-coding RNA molecules (containing about 22 nucleotides) that function in RNA silencing and post-transcriptional regulation of gene expression. miRNAs resemble siRNAs of the RNA interference (RNAi) pathway, except miRNAs derive from regions of RNA transcripts that fold back on themselves to form short hairpins, whereas siRNAs derive from longer regions of double-stranded RNA (Bartel, et al., *Cell,* 116: 281-297 (2004)). The biogenesis of miRNAs and siRNAs typically depends on RNase III type enzymes that convert their double-stranded RNA precursors into functional small RNAs. By contrast, piRNAs derive from single-stranded RNAs and, consequently, require alternative processing machinery.

Synthetic piRNAs can be used to block the synthesis of target proteins by binding to mRNAs, as has been attempted with miRNAs, might have the advantage of not requiring processing by enzymes such as Dicer, which is required by miRNAs. Potential advantages of piRNAs over miRNAs include the possibility of targets with better specificity because each miRNA regulates several mRNAs and there is the potential to access undesirable long non-coding RNAs with possible implications in disease processes (Assumpção, et al., *Epigenomics,* 7 (6): 975-984 (2015)). miRNA and piRNA can be the therapeutic agent or can be target sequences for post-transcriptional silencing. For example, synthetic piRNAs designed to couple to PIWI proteins and exert genomic silencing on PIWI genes at a transcriptional level is a possible strategy.

In some embodiments, the functional nucleic acid is siRNA, shRNA, miRNA, or piRNA. In some embodiments, the composition includes a vector expressing the functional nucleic acid. Methods of making and using vectors for in vivo expression of functional nucleic acids such as antisense oligonucleotides, siRNA, shRNA, miRNA, piRNA, EGSs, ribozymes, and aptamers are known in the art.

2. Gene Editing Compositions

In some embodiments the functional nucleic acids are gene editing compositions. Gene editing compositions can include nucleic acids that encode an element or elements that induce a single or a double strand break in the target cell's genome, and optionally a polynucleotide. The compositions can be used, for example, to reduce or otherwise modify expression of a gene target.

In some embodiments, the element that induces a single or a double strand break in the target cell's genome is a CRISPR/Cas system. CRISPR (Clustered Regularly Interspaced Short Palindromic Repeats) is an acronym for DNA loci that contain multiple, short, direct repetitions of base sequences. The prokaryotic CRISPR/Cas system has been adapted for use as gene editing (silencing, enhancing or changing specific genes) for use in eukaryotes (see, for example, Cong, Science, 15: 339 (6121): 819-823 (2013) and Jinek, et al., Science, 337 (6096): 816-21 (2012)). By transfecting a cell with the required elements including a cas gene and specifically designed CRISPRs, the organism's genome can be cut and modified at any desired location. Methods of preparing compositions for use in genome editing using the CRISPR/Cas systems are described in detail in WO 2013/176772 and WO 2014/018423, which are specifically incorporated by reference herein in their entireties.

In general, "CRISPR system" refers collectively to transcripts and other elements involved in the expression of or directing the activity of CRISPR-associated ("Cas") genes, including sequences encoding a Cas gene, a tracr (trans-activating CRISPR) sequence (e.g., tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), or other sequences and transcripts from a CRISPR locus. One or more tracr mate sequences operably linked to a guide sequence (e.g., direct repeat-spacer-direct repeat) can also be referred to as pre-crRNA (pre-CRISPR RNA) before processing or crRNA after processing by a nuclease.

In some embodiments, a tracrRNA and crRNA are linked and form a chimeric crRNA-tracrRNA hybrid where a mature crRNA is fused to a partial tracrRNA via a synthetic stem loop to mimic the natural crRNA: tracrRNA duplex as described in Cong, *Science,* 15: 339 (6121): 819-823 (2013) and Jinek, et al., *Science,* 337 (6096): 816-21 (2012)). A single fused crRNA-tracrRNA construct can also be referred to as a guide RNA or gRNA (or single-guide RNA (sgRNA)). Within an sgRNA, the crRNA portion can be identified as the 'target sequence' and the tracrRNA is often referred to as the 'scaffold'.

There are many resources available for helping practitioners determine suitable target sites once a desired DNA target sequence is identified. For example, numerous public resources, including a bioinformatically generated list of about 190,000 potential sgRNAs, targeting more than 40% of human exons, are available to aid practitioners in selecting target sites and designing the associate sgRNA to affect a nick or double strand break at the site. See also, http://crispr.i2bc.paris-saclay.fr, a tool designed to help scientists find CRISPR targeting sites in a wide range of species and generate the appropriate crRNA sequences.

In some embodiments, one or more vectors driving expression of one or more elements of a CRISPR system are introduced into a target cell such that expression of the elements of the CRISPR system direct formation of a CRISPR complex at one or more target sites. While the specifics can be varied in different engineered CRISPR systems, the overall methodology is similar. CRISPR technology can be used to target a DNA sequence by inserting a short DNA fragment containing the target sequence into a guide RNA expression plasmid. The sgRNA expression plasmid contains the target sequence (about 20 nucleotides), a form of the tracrRNA sequence (the scaffold) as well as a suitable promoter and necessary elements for proper processing in eukaryotic cells. Such vectors are commercially available (see, for example, Addgene). Many of the systems rely on custom, complementary oligos that are annealed to form a double stranded DNA and then cloned into the sgRNA expression plasmid. Co-expression of the sgRNA and the appropriate Cas enzyme from the same or separate plasmids in transfected cells results in a single or double strand break (depending of the activity of the Cas enzyme) at the desired target site.

In some embodiments, the element that induces a single or a double strand break in the target cell's genome is a nucleic acid construct or constructs encoding a zinc finger nucleases (ZFNs). ZFNs are typically fusion proteins that include a DNA-binding domain derived from a zinc-finger protein linked to a cleavage domain.

The most common cleavage domain is the Type IIS enzyme Fok1. Fok1 catalyzes double-stranded cleavage of DNA, at 9 nucleotides from its recognition site on one strand and 13 nucleotides from its recognition site on the other. See, for example, U.S. Pat. Nos. 5,356,802; 5,436,150 and 5,487,994; as well as Li et al. *Proc., Natl. Acad. Sci. USA* 89 (1992): 4275-4279; Li et al. *Proc. Natl. Acad. Sci. USA*, 90:2764-2768 (1993); Kim et al. *Proc. Natl. Acad. Sci.* USA. 91:883-887 (1994a); Kim et al. *J. Biol. Chem.* 269:31, 978-31,982 (1994b). One or more of these enzymes (or enzymatically functional fragments thereof) can be used as a source of cleavage domains.

The DNA-binding domain, which can, in principle, be designed to target any genomic location of interest, can be a tandem array of $Cys_2His_2$ zinc fingers, each of which generally recognizes three to four nucleotides in the target DNA sequence. The $Cys_2His_2$ domain has a general structure: Phe (sometimes Tyr)-Cys-(2 to 4 amino acids)-Cys-(3 amino acids)-Phe (sometimes Tyr)-(5 amino acids)-Leu-(2 amino acids)-His-(3 amino acids)-His. By linking together multiple fingers (the number varies: three to six fingers have been used per monomer in published studies), ZFN pairs can be designed to bind to genomic sequences 18-36 nucleotides long.

Engineering methods include, but are not limited to, rational design and various types of empirical selection methods. Rational design includes, for example, using databases including triplet (or quadruplet) nucleotide sequences and individual zinc finger amino acid sequences, in which each triplet or quadruplet nucleotide sequence is associated with one or more amino acid sequences of zinc fingers which bind the particular triplet or quadruplet sequence. See, for example, U.S. Pat. Nos. 6,140,081; 6,453,242; 6,534,261; 6,610,512; 6,746,838; 6,866,997; 7,067,617; U.S. Published Application Nos. 2002/0165356; 2004/0197892; 2007/0154989; 2007/0213269; and International Patent Application Publication Nos. WO 98/53059 and WO 2003/016496.

In some embodiments, the element that induces a single or a double strand break in the target cell's genome is a nucleic acid construct or constructs encoding a transcription activator-like effector nuclease (TALEN). TALENs have an overall architecture similar to that of ZFNs, with the main difference that the DNA-binding domain comes from TAL effector proteins, transcription factors from plant pathogenic bacteria. The DNA-binding domain of a TALEN is a tandem array of amino acid repeats, each about 34 residues long. The repeats are very similar to each other; typically they differ principally at two positions (amino acids 12 and 13, called the repeat variable diresidue, or RVD). Each RVD specifies preferential binding to one of the four possible nucleotides, meaning that each TALEN repeat binds to a single base pair, though the NN RVD is known to bind adenines in addition to guanine. TAL effector DNA binding is mechanistically less well understood than that of zinc-finger proteins, but their seemingly simpler code could prove very beneficial for engineered-nuclease design. TAL-ENs also cleave as dimers, have relatively long target sequences (the shortest reported so far binds 13 nucleotides per monomer) and appear to have less stringent requirements than ZFNs for the length of the spacer between binding sites. Monomeric and dimeric TALENs can include more than 10, more than 14, more than 20, or more than 24 repeats.

Methods of engineering TAL to bind to specific nucleic acids are described in Cermak, et al, *Nucl. Acids Res.* 1-11 (2011). US Published Application No. 2011/0145940, which discloses TAL effectors and methods of using them to modify DNA. Miller et al. *Nature Biotechnol* 29:143 (2011) reported making TALENs for site-specific nuclease architecture by linking TAL truncation variants to the catalytic domain of Fok1 nuclease. The resulting TALENs were shown to induce gene modification in immortalized human cells. General design principles for TALE binding domains can be found in, for example, WO 2011/072246.

The nuclease activity of the genome editing systems described herein cleave target DNA to produce single or double strand breaks in the target DNA. Double strand breaks can be repaired by the cell in one of two ways: non-homologous end joining, and homology-directed repair. In non-homologous end joining (NHEJ), the double-strand breaks are repaired by direct ligation of the break ends to one another. As such, no new nucleic acid material is inserted into the site, although some nucleic acid material may be lost, resulting in a deletion. In homology-directed repair, a donor polynucleotide with homology to the cleaved target DNA sequence is used as a template for repair of the cleaved target DNA sequence, resulting in the transfer of genetic information from a donor polynucleotide to the target DNA. As such, new nucleic acid material can be inserted/copied into the site.

Therefore, in some embodiments, the genome editing composition optionally includes a donor polynucleotide. The modifications of the target DNA due to NHEJ and/or homology-directed repair can be used to induce gene correction, gene replacement, gene tagging, transgene insertion, nucleotide deletion, gene disruption, gene mutation, etc.

Accordingly, cleavage of DNA by the genome editing composition can be used to delete nucleic acid material from a target DNA sequence by cleaving the target DNA sequence and allowing the cell to repair the sequence in the absence of an exogenously provided donor polynucleotide.

Alternatively, if the genome editing composition includes a donor polynucleotide sequence that includes at least a segment with homology to the target DNA sequence, the methods can be used to add, i.e., insert or replace, nucleic acid material to a target DNA sequence (e.g., to "knock in" a nucleic acid that encodes for a protein, an siRNA, an miRNA, etc.), to add a tag (e.g., 6×His, a fluorescent protein (e.g., a green fluorescent protein; a yellow fluorescent protein, etc.), hemagglutinin (HA), FLAG, etc.), to add a regulatory sequence to a gene (e.g., promoter, polyadenylation signal, internal ribosome entry sequence (IRES), 2A peptide, start codon, stop codon, splice signal, localization signal, etc.), to modify a nucleic acid sequence (e.g., introduce a mutation), and the like. As such, the compositions can be used to modify DNA in a site-specific, i.e., "targeted", way, for example gene knock-out, gene knock-in, gene editing, gene tagging, etc. as used in, for example, gene therapy.

In applications in which it is desirable to insert a polynucleotide sequence into a target DNA sequence, a polynucleotide including a donor sequence to be inserted is also provided to the cell. By a "donor sequence" or "donor polynucleotide" or "donor oligonucleotide" it is meant a nucleic acid sequence to be inserted at the cleavage site. The donor polynucleotide typically contains sufficient homology to a genomic sequence at the cleavage site, e.g., 70%, 80%, 85%, 90%, 95%, or 100% homology with the nucleotide sequences flanking the cleavage site, e.g., within about 50 bases or less of the cleavage site, e.g., within about 30 bases, within about 15 bases, within about 10 bases, within about 5 bases, or immediately flanking the cleavage site, to support homology-directed repair between it and the genomic sequence to which it bears homology. The donor sequence is typically not identical to the genomic sequence that it replaces. Rather, the donor sequence may contain at least one or more single base changes, insertions, deletions, inversions or rearrangements with respect to the genomic sequence, so long as sufficient homology is present to support homology-directed repair. In some embodiments, the donor sequence includes a non-homologous sequence flanked by two regions of homology, such that homology-directed repair between the target DNA region and the two flanking sequences results in insertion of the non-homologous sequence at the target region.

3. Peptide and Protein Expression Constructs

In some embodiments, the active agent is a nucleic acid encoding a protein or a polypeptide. Although discussed here in the context of mRNA, it will be appreciated that the nucleic acid active agent can itself be an mRNA, or can be a DNA or other oligonucleotide encoding the mRNA (or a functional nucleic acid as discussed above). As discussed in more detail below, the nucleic acid active agents, including mRNA and functional nucleic acids, can be encoded by a nucleic acid that encodes the RNA. The nucleic acid can be operably linked to an expression control sequence. In some embodiments, the nucleic acid is a vector, integration construct, etc., that enables expression of the RNA in a cell.

The mRNA can be a mature mRNA or pre-mRNA. Thus in some embodiments, the mRNA includes introns. The mRNA can be a naturally occurring gene transcript, for example, a human gene transcript. The mRNA can be an artificial sequence that is not normally expressed in a naturally occurring organism. An exemplary artificial sequence is one that contains portions of gene sequences that are ligated together to form an open reading frame that encodes a fusion protein. The portions of that are ligated together can be from a single organism or from more than one organism.

The mRNA can encode a polypeptide that provides a therapeutic or prophylactic effect to an organism or that can be used to diagnose a disease or disorder in an organism. For example, for treatment of cancer, autoimmune disorders, parasitic, viral, bacterial, fungal or other infections, the polypeptide can be a ligand or receptor for cells of the immune system, or can function to stimulate or inhibit the immune system of an organism. Typically, it is not desirable to have prolonged ongoing stimulation of the immune system, nor necessary to produce changes which last after successful treatment, since this may then elicit a new problem. For treatment of an autoimmune disorder, it may be desirable to inhibit or suppress the immune system during a flare-up, but not long term, which could result in the patient becoming overly sensitive to an infection. Thus in some embodiments, delivery of mRNA for transient expression of the protein (or functional nucleic acid) is preferred to sustained expression by a vector or gene integration.

The mRNA can include a 5' cap. A 5' cap (also termed an RNA cap, an RNA 7-methylguanosine cap or an RNA m7G cap) is a modified guanine nucleotide that has been added to the "front" or 5' end of a eukaryotic messenger RNA shortly after the start of transcription. The 5' cap consists of a terminal group which is linked to the first transcribed nucleotide. Its presence is critical for recognition by the ribosome and protection from RNases. Cap addition is coupled to transcription, and occurs co-transcriptionally, such that each influences the other. Shortly after the start of transcription, the 5' end of the mRNA being synthesized is bound by a cap-synthesizing complex associated with RNA polymerase. This enzymatic complex catalyzes the chemical reactions that are required for mRNA capping. Synthesis proceeds as a multi-step biochemical reaction. The capping moiety can be modified to modulate functionality of mRNA such as its stability or efficiency of translation. The 5' cap may, for example, be m7G (5')ppp(5') G, m7G (5')ppp(5') A, G (5')ppp(5') G or G (5')ppp(5') A cap analogs, which are all commercially available. The 5' cap can also be an anti-reverse-cap-analog (ARCA) (see, e.g., Stepinski, et al., RNA, 7:1468-95 (2001)) or any other suitable analog. The 5' cap is provided using techniques known in the art and described herein (Cougot, et al., Trends in Biochem. Sci., 29:436-444 (2001); Stepinski, et al., RNA, 7:1468-95 (2001); Elango, et al., Biochim. Biophys. Res. Commun., 330:958-966 (2005)). The mRNA can contain an internal ribosome entry site (IRES) sequence. The IRES sequence may be any viral, chromosomal or artificially designed sequence which initiates cap-independent ribosome binding to mRNA and facilitates the initiation of translation.

The mRNA can include a 5' untranslated region. The 5' UTR is upstream from the coding sequence. Within the 5' UTR is a sequence that is recognized by the ribosome which allows the ribosome to bind and initiate translation. The mechanism of translation initiation differs in Prokaryotes and Eukaryotes.

The mRNA includes an "open reading frame" or "ORF," which is a series of nucleotides that contains a sequence of bases that could potentially encode a polypeptide or protein. An open reading frame is located between the start-code sequence (initiation codon or start codon) and the stop-codon sequence (termination codon). The ORF can be from a naturally occurring sequence from the genome of an organism.

The mRNA can include a 3' untranslated region. The 3' UTR is found immediately following the translation stop codon. The 3' UTR plays an important role in translation termination as well as post transcriptional gene expression.

In some embodiments, the mRNA is polyadenylated. "Polyadenylation" refers to the covalent linkage of a polyadenylyl moiety, or its modified variant, to a messenger RNA molecule. In eukaryotic organisms, most messenger RNA (mRNA) molecules are polyadenylated at the 3' end. The 3' poly(A) tail is a long sequence of adenine nucleotides (often several hundred) added to the pre-mRNA through the action of an enzyme, polyadenylate polymerase. In higher eukaryotes, the poly(A) tail is added onto transcripts that contain a specific sequence, the polyadenylation signal. The poly(A) tail and the protein bound to it aid in protecting mRNA from degradation by exonucleases. Polyadenylation is also important for transcription termination, export of the mRNA from the nucleus, and translation. Polyadenylation occurs in the nucleus immediately after transcription of DNA into RNA, but additionally can also occur later in the cytoplasm. After transcription has been terminated, the mRNA chain is cleaved through the action of an endonuclease complex associated with RNA polymerase. The cleavage site is usually characterized by the presence of the nucleotide base sequence AAUAAA near the cleavage site. After the mRNA has been cleaved, adenosine residues are added to the free 3' end at the cleavage site.

RNA, including mRNA and RNA-based functional nucleic acids, can be prepared by in vitro transcription using, for example, a purified linear DNA template containing a promoter, ribonucleotide triphosphates, a buffer system that includes DTT and magnesium ions, and an appropriate phage RNA polymerase. The template can be a vector, PCR product, synthetic oligonucleotide, or cDNA.

4. Genes Targetted for Expression or Suppression

The genetic material to be loaded into the particles is chosen on the basis of the desired effect of that genetic material on the cell into which it is intended to be delivered and the mechanism by which that effect is to be carried out. For example, the nucleic acid may be useful in gene therapy, for example in order to express a desired gene in a cell or group of cells. Nucleic acid can also be used in gene silencing. Such gene silencing may be useful in therapy to switch off aberrant gene expression. Nucleic acid can also be used for example to express one or more antigens against which it is desired to produce an immune response. Thus, the nucleic acid to be loaded into the particle can encode one or more antigens against which is desired to produce an immune response, including but not limited to tumour antigens, antigens from pathogens such as viral, bacterial or fungal pathogens, such as those discussed in more detail below. Therapeutic strategies for treating cancer, inflammation, injury, autoimmunity, and infections are discussed in more detail below.

In some embodiments, the nanoparticles contain two or more species of nucleic acids, where one species of nucleic acid has a stimulatory effect upon one or more "target" genes, proteins or other biological molecules, and the second (or further) nucleic acid species suppresses the expression or function of one or more "target" genes, proteins or other biological molecules. Exemplary suppressor or inhibitory nucleic acids include functional nucleic acids, such as silencing RNAs (siRNAs) specific to one or more "target" genes or molecules. Exemplary stimulatory nucleic acids include messenger RNAs (mRNAs) that directly express, or otherwise induce expression of one or more "target" gene products or other molecules.

Exemplary targets for suppressor/inhibitory nucleic acids include co-stimulatory genes, proteins and molecules, for example, to induce immunological tolerance, and tumorigenic driver genes, proteins and activators, for example, to reduce the viability and proliferation of cancer cells. Exemplary targets for stimulatory nucleic acids include tolerogenic antigens and tumor suppressor genes, proteins and molecules.

The desired effect of the inhibition or stimulation of a target by the nucleic acid(s) can directly effect one or more cellular molecules or processes, or can indirectly effect one or more cellular molecules or processes. For example, in some embodiments, the gene product(s) of a stimulatory nucleic acid act to block, reduce or otherwise inhibit the function or expression of a co-stimulatory molecule, for example, to induce immunogenic tolerance against a target antigen. In other embodiments, the suppressor/inhibitory nucleic acids block or reduce expression or activation of genes or proteins that lead to the up-regulation of a cellular molecuke or process, such as up-regulation of a tumor suppressor.

a. Tumor Suppressors

In some embodiments, the mRNA can be tumor suppressor-encoded mRNA. In some embodiments, the mRNA encodes one or more exogenous or endogenus proteins that are expressed within the recipient to prevent, reduce or otherwise minimize the proliferation and/or viability of cancer cells within the recipient. As used herein, a tumor suppressor is a protein that acts to reduce the potential for cancer development and metastasis by modulating tumor cell growth, by negative regulation of the cell cycle or by promoting apoptosis. A number of tumor suppressors are known in the art (see Table 1).

Therefore, in some embodiments the nanoparticles include nucleic acids that encode tumor suppressor proteins, or activators of tumor suppressor proteins. A non-limiting list of tumor suppressor proteins that can be encoded by mRNAs within nanoparticles is provided in Table 1. One skilled in the art will understand that certain cancers are associated with or result from deficiencies or other abnormal expression of one or more gebe products. Thus, in some embodiments nanoparticles include mRNAs encoding genes that are expressed in or around the cancer cells, for example, to complensate or otherwise make up for the deficiencies or otherwise abnormal expression of genes that results in the cancer phenotype. In some embodiments, specific cancer cells are targeted with nanoparticles including one or more mRNAs that encode a gene product that is designed to suppress one or more of the biological functions of the targetted cancer cell. In some embodiments, the nanoparticles include two or more mRNAs encoding two or more tumor suppressors. For example, the simultaneous expression of the two or more tumor suppressor genes in the same cancer cell results in reduced proliferation and/or viability of the cell. In other embodiments, the nanopartilces include one or more mRNAs encoding a tumor suppressor, and one or more nucleic acids that suppresses one or more genes or gene products in the cancer cell. For example, expression of the one or more tumor suppressors and the simultaneous suppression of the one or more targeted genese within the same cell results in reduced proliferation and/or viability of the cell. In a preferred embodiment, the nanoparticles include a combination of mRNA(s) encoding tumor suppressors, and one or more siRNAs targeting an oncogene and/or a tumorigenic driver element. Preferably, the simultaneous expression of one or more tumor suppressors, and the silencing or down-regulating of one or more oncogenes and/or a tumorigenic driver elements within a cancer cell results in selective killing of the cancer cell.

TABLE 1

| | Exemplary tumor suppressors that can be enhanced or expressed | | | |
|---|---|---|---|---|
| | Genetic | Associated | GenBank Acc No. | |
| GENE | Alteration(s) | Cancer(s) | mRNA | Protein |
| PTEN | Point mutation, deletion | Prostate, breast, glioblastoma, melanoma, pancreatic cancer, colorectal cancer, leukemia | AF067844.1 | AAD13528.1 |

TABLE 1-continued

Exemplary tumor suppressors that can be enhanced or expressed

| GENE | Genetic Alteration(s) | Associated Cancer(s) | GenBank Acc No. mRNA | GenBank Acc No. Protein |
|---|---|---|---|---|
| APC | Point mutation, deletion | Adenomatous polyposis and sporadic colorectal tumors | M74088.1 | AAA03586.1 |
| ARF | Deletion | Breast carcinomas, colorectal adenoma, glioblastoma | AF208864.1 | AAF64278.1 |
| BMPR | Point mutation | Gastrointestinal cancer | NM_009758.4 | NP_033888.2 |
| BRCA1 | Point mutation | Ductal breast cancers, Epithelial ovarian cancers | U14680.1 | AAA73985.1 |
| E-cadherin | Point mutation | Loss of function leads to metastasis | Z13009.1 | CAA78353.1 |
| EXT1,2 | Point mutation, deletion, insertion | Hereditary multiple exostoses, also known as diaphyseal aclasis | S79639.1, U62740.1 | AAB62283.1 AAB07008.1 |
| FBXW7 | Point mutation, deletion | Breast cancer | AF411971.1 | AAL06290.1 |
| FH | Point mutation | Hereditary leiomyomatosis and renal-cell cancer | BC003108.1 | AAH03108.1 |
| GPC3 | Deletions, point mutation | Lung carcinoma | L47125.1 | AAA98132.1 |
| HIPK2 | Point mutation | Metastatic bladder cancer | AF208291 | AAG41236.1 |
| HRPT2 | Point mutation | Hereditary hyperparathyroidism-jaw tumor syndrome, Malignancy in sporadic parathyroid tumors | DQ366291 | |
| INPP4B | Deletion, loss of heterozygosity, reduced expression | Epithelial carcinomas and some human basal-like breast carcinomas | U96922.1 | AAB72153.1 |
| LKB1 | Point mutation, deletion | Human Lung Cancer (especially NSCLC), cervical carcinomas Inherited cancer disorder Peutz-Jeghers Syndrome | U63333.1 | AAB05809.1 |
| MEN1 | Point mutation | Pituitary tumors | U93236.1 | AAC51228.1 |
| MMR genes | Point mutation, reduced expression | Hereditary non-polyposis colon cancer | | |
| MUTYH | Point mutation, deletion | Lung and ovarian tumors, and lymphomas | U63329.1 | AAC50618.1 |
| NF1 | Point mutation, deletion | Juvenile myelomonocytic leukemia, Watson syndrome and breast cancer. | NM_000267.3 | NP_000258.1 |
| NF2 | Point mutation, deletion | Meningioma Thyroid cancer, mesothelioma, and melanoma | L11353.1 | AAA36212.1 |
| p15, p16 | Point mutation | Colorectal cancer, leukemia | AB060808.1 L27211.1 | BAB91133.1 AAA92554.1 |
| p53 | Point mutation, deletion | Lung Prostate | AF307851.1 | AAG28785.1 |
| p57 | Point mutation | Beckwith-Wiedemann syndrome | D64137.1 | BAA11014.1 |
| Ptch | Point mutation | Cell carcinomas of the skin, ovarian | AI494442.1 NM_000264.4 | Q13635 NP_000255.2 |

TABLE 1-continued

Exemplary tumor suppressors that can be enhanced or expressed

| GENE | Genetic Alteration(s) | Associated Cancer(s) | GenBank Acc No. mRNA | GenBank Acc No. Protein |
|---|---|---|---|---|
| | | fibromas, and medulloblastomas | | |
| Rb | Point mutation, deletion | Prostate cancer Pituitary melanotroph tumors | M15400.1 | AAA69807.1 |
| RECQL4 | Point mutation | Osteosarcoma | AB006532.1 | BAA74453.1 |
| SDH | Point mutation, deletion | Paraganglioma, renal cell carcinoma | U17248.1 | AAA81167.1 |
| Smad2/3 | Point mutation, deletions | Breast cancer | U65019.1 BC050743.1 | AAB17054.1 AAH50743.1 |
| Smad4 | Point mutation | Pancreatic Gastric Carcinoma | U44378.1 | AAA91041.1 |
| Su(Fu) | Point mutation, deletion | Brain tumor | Not available | Not available |
| TGFβR | Point mutation | Head and neck cancers, cervical and ovarian carcinomas | Not available | 5E92_A |
| TSC1/TSC2 | Point mutation | Tuberous sclerosis complex | AF013168.1 AB014460.1 | AAC51674.1" BAA32694.1" |
| VHL | Point mutation, deletion, hyper-methylation | Renal carcinomas | L15409.1 | AAB64200 |
| WT1 | Point mutation, deletion | Haematological malignancies Pediatric nephroblastoma Wilms tumor | NM_000378.4 | NP_000369.3 |
| XPA, C, D | Point mutation | Bladder cancer | D14533.1 | BAA03403.1 |
| α-catenin | Point mutation | Basal-like breast cancer | HUMACA | BAA02979 |
| RASSF1A | Hyper-methylation, point mutation | Lung, Cervical Cancer | NM_007182 | NP_009113 |
| SDHB | Point mutation | Kidney Paragangliomas | KR710096 | |
| SIN3B | Point mutation | Prostate cancer | | AAI10822 |
| RGS12 | Point mutation | Prostate cancer | AF035152 | AAC39835 |
| Kai1 metastasis suppressor | Deletion, mutation and loss of expression | Prostate cancer | HSU20770 | CAG47051 |
| ING1B | Point mutation | Prostate cancer, Brain tumors | AJ310392 | NP_937861 |
| Atg7 | Deletion | Prostate cancer | BC000091 | ATG7_HUMAN |
| JARID1D | Point mutation | Prostate cancer | Not available | AAI46768 |
| PALB2 | Point mutation | Breast cancer | NM_024675 | AAH44254 |
| 53BP1 | Point mutation | Breast cancer | NM_024675 | AAH44254 |
| RAD51 | Point mutation | Breast cancer | HSU09477 | 1GZH_D |
| XRCC4 | Point mutation | Breast cancer | HUMRAD51 | CAG38796 |
| KEAP1 | Point mutation | Liver cancer | AB017445 | BAB20668 |
| ARIAD1A | Point mutation | Liver cancer | NM_012289 | AAH15945 |
| Ariad2 | Point mutation | Liver cancer | Not available | Not available |
| Rps6ka3 | Point mutation | Liver cancer | Not available | Not available |
| RARβ | Point mutation | Lung cancer | BC096303 | BAC81131 |
| FHIT | Point mutation | Lung cancer | NM_001290276 | BAH02279 |
| PTCH1 | Point mutation | Lung cancer | HSU46922 | AAH32336 |
| DCC | Point mutation | Colorectal cancer | KY652975 | AAH43542 |
| Bax | Point mutation | Colorectal cancer | NM_005215 | NP_005206 |
| AML1 | Point mutation | Acute myeloid leukemia | HUMBAXA | NP_620116 |
| CDKN2A | Point mutation | Bladder | X90981 | BAA14022 |
| Cdkn1b | Point mutation | Prostate cancer | JQ694044 | AFN61600 |
| NKX3.1 | Point mutation | Prostate cancer | NM_004064 | CAG33680 |
| P14 | Point mutation | Melanoma | NM_006167 | AAB38747 |
| CDK4 | Point mutation | Melanoma | NM_001098783 | NP_008973 |
| CDK6 | Point mutation | Melanoma | NM_000075 | CAG47043 |

In some embodiments, the nanoparticles include one or more functional nucleic acids (such as siRNAs) that silence, or otherwise alter the expression and/or function of tumor-associated antigens. Exemplart tunmor-associated antigens include, for example, cellular oncogene-encoded products or aberrantly expressed proto-oncogene-encoded products (e.g., products encoded by the neu, ras, trk, and kit genes), or mutated forms of growth factor receptor or receptor-like cell surface molecules (e.g., surface receptor encoded by the c-erb B gene). Other tumor-associated antigens that may be targeted fro genbe siliencing or modification include molecules that may be directly involved in transformation events, or molecules that may not be directly involved in oncogenic transformation events but are expressed by tumor cells (e.g., carcinoembryonic antigen, CA-125, melonoma associated antigens, etc.) (see, e.g., U.S. Pat. No. 6,699,475; Jager, et al., Int. J. Cancer, 106:817-20 (2003); Kennedy, et al., Int. Rev. Immunol., 22:141-72 (2003); Scanlan, et al. Cancer Immun., 4:1 (2004)).

Genes that encode cellular tumor associated antigens include cellular oncogenes and proto-oncogenes that are aberrantly expressed. In general, cellular oncogenes encode products that are directly relevant to the transformation of the cell, and because of this, these antigens are particularly preferred targets for anticancer therapy. An example is the tumorigenic neu gene that encodes a cell surface molecule involved in oncogenic transformation. Other examples include the ras, kit, and trk genes. The products of proto-oncogenes (the normal genes which are mutated to form oncogenes) may be aberrantly expressed (e.g., overexpressed), and this aberrant expression can be related to cellular transformation. Thus, the product encoded by proto-oncogenes can be targeted. Some oncogenes encode growth factor receptor molecules or growth factor receptor-like molecules that are expressed on the tumor cell surface.

b. Vaccine Antigens

In some embodiments, the active agent is a nucleic acid encoding an antigen designed to elicit a desired immune response. In some embodiments the nucleic acid encodes a vaccine antigen thus to elicit an immune response, and/or develop immune memory towards the encoded antigen. An antigen can include any protein or peptide that is foreign to the subject organism.

Preferred antigens can be presented at the surface of antigen presenting cells (APC) of a subject for surveillance by immune effector cells, such as leucocytes expressing the CD4 receptor (CD4 T cells) and Natural Killer (NK) cells. Typically, the antigen is of viral, bacterial, protozoan, fungal, or animal origin. In some embodiments the antigen encoded by the nucleic acid is a cancer antigen. Cancer antigens can be antigens expressed only on tumor cells and/or required for tumor cell survival.

Certain antigens are recognized by those skilled in the art as immuno-stimulatory (i.e., stimulate effective immune recognition) and provide effective immunity to the organism or molecule from which they derive. The antigen can be derived from a virus, bacterium, parasite, plant, protozoan, fungus, tissue or transformed cell such as a cancer or leukemic cell and can be a whole cell or immunogenic component thereof, e.g., cell wall components or molecular components thereof. Suitable antigens are known in the art and are available from commercial government and scientific sources. Antigen encoded by nucleic acid can be all or part of an antigenic protein. An antigen target may be provided as single nucleic acid or may be provided in multiple nucleic acids.

c. Antigens for Induction of Tolerance

In some embodiments, the active agent is a nucleic acid encoding an antigen to which tolerance is desired. Sutiable antigens can be selected based on the desired therapeutic outcome or the disease, disorder, or condition being treated. Exemplary antigens are known in the art. See, for example, U.S. Published Application No. 2014/0356384 which discusses:

Antigens to which tolerance is induced include self-antigens, antigens associated with autoimmune disease such as degenerative disease antigens, diseases such as gout where uricase elicits an immune response, atopic disease antigens, self-antigens such as those involved, and allergens such as insect toxins, drugs such antibiotics like penicillin and erythromycin, and addictive substances such as nicotine. Therefore, in some embodiments, nanopartilces encapsulate one or more nucleic acids that silences or expresses the urate oxidase enzyme. For example, an mRNA encoding the uricase enzyme, or fragemnts thereof expresses endogenous urate oxidase in a recipient, and a simultaneously delivered siRNA tollerizes the host to this antigen, through appropriate modulation of the dendritic cell phenotype in the recipient.

Specific examples include antigen derived from naturally occurring allergens such as pollen allergens (tree-, herb, weed-, and grass pollen allergens), insect allergens (inhalant, saliva and venom allergens), animal hair and dandruff allergens, and food allergens. Important pollen allergens from trees, grasses and herbs originate from the taxonomic orders of Fagales, Oleales, Pinales and platanaceae including i.a. birch (*Betula*), alder (*Alnus*), hazel (*Corylus*), hornbeam (*Carpinus*) and olive (*Olea*), cedar (*Cryptomeriaand juniperus*), Plane tree (*Platanus*), the order of Poales including i.e. grasses of the genera *Lolium, Phleum, Poa, Cynodon, Dactylis, Holcus, Phalaris, Secale*, and *Sorghum*, the orders of Asterales and Urticales including i.a. herbs of the genera *Ambrosia, Artemisia*, and *Parietaria*. Other allergen antigens that may be used include allergens from house dust mites of the genus *Dermatophagoides* and *Euroglyphus*, storage mite e.g. Lepidoglyphys, Glycyphagus and Tyrophagus, those from cockroaches, midges and fleas e.g. Blatella, *Periplaneta, Chironomus* and Ctenocepphalides, those from mammals such as cat, dog and horse, birds, venom allergens including such originating from stinging or biting insects such as those from the taxonomic order of Hymenoptera including bees (superfamily Apidae), wasps (superfamily Vespidea), and ants (superfamily Formicoidae). Still other allergen antigens that may be used include inhalation allergens from fungi such as from the genera *Alternaria* and *Cladosporium*.

In some embodiments, the active agent is a nucleic acid encoding a viral antigen such as those used in gene therapy or to treat certain cancers. Nucleic acids encoding viral antigens can be naturally isolated from a virus, amplified, synthesized, or combinations thereof. Viral antigens can be derived from any virus used for gene therapy, such as Adenovirus and Adeno Associated Virus. Many gene therapy clinical trials rely on retroviruses or adenoviruses to deliver the desired gene. Other viruses used as vectors include adeno-associated viruses, lentiviruses, pox viruses, alphaviruses, and herpes viruses. Gene therapy can also include genes that induce an immune response to cancerous cells which are delivered via a viral vaccine.

The tolerogenic antigen can be derived from a therapeutic agent protein to which tolerance is desired. Examples are protein drugs in their wild type, e.g., human factor VIII or factor IX, to which patients did not establish central tolerance because they were deficient in those proteins; or nonhuman protein drugs, used in a human. Other examples are protein drugs that are glycosylated in nonhuman forms due to production, or engineered protein drugs, e.g., having non-native sequences that can provoke an unwanted immune response. Examples of tolerogenic antigens that are engineered therapeutic proteins not naturally found in humans include human proteins with engineered mutations, e.g., mutations to improve pharmacological characteristics. Examples of tolerogenic antigens that contain nonhuman glycosylation include proteins produced in yeast or insect cells.

The tolerogenic antigen can be derived from proteins that are administered to humans that are deficient in the protein. Deficient means that the patient receiving the protein does not naturally produce enough of the protein. Moreover, the proteins may be proteins for which a patient is genetically deficient. Such proteins include, for example, antithrombin-III, protein C, factor VIII, factor IX, growth hormone, somatotropin, insulin, pramlintide acetate, mecasermin (IGF-1), β-gluco cerebrosidase, alglucosidase-α, laronidase (α-L-iduronidase), idursuphase (iduronate-2-sulphatase), galsulphase, agalsidase-β (α-galactosidase), α-1 proteinase inhibitor, and albumin.

The tolerogenic antigen can be derived from therapeutic antibodies and antibody-like molecules, including antibody fragments and fusion proteins with antibodies and antibody fragments. These include nonhuman (such as mouse) antibodies, chimeric antibodies, and humanized antibodies. Immune responses to even humanized antibodies have been observed in humans (Getts D R, Getts M T, McCarthy D P, Chastain E M L, & Miller S D (2010), mAbs, 2 (6): 682-694). The tolerogenic antigen can be derived from proteins that are nonhuman. Examples of such proteins include adenosine deaminase, pancreatic lipase, pancreatic amylase, lactase, botulinum toxin type A, botulinum toxin type B, collagenase, hyaluronidase, papain, L-Asparaginase, rasburicase, lepirudin, streptokinase, anistreplase (anisoylated plasminogen streptokinase activator complex), antithymocyte globulin, crotalidae polyvalent immune Fab, digoxin immune serum Fab, L-arginase, and L-methionase.

The tolerogenic antigen can be derived from human allograft transplantation antigens. Examples of these antigens are the subunits of the various MHC class I and MHC class II haplotype proteins, and single-amino-acid polymorphisms on minor blood group antigens including RhCE, Kell, Kidd, Duffy and Ss.

The tolerogenic antigen can be a self-antigen against which a patient has developed an autoimmune response or may develop an autoimmune response. Examples are proinsulin (diabetes), collagens (rheumatoid arthritis), myelin basic protein (multiple sclerosis).

For example, Type 1 diabetes mellitus (T1D) is an autoimmune disease whereby T cells that recognize islet proteins have broken free of immune regulation and signal the immune system to destroy pancreatic tissue. Numerous protein antigens that are targets of such diabetogenic T cells have been discovered, including insulin, GAD65, chromogranin-A, among others. In the treatment or prevention of T1D, it would be useful to induce antigen-specific immune tolerance towards defined diabetogenic antigens to functionally inactivate or delete the diabetogenic T cell clones.

Tolerance and/or delay of onset or progression of autoimmune diseases may be achieved for many proteins that are human autoimmune proteins, a term referring to various autoimmune diseases wherein the protein or proteins causing the disease are known or can be established by routine testing.

The tolerogenic antigen can be one or more of the following proteins, or a fragment or peptide derived therefrom. In type 1 diabetes mellitus, several main antigens have been identified: insulin, proinsulin, preproinsulin, glutamic acid decarboxylase-65 (GAD-65), GAD-67, insulinoma-associated protein 2 (IA-2), and insulinoma-associated protein 2ß (IA-2ß); other antigens include ICA69, ICA12 (SOX-13), carboxypeptidase H, Imogen 38, GLIMA 38, chromogranin-A, FISP-60, caboxypeptidase E, peripherin, glucose transporter 2, hepatocarcinoma-intestine-pancreas/pancreatic associated protein, S100ß, glial fibrillary acidic protein, regenerating gene II, pancreatic duodenal homeobox 1, dystrophia myotonica kinase, islet-specific glucose-6-phosphatase catalytic subunit-related protein, and SST G-protein coupled receptors 1-5. In autoimmune diseases of the thyroid, including Hashimoto's thyroiditis and Graves' disease, main antigens include thyroglobulin (TG), thyroid peroxidase (TPO) and thyrotropin receptor (TSHR); other antigens include sodium iodine symporter (NIS) and megalin. In thyroid-associated ophthalmopathy and dermopathy, in addition to thyroid autoantigens including TSHR, an antigen is insulin-like growth factor 1 receptor. In hypoparathyroidism, a main antigen is calcium sensitive receptor. In Addison's disease, main antigens include 21-hydroxylase, 17α-hydroxylase, and P450 side chain cleavage enzyme (P450scc); other antigens include ACTH receptor, P450c21 and P450c17. In premature ovarian failure, main antigens include FSH receptor and α-enolase. In autoimmune hypophysitis, or pituitary autoimmune disease, main antigens include pituitary gland-specific protein factor (PGSF) 1a and 2; another antigen is type 2 iodothyronine deiodinase. In multiple sclerosis, main antigens include myelin basic protein, myelin oligodendrocyte glycoprotein and proteolipid protein. In rheumatoid arthritis, a main antigen is collagen II. In immunogastritis, a main antigen is H+, K+-ATPase. In pernicious angemis, a main antigen is intrinsic factor. In celiac disease, main antigens are tissue transglutaminase and gliadin. In vitiligo, a main antigen is tyrosinase, and tyrosinase related protein 1 and 2. In myasthenia gravis, a main antigen is acetylcholine receptor. In pemphigus vulgaris and variants, main antigens are desmoglein 3, 1 and 4; other antigens include pemphaxin, desmocollins, plakoglobin, perplakin, desmoplakins, and acetylcholine receptor. In bullous pemphigoid, main antigens include BP180 and BP230; other antigens include plectin and laminin 5. In dermatitis herpetiformis Duhring, main antigens include endomysium and tissue transglutaminase. In epidermolysis bullosa acquisita, a main antigen is collagen VII. In systemic sclerosis, main antigens include matrix metalloproteinase 1 and 3, the collagen-specific molecular chaperone heat-shock protein 47, fibrillin-1, and PDGF receptor; other antigens include Scl-70, U1 RNP, Th/To, Ku, Jo1, NAG-2, centromere proteins, topoisomerase I, nucleolar proteins, RNA polymerase I, II and III, PM-Slc, fibrillarin, and B23. In mixed connective tissue disease, a main antigen is UlsnRNP. In Sjogren's syndrome, the main antigens are nuclear antigens SS-A and SS-B; other antigens include fodrin, poly(ADP-ribose) polymerase and topoisomerase. In systemic lupus erythematosus, main antigens include nuclear proteins including SS-A, high mobility group box 1 (HMGB1), nucleosomes, histone proteins and double-stranded DNA. In Goodpasture's syndrome, main antigens include glomerular basement membrane proteins including collagen IV. In rheumatic heart disease, a main antigen is cardiac myosin. Other autoantigens revealed in autoimmune polyglandular syndrome type 1 include aromatic L-amino acid decarboxylase, histidine decarboxylase, cysteine sulfinic acid decarboxylase, tryptophan hydroxylase, tyrosine hydroxylase, phenylalanine hydroxylase, hepatic P450 cytochromes P4501A2 and 2A6, SOX-9, SOX-10, calcium-sensing receptor protein, and the type 1 interferons interferon alpha, beta and omega.

The tolerogenic antigen can be a foreign antigen against which a patient has developed an unwanted immune response. Examples are food antigens. Embodiments include testing a patient to identify foreign antigen and creating a molecular fusion that incorporates the antigen and treating the patient to develop immunotolerance to the antigen or food. Examples of such foods and/or antigens are provided. Examples are from peanut: conarachin (Ara h 1), allergen II (Ara h 2), arachis agglutinin, conglutin (Ara h 6); from apple: 31 kda major allergen/disease resistance protein homolog (Mal d 2), lipid transfer protein precursor (Mal d 3), major allergen Mal d 1.03 D (Mal d 1); from milk: α-lactalbumin (ALA), lactotransferrin; from kiwi: actinidin (Act c 1, Act d 1), phytocystatin, thaumatin-like protein (Act d 2), kiwellin (Act d 5); from mustard: 2S albumin (Sin a 1), 11 S globulin (Sin a 2), lipid transfer protein (Sin a 3), profilin (Sin a 4); from celery: profilin (Api g 4), high molecular weight glycoprotein (Api g 5); from shrimp: Pen a 1 allergen (Pen a 1), allergen Pen m 2 (Pen in 2), tropomyosin fast isoform; from wheat and/or other cereals: high molecular weight glutenin, low molecular weight glutenin, alpha- and gamma-gliadin, hordein, secalin, avenin; from strawberry: major strawberry allergy Fra a 1-E (Fra a 1), from banana: profilin (Mus xp 1).

Many protein drugs that are used in human and veterinary medicine induce immune responses, which create risks for the patient and limit the efficacy of the drug. This can occur with human proteins that have been engineered, with human proteins used in patients with congenital deficiencies in production of that protein, and with nonhuman proteins. It would be advantageous to tolerize a recipient to these protein drugs prior to initial administration, and it would be advantageous to tolerize a recipient to these protein drugs after initial administration and development of immune response. In patients with autoimmunity, the self-antigen(s) to which autoimmunity is developed are known. In these cases, it would be advantageous to tolerize subjects at risk prior to development of autoimmunity, and it would be advantageous to tolerize subjects at the time of or after development of biomolecular indicators of incipient autoimmunity. For example, in Type 1 diabetes mellitus, immunological indicators of autoimmunity are present before broad destruction of beta cells in the pancreas and onset of clinical disease involved in glucose homeostasis. It would be advantageous to tolerize a subject after detection of these immunological indicators prior to onset of clinical disease.

In some embodiments, the nucleic acid encodes a tolerogenic antigen that corresponding to one or more of the protein components of a viral capsid. For example, in some embodiments, the tolerogenic antigen is a viral capsid protein, or fragment of a protein of a virus that is used to deliver one or more active agents to the body. Therefore, in some embodiments, nanoparticles deliver nucleic acids to induce tolerance to a viral vector used for gene therapy. In some embodiments, the nanoparticles provide tolerogenic therapy to enhance the efficacy of gene therapy, to reduce the host immune response to vectors used in gene therapy, or to facilitate selective cellular uptake/targeting of vectors used for gene therapy. Viruses used for gene therapy are known in the art, and include viral subtypes from adeno-associated viruses (AAV), such as viruses of the Dendovirus genus, lentiviruses and retroviruses, such as Human Immunodeficiency Virus (HIV), and herpesviruses, such as HSV-1, HSV2 and Epstein-Barr virus (EBV)). An exemplary viral capsid antigen is one or more of the VP1, VP2, or VP3 capsid proteins from a virion of the AAV virus. For example, in some embodiments, one or more nucleic acids loaded into a nanoparticle, or administered in combination with a nanoparticle encodes a tolerogenic antigen corresponding to one or more capsid proteins from one or more AAV viruses, such as serotype AAV1, AAV2, AAV3, AAV4, AAV5, AAV6, AAV7, AAV8, AAV9, AAV10, AAV11, or mixtures, variants or derivatives thereof.

In an exemplary emebodiment, the nanoparticle co-delivery of siRNA and mRNA provides tolerogenic vaccines, wherein the mRNA encodes an antigen designed to elicit a desired immune response, and the siRNA silences the expression of co-stimulatory proteins. In an exemplary embodiment, co-delivery of B7-1/7-2 siRNA and mRNA encoding AAV capsid proteins (VP1, VP2 or VP3) induces tolerance for AAV vectors for gene therapy. In another embodiment, co-delivery of B7-1/7-2 siRNA and mRNA encoding GAD65, insulin, proinsulin, HSP60, IA-2, ZnT8 or IGRP provides therapy for Type 1 diabetes. In an exemplary embodiment, nanoparticles include an siRNA against 7-ketocholesterol (7KC). In another embodiment, nanoparticles include an siRNA against collagenase enzymes. A non-limiting list of tolerogenic antigens that can be upregulated or expressed by RNAs encapsulated in nanoparticles, or otherwise presented for immune surveillance by tolerogenic antigen presenting cells is provided in Table 2, below.

TABLE 2

| Exemplary Tolerogenic Antigens that may be induced or expressed by RNAs within nanoparticles |
|---|
| Proteins for which a patient is genetically deficient |
| ANTITHROMBIN-III |
| PROTEIN C |
| FACTOR VIII |
| FACTOR IX |
| GROWTH HORMONE |
| SOMATOTROPIN |
| INSULIN |
| PRAMLINTIDE ACETATE |
| MECASERMIN (IGF-1) |
| B-GLUCO CEREBROSIDASE |
| ALGLUCOSIDASE-A |
| LARONIDASE (A-L-IDURONIDASE) |
| GALSULPHASE |
| IDURSUPHASE (IDURONATE-2-SULPHATASE) |
| AGALSIDASE-B (A-GALACTOSIDASE) |
| A-1 PROTEINASE INHIBITOR |
| ALBUMIN |
| Food antigens (Peanut) |
| CONARACHIN (ARA H 1) |
| ALLERGEN II (ARA H 2) |
| ARACHIS AGGLUTININ, |
| CONGLUTIN (ARA H 6) |
| Other Food allergens |
| HIGH MOLECULAR WEIGHT GLUTENIN |
| LOW MOLECULAR WEIGHT GLUTENIN |
| ALPHA- AND GAMMA-GLIADIN |
| HORDEIN |
| SECALIN |
| AVENIN |
| MAJOR STRAWBERRY ALLERGY FRA A 1-E (FRA A 1) |
| PROFILIN (MUS XP 1) |
| A-LACTALBUMIN (ALA) 2S ALBUMIN (SIN A 1) |
| LACTOTRANSFERRIN |

TABLE 2-continued

| Exemplary Tolerogenic Antigens that may be induced or expressed by RNAs within nanoparticles |
| --- |
| ACTINIDIN (ACT C 1, ACT D 1) |
| PHYTOCYSTATIN |
| THAUMATIN-LIKE PROTEIN (ACT D 2) |
| KIWELLIN (ACT D 5) |
| 11 S GLOBULIN (SIN A 2) |
| LIPID TRANSFER PROTEIN (SIN A 3) |
| PROFILIN (SIN A 4); |
| PROFILIN (API G 4),; |
| HIGH MOLECULAR WEIGHT GLYCOPROTEIN (API G 5) |
| Exemplary Nonhuman protein antigens |
| ADENOSINE DEAMINASE |
| PANCREATIC LIPASE, |
| BOTULINUM TOXIN TYPE A |
| PANCREATIC AMYLASE |
| LACTASE |
| BOTULINUM TOXIN TYPE B |
| COLLAGENASE, |
| L-ASPARAGINASE |
| HYALURONIDASE |
| CROTALIDAE POLYVALENT IMMUNE FAB |
| DIGOXIN IMMUNE SERUM FAB |
| L-ARGINASE |
| PAPAIN |
| ANISTREPLASE (ANISOYLATED PLASMINOGEN STREPTOKINASE ACTIVATOR COMPLEX) |
| ANTITHYMOCYTE GLOBULIN |
| RASBURICASE |
| LEPIRUDIN |
| STREPTOKINASE |
| L-METHIONASE |
| Human allograft transplantation antigens |
| MHC class I haplotype proteins |
| MHC class II haplotype proteins |
| Polymorphisms on RhCE |
| Polymorphisms on Kell |
| Polymorphisms on Kidd |
| Polymorphisms on Duffy |
| Food allergens (apple) |
| 31 KDA MAJOR ALLERGEN/DISEASE RESISTANCE PROTEIN HOMOLOG (MAL D 2), |
| LIPID TRANSFER PROTEIN PRECURSOR (MAL D 3) |
| MAJOR ALLERGEN MAL D 1.03D (MAL D 1); |
| Food allergens (shrimp) |
| PEN A 1 ALLERGEN (PEN A 1) |
| ALLERGEN PEN M 2 (PEN IN 2) |
| TROPOMYOSIN FAST ISOFORM |
| Viral Capsid Proteins |
| AAV1 Capsid (VP1, VP2, or VP3) |
| AAV2 (VP1, VP2, or VP3) |
| AAV3 (VP1, VP2, or VP3) |
| AAV4 (VP1, VP2, or VP3) |
| AAV5 (VP1, VP2, or VP3) |
| AAV6 (VP1, VP2, or VP3) |
| AAV7 (VP1, VP2, or VP3) |
| AAV8 (VP1, VP2, or VP3) |
| AAV9 (VP1, VP2, or VP3) |
| AAV10 (VP1, VP2, or VP3) |
| AAV11 (VP1, VP2, or VP3) |
| Human Autoimmune Markers |
| PROINSULIN |
| COLLAGENS |
| MYELIN BASIC PROTEIN |
| GLUTAMIC ACID DECARBOXYLASE-65 |
| CHROMOGRANIN-A |
| GLUTAMIC ACID DECARBOXYLASE-67 |
| SODIUM IODINE SYMPORTER (NIS) |
| GLIAL FIBRILLARY ACIDIC PROTEIN |
| MEGALIN |
| INSULINOMA-ASSOCIATED PROTEIN 2 (IA-2) |
| INSULINOMA-ASSOCIATED PROTEIN 2B (IA-213) |

TABLE 2-continued

| Exemplary Tolerogenic Antigens that may be induced or expressed by RNAs within nanoparticles |
| --- |
| ICA69 |
| ICA12 (SOX-13) |
| CARBOXYPEPTIDASE H |
| IMOGEN 38 |
| GLIMA 38 |
| CHROMOGRANIN-A |
| FISP-60 |
| CABOXYPEPTIDASE E, |
| PERIPHERIN |
| GLUCOSE TRANSPORTER 2 |
| HEPATOCARCINOMA-INTESTINE-PANCREAS/ PANCREATIC ASSOCIATED PROTEIN |
| S100β |
| REGENERATING GENE II, |
| THYROGLOBULIN (TG) |
| THYROID PEROXIDASE (TPO) |
| THYROTROPIN RECEPTOR (TSHR) |
| PANCREATIC DUODENAL HOMEOBOX 1 |
| DYSTROPHIA MYOTONICA KINASE |
| ISLET-SPECIFIC GLUCOSE-6-PHOSPHATASE |
| CATALYTIC SUBUNIT-RELATED PROTEIN |
| SST G-PROTEIN COUPLED RECEPTORS 1-5 |
| 21-HYDROXYLASE |
| 17A-HYDROXYLASE |
| P450 SIDE CHAIN CLEAVAGE ENZYME (P450SCC) |
| ACTH RECEPTOR |
| P450C21 |
| P450C17 |
| FSH RECEPTOR |
| α-ENOLASE |
| H+, K+-ATPase |
| TISSUE TRANSGLUTAMINASE |
| GLIADIN |
| TYROSINASE (also TYROSINASE RELATED PROTEIN 1 and 2) |
| ACETYLCHOLINE RECEPTOR | d. Costimulatory Molecules

In some embodiments, the nucleic acid suppresses, enhances or otherwise alters the function of one or more co-stimulatory molecues, such as those associated with the activation and immunological functions of Leukocytes. For example, in some embodiments, nanoparticles include one or more siRNAs that silence or down-regulate one or more genes responsible for the activation of antigen presenting cell, s such as dendritic cells.

Activation of naïve T cells requires at least two signals. The first signal is antigen displayed by antigen presenting cells (APCs) in the form of 10 peptides bound to histocompatibility molecules. The second signal, the co-stimulatory signal, is antigen nonspecific and is provided by molecules on APCs that engage particular costimulatory receptors on T cells, leading to T cell stimulation in conjunction with antigen. Costimulation is important for an effective immune response of adaptive immunity, and drives T cell proliferation, differentiation and survival. Activation of T cells without costimulation may lead to T cell anergy, T cell deletion or the development of immune tolerance.

One of the best characterized costimulatory receptors expressed by T cells is CD28, which interacts with CD80 (B7-1) and CD86 (B7-2) on the membrane of APCs. CD28 is constitutively expressed on almost all T cells, and is the major costimulatory receptor for naive T cells. The costimulatory molecules B7-1 and B7-2 are expressed mainly on APCs, including dendritic cells, macrophages, and B cells. The expression of B7-1 and B7-2 on APCs can be increased by the presence of microbes and by cytokines that are produced in response to microbes. B7 costimulator expression ensures that T cells respond best only when necessary, that is, when faced with pathogens.

Another costimulatory receptor expressed by T cells is ICOS (Inducible Costimulator), which interacts with ICOS-L. ICOS, which is a member of the CD28 family of costimulatory molecules. Induced upon activation, ICOS is a desirable target for modifying T-cell-mediated immune responses. The activation and effector function of ICOS for both Th1 and Th2 cell indicates it contributes to generation and maintenance of humoral immunity. Numerous costimulatory molecules have been identified playing a role in the initiation of immune responses by T and B lymphocytes. For example, activation of B cells requires CD40-CD40L interactions for proper antibody response: promoting survival, cytokine receptor expression, and inducing antibody class switch. Without this costimulation B cells do not further proliferate. Recent discoveries have illustrated the contrasting roles of costimulatory molecules: stimulatory (costimulation) verse inhibitory (coinhibition), and various aspects of immune dysfunction in cancer are related to the presence of coinhibitory (ex: PD-1, PD-L1, CTLA-4, BTLA) and costimulatory (ex: CD28, ICOS, 4-1BB, CD40, OX40, CD27) signaling.

Costimulatory molecules can be organized by family.

B7/CD28 family member include, for example, B7-1/CD80, B7-2/CD86, B7-H2, B7-H3, B7-H4, B7-H6, B7-H7/HHLA2, BTLA, CD28, CTLA-4, ICOS, PD-1, PD-L1/B7-H1, PD-L2/B7-DC, PDCD6, TMIGD2/CD28H, and VISTA/B7-H5/PD-1H.

Butyrophilins include, for example, BTN1A1/Butyrophilin, BTN2A1, BTN2A2/Butyrophilin 2A2, BTN3A1/2, BTN3A2, BTN3A3, BTNL2/Butyrophilin-like 2, BTNL3, BTNL4, BTNL6, BTNL8, BTNL9, BTNL10, and CD277/BTN3A1.

LAIR Family members include, for example, LAIR1 and LAIR2.

Nectin and Nectin-like Ligand/Receptor co-signaling molecules include, for example, CD96, CD155/PVR, CRTAM, DNAM-1/CD226, Nectin-2/CD112, Nectin-3, PVRIG, and TIGIT.

Regulation of T cell co-stimulation by ILT/CD85 family proteins include, for example, LILRA3/CD85e, LILRA4/CD85g/ILT7, LILRB1/CD85j/ILT2, LILRB2/CD85d/ILT4, LILRB3/CD85a/ILT5, and LILRB4/CD85k/ILT3.

Regulation of T cell co-stimulation by TNF superfamily members include, for example, 4-1BB/TNFRSF9/CD137, 4-1BB Ligand/TNFSF9, BAFF/BLyS/TNFSF13B, BAFF R/TNFRSF13C, CD27/TNFRSF7, CD27 Ligand/TNFSF7, CD30/TNFRSF8, CD30 Ligand/TNFSF8, CD40/TNFRSF5, CD40 Ligand/TNFSF5, DR3/TNFRSF25, GITR/TNFRSF18, GITR Ligand/TNFSF18, HVEM/TNFRSF14, LIGHT/TNFSF14, Lymphotoxin-alpha/TNF-beta, OX40/TNFRSF4, OX40 Ligand/TNFSF4, RELT/TNFRSF19L, TACI/TNFRSF13B, TL1A/TNFSF15, TNF-alpha, and TNF RII/TNFRSF1B.

SLAM family members include, for example, 2B4/CD244/SLAMF4, BLAME/SLAMF8, CD2, CD2F-10/SLAMF9, CD48/SLAMF2, CD58/LFA-3, CD84/SLAMF5, CD229/SLAMF3, CRACC/SLAMF7, NTB-A/SLAMF6, and SLAM/CD150.

TIM family co-Signaling molecules include, for example, TIM-1/KIM-1/HAVCR, TIM-3, and TIM-4.

Other co-stimulatory molecules include, for example, CD7, CD160, CD200, CD300a/LMIR1, CD300d/LMIR4, CLECL1/DCAL-1, DAP12, Dectin-1/CLEC7A, DPPIV/CD26, EphB6, Integrin alpha 4 beta 1, Integrin alpha 4 beta 7/LPAM-1, LAG-3, and TSLP R. A non-limiting list of co-stimulatory molecules that can be down-regulated, silenced, up-reglated, or otherwise modified by nucleic acids (e.g., siRNAs) encapsulated within the described nanoparticles is provided in Table 3, below.

TABLE 3

Exemplary Co-stimulatory molecules that can be silenced, down-regulated, or otherwise moderated by nucleic acids delivered within nanoparticles. Costimulatory molecules are arranged by super family.

| B7/CD28 Family |
| --- |
| B7-1/CD80 |
| B7-2/CD86 |
| B7-H2 |
| B7-H3 |
| B7-H4 |
| B7-H6 |
| B7-H7/HHLA2 |
| BTLA |
| CD28 |
| CTLA-4 |
| ICOS |
| PD-1 |
| PD-L1/B7-H1 |
| PD-L2/B7-DC |
| PDCD6 |
| TMIGD2/CD28H |
| VISTA/B7-H5/PD-1H |
| Butyrophilins |
| BTN1A1/Butyrophilin |
| BTN2A1 |
| BTN2A2/Butyrophilin 2A2 |
| BTN3A1/2 |
| BTN3A2 |
| BTN3A3 |
| BTNL2/Butyrophilin-like 2 |
| BTNL3 |
| BTNL4 |
| BTNL6 |
| BTNL9 |
| BTNL10 |
| CD277/BTN3A1 |
| LAIR Family members |
| LAIR1 |
| LAIR2 |
| Nectin and Nectin-like Ligand/Receptor |
| CD155/PVR |
| CRTAM |
| DNAM-1/CD226 |
| Nectin-2/CD112 |
| Nectin-3 |
| PVRIG |
| TIGIT |
| CD96 |
| TNF superfamily members |
| 4-1BB/TNFRSF9/CD137 |
| 4-1BB Ligand/TNFSF9 |
| BAFF/BLyS/TNFSF13B |
| BAFF R/TNFRSF13C |
| CD27 Ligand/TNFSF7 |
| CD27/TNFSF7 |
| CD30/TNFRSF8 |
| CD30 Ligand/TNFSF8 |
| CD40/TNFRSF5 |
| CD40 Ligand/TNFSF5 |
| DR3/TNFRSF25 |
| GITR/TNFRSF18 |
| GITR Ligand/TNFSF18 |
| HVEM/TNFRSF14 |
| LIGHT/TNFSF14 |
| Lymphotoxin-alpha/TNF-beta |
| OX40/TNFRSF4 |
| RII/TNFRSF1B |
| OX40 Ligand/TNFSF4 |

TABLE 3-continued

Exemplary Co-stimulatory molecules that can be silenced, down-regulated, or otherwise moderated by nucleic acids delivered within nanoparticles. Costimulatory molecules are arranged by super family.

RELT/TNFRSF19L
TACI/TNFRSF13B
TL1A/TNFSF15
TNF-alpha
TNF RII/TNFRSF1B
SLAM family members BLAME/SLAMF8
2B4/CD244/SLAMF4
CD2
CD2F-10/SLAMF9
CD48/SLAMF2
CD58/LFA-3
CD84/SLAMF5
CD229/SLAMF3
CRACC/SLAMF7
NTB-A/SLAMF6
SLAM/CD150
TIM family co-Signaling molecules TIM-1/KIM-1/HAVCR
TIM-3
TIM-4.
Other co-stimulatory molecules CD7
CD160
CD200
CD300a/LMIR1
CD300d/LMIR4
CLECL1/DCAL-1
DAP12
Dectin-1/CLEC7A
DPPIV/CD26
EphB6
Integrin alpha 4 beta 1
Integrin alpha 4 beta 7/LPAM-1
LAG-3
TSLP R
ILT/CD85 family proteins LILRA3/CD85e
LILRA4/CD85g/ILT7
LILRB1/CD85j/ILT2
LILRB2/CD85d/ILT4,
LILRB3/CD85a/ILT5
LILRB4/CD85k/ILT3

In some embodiments, the active agent is a nucleic acid encoding or targeting one or more costimulatory molecules. Exemplary preferred costimulatory molecules include costimulatory molecules of the B7 family e.g, CD80 (B7-1), CD86 (B7-2), ICOS-ligand (B7-H2), B7-H3, B7-H4, PD-L1 (B7-H1), PD-L2 (B7-DC); costimulatory molecules of the TNF-receptor family e.g., CD40, OX40 ligand (OX40L), LIGHT, 4-1BBL, CD30L, CD70; SLAM family members, and combinations thereof.

2. Nucleic Acid Composition

The nucleic acid cargos can be deoxyribonucleic acid (DNA) or ribonucleic acid (RNA) nucleotides which typically include a heterocyclic base (nucleic acid base), a sugar moiety attached to the heterocyclic base, and a phosphate moiety which esterifies a hydroxyl function of the sugar moiety. The principal naturally-occurring nucleotides include uracil, thymine, cytosine, adenine and guanine as the heterocyclic bases, and ribose or deoxyribose sugar linked by phosphodiester bonds.

In some embodiments, the oligonucleotides are composed of nucleotide analogs that have been chemically modified to improve stability, half-life, or specificity or affinity for a target receptor, relative to a DNA or RNA counterpart. The chemical modifications include chemical modification of nucleobases, sugar moieties, nucleotide linkages, or combinations thereof. As used herein 'modified nucleotide" or "chemically modified nucleotide" defines a nucleotide that has a chemical modification of one or more of the heterocyclic base, sugar moiety or phosphate moiety constituents. In some embodiments, the charge of the modified nucleotide is reduced compared to DNA or RNA oligonucleotides of the same nucleobase sequence. For example, the oligonucleotide can have low negative charge, no charge, or positive charge.

Typically, nucleoside analogs support bases capable of hydrogen bonding by Watson-Crick base pairing to standard polynucleotide bases, where the analog backbone presents the bases in a manner to permit such hydrogen bonding in a sequence-specific fashion between the oligonucleotide analog molecule and bases in a standard polynucleotide (e.g., single-stranded RNA or single-stranded DNA). In some embodiments, the analogs have a substantially uncharged, phosphorus containing backbone.

a. Heterocyclic Bases

The principal naturally-occurring nucleotides include uracil, thymine, cytosine, adenine and guanine as the heterocyclic bases. The oligonucleotides can include chemical modifications to their nucleobase constituents. Chemical modifications of heterocyclic bases or heterocyclic base analogs may be effective to increase the binding affinity or stability in binding a target sequence. Chemically-modified heterocyclic bases include, but are not limited to, inosine, 5-(1-propynyl) uracil (pU), 5-(1-propynyl) cytosine (pC), 5-methylcytosine, 8-oxo-adenine, pseudocytosine, pseudoisocytosine, 5 and 2-amino-5-(2'-deoxy-.beta.-D-ribofuranosyl) pyridine (2-aminopyridine), and various pyrrolo- and pyrazolopyrimidine derivatives.

b. Sugar Modifications

Oligonucleotides can also contain nucleotides with modified sugar moieties or sugar moiety analogs. Sugar moiety modifications include, but are not limited to, 2'-O-aminoetoxy, 2'-O-amonioethyl (2'-OAE), 2'-O-methoxy, 2'-O-methyl, 2-guanidoethyl (2'-OGE), 2'-0,4'-C-methylene (LNA), 2'-O-(methoxyethyl) (2'-OME) and 2'-O—(N-(methyl) acetamido) (2'-OMA).

In some embodiments, the functional nucleic acid is a morpholino oligonucleotide. Morpholino oligonucleotides are typically composed of two more morpholino monomers containing purine or pyrimidine base-pairing moieties effective to bind, by base-specific hydrogen bonding, to a base in a polynucleotide, which are linked together by phosphorus-containing linkages, one to three atoms long, joining the morpholino nitrogen of one monomer to the 5' exocyclic carbon of an adjacent monomer. The purine or pyrimidine base-pairing moiety is typically adenine, cytosine, guanine, uracil or thymine. The synthesis, structures, and binding characteristics of morpholino oligomers are detailed in U.S. Pat. Nos. 5,698,685, 5,217,866, 5,142,047, 5,034,506, 5,166,315, 5,521,063, and 5,506,337.

Important properties of the morpholino-based subunits typically include: the ability to be linked in a oligomeric form by stable, uncharged backbone linkages; the ability to support a nucleotide base (e.g. adenine, cytosine, guanine, thymidine, uracil or inosine) such that the polymer formed can hybridize with a complementary-base target nucleic acid, including target RNA, with high $T_m$, even with oligomers as short as 10-14 bases; the ability of the oligomer to be actively transported into mammalian cells; and the ability of an oligomer: RNA heteroduplex to resist RNAse degradation.

In some embodiments, oligonucleotides employ morpholino-based subunits bearing base-pairing moieties, joined by uncharged linkages, as described above.

c. Internucleotide Linkages

Oligonucleotides connected by an internucleotide bond that refers to a chemical linkage between two nucleoside moieties. Modifications to the phosphate backbone of DNA or RNA oligonucleotides may increase the binding affinity or stability oligonucleotides, reduce the susceptibility of oligonucleotides nuclease digestion, or increase membrane permeability. Cationic modifications, including, but not limited to, diethyl-ethylenediamide (DEED) or dimethyl-aminopropylamine (DMAP) may be especially useful due to decrease electrostatic repulsion between the oligonucleotide and a target. Modifications of the phosphate backbone may also include the substitution of a sulfur atom for one of the non-bridging oxygens in the phosphodiester linkage. This substitution creates a phosphorothioate internucleoside linkage in place of the phosphodiester linkage. Oligonucleotides containing phosphorothioate internucleoside linkages have been shown to be more stable in vivo.

Examples of modified nucleotides with reduced charge include modified internucleotide linkages such as phosphate analogs having achiral and uncharged intersubunit linkages (e.g., Sterchak, E. P. et al., *Organic. Chem.,* 52:4202, (1987)), and uncharged morpholino-based polymers having achiral intersubunit linkages (see, e.g., U.S. Pat. No. 5,034, 506), as discussed above. Some internucleotide linkage analogs include morpholidate, acetal, and polyamide-linked heterocycles.

The oligonucleotides can be locked nucleic acids. Locked nucleic acids (LNA) are modified RNA nucleotides (see, for example, Braasch, et al., *Chem. Biol.,* 8 (1): 1-7 (2001)). LNAs form hybrids with DNA which are more stable than DNA/DNA hybrids, a property similar to that of peptide nucleic acid (PNA)/DNA hybrids. Therefore, LNA can be used just as PNA molecules would be. LNA binding efficiency can be increased in some embodiments by adding positive charges to it. Commercial nucleic acid synthesizers and standard phosphoramidite chemistry are used to make LNAs.

In some embodiments, the oligonucleotides are composed of peptide nucleic acids. Peptide nucleic acids (PNAs) are synthetic DNA mimics in which the phosphate backbone of the oligonucleotide is replaced in its entirety by repeating N-(2-aminoethyl)-glycine units and phosphodiester bonds are typically replaced by peptide bonds. The various heterocyclic bases are linked to the backbone by methylene carbonyl bonds. PNAs maintain spacing of heterocyclic bases that is similar to conventional DNA oligonucleotides, but are achiral and neutrally charged molecules. Peptide nucleic acids are formed of peptide nucleic acid monomers.

Other backbone modifications include peptide and amino acid variations and modifications. Thus, the backbone constituents of oligonucleotides such as PNA may be peptide linkages, or alternatively, they may be non-peptide peptide linkages. Examples include acetyl caps, amino spacers such as 8-amino-3,6-dioxaoctanoic acid (referred to herein as O-linkers), amino acids such as lysine are particularly useful if positive charges are desired in the PNA, and the like. Methods for the chemical assembly of PNAs are well known. See, for example, U.S. Pat. Nos. 5,539,082, 5,527, 675, 5,623,049, 5,714,331, 5,736,336, 5,773,571 and 5,786, 571.

Oligonucleotides optionally include one or more terminal residues or modifications at either or both termini to increase stability, and/or affinity of the oligonucleotide for its target. Commonly used positively charged moieties include the amino acids lysine and arginine, although other positively charged moieties may also be useful. Oligonucleotides may further be modified to be end capped to prevent degradation using a propylamine group. Procedures for 3' or 5' capping oligonucleotides are well known in the art. The functional nucleic acid can be single stranded or double stranded.

B. Non-Nucleic Acid-Based Agents

In some embodiments, non-nucleic acid based active agents are delivered within, or in combination with the nanoparticles including nucleic acids.

It will be appreciated that in addition to nucleic acid-based active agents, the particles can further include other active agent cargos. Additionally or alternatively nucleic acid-containing particles can be co-delivered to a subject in combination with (i) particles containing other active agents, or (ii) with active agents not contained in particles, or combination thereof. Active agent cargos to be delivered include therapeutic, nutritional, diagnostic, and prophylactic agents. The active agents can be small molecule active agents or biomacromolecules, such as proteins, polypeptides, sugars or carbohydrates, lipids, nucleic acids or small molecule compounds (typically 1 kD or less, but may be larger). Suitable small molecule active agents include organic and organometallic compounds. The small molecule active agents can be a hydrophilic, hydrophobic, or amphiphilic compound.

Active agents include synthetic and natural proteins (including enzymes, peptide-hormones, receptors, growth factors, antibodies, signaling molecules), and synthetic and natural nucleic acids (including RNA, DNA, anti-sense RNA, triplex DNA, inhibitory RNA (RNAi), and oligonucleotides), and biologically active portions thereof. Suitable active agents have a size greater than about 1,000 Da for small peptides and polypeptides, more typically at least about 5,000 Da and often 10,000 Da or more for proteins. Nucleic acids are more typically listed in terms of base pairs or bases (collectively "bp"). Nucleic acids with lengths above about 10 bp are typically used. More typically, useful lengths of nucleic acids for probing or therapeutic use will be in the range from about 20 bp (probes; inhibitory RNAs, etc.) to tens of thousands of bp for genes and vectors. The active agents may also be hydrophilic molecules, preferably having a low molecular weight.

Exemplary therapeutic agents that can be co-delivered with the particles include cytokines, chemotherapeutic agents, radionuclides, monoclonal antibodies or other immunotherapeutics, enzymes, antibiotics, antivirals, anti-parasites (helminths, protozoans), growth factors, growth inhibitors, hormones, hormone antagonists, antibodies and bioactive fragments thereof (including humanized, single chain, and chimeric antibodies), antigen and vaccine formulations (including adjuvants), peptide drugs, anti-inflammatoires, immunomodulators (including ligands that bind to Toll-Like Receptors (including, but not limited to, CpG oligonucleotides) to activate the innate immune system, molecules that mobilize and optimize the adaptive immune system, molecules that activate or up-regulate the action of cytotoxic T lymphocytes, natural killer cells and helper T-cells, and molecules that deactivate or down-regulate suppressor or regulatory T-cells), agents that promote uptake of particles into cells, and nutraceuticals such as vitamins.

Exemplary diagnostic agents include paramagnetic molecules, fluorescent compounds, magnetic molecules, and radionuclides, x-ray imaging agents, and contrast agents. An imaging, detectable or sensing moiety, i.e., a moiety that can be determined in some fashion, either directly or indirectly, may be bound to the NPs or to the polymers forming the NPs, or encapsulated therein. Representative imaging entities include, but are not limited to, fluorescent, radioactive, electron-dense, magnetic, or labeled members of a binding pair or a substrate for an enzymatic reaction, which can be detected. In some cases, the imaging entity itself is not directly determined, but instead interacts with a second entity in order to effect determination; for example, coupling of the second entity to the imaging entity may result in a determinable signal. Non-limiting examples of imaging moieties include, but are not limited to, fluorescent compounds such as FITC or a FITC derivative, fluorescein, green fluorescent protein ("GFP"), radioactive atoms such as $^3$H, $^{14}$C, $^{33}$P, $^{32}$P, $^{125}$I, $^{131}$I, $^{35}$S, or a heavy metal species, for example, gold or osmium. An imaging moiety may be a gold nanoparticle. A diagnostic or imaging tag such as a fluorescent tag can be chemically conjugated to a polymer to yield a fluorescently labeled polymer. For imaging, radioactive materials such as Technetium99 ($^{99m}$Tc) or magnetic materials such as $Fe_2O_3$ could be used. Examples of other materials include gases or gas emitting compounds, which are radioopaque.

IV. Tissue Targeting Ligands, Cell Adhesion Ligands, and Endosomal Escape Ligands 1. Targeting Moieties The nanoparticles, cargo they contain, or a combination thereof, can include a targeting moiety, i.e., a moiety able to bind to or otherwise associate with a target, for example, a membrane component, a cell surface receptor, or a molecule at a site where delivery is to occur. In one embodiment, the targeting moiety has a specificity (as measured via a disassociation constant) of less than about 1 micromolar, at least about 10 micromolar, or at least about 100 micromolar. Numerous examples of targeting moieties are known, some of which are more selective than others. The ligand can be selected based on the disease to be treated, the target cells, tissue or organ, and the desired delivery strategy (e.g., into a cells or into the extracellular space). The particles or cargo can include two, three, or more targeting moieties. In some embodiments, some polymers of the particle have a targeting moiety attached thereto and others do not. In this way, the density of the targeting moiety on the surface of the particle can be manipulated.

The targeting signal can include a sequence of monomers that facilitates in vivo localization of the molecule. The monomers can be amino acids, nucleotide or nucleoside bases, or sugar groups such as glucose, galactose, and the like which form carbohydrate targeting signals. Exemplary targeting molecules include small molecules, peptides, aptamers, polynucleotides, and antibodies and antigen binding fragments thereof. In certain embodiments, the antibody is polyclonal, monoclonal, linear, humanized, chimeric or a fragment thereof. Representative antibody fragments are those fragments that bind the antibody binding portion such as Fab, Fab', F(ab'), Fv diabodies, linear antibodies, single chain antibodies and bispecific antibodies.

Targeting signals or sequences can be specific for a host, tissue, organ, cell, organelle, non-nuclear organelle, or cellular compartment. For example, in some embodiments, the particle or cargo includes a cell-specific targeting domain, an organelle specific targeting domain to enhance delivery to a subcellular organelle, or a combination thereof. For example, the particle can include targeting moiety that directs the particle to a microenvironment where the cargo is released. A second targeting moiety on the cargo can then enhance delivery to cargo into a target cell or cell(s) in the microenvironment. In some embodiment, the particle includes a moiety that targets it to a tissue, cell or organ, and the cargo includes a moiety that enhances delivery of the cargo to a subcellular location such as an organelle.

General classes and methods of targeting are discussed here, and specific exemplary cell, tissue, organ, and microenvironment specific targets are discussed in more detail and the sections below devoted to therapeutic strategies and in the working Examples.

Another embodiment provides an antibody or antigen binding fragment thereof bound to the proteins of interest acting as the targeting signal. The antibodies or antigen binding fragment thereof are useful for directing the vector to a cell type or cell state. In one embodiment, the polypeptide of interest possesses an antibody binding domain, for example, from proteins known to bind antibodies such as Protein A and Protein G from *Staphylococcus aureus*.

In some embodiments, the targeting domain includes all or part of an antibody that directs the vector to the desired target cell type or cell state. Antibodies can be monoclonal or polyclonal, but are preferably monoclonal. For human gene therapy purposes, antibodies are derived from human genes and are specific for cell surface markers, and are produced to reduce potential immunogenicity to a human host as is known in the art. For example, transgenic mice which contain the entire human immunoglobulin gene cluster are capable of producing "human" antibodies can be utilized. In one embodiment, fragments of such human antibodies are employed as targeting signals. In a preferred embodiment, single chain antibodies modeled on human antibodies are prepared in prokaryotic culture.

In one embodiment, the targeting ligand is a fusion protein. The fusion protein can include, for example, a polynucleotide-binding polypeptide, a protein transduction domain, and optionally one or more targeting signals. Other exemplary fusion proteins containing a mitochondrial transcription factor polypeptide are disclosed in U.S. Pat. Nos. 8,039,587, 8,062,891, 8,133,733.

The particles, the cargo, or a combination thereof can be modified to target a specific cell type or population of cells. For example, the particles and cargo can be modified with galactosyl-terminating macromolecules to target the polypeptide of interest to the liver or to liver cells. The modified particles and cargo selectively enters hepatocytes after interaction of the carrier galactose residues with the asialoglycoprotein receptor present in large amounts and high affinity only on these cells. The eukaryotic cell includes a number of distinct cell surface molecules. The structure and function of each molecule can be specific to the origin, expression, character and structure of the cell. Determining the unique cell surface complement of molecules of a specific cell type can be determined using techniques well known in the art.

In some embodiments, the targeting signal binds to its ligand or receptor which is located on the surface of a target cell such as to bring the composition and cell membranes sufficiently close to each other to allow penetration of the composition into the cell. One skilled in the art will appreciate that the tropism of the particles and cargo can be altered by changing the targeting signal. For example, the compositions can be modified to include cell surface antigen specific antibodies. Exemplary cell surface antigens are disclosed in Wagner et al., *Adv Gen,* 53:333-354 (2005). Tumor antigens discussed in more detail below.

It is known in the art that nearly every cell type in a tissue in a mammalian organism possesses some unique cell surface receptor or antigen. Thus, it is possible to incorporate nearly any ligand for the cell surface receptor or antigen as a targeting signal. For example, peptidyl hormones can be used a targeting moieties to target delivery to those cells which possess receptors for such hormones. Chemokines and cytokines can similarly be employed as targeting signals to target delivery of the complex to their target cells. A variety of technologies have been developed to identify genes that are preferentially expressed in certain cells or cell states and one of skill in the art can employ such technology to identify targeting signals which are preferentially or uniquely expressed on the target tissue of interest The targeting signal can be directed to cells of the nervous system, including the brain and peripheral nervous system. Cells in the brain include several types and states and possess unique cell surface molecules specific for the type. Furthermore, cell types and states can be further characterized and grouped by the presentation of common cell surface molecules. The targeting signal can be directed to specific neurotransmitter receptors expressed on the surface of cells of the nervous system. The distribution of neurotransmitter receptors is well known in the art and one so skilled can direct the compositions described by using neurotransmitter receptor specific antibodies as targeting signals. Furthermore, given the tropism of neurotransmitters for their receptors, in one embodiment the targeting signal consists of a neurotransmitter or ligand capable of specifically binding to a neurotransmitter receptor.

The targeting signal can be specific to cells of the nervous system which may include astrocytes, microglia, neurons, oligodendrites and Schwann cells. These cells can be further divided by their function, location, shape, neurotransmitter class and pathological state. Cells of the nervous system can also be identified by their state of differentiation, for example stem cells. Exemplary markers specific for these cell types and states are well known in the art and include, but are not limited to CD133 and Neurosphere.

The targeting signal can be directed to cells of the musculoskeletal system. Muscle cells include several types and possess unique cell surface molecules specific for the type and state. Furthermore, cell types and states can be further characterized and grouped by the presentation of common cell surface molecules. For example, the targeting signal can be directed to specific neurotransmitter receptors expressed on the surface of muscle cells. The distribution of neurotransmitter receptors is well known in the art and one so skilled can direct the compositions described by using neurotransmitter receptor specific antibodies as targeting signals. Furthermore, given the tropism of neurotransmitters for their receptors, in some embodiments the targeting signal consists of a neurotransmitter. Exemplary neurotransmitters expressed on muscle cells that can be targeted include but are not limited to acetycholine and norepinephrine.

The targeting signal can be specific to muscle cells which consist of two major groupings, Type I and Type II. These cells can be further divided by their function, location, shape, myoglobin content and pathological state. Muscle cells can also be identified by their state of differentiation, for example muscle stem cells. Exemplary markers specific for these cell types and states are well known in the art include, but are not limited to MyoD, Pax7 and MR4.

In some embodiments, the particle, cargo, or a combination thereof is modified to target a subcellular organelle. Targeting of the disclosed composition to organelles can be accomplished by modifying the composition to contain specific organelle targeting signals. These sequences can target organelles, either specifically or non-specifically. In some embodiments the interaction of the targeting signal with the organelle does not occur through a traditional receptor-ligand interaction.

The eukaryotic cell includes a number of discrete membrane bound compartments, or organelles. The structure and function of each organelle is largely determined by its unique complement of constituent polypeptides. However, the vast majority of these polypeptides begin their synthesis in the cytoplasm. Thus organelle biogenesis and upkeep require that newly synthesized proteins can be accurately targeted to their appropriate compartment. This is often accomplished by amino-terminal signaling sequences, as well as post-translational modifications and secondary structure.

Organelles can have single or multiple membranes and exist in both plant and animal cells. Depending on the function of the organelle, the organelle can consist of specific components such as proteins and cofactors. The composition delivered to the organelle can enhance or inhibit to the functioning of the organelle. Exemplary organelles include the nucleus, mitochondrion, chloroplast, lysosome, peroxisome, Golgi, endoplasmic reticulum, and nucleolus. Some organelles, such as mitochondria and chloroplasts, contain their own genome. Nucleic acids are replicated, transcribed, and translated within these organelles. Proteins are imported and metabolites are exported.

There can be an exchange of material across the membranes of organelles. Synthetic organelles can be formed from lipids and can contain specific proteins within the lipid membranes. Additionally, the content of synthetic organelles can be manipulated to contain components for the translation of nucleic acids.

In certain embodiments the particle, the cargo, or a combination thereof specifically target mitochondria. Mitochondria contain the molecular machinery for the conversion of energy from the breakdown of glucose into adenosine triphosphate (ATP). The energy stored in the high energy phosphate bonds of ATP is then available to power cellular functions. Cells with high metabolic activity, such as heart muscle, have many well developed mitochondria.

Mitochondrial targeting agents can include a sequence of highly positively charged amino acids. This allows the protein to be targeted to the highly negatively charged mitochondria. Unlike receptor-ligand approaches that rely upon stochastic Brownian motion for the ligand to approach the receptor, such targeting signals are drawn to mitochondria because of charge. Therefore, in some embodiments, the mitochondrial targeting agent is a protein transduction domain including but not limited to the protein transduction domains discussed in more detail below.

Mitochondrial targeting agents also include short peptide sequences (Yousif, et al., *Chembiochem.*, 10 (13): 2131 (2009)), for example, mitochondrial transporters-synthetic cell-permeable peptides, also known as mitochondria-penetrating peptides (MPPs), that are able to enter mitochondria. MPPs are typically cationic, but also lipophilic; this combination of characteristics facilitates permeation of the hydrophobic mitochondrial membrane. For example, MPPs can include alternating cationic and hydrophobic residues (Horton, et al., *Chem Biol.*, 15 (4): 375-82 (2008)). Some MPPs include delocalized lipophilic cations (DLCs) in the peptide sequence instead of, or in addition to natural cationic amino acids (Kelley, et al., *Pharm. Res.*, 2011 Aug. 11 [Epub ahead of print]). Other variants can be based on an oligomeric carbohydrate scaffold, for example attaching guanidinium moieties due to their delocalized cationic form (Yousif, et al., Chembiochem., 10 (13): 2131 (2009).

Mitochondrial targeting agents also include mitochondrial localization signals or mitochondrial targeting signals. Many mitochondrial proteins are synthesized as cytosolic precursor proteins containing a leader sequence, also known as a presequence, or peptide signal sequence. Many sequences are known in the art, see for example, U.S. Pat. No. 8,039,587. The identification of the specific sequences necessary for translocation of a linked compound into a mitochondrion can be determined using predictive software known to those skilled in the art.

In some embodiments the target moiety directs the composition to the nucleus. Nuclear localization signals (NLS) or domains are known in the art and include for example, SV 40 T antigen or a fragment thereof. The NLS can be simple cationic sequences of about 4 to about 8 amino acids, or can be bipartite having two interdependent positively charged clusters separated by a mutation resistant linker region of about 10-12 amino acids.

In some embodiments, the particles, cargo, or a combination thereof additionally or alternatively include a moiety that enhances escape from endosomes or macropinosomes. In some embodiments, particles enter cells through endocytosis and are entrapped in endosomes. These early endosomes subsequently fuse with sorting endosomes, which in turn transfer their contents to the late endosomes. Late endosomal vesicles are acidified (pH 5-6) by membrane-bound proton-pump ATPases. If the particles are not released from the endosome, for example, by pH-induced degradation and the associated "sponge" effect as discussed in more detail below, the endosomal content can be relocated to the lysosomes, which are further acidified (pH ~4.5) and contain various nucleases that promote the degradation of nucleic acids. To avoid lysosomal degradation of cargo, particularly nucleic acid cargo, the particle including the cargo, or the cargo itself (following release from the particle) escapes from the endosome into the cytosol. This is particularly preferred for mRNA and functional nucleic acid cargos which may rely on cytosolic cellular machinery for their activity.

Strategies to promote endosomal release are known in the art, and include, for example, the use of fusogenic lipids, polymers with high buffering capacity and membrane-interacting peptides (exemplary strategies are reviewed in Dominska and Dykxhoorn, J Cell Sci, 123:1183-1189 (2010)). In particularly preferred embodiments, the endosomal escape sequence is a membrane interacting peptide. In some embodiments, the endosomal escape sequence is a protein transduction domain. Thus in some embodiments the endosomal escape sequence is part of, or consecutive with, the protein transduction domain. In some embodiments, the endosomal escape sequence is non-consecutive with the protein transduction domain or provided in the absence of a protein transduction domain. In some embodiments the endosomal escape sequence includes a portion of the hemagglutinin peptide from influenza (HA).

Examples of endosomal escape sequences are known in the art. See, for example, WO 2013/103972. Hatakeyama, et al., have described a fusogenic PEG-peptide-DOPE (PPD) construct and a pH-sensitive fusogenic GALA peptide (Hatakeyama, et al., J. Control. Release 139, 127-132 (2009)) and that PPD constructs can be cleaved by matrix metalloproteinases that are specifically secreted by cancer cells, enhancing the delivery of siRNA complexed with this carrier to tumor cells (Hatakeyama, et al., Gene Ther., 14, 68-77 (2007)).

Another membrane-destabilization mechanism takes advantage of the pore-forming ability of viroporins, highly hydrophobic proteins that create channels and facilitate ion flow across biological membranes (Gonzalez and Carrasco, FEBS Lett. 552, 28-34 (2003)). For example, peptides derived from the endodomain of the HIV gp41 envelope glycoprotein (sequence corresponding to residues 783-806 of gp160) form pores in the cell membrane by adopting an amphipathic α-helical structure (Costin et al., Virol. J., 4:123 (2007)) and (Kwon et al., Bioconjugate Chem., 19, 920-927 (2008)).

The influenza-derived fusogenic peptide diINF-7 has also been shown to enhance endosomal release (Oliveira et al., Int. J. Pharm. 331, 211-214 (2007)).

The particles, any of the active agents, but particularly protein and nucleic acid agents, or a combination thereof can include a protein transduction domain to improve delivery of the active agent across extracellular membranes, intracellular membranes, or the combination thereof. As used herein, a "protein transduction domain" or PTD refers to a polypeptide, polynucleotide, carbohydrate, organic or inorganic compound that facilitates traversing a lipid bilayer, micelle, cell membrane, organelle membrane, or vesicle membrane. A PTD attached to another molecule facilitates the molecule traversing membranes, for example going from extracellular space to intracellular space, or cytosol to within an organelle.

The protein transduction domain can be a polypeptide including positively charged amino acids and can be cationic or amphipathic. Protein transduction domains (PTD), also known as a cell penetrating peptides (CPP), are typically polypeptides including positively charged amino acids. PTDs are known in the art

IV. Nanoparticle Formation

The nanoparticles are typically formed using an emulsion process, single or double, using an aqueous and a non-aqueous solvent or self-assembly of amphiphilic polymers or a mixture of amphiphlic polymers and hydrophobic polymers. Typically, the nanoparticles contain a minimal amount of the non-aqueous solvent after solvent removal. Preferred methods of preparing these nanoparticles are described in the examples.

In one embodiment, nanoparticles are prepared using emulsion solvent evaporation method. A polymeric material is dissolved in a water immiscible organic solvent and mixed with a drug solution or a combination of drug solutions. The water immiscible organic solvent is preferably a GRAS ingredient such as chloroform, dichloromethane, and acyl acetate. The drug can be dissolved in, but is not limited to, one or a plurality of the following: acetone, ethanol, methanol, isopropyl alcohol, acetonitrile and Dimethyl sulfoxide (DMSO). An aqueous solution is then added into the resulting mixture solution to yield emulsion solution by emulsification. The emulsification technique can be, but not limited to, probe sonication or homogenization through a homogenizer.

In another embodiment, nanoparticles are prepared using nanoprecipitation methods or microfluidic devices. A polymeric material is mixed with a drug or drug combinations in a water miscible organic solvent. The water miscible organic solvent can be one or more of the following: acetone, ethanol, methanol, isopropyl alcohol, acetonitrile and Dimethyl sulfoxide (DMSO). The resulting mixture solution is then added to an aqueous solution to yield nanoparticle solution. The agents may be associated with the surface of, encapsulated within, surrounded by, and/or distributed throughout the polymeric matrix of the particles.

In another embodiment, nanoparticles are prepared by the self-assembly of the amphiphilic polymers, optionally including hydrophilic and/or hydrophobic polymers, using emulsion solvent evaporation, a single-step nanoprecipitation method, or microfluidic devices.

Two methods to incorporate targeting moieties into the nanoparticles include: i) conjugation of targeting ligands to the hydrophilic region (e.g. PEG) of polymers prior to nanoparticle preparation; and ii) incorporation of targeting molecules onto nanoparticles where the PEG layer on the nanoparticle surface can be cleaved in the presence of a chemical or enzyme at tissues of interest to expose the targeting molecules.

In some embodiments, the polymer or lipid forming the particle can be couple to targeting agents or other molecules as discussed above using a linker. The linker may be a cleavable linker hydrolyzed by a chemical or enzymatic process. Interactive release can be engineered using a linker cleaved by hydrogen peroxide, which is produced at sites of inflammation or areas of high neutrophil concentration.

The average diameters of the nanoparticles are typically between about 40 nm and about 150 nm, preferably between about 50 nm and about 100 nm. In some embodiments, the average diameters of the nanoparticles are about 100 nm. The zeta potential of the nanoparticles is typically between about-50 mV and about +50 mV, preferably between about-25 mV and +25 mV, most preferably between about-10 mV and about +10 mv.

V. Formulations and Methods of Administration

A. Formulations

Formulations are prepared using a pharmaceutically acceptable "carrier" composed of materials that are considered safe and effective and may be administered to an individual without causing undesirable biological side effects or unwanted interactions. The "carrier" is all components present in the pharmaceutical formulation other than the active ingredient or ingredients. The term "carrier" includes but is not limited to diluents, binders, lubricants, desintegrators, fillers, and coating compositions.

Pharmaceutical compositions can be for administration by parenteral (intramuscular, intraperitoneal, intravenous (IV) or subcutaneous injection), routes of administration and can be formulated in dosage forms appropriate for each route of administration. The compositions are most typically administered systemically.

Compounds and pharmaceutical compositions thereof can be administered in an aqueous solution, by parenteral injection. The formulation may also be in the form of a suspension or emulsion, optionally including pharmaceutically acceptable diluents, preservatives, solubilizers, emulsifiers, adjuvants and/or carriers. Diluents include sterile water, buffered saline of various buffer content (e.g., Tris-HCl, acetate, phosphate), pH and ionic strength; and optionally, additives such as detergents and solubilizing agents (e.g., TWEEN® 20, TWEEN® 80 also referred to as polysorbate 20 or 80), anti-oxidants (e.g., ascorbic acid, sodium metabisulfite), and preservatives. Examples of non-aqueous solvents or vehicles are propylene glycol, polyethylene glycol, vegetable oils, such as olive oil and corn oil, gelatin, and injectable organic esters such as ethyl oleate. The formulations may be lyophilized and redissolved/resuspended immediately before use. The formulation may be sterilized by, for example, filtration through a bacteria retaining filter, by incorporating sterilizing agents into the compositions, by irradiating the compositions, or by heating the compositions.

Active agent(s) and compositions thereof can be formulated for pulmonary or mucosal administration. The administration can include delivery of the composition to the lungs, nasal, oral (sublingual, buccal), vaginal, or rectal mucosa.

Suitable parenteral administration routes include intravascular administration; subcutaneous injection or deposition including subcutaneous infusion (such as by osmotic pumps); or direct application by a catheter or other placement device (e.g., an implant comprising a porous, non-porous, or gelatinous material).

The formulation can be administered in a single dose or in multiple doses. Dosage levels on the order of about 1 mg/kg to 100 mg/kg of body weight per administration are useful in the treatment of a disease. One skilled in the art can also readily determine an appropriate dosage regimen for administering the disclosed polynucleotides to a given subject. For example, the formulation can be administered to the subject once, e.g., as a single injection, infusion or bolus. Alternatively, the formulation can be administered once or twice daily to a subject for a period of from about three to about twenty-eight days, or from about seven to about ten days.

B. Exemplary Applications of the Technology

The compositions and methods are particularly useful for modulating gene expression in cells. Inhibitory nucleic acids can be introduced into cells to reduce gene expression. The expressed gene can encode a protein, or can encode a non-coding nucleic acid, for example, a functional non-coding RNA molecule such as transfer RNA, ribosomal RNA, or regulatory RNA. The inhibitory nucleic acid can specifically target the expressed gene (or an RNA expressed therefrom) and reduce expression of the gene product. Alternatively, mRNA and functional non-coding RNA molecules such as transfer RNA, ribosomal RNA, and regulatory RNA can be introduced into a cell to increase expression of the protein or polypeptide encoded by the mRNA, or increase the presence of the functional RNA in the cell. Table 4 shows four examples of co-delivery of siRNA and mRNA or DNA for various disease treatments.

TABLE 4

Examples of co-delivery of siRNA and mRNA or DNA for treatments.

|  | Species 1 | Species 2 | Application |
|---|---|---|---|
| Example 1 | siRNA against AR | mRNA encoding PTEN | Prostate cancer therapy |
| Example 2 | siRNA against PHB1 | DNA encoding p53 | Non-small cell lung cancer (NSCLC) therapy |
| Example 3 | siRNA against B7-1 and/or B7-2 | mRNA encoding AAV capsid proteins (VP1, VP2 and VP3) | Tolerance for AAV vectors for gene therapy |
| Example 4 | siRNA against B7-1 and/or B7-2 | mRNA encoding antigens (e.g., insulin, glutamic acid decarboxylase, insulinoma antigen-2, and ZnT8) | Type 1 diabetes therapy |
| Example 5 | siRNA an oncogene | mRNA encoding a tumor suppressor | Cancer therapy |
| Example 6 | siRNA against one or more co- | mRNA encoding a antigen (e.g., a | Induction of tolerance against |

TABLE 4-continued

Examples of co-delivery of siRNA and mRNA or DNA for treatments.

| Species 1 | Species 2 | Application |
|---|---|---|
| stimulatory molecules (e.g., immune activating molecules including, but not limited to, B71, B72, etc). | tolerogenic antigen). | the antigen |

The disclosed compositions and methods can be used to deliver multiple different nucleic acid species into a single cell at the same time. Preferably the particles are loaded with two or more species of nucleic acids. Although the compositions and methods include co-loading two or more mRNA or two or more functional nucleic acids into a single particle, in the most preferred embodiments, the particle is loaded with at least one functional nucleic acid, preferable an inhibitory RNA such as a siRNA, and at least on one mRNA.

As illustrated in the experiments below, co-delivery of siRNA and mRNA into cells can enhance the function of the siRNA and the mRNA. In some embodiments, the effect of a nucleic acid delivered by particles loaded with two or more species of nucleic acid is compared to the effect of the nucleic acid when delivered in particles absent the other nucleic acid species. In some embodiments, the effect of the nucleic acid is increased 5, 10, 15, 20, 25, 30, 35, 40, 50, 75, 100, or more percent. In some embodiments, individual particles are loaded with two of more different species of nucleic acids. In some embodiments, individual particles are loaded with one species of nucleic acid, and two or more species of particles (and thus two or more species of nucleic acids) are co-delivered to a subject in need thereof.

The co-delivery of a functional nucleic acid and an mRNA can be used to reduce expression of one target and increase expression of another target simultaneously. The targets can be in the same or different molecular pathways. In some embodiments, the two targets are in the same or related cellular processes, for example, cell communication, cellular senescence, DNA repair, gene expression, metabolism, necrosis, and programmed cell death (apoptosis), etc. Thus strategies can be designed such that one of the nucleic acid species increases expression or is an inducer or activator of a pathway or process, and the second nucleic acid species decreases expression of an inhibitor or a checkpoint in the pathway or process. For example, in an exemplary embodiment apoptosis can be increased by increasing expression of a pro-apoptotic factor (e.g., introducing mRNA encoding Bax, BAD, Bak, Bok, etc.) while also decreasing expression of an anti-apoptotic factor (e.g., an inhibitory nucleic acid that targets Bcl-2 proper, Bcl-XL, Bcl-w, etc.).

The two species of nucleic acids can also target different pathways or processes. In such embodiments, the targets are selected based disease to be treated or another desired outcome. For example, in the treatment of cancer, strategies may be designed to reduce expression of anti-apoptotic or other survival signaling, reduce proliferation, increase sensitivity to anticancer agents, modulate DNA damage and repair pathways, alter cellular metabolism, etc., in combinations of two or more. Targeting two or more of these pathways separately, but simultaneously, can be more effective at treating the disease or disorder than targeting only one pathway. In one pathway, the nucleic acids can decrease the expression of disease-associated protein expression. These proteins can include kinesin spindle protein, RRM2, keratin 6a, HER1, ErbB2, VEGFR1, VEGFR3), PDGFR-α, PDGFR-β, EGFR, FGFR1, FGFR2, FGFR3, FGFR4, EphA2, EphA3, EphA4, HER2, HER3, HER4, INS-R, IGF-1R, IR-R, CSF1R, KIT, FLK-II, KDR/FLK-1, FLK-4, flt-1, c-Met, Ron, Sea, TRKA, TRKB, TRKC, FLT3, VEGFR/Flt2, Flt4, EphA1, EphB2, EphB4, Pim1, Pim2, Pim3, Tie2PKN3, PLK1, PLK2, PLK3, Src, Fyn, Lck, Fgr, Btk, Fak, SYK, FRK, JAK, Abl, Kit, KDR, CaM-kinase, phosphorylase kinase, MEKK, ERK, MAP kinase, PI3K, Akt1, Akt2, Akt3, TGF-αR, KRAS, BRAF, CDK1, CDK2, CDK4, CDK5, CDK6, CDK7, CDK9, GSK3, CLK1, CLK4, Aurora A, Aurora B, Aurora C, MEK1, MEK2, mTOR, protein kinase A, protein kinase C, protein kinase G, PHB1, survivin, KIF11, and BRD4. In a preferred embodiment, the nucleic acids encapsulated are siRNA targeting PHB1.

In another pathway, the nucleic acids can increase the expression of disease-suppressed protein expression (e.g., see Table 1). These proteins can be but not only adenomatous polyposis coli (APC), tumor protein p53 (TP53), cyclin-dependent kinase inhibitor 2A (CDKN2A), phosphatase and tensin homolog (PTEN), retinoblastoma 1 (RB1), mothers against DPP homolog 4 (SMAD4), von Hippel-Lindau protein (pVHL), CD95, suppression of tumorigenicity 5 (ST5), suppression of tumorigenicity 7 (ST7), suppression of tumorigenicity (ST14), and Yippee-like 3 (YPEL3). In a preferred embodiment, the nucleic acids encapsulated are mRNA encoding PTEN.

In some embodiments, the nanoparticles are stimuli-responsive nanoparticles. Stimuli-responsive nanoparticles, which can undergo shape, structure and property change upon encountering endogenous or exogenous stimuli, can be used in diverse range of biomedical applications, such as drug controlled release, nucleic acid delivery, imaging, and diagnostics. The stimuli-responsive characteristic provides spatiotemporal control over the macroscopic properties of the nanoparticles, and thus the release of the encapsulated cargo can occur directly at the desired site, minimizing toxic and side effects in surrounding, healthy tissue. Dissociation of the particle and release of its cargo, can be driven by, for example, pH-, redox-, light-, temperature-, enzyme-, or ultrasound-responsive polymers composing the particles.

The stimuli that drive a response by the particle can be present within a cell (e.g., intracellularly) or outside cells in the extracellular microenvironment, or can be an external stimuli for example, light, heat, ultrasound, etc., which can be applied by the user to the target site. The particles can optionally include a targeting moiety or ligand. For embodiments in which intracellular release is desired, the targeting moiety or ligand is typically one that preferentially binds to the surface of a target cell and induces or allows the particle to be absorbed or internalized by, for example, endocytosis or micropinocytosis (Vranic et al., Particle and Fibre Toxicology, 10 (2): (12 page) (2013)). For embodiments in which extracellular release is desired, the targeting moiety or ligand can be one that preferentially binds to an extracellular target in the desired microenvironment.

C. Exemplary Environments for Selective Delivery

1. Acidic Environment pH responsive nanoparticles can be used to target tissues with acidic extracellular pH. Although the nanoparticles can optionally include a cell, tissue, organ, or extracellular matrix-specific targeting moiety or ligand, a targeting moiety or ligand is not requirement. The pH responsive nanoparticles can be designed to have spherical morphology at a pH above pKa to protect cargo during systemic circulation and infiltration into tissues with extracellular pH at or around neutral or physiological pH. The particles can dissociate at a pH below pKa, releasing its cargo into the microenvironment. Low pH is associated with infection, cancer and some other conditions. In this way, the particles selectively release their cargo at the target site.

pH responsive nanoparticles can also be used to deliver cargo into cells. Particles, preferable with a targeting moiety or ligand, can bind to a target cell and be absorbed or internalized. Upon encountering an acidic intracellular environment such as that of endosomes, the pH responsive particles can dissociate and release their cargo. The particles can also optionally include a moiety that enhances endosomal escape, such as oligoarinine. As illustrated in the working Examples below, particle dissociation within the endosome is believe to induce swelling of the endosome via "sponge" effect, thus achieving fast and high efficacy delivery of their cargo into the cytosol. Using an intracellular endosomal-release strategy, virtually any cell with endosomes (or another equivalently acidic intracellular environment, compartment, or organelle) can be the target cell. The addition of a targeting moiety can be used to accomplish selective delivery of the particle into target cells over non-target cells. pH responsive intracellular release can be most effective when the extracellular pH does not induce nanoparticle dissociation thus allowing the particles to absorbed or internalized by cells.

In some embodiments, cargo is released below physiological pH (e.g., 7.4, or 7.2), or below neutral pH (e.g., 7.0), or in a pH range of about 5.8 to about 7.3, or about 5.8 to about 6.9, or about 6.0 to about 6.5, or about 6.5 to about 6.9.

2. Temperature

In embodiments, cargo release is driven by a change in temperature. In the biomedical setting, a change in temperature will can be an increase or decrease from the physiological temperature of the subject being treated. Normal human body temperature, also referred to as normothermia or euthermia, depends upon the place in the body at which the measurement is made, the time of day, as well as the activity level of the person. Typically values for oral measurement (under the tongue) are 36.8±0.4° C. (98.2±0.72° F.) and internal (rectal, vaginal) measurement are 37.0° C. (98.6° F.) (*Harrison's Principles of Internal Medicine*, 18e, Longo, Editor, Fauci, et al., Editor, Kasper). Human temperature classifications can be, for example, Hypothermia<35.0° C. (95.0° F.); Normal 36.5-37.5° C. (97.7-99.5° F.), Fever>37.5 or 38.3° C. (99.5 or 100.9° F.), Hyperthermia>37.5 or 38.3° C. (99.5 or 100.9° F.), Hyperpyrexia>40.0 or 41.5° C. (104.0 or 106.7° F.). The particles can be designed for release within one or more of these temperature classifications, or a sub-range thereof. It will be appreciated that a subject's normal body temperature can fluctuate, for example, with the time of day, sleep vs. wake, eating vs. fasting, exercise, the amount of clothing being worn, the ambient temperature, the anxiety or excitement level of the subject, etc., as is known in the art. The particles can be tuned for release when body temperature drops below or exceeds a predetermined threshold, and therefore selectively release cargo during certain times of the day or night, caloric intake (or lack thereof), during exercise, anxiety, etc. The release can be local so systemic.

In addition of more global changes in overall body temperature, such as those introduced above, the particles can be tuned for release at sites of local temperature changes. For example, local, tissue-specific increase in tissue temperature can occur at sites of inflammation, injury, infection, and cancer (e.g., tumor) (Chapter Nine, *Inflammation, Tissue Repair, and Fever*, pages 150-167). The change in temperature can be relative to unaffected tissue and may occur in the presence or absence of a global change in body temperature.

3. Reduction-Oxidation (Redox)

The release of nanoparticle cargo can be induced by a reduction-oxidation ("redox") reaction. In some embodiments, the polymers composing the particles include one or more disulfide bonds. The particles can release their cargo when disulfide bond is reduced upon exposure to a reducing agent. In some embodiments, the reducing agent is a glutathione. L-Glutathione (GSH) is a tripeptide molecule that can also act as an antioxidant. In cells, GSH reduces the disulfide bonds formed within cytoplasmic proteins to cysteines and reacts to other oxidized GSH to an oxidized form of glutathione disulfide (GSSG), also called L (−)-glutathione (Traverso, et al., *Oxidative Medicine and Cellular Longevity*, Volume 2013 (2013), Article ID 972913, 10 pages). As discussed in more detail below, intracellular levels of glutathione (GSH) are 100-1000 fold higher in cancer cells than in normal tissue, and thus redox-sensitive particles can be used to selective release cargo in cells with higher-than-normal GSH, such as cancer cells. For example, one study showed that intracellular GHS levels in normal lung cells were about 11.20±0.58 (SEM) nmol GSH/mg protein (24 patients) with a range from 6.1 to 17.5 nmol GSH/mg protein, while GHS level in adenocarcinomas was 8.83±0.96 nmol/mg protein (8 patients); large cell carcinomas was 8.25±2.51 nmol/mg protein (3 patients); and squamous cell carcinomas 23.25±5.99 nmol/mg protein (8 patients) (Cook, et al., *Cancer Research*, 51:4287-4294 (1991).

The Examples below show that cargo can be released redox-sensitive particles in matter of minutes in the presences of 10 nM GSH.

In some embodiments, the reducing agent is not endogenous to the cell, tissue, organ, or other microenvironment. For example, in some embodiments, the reducing agent is administered locally or systemically to trigger release of the cargo from the particles in a local or systemic fashion. In addition to GSH, other reducing agents can also induce release of the cargo, however, it will be appreciated that in some embodiments, the use, or the amount that can be used, of certain reducing agents is limited in biological and therapeutic applications by their toxicity.

4. External Stimuli

As introduced above, release of nanoparticle cargo can be induced by external stimuli, such as light, temperature, or ultrasound. The stimuli can be applied globally, for example to the entire subject, or preferably to a more limited or local aspect thereof. For example, light, heat (or cold), or ultrasound can be administered to a specific tissue(s), location(s), or combination thereof to modulate selective release of cargo from particles accumulating or passing through the targeted tissue or location. For example, heat (or cold) can be applied to the target tissue or location to cause a local temperature shift that induces dissociation of the particle and release of its cargo. Radiation at different frequencies along the electromagnetic spectrum can also be used to release cargo. For example, particles can be formed that are sensitive to ionizing radiation, visible light, microwaves, or radiowaves. In particular embodiments, the particles are sensitive to visible light (e.g., near ultraviolet, near infrared, mid infrared, far infrared). Particles can also be formed that are sensitive to sound waves. For example, in particular embodiments, the particles release cargo in response to ultrasound.

In particular embodiments, the particles are sensitive to ultraviolet light. Ultraviolet (UV) light is an electromagnetic radiation with a wavelength shorter than that of visible light but longer than X-rays. The wavelength of UV light is typically from about 400 nm (750 THz) to about 10 nm (30 PHz). UV radiation can be divided into five categories: UV-A is about 320-400 nm, UV-B is 290-320 nm, UV-C is 220-209 nm, Far UV is 190-220 nm, and vacuum UV 40-190 nm. In some embodiments, the particles are sensitive to UV-A, UV-B, UV-C, or a combination thereof. The Examples below illustrate that particles can be formed that the release their cargo after exposure to UV light, for example 365 nm UV light (16 W), for different time periods. In some embodiments, the source provides a specific desired wavelength. In some embodiments, the source provides a range of wavelength.

The external stimuli can be provided by the practitioner using, for example, a piece of equipment that provides the stimuli. The stimuli can also be provided by the environment and may or may not be under the control of practitioner or user. For example, the sun generates visible light, heat, and UV radiation. Thus, in some embodiments, the particles are designed to release their cargo in response to the sun.

Exposure to external stimuli can be carried out over minutes, hours, days or weeks. In some embodiments, the exposure is between about 1 and about 120 minutes, for example, 10, 15, 30, 45, 60, 90, or 120 minutes. In some embodiments, the exposure is between about 1 and 48 hours, for example, 1, 2, 3, 4, 5, 10, 12.5, 15, 20, 24, 36, or 48 hours. In some embodiments, the exposure is over two or more days.

D. Exemplary Tissues to Target and Therapeutic Strategies

Particles co-loaded with two or more nucleic acid species can be used to in a variety of therapeutic applications. Suitable methods can include administering a subject an effective amount of nanoparticles containing a therapeutic cargo to reduce or alleviate one or more symptoms of the disease or disorder to be treated. As discussed above, the particles can be used to selectively target cells, tissues, organs, or microenvironments thereof. The selective release of cargo at a target site can be used in strategies to treat a variety of diseases and disorders. In the most preferred embodiments, nanoparticles containing nucleic acids cross the cellular membrane and their contents are released into the cytosol. Strategies can include targeting certain intracellular and/or extracellular environments for selective release based on response-inducing stimuli alone, or in combination with one or more targeting moieties that enhance delivery to a desired cell type, tissue, organ, microenvironment, subcellular organelle, or a combination thereof.

1. Tumor Targeting

Methods of treating cancer are provided. The nanoparticles can be designed, for example, for release in the tumor microenvironment or within a tumor cells, or in an immune response microenvironment or within an immune cell. Suitable methods can include administering a subject an effective amount of nanoparticles containing a therapeutic cargo to reduce or alleviate one or more symptoms of the cancer. The effect of the particles on the cancer can be direct or indirect. The compositions and methods described herein are useful for treating subjects having benign or malignant tumors by delaying or inhibiting the growth of a tumor in a subject, reducing the growth or size of the tumor, inhibiting or reducing metastasis of the tumor, and/or inhibiting or reducing symptoms associated with tumor development or growth.

The tumor microenvironment is the cellular environment in which the tumor exists, and can include surrounding blood vessels, immune cells, fibroblasts, bone marrow-derived inflammatory cells, lymphocytes, signaling molecules and the extracellular matrix (ECM). The tumor and the surrounding microenvironment are closely related and interact constantly. Tumors can modulate the microenvironment by releasing extracellular signals, promoting tumor angiogenesis and inducing peripheral immune tolerance, while the immune cells in the microenvironment can affect the growth and evolution of cancerous cells. The microenvironment in tumor tissue is different from the normal tissues. Compared to normal tissues, the pH in tumor tissue is more acidic, the tissue temperature is relatively higher, and some specific enzymes or chemicals are over-expressed. The interstitial fluid of tumors and abscesses also has shown pH values of less than 6.0, averaging 0.2-0.6 units lower than mean extracellular pH of normal tissues (Kraus and Wolf, *Tumour Biol,* 17, 133-154 (1996)). Tumors commonly have an extracellular environment with a pH in the range of, for example, 6.5-6.9. See, for example, Balkwill, et al., *Journal of Cell Science,* 125 (23): 5591-6 (2012) and Kato, et al., *Cancer Cell International,* 13 (89) (8 pages) (2013). Thus, in some embodiments pH-sensitive nanoparticles are used to selectively delivery cargo to an acidic tumor microenvironment.

Tumors can also have elevated temperatures relative to the surround or otherwise normal or non-malignant tissue (see, e.g., Stefanadis, JCO, 19 (3): 676-681 (2001)). Therefore, temperature-responsive particles can also be utilized to selectively target tumors.

The intracellular levels of glutathione (GSH) are 100-1000 fold higher in cancer cells than in normal tissue. Redox-sensitive approach is particularly promising to enhance the exposure of cancer cells to therapeutic molecules.

a. Tumor Targeting Moieties

In addition or alternative to selectively targeting cancer cells by targeting an acidic microenvironment, or one with an elevated temperature, cancer cells or their microenvironment can be specifically targeted relative to healthy or normal cells by including a targeting moiety. Tumor or tumor-associated neovasculature targeting domains can be ligands that bind to cell surface antigens or receptors that are specifically expressed on tumor cells or tumor-associated neovasculature or microenvironment, or are overexpressed on tumor cells or tumor-associated neovasculature or microenvironment as compared to normal tissue. Tumors also secrete a large number of ligands into the tumor microenvironment that affect tumor growth and development. Receptors that bind to ligands secreted by tumors, including, but not limited to growth factors, cytokines and chemokines, including the chemokines provided below, can also be used. Ligands secreted by tumors can be targeted using soluble fragments of receptors that bind to the secreted ligands. Soluble receptor fragments are fragments polypeptides that may be shed, secreted or otherwise extracted from the producing cells and include the entire extracellular domain, or fragments thereof. In some embodiments, the targeting moiety is an antibody, for example a single chain antibody, the binds to the target.

i. Cancer Antigens

Cancer antigens that can be targeted are well known in the art. The antigen expressed by the tumor may be specific to the tumor, or may be expressed at a higher level on the tumor cells as compared to non-tumor cells. Antigenic markers such as serologically defined markers known as tumor associated antigens, which are either uniquely expressed by cancer cells or are present at markedly higher levels (e.g., elevated in a statistically significant manner) in subjects having a malignant condition relative to appropriate controls, are contemplated for use in certain embodiments.

Tumor-associated antigens may include, for example, cellular oncogene-encoded products or aberrantly expressed proto-oncogene-encoded products (e.g., products encoded by the neu, ras, trk, and kit genes), or mutated forms of growth factor receptor or receptor-like cell surface molecules (e.g., surface receptor encoded by the c-erb B gene). Other tumor-associated antigens include molecules that may be directly involved in transformation events, or molecules that may not be directly involved in oncogenic transformation events but are expressed by tumor cells (e.g., carcinoembryonic antigen, CA-125, melonoma associated antigens, etc.) (see, e.g., U.S. Pat. No. 6,699,475; Jager, et al., Int. J. Cancer, 106:817-20 (2003); Kennedy, et al., Int. Rev. Immunol., 22:141-72 (2003); Scanlan, et al. Cancer Immun., 4:1 (2004)).

Genes that encode cellular tumor associated antigens include cellular oncogenes and proto-oncogenes that are aberrantly expressed. In general, cellular oncogenes encode products that are directly relevant to the transformation of the cell, and because of this, these antigens are particularly preferred targets for anticancer therapy. An example is the tumorigenic neu gene that encodes a cell surface molecule involved in oncogenic transformation. Other examples include the ras, kit, and trk genes. The products of proto-oncogenes (the normal genes which are mutated to form oncogenes) may be aberrantly expressed (e.g., overexpressed), and this aberrant expression can be related to cellular transformation. Thus, the product encoded by proto-oncogenes can be targeted. Some oncogenes encode growth factor receptor molecules or growth factor receptor-like molecules that are expressed on the tumor cell surface. An example is the cell surface receptor encoded by the c-erbB gene. Other tumor-associated antigens may or may not be directly involved in malignant transformation. These antigens, however, are expressed by certain tumor cells and may therefore provide effective targets. Some examples are carcinoembryonic antigen (CEA), CA 125 (associated with ovarian carcinoma), and melanoma specific antigens.

In ovarian and other carcinomas, for example, tumor associated antigens are detectable in samples of readily obtained biological fluids such as serum or mucosal secretions. One such marker is CA125, a carcinoma associated antigen that is also shed into the bloodstream, where it is detectable in serum (e.g., Bast, et al., N. Eng. J. Med., 309:883 (1983); Lloyd, et al., Int. J. Canc., 71:842 (1997). CA125 levels in serum and other biological fluids have been measured along with levels of other markers, for example, carcinoembryonic antigen (CEA), squamous cell carcinoma antigen (SCC), tissue polypeptide specific antigen (TPS), sialyl TN mucin (STN), and placental alkaline phosphatase (PLAP), in efforts to provide diagnostic and/or prognostic profiles of ovarian and other carcinomas (e.g., Sarandakou, et al., Acta Oncol., 36:755 (1997); Sarandakou, et al., Eur. J. Gynaecol. Oncol., 19:73 (1998); Meier, et al., Anticancer Res., 17 (4B): 2945 (1997); Kudoh, et al., Gynecol. Obstet. Invest., 47:52 (1999)). Elevated serum CA125 may also accompany neuroblastoma (e.g., Hirokawa, et al., Surg. Today, 28:349 (1998), while elevated CEA and SCC, among others, may accompany colorectal cancer (Gebauer, et al., Anticancer Res., 17 (4B): 2939 (1997)).

The tumor associated antigen, mesothelin, defined by reactivity with monoclonal antibody K-1, is present on a majority of squamous cell carcinomas including epithelial ovarian, cervical, and esophageal tumors, and on mesotheliomas (Chang, et al., Cancer Res., 52:181 (1992); Chang, et al., Int. J. Cancer, 50:373 (1992); Chang, et al., Int. J. Cancer, 51:548 (1992); Chang, et al., Proc. Natl. Acad. Sci. USA, 93:136 (1996); Chowdhury, et al., Proc. Natl. Acad. Sci. USA, 95:669 (1998)). Using MAb K-1, mesothelin is detectable only as a cell-associated tumor marker and has not been found in soluble form in serum from ovarian cancer patients, or in medium conditioned by OVCAR-3 cells (Chang, et al., Int. J. Cancer, 50:373 (1992)). Structurally related human mesothelin polypeptides, however, also include tumor-associated antigen polypeptides such as the distinct mesothelin related antigen (MRA) polypeptide, which is detectable as a naturally occurring soluble antigen in biological fluids from patients having malignancies (see WO 00/50900).

A tumor antigen may include a cell surface molecule. Tumor antigens of known structure and having a known or described function, include the following cell surface receptors: HER1 (GenBank Accession No. U48722), HER2 (Yoshino, et al., J. Immunol., 152:2393 (1994); Disis, et al., Canc. Res., 54:16 (1994); GenBank Acc. Nos. X03363 and M17730), HER3 (GenBank Acc. Nos. U29339 and M34309), HER4 (Plowman, et al., Nature, 366:473 (1993); GenBank Acc. Nos. L07868 and T64105), epidermal growth factor receptor (EGFR) (GenBank Acc. Nos. U48722, and KO3193), vascular endothelial cell growth factor (GenBank No. M32977), vascular endothelial cell growth factor receptor (GenBank Acc. Nos. AF022375, 1680143, U48801 and X62568), insulin-like growth factor-I (GenBank Acc. Nos. X00173, X56774, X56773, X06043, European Patent No. GB 2241703), insulin-like growth factor-II (GenBank Acc. Nos. X03562, X00910, M17863 and M17862), transferrin receptor (Trowbridge and Omary, Proc. Nat. Acad. USA, 78:3039 (1981); GenBank Acc. Nos. X01060 and M11507), estrogen receptor (GenBank Acc. Nos. M38651, X03635, X99101, U47678 and M12674), progesterone receptor (GenBank Acc. Nos. X51730, X69068 and M15716), follicle stimulating hormone receptor (FSH-R) (GenBank Acc. Nos. Z34260 and M65085), retinoic acid receptor (GenBank Acc. Nos. L12060, M60909, X77664, X57280, X07282 and X06538), MUC-1 (Barnes, et al., Proc. Nat. Acad. Sci. USA, 86:7159 (1989); GenBank Acc. Nos. M65132 and M64928) NY-ESO-1 (GenBank Acc. Nos. AJ003149 and U87459), NA 17-A (PCT Publication No. WO 96/40039), Melan-A/MART-1 (Kawakami, et al., Proc. Nat. Acad. Sci. USA, 91:3515 (1994); GenBank Acc. Nos. U06654 and U06452), tyrosinase (Topalian, et al., Proc. Nat. Acad. Sci. USA, 91:9461 (1994); GenBank Acc. No. M26729; Weber, et al., J. Clin. Invest, 102:1258 (1998)), Gp-100 (Kawakami, et al., Proc. Nat. Acad. Sci. USA, 91:3515 (1994); GenBank Acc. No. S73003, Adema, et al., J. Biol. Chem., 269:20126 (1994)), MAGE (van den Bruggen, et al., Science, 254:1643 (1991)); GenBank Acc. Nos. U93163, AF064589, U66083, D32077, D32076, D32075, U10694, U10693, U10691, U10690, U10689, U10688, U10687, U10686, U10685, L18877, U10340, U10339, L18920, U03735 and M77481), BAGE (GenBank Acc. No. U19180; U.S. Pat. Nos. 5,683,886 and 5,571,711), GAGE (GenBank Acc. Nos. AF055475, AF055474, AF055473, U19147, U19146, U19145, U19144, U19143 and U19142), any of the CTA class of receptors including in particular HOM-MEL-40 antigen encoded by the SSX2 gene (GenBank Acc. Nos. X86175, U90842, U90841 and X86174), carcinoembryonic antigen (CEA, Gold and Freedman, J. Exp. Med., 121:439 (1985); GenBank Acc. Nos. M59710, M59255 and M29540), and PyLT (GenBank Acc. Nos. J02289 and J02038); p97 (melanotransferrin) (Brown, et al., *J. Immunol.*, 127:539-46 (1981); Rose, et al., *Proc. Natl. Acad. Sci. USA*, 83:1261-61 (1986)).

Additional tumor associated antigens include prostate surface antigen (PSA) (U.S. Pat. Nos. 6,677,157; 6,673, 545); β-human chorionic gonadotropin β-HCG) (McManus, et al., *Cancer Res.*, 36:3476-81 (1976); Yoshimura, et al., *Cancer*, 73:2745-52 (1994); Yamaguchi, et al., *Br. J. Cancer*, 60:382-84 (1989): Alfthan, et al., *Cancer Res.*, 52:4628-33 (1992)); glycosyltransferase β-1,4-N-acetylgalactosaminyl-transferases (GalNAc) (Hoon, et al., *Int. J. Cancer*, 43:857-62 (1989); Ando, et al., *Int. J. Cancer*, 40:12-17 (1987); Tsuchida, et al., *J. Natl. Cancer*, 78:45-54 (1987); Tsuchida, et al., *J. Natl. Cancer*, 78:55-60 (1987)); NUC18 (Lehmann, et al., *Proc. Natl. Acad. Sci. USA*, 86:9891-95 (1989); Lehmann, et al., *Cancer Res.*, 47:841-45 (1987)); melanoma antigen gp75 (Vijayasardahi, et al., *J. Exp. Med.*, 171:1375-80 (1990); GenBank Accession No. X51455); human cytokeratin 8; high molecular weight melanoma antigen (Natali, et al., *Cancer*, 59:55-63 (1987); keratin 19 (Datta, et al., *J. Clin. Oncol.*, 12:475-82 (1994)).

Tumor antigens of interest include antigens regarded in the art as "cancer/testis" (CT) antigens that are immunogenic in subjects having a malignant condition (Scanlan, et al., *Cancer Immun.*, 4:1 (2004)). CT antigens include at least 19 different families of antigens that contain one or more members and that are capable of inducing an immune response, including but not limited to MAGEA (CT1); BAGE (CT2); MAGEB (CT3); GAGE (CT4); SSX (CT5); NY-ESO-1 (CT6); MAGEC (CT7); SYCP1 (C8); SPANXB1 (CT11.2); NA88 (CT18); CTAGE (CT21); SPA17 (CT22); OY-TES-1 (CT23); CAGE (CT26); HOM-TES-85 (CT28); HCA661 (CT30); NY-SAR-35 (CT38); FATE (CT43); and TPTE (CT44).

Additional tumor antigens that can be targeted, including a tumor-associated or tumor-specific antigen, include, but not limited to, alpha-actinin-4, Bcr-Abl fusion protein, Casp-8, beta-catenin, cdc27, cdk4, cdkn2a, coa-1, dek-can fusion protein, EF2, ETV6-AML1 fusion protein, LDLR-fucosyltransferaseAS fusion protein, HLA-A2, HLA-A11, hsp70-2, KIAAO205, Mart2, Mum-1, 2, and 3, neo-PAP, myosin class I, OS-9, pml-RARα fusion protein, PTPRK, K-ras, N-ras, Triosephosphate isomeras, Bage-1, Gage 3,4, 5,6,7, GnTV, Herv-K-mel, Lage-1, Mage-A1,2,3,4,6,10,12, Mage-C2, NA-88, NY-Eso-1/Lage-2, SP17, SSX-2, and TRP2-Int2, MelanA (MART-I), gp100 (Pmel 17), tyrosinase, TRP-1, TRP-2, MAGE-1, MAGE-3, BAGE, GAGE-1, GAGE-2, p15 (58), CEA, RAGE, NY-ESO (LAGE), SCP-1, Hom/Mel-40, PRAME, p53, H-Ras, HER-2/neu, BCR-ABL, E2A-PRL, H4-RET, IGH-IGK, MYL-RAR, Epstein Barr virus antigens, EBNA, human papillomavirus (HPV) antigens E6 and E7, TSP-180, MAGE-4, MAGE-5, MAGE-6, p185erbB2, p180erbB-3, c-met, nm-23H1, PSA, TAG-72-4, CA 19-9, CA 72-4, CAM 17.1, NuMa, K-ras, β-Catenin, CDK4, Mum-1, p16, TAGE, PSMA, PSCA, CT7, telomerase, 43-9F, 5T4, 791Tgp72, α-fetoprotein, 13HCG, BCA225, BTAA, CA 125, CA 15-3 (CA 27.29\BCAA), CA 195, CA 242, CA-50, CAM43, CD68\KP1, CO-029, FGF-5, G250, Ga733 (EpCAM), HTgp-175, M344, MA-50, MG7-Ag, MOV18, NB\70K, NY-CO-1, RCAS1, SDCCAG16, TA-90 (Mac-2 binding protein\cyclophilin C-associated protein), TAAL6, TAG72, TLP, and TPS. Other tumor-associated and tumor-specific antigens are known to those of skill in the art and are suitable for targeting the disclosed nanoparticles.

ii. Antigens Associated with Tumor Neovasculature

The antigen may be specific to tumor neovasculature or may be expressed at a higher level in tumor neovasculature when compared to normal vasculature. Exemplary antigens that are over-expressed by tumor-associated neovasculature as compared to normal vasculature include, but are not limited to, VEGF/KDR, Tie2, vascular cell adhesion molecule (VCAM), endoglin and $\alpha_5\beta_3$ integrin/vitronectin. Other antigens that are over-expressed by tumor-associated neovasculature as compared to normal vasculature are known to those of skill in the art and are suitable for targeting by the nanoparticles.

iii. Chemokines/Chemokine Receptors

In another embodiment, the particles contain a domain that specifically binds to a chemokine or a chemokine receptor. Chemokines are soluble, small molecular weight (8-14 kDa) proteins that bind to their cognate G-protein coupled receptors (GPCRs) to elicit a cellular response, usually directional migration or chemotaxis. Tumor cells secrete and respond to chemokines, which facilitate growth that is achieved by increased endothelial cell recruitment and angiogenesis, subversion of immunological surveillance and maneuvering of the tumoral leukocyte profile to skew it such that the chemokine release enables the tumor growth and metastasis to distant sites. Thus, chemokines are vital for tumor progression.

Based on the positioning of the conserved two N-terminal cysteine residues of the chemokines, they are classified into four groups namely CXC, CC, CX3C and C chemokines. The CXC chemokines can be further classified into ELR+ and ELR– chemokines based on the presence or absence of the motif 'glu-leu-arg (ELR motif)' preceding the CXC sequence. The CXC chemokines bind to and activate their cognate chemokine receptors on neutrophils, lymphocytes, endothelial and epithelial cells. The CC chemokines act on several subsets of dendritic cells, lymphocytes, macrophages, eosinophils, natural killer cells but do not stimulate neutrophils as they lack CC chemokine receptors except murine neutrophils. There are approximately 50 chemokines and only 20 chemokine receptors, thus there is considerable redundancy in this system of ligand/receptor interaction.

Chemokines elaborated from the tumor and the stromal cells bind to the chemokine receptors present on the tumor and the stromal cells. The autocrine loop of the tumor cells and the paracrine stimulatory loop between the tumor and the stromal cells facilitate the progression of the tumor. Notably, CXCR2, CXCR4, CCR2 and CCR7 play major roles in tumorigenesis and metastasis. CXCR2 plays a vital role in angiogenesis and CCR2 plays a role in the recruitment of macrophages into the tumor microenvironment. CCR7 is involved in metastasis of the tumor cells into the sentinel lymph nodes as the lymph nodes have the ligand for CCR7, CCL21. CXCR4 is mainly involved in the metastatic spread of a wide variety of tumors.

b. Cancers to be Treated

The types of cancer that can be treated with the provided compositions and methods include, but are not limited to, the following: bladder, brain, breast, cervical, colo-rectal, esophageal, kidney, liver, lung, nasopharangeal, pancreatic, prostate, skin, stomach, uterine, ovarian, testicular and the like. Administration is not limited to the treatment of an existing tumors but can also be used to prevent or lower the risk of developing such diseases in an individual, i.e., for prophylactic use. Potential candidates for prophylactic vaccination include individuals with a high risk of developing cancer, i.e., with a personal or familial history of certain types of cancer.

Malignant tumors which may be treated are classified herein according to the embryonic origin of the tissue from which the tumor is derived. Carcinomas are tumors arising from endodermal or ectodermal tissues such as skin or the epithelial lining of internal organs and glands. Sarcomas, which arise less frequently, are derived from mesodermal connective tissues such as bone, fat, and cartilage. The leukemias and lymphomas are malignant tumors of hematopoietic cells of the bone marrow. Leukemias proliferate as single cells, whereas lymphomas tend to grow as tumor masses. Malignant tumors may show up at numerous organs or tissues of the body to establish a cancer.

In some embodiments, the nucleci acid cargo can be functional nucleic acids having an anticancer activity for example siRNAs that target one or more oncogenese, and one or more mRNAs that encode proteins having antiproliferative activity, a pro-apoptotic activity, or other cytotoxic activity. In some embodiments the nanoparticles are delivered in addition to one or more chemotherapeutic drugs or therapeutic regimens, surgeries or methods.

Figure 3:
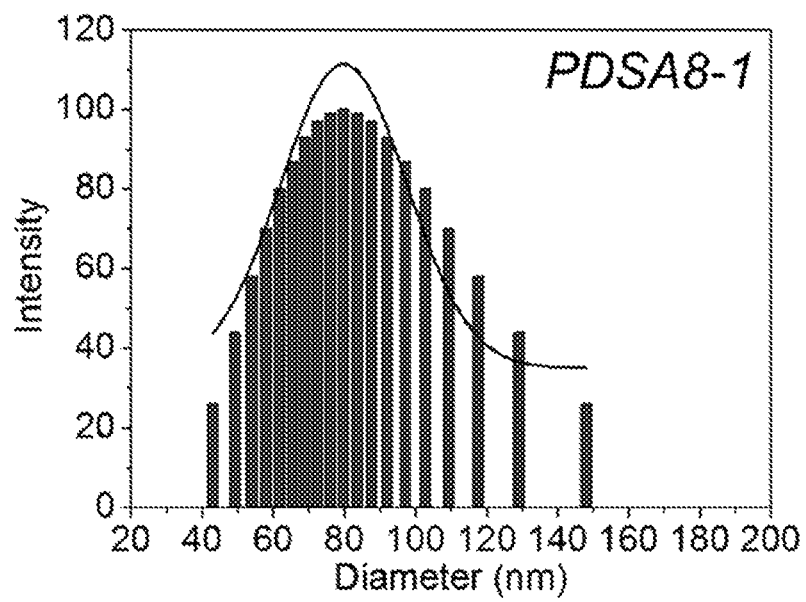
FIG. 3 is a graph showing size distribution of siRNA loaded PDSA8-1 NPs.

In a particularly preferred example, a cancer therapy includes co-delivery of RNA encoding one or more tumor suppressors and functional nucleic acid (e.g., siRNA) that targets and reduces expression of one or more oncogenes. Suitable tumor supressors and oncogenes are well known in the art. Exemplary oncogenes and tumor suppressors are illustrated in Table 5, adapted from Supplemental FIG. 3 (compiled from the CancerGenes website) of Walker, et al., *Cancer Res.*, 72 (3): 636-644 (2012) and supplemental information, DOI: 10.1158/0008-5472.CAN-11-2266.

TABLE 5

Oncogenes and Tumor Suppressors

| Gene Symbol—Oncogenes | | | | Gene Symbol—Tumor Suppressors | |
|---|---|---|---|---|---|
| ABL1 | EVI1 | MYC | APC | IL2 | TNFAIP3 |
| ABL2 | EWSR1 | MYCL1 | ARHGEF12 | JAK2 | TP53 |
| AKT1 | FEV | MYCN | ATM | MAP2K4 | TSC1 |
| AKT2 | FGFR1 | NCOA4 | BCL11B | MDM4 | TSC2 |
| ATF1 | FGFR1OP | NFKB2 | BLM | MEN1 | VHL |
| BCL11A | FGFR2 | NRAS | BMPR1A | MLH1 | WRN |
| BCL2 | FUS | NTRK1 | BRCA1 | MSH2 | WT1 |
| BCL3 | GOLGA5 | NUP214 | BRCA2 | NF1 | |
| BCL6 | GOPC | PAX8 | CARS | NF2 | |
| BCR | HMGA1 | PDGFB | CBFA2T3 | NOTCH1 | |
| BRAF | HMGA2 | PIK3CA | CDH1 | NPM1 | |
| CARD11 | HRAS | PIM1 | CDH11 | NR4A3 | |
| CBLB | IRF4 | PLAG1 | CDK6 | NUP98 | |
| CBLC | JUN | PPARG | CDKN2C | PALB2 | |
| CCND1 | KIT | PTPN11 | CEBPA | PML | |
| CCND2 | KRAS | RAF1 | CHEK2 | PTEN | |
| CCND3 | LCK | REL | CREB1 | RB1 | |
| CDX2 | LMO2 | RET | CREBBP | RUNX1 | |
| CTNNB1 | MAF | ROS1 | CYLD | SDHB | |
| DDB2 | MAFB | SMO | DDX5 | SDHD | |
| DDIT3 | MAML2 | SS18 | EXT1 | SMARCA4 | |
| DDX6 | MDM2 | TCL1A | EXT2 | SMARCB1 | |
| DEK | MET | TET2 | FBXW7 | SOCS1 | |
| EGFR | MITF | TFG | FH | STK11 | |
| ELK4 | MLL | TLX1 | FLT3 | SUFU | |
| ERBB2 | MPL | TPR | FOXP1 | SUZ12 | |
| ETV4 | MYB | USP6 | GPC3 | SYK | |
| ETV6 | IDH1 | TCF3 | | | |

2. Inflammation and Infection

Methods of treating inflammation and infection are provided. The nanoparticles can be designed, for example, for release in the microenvironment of inflammation, injury, and infection, or immune or pro-inflammatory cells, or within immune or inflammatory cells themselves. Suitable methods can include administering a subject an effective amount of nanoparticles containing a therapeutic cargo to reduce or alleviate one or more symptoms of the inflammation, injury, or infection. The effect on the inflammation, injury, or infection can be direct or indirect. Administration is not limited to the treatment of an existing inflammation, injury, and infection, but can also be used to prevent or lower the risk of developing such diseases in an individual, i.e., for prophylactic use. A characteristic feature of the inflammation is local acidosis, which is attributed to the local increase of lactic-acid production by the anaerobic, glycolytic activity of infiltrated neutrophils and to the presence of short-chain, fatty acid by-products of bacterial metabolism (Grinstein, et al., *Clin. Biochem.* 24, 241-247 (1991) and Ehrich, W. E. (1961) *Inflammation* Allgower, M. eds. *Progress in Surgery* vol. 1, 1-70 S. Karger Basel, Switzerland). An acidic extracellular pH is also found in the epidermis and plays an important protective role against bacterial infection (Lardner, et al., *Journal of Leukocyte Biology*, 69 (4): 522-530 (2001)). As discussed above, local, tissue-specific increase in tissue temperature can occur at site of inflammation, injury, and infection. Similar to selectively targeting the tumor microenvironment, the pH and temperature sensitive particles can be utilized to delivery and selectively release cargo at sites of inflammation, injury, and infection.

As with cancer, in addition or alternative to selectively targeting cancer cells by targeting an acidic microenvironment, or one with an elevated temperature, cancer cells or their microenvironment can be specifically targeted relative to healthy or normal cells by including a targeting moiety. Preferred targeting domains target the molecule to areas of inflammation, injury, or infection. Exemplary targeting domains are antibodies, or antigen binding fragments thereof that are specific for inflamed tissue or to a proinflammatory cytokine including but not limited to IL17, IL-4, IL-6, IL-12, IL-21, IL-22, and IL-23. In the case of neurological disorders such as Multiple Sclerosis, the targeting domain may target the molecule to the CNS or may bind to VCAM-1 on the vascular epithelium. Additional targeting domains can be peptide aptamers specific for a proinflammatory molecule. In other embodiments, the particles can include a binding partner specific for a polypeptide displayed on the surface of an immune cell, for example a T cell. In still other embodiments, the targeting domain specifically targets activated immune cells. Preferred immune cells that are targeted include Th0, Th1, Th17 and Th22 T cells, other cells that secrete, or cause other cells to secrete inflammatory molecules including, but not limited to, IL-1β, TNF-α, TGF-beta, IFN-γ, IL-17, IL-6, IL-23, IL-22, IL-21, and MMPs, and Tregs. For example, a targeting domain for Tregs may bind specifically to CD25.

In some embodiments, the target site is neutrophils, which may phagocytize the particles to release a therapeutic and/or diagnostic agent at the site of inflammation.

Proteins constitutively expressed on the surface of neutrophils that are important for recognition of the endothelial inflammatory signals include the glycoprotein P-selectin glycoprotein ligand-1 (PSGL-1) and L-selectin. Other agents to be targeted include those associated with the disease. For example, a plaque targeted peptide can be one or more of the following: Collagen IV, CREKA (SEQ ID NO: 1), LyP-I, CRKRLDRNC (SEQ ID NO: 2), or their combinations at various molar ratios.

In another embodiment, particles can contain a targeting domain to target the molecule to an organ or tissue that is being transplanted. For example, the targeting domain can be an antibody, antigen binding fragment thereof, or another binding partner specific for a polypeptide displayed on the surface of cells specific to the type of organ or tissue being transplanted.

a. Inflammation

Inflammation is typically a localized physical condition in which part of the body becomes reddened, swollen, hot, and often painful, especially as a reaction to injury or infection. Inflammation is a protective response that involves immune cells, blood vessels, and molecular mediators, the purpose of which is to eliminate the cause of cell injury, remove necrotic cells and tissues damaged from the injury and the inflammatory process, and to initiate tissue repair. The compositions can be used to treat acute and chronic inflammation.

The inflammation can be caused by an infection such as those described below or can be caused by a non-infectious mechanism. For example, inflammation is associated with atherosclerosis, type III hypersensitivity, trauma, and ischaemia. Inflammation can be associated with autoimmune diseases, transplantation, graft verse host disease, and conditions driven by immune responses. In some embodiments, the particles are used to deliver a cargo for treatment of an inflammatory or autoimmune disease or disorder such as rheumatoid arthritis, systemic lupus erythematosus, alopecia areata, anklosing spondylitis, antiphospholipid syndrome, autoimmune Addison's disease, autoimmune hemolytic anemia, autoimmune hepatitis, autoimmune inner ear disease, autoimmune lymphoproliferative syndrome (alps), autoimmune thrombocytopeni purpura (ATP), Behcet's disease, bullous pemphigoid, cardiomyopathy, celiac sprue-dermatitis, chronic fatigue syndrome immune deficiency, syndrome (CFIDS), chronic inflammatory demyelinating polyneuropathy, cicatricial pemphigoid, cold agglutinin disease, Crest syndrome, Crohn's disease, Dego's disease, dermatomyositis, dermatomyositis—juvenile, discoid lupus, essential mixed cryoglobulinemia, fibromyalgia—fibromyositis, grave's disease, guillain-barre, hashimoto's thyroiditis, idiopathic pulmonary fibrosis, idiopathic thrombocytopenia purpura (ITP), Iga nephropathy, insulin dependent diabetes (Type I), juvenile arthritis, Meniere's disease, mixed connective tissue disease, multiple sclerosis, myasthenia gravis, pemphigus vulgaris, pernicious anemia, polyarteritis nodosa, polychondritis, polyglancular syndromes, polymyalgia rheumatica, polymyositis and dermatomyositis, primary agammaglobulinemia, primary biliary cirrhosis, psoriasis, Raynaud's phenomenon, Reiter's syndrome, rheumatic fever, sarcoidosis, scleroderma, Sjogren's syndrome, stiff-man syndrome, Takayasu arteritis, temporal arteritis/giant cell arteritis, ulcerative colitis, uveitis, vasculitis, vitiligo, and Wegener's granulomatosis. In some embodiments, the cargo is a functional nucleic acid that targets a factor that contributes to inflammation, the activation or persistence of pro-inflammatory cells, a pro-inflammatory response, active immune response, an autoimmune response, etc. Specific targets include, for example, pro-inflammatory molecules such as IL-1β, TNF-α, TGF-beta, IFN-γ, IL-17, IL-6, IL-23, IL-22, IL-21, and MMPs.

Additionally or alternatively, an RNA can be introduced to reduce the inflammation or autoimmune response. These can be introduced into cells that inhibit the development of naïve T cells into Th1, Th17, Th22 or other cells that secrete, or cause other cells to secrete, inflammatory molecules. The cargo can increase the number or activity of Tregs.

The cargo can promote or enhance production of IL-10 or another anti-inflammatory cytokine. For example, Kamaly, et al., *ACS Nano* 2016, 10, 5280-5292, DOI: 10.1021/acsnano.6b01114, describes controlled-release polymeric nanoparticles incorporating IL-10 for targeted delivery to atherosclerotic plaques. Nanoparticles were nanoengineered via self-assembly of biodegradable polyester polymers by nanoprecipitation using a rapid micromixer chip capable of producing nanoparticles with retained IL-10 bioactivity post-exposure to organic solvent, reducing acute inflammation and preventing plaque formation in disease models. Thus, in some embodiments, the cargo that can promote or enhance production of IL-10 is RNA encoding IL-10.

In some embodiments, the cargo enhances the differentiation, recruitment and/or expansion of Treg cells in the region of inflammation, autoimmune activity, or tissue engraftment. Exemplary functional nucleic acid targets for treating autoimmune disease are reviewed in Pauley and Cha, *Pharmaceuticals* 2013, 6 (3), 287-294; and discussed in, for example, Kim, et al., *Molecular Therapy*, (2010) 18 5, 993-1001, Laroui, et al., *Molecular Therapy* (2014); 22 1, 69-80, Ponnappa, et al., *Curr Opin Investig Drugs.* 2009 May; 10 (5): 418-24; Abrams, et al., *Molecular Therapy*, (2010) 18 1, 171-180, Leuschner, et al., *Nature biotechnology* 29.11 (2011): 1005-1010. PMC. Web. 29 Mar. 2016. In some embodiments, the cargo is a nucleic acid that encodes an anti-inflammatory cytokine, for example, (IL)-1 receptor antagonist, IL-4, IL-6, IL-10, IL-11, or IL-13 (Opal and DePalo, et al., Chest. (2000) 117 (4): 1162-72).

In some embodiments, the methods includes delivery an inflammation resolution mediator. Resolution mediators are known in the art and discussed in, for example, Fredman, et al., *Sci Transl Med.* 2015 Feb. 18; 7 (275): 275ra20. doi: 10.1126/scitranslmed.aaa1065). One class of resolution mediators includes fatty acid-derived lipids called lipoxins, resolvins, protectins, and maresins, which are collectively referred to as specialized proresolving lipid mediators (Buckley, et al., *Immunity.* 2014; 40:315-327). Several of these mediators, notably RvE1, have shown benefit in pre-clinical models of certain chronic inflammatory diseases, including asthma, rheumatoid arthritis, and periodontal disease (Hasturk, et al., *FASEB J.* 2006; 20:401-403; Haworth, et al., *Nat. Immunol.* 2008; 9:873-879). In humans, proresolving lipid mediators have shown benefit in dry eye syndrome, a chronic inflammatory disease affecting the ocular surface. Another class of proresolving mediators includes proteins such as transforming growth factor-β (TGF-β) and annexin A1 (Perretti, et al., *Nat. Rev. Immunol.* 2009; 9:62-70). Endogenous annexin A1, a 37-kD protein, mediates inflammation resolution in several disease models, and administration of a 25-amino acid peptide encompassing its pharmacophore N-terminal region, called Ac2-26, can mimic the effects of annexin A1 (Perretti, et al., *Br. J. Pharmacol.* 2009; 158:936-946). Annexin A1 and Ac2-26 bind and activate a specific G protein-coupled receptor (GPCR) called N-formyl peptide receptor 2 (FPR2/ALX) to evoke their protective actions, and intriguingly, this is the same receptor used by two lipid mediators: resolvin D1 (RvD1) and lipoxin A4 (LXA4) (Cooray, et al., *Proc. Natl. Acad. Sci. U.S.A.* 2013; 110:18232-18237; Perretti, et al., Nat. Med. 2002; 8:1296-1302; Fiore, et al., J. Exp. Med. 1994; 180:253-260; Krishnamoorthy, et al., *Proc. Natl. Acad. Sci. U.S.A.* 2010; 107:1660-1665).

Thus, in some embodiments, the composition and method of resolution of inflammation include particle delivery of a inflammation resolution mediator, for example, RNA encoding a transforming growth factor-β (TGF-β) or annexin A1 protein such as Ac2-26, alone or in combination with RNA encoding IL-10.

A number of chronic diseases, including atherosclerosis, type 2 diabetes, and Alzheimer's disease, have aninflammatory component. In some cases, the inflammatory stimulus is unknown and, if known, is difficult to remove. Thus, there is interest in therapeutically targeting the inflammatory response. The basic priniciples of the inflammatory response and inflammation resolution, and the principles of anti-inflammatory therapy in chronic autoimmune inflammatory diseases are reviewed in Tabas and Glass, *Science*. 2013 Jan. 11; 339 (6116): 166-172. doi: 10.1126/science.1230720, which also provides specific targets and strategies for targeting inflammation in chronic disease with an inflammatory component not triggered by autoimmunity. The targets discussed in Tabas and Glass can be modulated using the disclosed compositions and methods for treating inflammation.

In some embodiments, the particles are targeted to the site of inflammation, for example, atherosclerosis, using a targeting moiety. An exemplary targeting moiety is one that binds to Col IV, e.g., the Col IV-binding heptapeptide discussed in Chan, et al., *Proc. Natl. Acad. Sci. U.S.A.* 2010; 107:2213-2218.

b. Infections

Similarly, in some embodiments, the particles are used to deliver a cargo for treatment of an infectious disease. Infectious diseases that can be treated, prevented, and/or managed using the disclosed nanoparticles can be caused by infectious agents including but not limited to bacteria, fungi, protozae, and viruses. Viral diseases include, for example, those caused by hepatitis type A, hepatitis type B, hepatitis type C, influenza (e.g., influenza A or influenza B), varicella, adenovirus, herpes simplex type I (HSV-I), herpes simplex type II (HSV-II), rinderpest, rhinovirus, echovirus, rotavirus, respiratory syncytial virus, papilloma virus, papova virus, cytomegalovirus, echinovirus, arbovirus, huntavirus, coxsackie virus, mumps virus, measles virus, rubella virus, polio virus, small pox, Epstein Barr virus, human immunodeficiency virus type I (HIV-I), human immunodeficiency virus type II (HIV-II), and agents of viral diseases such as viral meningitis, encephalitis, dengue or small pox.

Bacterial diseases can be caused by bacteria (e.g., *Escherichia coli, Klebsiella pneumoniae, Staphylococcus aureus, Enterococcus faecalis, Proteus vulgaris, Staphylococcus viridans*, and *Pseudomonas aeruginosa*) include, for example, mycobacteria rickettsia, mycoplasma, neisseria, *S. pneumonia, Borrelia burgdorferi* (Lyme disease), *Bacillus antracis* (anthrax), tetanus, streptococcus, staphylococcus, mycobacterium, pertissus, cholera, plague, diptheria, chlamydia, *S. aureus* and legionella.

Protozoal diseases caused by protozoa include, for example, leishmania, kokzidioa, trypanosome schistosoma or malaria. Parasitic diseases caused by parasites include chlamydia and rickettsia.

Fungal infections include, but are not limited to, Candida infections, zygomycosis, Candida mastitis, progressive disseminated trichosporonosis with latent trichosporonemia, disseminated candidiasis, pulmonary paracoccidioidomycosis, pulmonary aspergillosis, *Pneumocystis carinii* pneumonia, cryptococcal meningitis, coccidioidal meningoencephalitis and cerebrospinal vasculitis, *Aspergillus niger* infection, Fusarium keratitis, paranasal sinus mycoses, *Aspergillus fumigatus* endocarditis, tibial dyschondroplasia, *Candida glabrata* vaginitis, oropharyngeal candidiasis, X-linked chronic granulomatous disease, tinea pedis, cutaneous candidiasis, mycotic placentitis, disseminated trichosporonosis, allergic bronchopulmonary aspergillosis, mycotic keratitis, *Cryptococcus neoformans* infection, fungal peritonitis, *Curvularia geniculata* infection, staphylococcal endophthalmitis, sporotrichosis, and dermatophytosis.

In some embodiments, the cargo is a functional nucleic acid that targets a factor that contributes to anti-infective drug resistance, for example, drug efflux pumps, anti-apoptotic defense mechanisms, etc., or infected cells or the pathogens themselves. In some embodiments, the functional nucleic acid specifically targets a gene expressed by the pathogen. See, for example, Fischer, et al., *Cell Research*, (2004) 14, 460-466, which describes RNAi strategies for targeting viral infection. Additionally or alternatively, an RNA can be introduced to enhance the fight against the infection. As in described above in the context of cancer, these can be introduced into cells that induce, program, or activate cells to resolve an infection. For example, in some embodiments, the cargo is a nucleic acid that primes T cells or other immune cells for immunotherapy against the infection. Immunotherapeutic methods, including CAR T cell therapy and other strategies for activation of immune cells against target antigens, and inhibition of immune check points leading to T cell exhaustion, anergy, or deactivation were well known in the art. The particles can be used in vitro or in vivo to introduce nucleic acids into targets including immune cells, to, for example, increase antigen-specific proliferation of T cells, enhance cytokine production by T cells, stimulate differentiation, stimulate effector functions of T cells, promote T cell survival, overcome T cell exhaustion, overcome T cell anergy or a combination thereof. Immune cells, including but not limited to, neutrophils, lymphocytes, dendritic cells, macrophages, eosinophils, natural killer cells, can be the target of therapy.

3. Modifying Immune Responses to Antigen

Methods for modifying, or enhancing antigen presentation by antigen presenting cells, and modifying the immunological responses to a specific antigen are provided. Methods for inducing or stimulating an immune response to an exogenous antigen a subject are also provided. Typically, the methods include administering to the subject pharmaceutical compositions including the nanoparticles carrying one or more nucleic acids and a pharmaceutically acceptable excipient in an amount sufficient to induce an immune response in the subject, preferably via the antigen presenting cells in the subject. Exemplary antigen presenting cells include dendritic cells, neutrophils, macrophages, Langerhans cells, and lymphocytes. Exemplary antigens include viral antigens, bacterial antigens, protozoan antigens, fungal antigens, nematode antigens and cancer antigens. In some embodiments, the nanoparticles include more than one antigen.

Preferably, in some embodiments, the nanoparticles carrying one or more nucleic acids expressing desired antigens further include one or more nucleic acids that condition cells, or cellular environment to modulate an immunological response. Depending on the applications, in some embodiments, the desired immunological response is to enhance immunity against an antigen, in others, to suppress immunity or to induce tolerance.

A growing body of evidence suggests that mTOR regulates functional outcome in a wide range of immune cells, including T cells, B cells, dendritic cells, macrophages, neutrophils, mast cells and natural killer cells. Thus, in some embodiments, the nanoparticles can include one or more nucleic acids that overexpress protein targets that upregulated by rapamycin, and/or suppress protein targets that are downregulated or inhibited by rapamycin.

The mammalian target of rapamycin (mTOR) is a serine/threonine kinase that controls cell proliferation and metabolism in response to a diverse range of extracellular stimuli such as the availability of nutrients, growth factors and stress. mTOR is physiologically active in complex with accessory proteins that determine the functional outcomes of mTOR signaling. The two currently recognized multi-molecular signaling forms of mTOR, mTOR complex 1 (mTORC1) and mTOR complex 2 (mTORC2), are differentially activated by distinct extracellular and intracellular signals (Xu X et al., Semin Immunol. 24 (6): 429-35 (2012)).

mTORC1 includes mTOR and four subunits, including the scaffolding protein, regulatory-associated protein of mTOR (RAPTOR), DEP-containing mTOR-interacting protein (DEPTOR), mammalian lethal with Sec13 protein 8 (mLST8) and the Proline-Rich Akt Substrate 40 kDa (PRAS40). mTORC2 includes mTOR and five subunits, including the scaffold protein Raptor-Independent Companion of TOR (RICTOR), mammalian stress-activated protein kinase interacting protein 1 (mSIN1), DEPTOR, mLST8 and the Protein Observed with RICTOR (PROTOR). Classically, growth factors, cytokines or other co-stimulatory signals activate PI3 kinase (PI3K), leading to activation of the protein kinase Akt. Akt in turn activates mTOR through inhibition of the mTORC1 repression factor Tuberous Sclerosis Complex (TSC). TSC is a hetero-dimeric complex, comprising the TSC1 and TSC2 subunits, which functions as a GTPase-activating protein by inhibition of the GTP-binding protein Rheb. Rheb is an essential component of mTORC1 activation. Upon de-activation of TSC, the active, GTP-bound Rheb interacts with mTORC1 to promote signaling. Akt can further phosphorylate PRAS40, relieving it from inhibiting mTORC1. Reciprocal to the activating signals from Akt, a decrease in the ATP/ADP ratio can activate AMP-activated Protein Kinase (AMPK) which in turn inhibits mTOR activity by phosphorylation of TSC2 and/or RAPTOR.

The mTORC1 signaling pathway controls the expression of a diverse range of genes that promote cellular growth and proliferation. One of these pathways is the phosphorylation of p70-S6 kinase (S6K) and eukaryotic initiation factor 4E binding protein (4E-BP), which promotes protein translation. Active mTORC1 also down-regulates the autophagy pathway and promotes lipid biosynthesis as well as mitochondrial biogenesis. Enhanced mitochondrial biogenesis was observed upon increased mTORC1 activity by genetically deleting the mTORC1 repression factor, TSC1 in hematopoietic stem cells. Signaling events involving mTORC2 are less well-characterized. mTORC2 signaling has been associated with cell survival and cytoskeleton organization.

In some embodiments, the nanoparticles can include one or more nucleic acids that target one or more upstream targets of mTOC1 to mimic the effect of rapamycin. For example, the one or more nucleic acid can suppress PI3 kinase, Akt, and/or Rheb. Alternatively, the one or more nucleic acid can overexpress TSC to inhibit mTORC1 activation. In some embodiments, the nanoparticles can include one or more nucleic acids that promote autophagy, reduce glycolytic metabolism, and/or promote fatty acid oxidation of target cells.

In some embodiments, the molecules to be overexpressed or suppressed are molecules of professional APC such as dendritic cells. Exemplary costimulatory molecules include B7-1, B7-2, B7-H3, B7-H4, CD40, OX40L, ICOS-L, PD-L1, PD-L2, LIGHT, CD70, 4-1BBL, CD30L, SLAM, and combinations thereof. The nucleic acid can also target one or more of DC markers. Exemplary DC markers include, but are not limited to, CD1a (R4, T6, HTA-1); CD1b (R1); CD1c (M241, R7); CD1d (R3); CD1e (R2); CD11b (αM Integrin chain, CR3, Mo1, C3niR, Mac-1); CD11c (αX Integrin, p150, 95, AXb2); CDw117 (Lactosylceramide, LacCer); CD19 (B4); CD33 (gp67); CD 35 (CR1, C3b/C4b receptor); CD 36 (GpIIIb, GPIV, PASIV); CD39 (ATPdehydrogenase, NTPdehydrogenase-1); CD40 (Bp50); CD45 (LCA, T200, B220, Ly5); CD45RA; CD45RB; CD45RC; CD45RO (UCHL-1); CD49d (VLA-4α, α4 Integrin); CD49e (VLA-5α, α5 Integrin); CD58 (LFA-3); CD64 (FcγRI); CD72 (Ly-19.2, Ly-32.2, Lyb-2); CD73 (Ecto-5'nucloticlase); CD74 (Ii, invariant chain); CD80 (B7, B7-1, BB1); CD81 (TAPA-1); CD83 (HB15); CD85a (ILT5, LIR3, HL9); CD85d (ILT4, LIR2, MIR10); CD85j (ILT2, LIR1, MIR7); CD85k (ILT3, LIR5, HM18); CD86 (B7-2/B70); CD88 (C5aB); CD97 (BL-KDD/F12); CD101 (IGSF2, P126, V7); CD116 (GM-CSFRα); CD120a (TMFRI, p55); CD120b (TNFRII, p75, TNFR p80); CD123 (IL-3Rα); CD139; CD148 (HPTP-η, p260, DEP-1); CD150 (SLAM, IPO-3); CD156b (TACE, ADAM17, cSVP); CD157 (Mo5, BST-1); CD167a (DDR1, trkE, cak); CD168 (RHAMM, IHABP, HMMR); CD169 (Sialoadhesin, Siglec-1); CD170 (Siglec-5); CD171 (LICAM, NILE); CD172 (SIRP-1α, MyD-1); CD172b (SIRPβ); CD180 (RP105, Bgp95, Ly64); CD184 (CXCR4, NPY3R); CD193 (CCR3); CD196 (CCR6); CD197 (CCR7 (ws CDw197)); CDw197 (CCR7, EBI1, BLR2); CD200 (OX2); CD205 (DEC-205); CD206 (MMR); CD207 (Langerin); CD208 (DC-LAMP); CD209 (DC-SIGN); CDw218a (IL18Rα); CDw218b (IL8Rβ); CD227 (MUC1, PUM, PEM, EMA); CD230 (Prion Protein (PrP)); CD252 (OX40L, TNF (ligand) superfamily, member 4); CD258 (LIGHT, TNF (ligand) superfamily, member 14); CD265 (TRANCE-R, TNF-R superfamily, member 11a); CD271 (NGFR, p75, TNFR superfamily, member 16); CD273 (B7DC, PDL2); CD274 (B7H1, PDL1); CD275 (B7H2, ICOSL); CD276 (B7H3); CD277 (BT3.1, B7 family: Butyrophilin 3); CD283 (TLR3, TOLL-like receptor 3); CD289 (TLR9, TOLL-like receptor 9); CD295 (LEPR); CD298 (ATP1B3, Na K ATPase β3 submit); CD300a (CMRF-35H); CD300c (CMRF-35A); CD301 (MGL1, CLECSF14); CD302 (DCL1); CD303 (BDCA2); CD304 (BDCA4); CD312 (EMR2); CD317 (BST2); CD319 (CRACC, SLAMF7); CD320 (8D6); and CD68 (gp110, Macrosialin); class II MHC; BDCA-1; Siglec-H; wherein the names listed in parentheses represent alternative names.

A. Enhancing Vaccination Efficacy

Methods of using the nanoparticle compositions for vaccination are provided. Nanoparticles can carry one or more nucleic acids encoding the desired antigen(s) are suitable for use in vaccination. Methods for enhancing vaccine efficacy are also provided. Nanoparticles carrying one or more nucleic acids encoding the desired antigen(s) can further include one or more nucleic acids target molecules that boost the immunological response towards the antigen(s). The methods typically include administering a subject in a need thereof an effective amount of the composition for an enhanced vaccination response.

Small molecules such as rapamycin and metformin have shown to improve CD8 T-cell differentiation and memory formation (Araki K et al., Nature. 460 (7251): 108-12 (2009); Pearce E L et al., Nature. 460, 103-107 (2009)). Thus, in some embodiments, the nanoparticles can include one or more nucleic acids that overexpress protein targets that upregulated by rapamycin, and/or suppress protein targets that are downregulated or inhibited by rapamycin. For example, the nanoparticle can carry one nucleic acid encoding yellow fever vaccine, and an additional nucleic acid encoding siRNA targeting raptor (which mimics rapamycin function in inhibiting mTORC1 function). In further embodiments, the nanoparticles can include one or more nucleic acids that overexpress protein targets that upregulated by metformin, and/or suppress protein targets that are downregulated or inhibited by metformin.

In some embodiments, the one or more nucleic acids incorporated in the nanoparticles can enhance antigen presentation by MHC molecules. Exemplary molecules to overexpress to promote activation include surface molecules of antigen presenting cells CD80, CD86, CD40, OX40L, CLII, and ICOSL; soluble factors IL-12, IL-6, IL-1, IFN-γ, TNF-α, IL-18, and IL-2. Exemplary targets to suppress in DC to induce maturation include surface molecules ILT3, ILT4, PD-L1, PD-L2, and CD275; soluble factors TGFβ, IL-10. In some embodiments, the nucleic acids incorporated in the nanoparticles can promote cellular metabolism to be more glycolytic such as increase mTORC1 activities.

In some embodiments, the one or more nucleic acids incorporated in the nanoparticles can enhance antigen presentation by promoting autophagy. Autophagy has been shown to mediate both MHC-I and MHC-II presentation.

In some embodiments, co-delivery of siRNA and mRNA, preferably in the form of nanoparticles can be used as tolerogenic vaccines, wherein mRNA encodes an antigen designed to elicit a desired immune response and siRNA silences the expression of co-stimulatory proteins. For example, co-delivery of B7-1/7-2 siRNA and mRNA encoding adeno-associated virus (AAV) capsid proteins (VP1, VP2 or VP3) can be developed for the application of tolerance for AAV vectors for gene therapy (Table 2). In another embodiment, co-delivery of B7-1/7-2 siRNA and mRNA encoding GAD65, insulin, proinsulin, HSP60, IA-2, ZnT8 or IGRP are used for Type 1 diabetes therapy (Table 2).

B. Inducing Immune Tolerance

In some embodiments, the nanoparticles can be used to suppress the immune system and/or promote tolerance in a subject. Methods for inducing immune tolerance are provided. Methods typically include administering a subject in a need thereof an effective amount of the composition for inducing tolerance. In preferred embodiments, methods include administering a subject in a need thereof an effective amount of the composition to induce regulatory T cells. In some embodiments, the subject in need thereof has an allergic disease or condition. In some embodiments, the subject in need thereof is about to, is undergoing, or has undergone stem cell or tissue transplantation.

Nanoparticles carrying one or more nucleic acids encoding the desired antigen(s) can further include one or more nucleic acids target molecules to induce tolerance. In some embodiments, the nucleic acids target molecules to induce tolerance can induce regulatory T cells and/or acquisition of tolerance to the antigen. In some embodiments, the therapy includes introducing a nucleic acid (e.g., mRNA) that increases expression of cohihibitory molecule (e.g., PD-1, PD-L1, CTLA-4, BTLA), or functional nucleic acid (e.g., siRNA) that decreases expression of a costimulatory molecule (e.g., CD80 (B7-1), CD86 (B7-2), CD28, ICOS, 4-1BB, CD40, OX40, CD27) signaling. For example, a siRNA that downregulates one or more costimulatory molecules such as CD80 (B7-1), CD86 (B7-2) can be incorporated to help induce immunological tolerance towards the antigen on a dendritic cell.

The ability of dendritic cells (DC) to regulate Ag-specific immune responses via their influence on T regulatory cells (Treg) may be key to their potential as therapeutic tools or targets for the promotion/restoration of tolerance. It has been shown that rapamycin-conditioned DCs have impaired ability to stimulate effector CD4 T cells but promoted antigen-specific Foxp3+T Regulatory Cells (Turnquist H R et al., *J Immunol.* 178 (11): 7018-31 (2007)). In some embodiments, the nanoparticles include one or more nucleic acids to induce tolerogenic DC function for example by increasing the expression of immunosuppressive cytokine IL-10, or suppressing the expression of costimulatory molecules. Exemplary targets to overexpress in DC to induce tolerance include surface molecules ILT3, ILT4, PD-L1, PD-L2, and CD275; soluble factors TGFβ, IL-10. Exemplary molecules to suppress include surface molecules of antigen presenting cells CD80, CD86, CD40, OX40L, CLII, ICOSL; soluble factors IL-12, IL-6, IL-1, IFN-γ, TNF-α, IL-18, and IL-2. In some embodiments, the nucleic acids incorporated in the nanoparticles to induce tolerance are to promote less glycolytic metabolism, and/or more fatty acid oxidation. In some embodiments, the nucleic acids incorporated in the nanoparticles to induce tolerance are effective in suppressing activities of mTOC1. In some embodiments, the nucleic acids incorporated in the nanoparticles to induce tolerance are effective in increasing activities of AMPK, and/or autophagy.

Thus, in some embodiments, to induce immune tolerance, the disclosed nanoparticles can include one or more nucleic acids that overexpress protein targets that upregulated by rapamycin, and/or suppress protein targets that are downregulated or inhibited by rapamycin. For example, the nanoparticles carrying nucleic acids that express one or more desired antigens further include nucleic acids that suppress the expression of mTORC1, for example via siRNA targeting raptor, which is an essential component of mTORC1 complex. In some embodiments, the downstream effectors of mTORC1 are the inhibitory targets such as S6K1, S6, and eIF4E. In some embodiments, the nanoparticles include one or more nucleic acid that promotes one or more of the downstream pathways that are inhibited by mTORC1 such as 4E-BP, ULK1.

A particularly preferred therapeutic strategy includes co-administration of a nucleic acid (e.g., mRNA) encoding an antigenic protein to which tolerance is desired in combination with a functional nucleic acid (e.g., an siRNA) that reduces costimulatory signaling. Exemplary antigens are discussed above and include, for example, autoimmune antigens, food antigens, allergens, etc. Exemplary costimulatory signaling molecules are also discussed above and include, but are not limited to CD80 (B7-1), CD86 (B7-2).

C. Diagnositic and Prognostic Uses

As introduced above, upon exposure to plamsa, cells, tissue, or other biological material, particles rapid absorb proteins and other biomolecules such as nucleic acids and lipids, forming a corona around the particle. In some embodiments, empty or loaded particles are utilized in diagionistic or prognostic applications.

In some embodiments, analysis of the corona is used to characterize the effecicay of a treatment. For example, in some embodiments, a biomarker associated with a disease or condition to be treated forms part of the corona of injected particles. Particles can be injected and later collected before, during, or after treatment with a therapeutic composition. The therapeutic composition can be one disclosed herein or a different therapy, for example, a conventional drug treatment regimen. A change in the level of the biomarker in the corona can indicate an efficacious treatment, while no change in the level of the biomarker in the protein corona can indicate a non-efficacious treatment.

The present invention will be further understood by reference to the following non-limiting examples.

Example 1: Fast Redox-Responsive Hybrid Nanoparticles

Methods

Synthesis of the L-Cystine-Based poly(disulfide) (PDSA) Polymers

PDSA polymers were prepared by one-step polycondensation of L-cystine dimethyl ester dihydrochloride ((H-Cys-OMe) 2.2HCl) and dichlorides or Bis-nitrophenol esters of different fatty diacids. A standard synthesis procedure was carried out as follows: (H-Cys-OMe) 2.2HCl (10.0 mmol) and triethylamine (15 mmol) were dissolved in 20.0 mL DMSO, then the dichloride of fatty acid (10.0 mmol) DMSO solution (10.0 mL) was added into the cystine mixture solution dropwise. The solution was stirred for 15 mins to obtain a uniform mixture, precipitated twice in 250 mL of cold ethyl ether, and dried under reduced atmosphere. The final product was a yellow or brown yellow powder. The synthesis scheme is shown below.

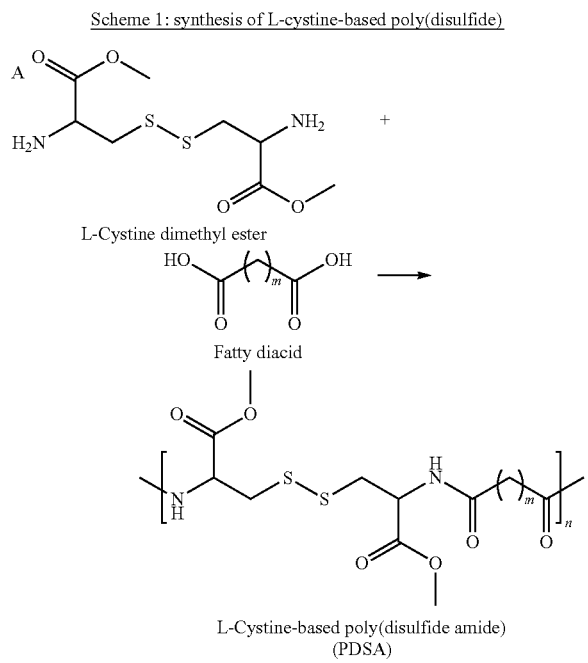

Scheme 1: synthesis of L-cystine-based poly(disulfide)

(PDSA) Redox-Responsive Behavior of the PDSA Polymers

GPC analysis was used to study the redox-responsive behavior of the PDSA polymers. The polymer (1 mg) was dissolved in 2 mL of DMF/H2O (9:1, V/V) and then GSH (6.2 mg, 0.02 mmol) was added to obtain a solution with GSH concentration of 10 mM. At predetermined intervals, 100 µL of the solution was taken for GPC analysis.

Preparation and Characterization of Nanoparticles (NPs)

The PDSA polymers were dissolved in DMF or DMSO to form a homogenous solution with a concentration of 20 mg/mL. Subsequently, 200 µL of this solution was taken and mixed with 140 µL of DSPE-PEG3000 (20 mg/mL in DMF), 50 µL of G0-C14 (5 mg/mL in DMF) and 1 nmol siRNA (0.1 nmol/µL aqueous solution). Under vigorously stirring (1000 rpm), the mixture was added dropwise to 5 mL of deionized water. The NP dispersion formed was transferred to an ultrafiltration device (EMD Millipore, MWCO 100 K) and centrifuged to remove the organic solvent and free compounds. After washing with PBS (pH 7.4) solution (3×5 mL), the siRNA loaded NPs were dispersed in 1 mL of phosphate buffered saline (PBS, pH 7.4) solution. Size and zeta potential were determined by DLS. The morphology of NPs was visualized on TEM. To determine the siRNA encapsulation efficiency, DY547-labelled GL3 siRNA (DY547-siRNA) loaded NPs were prepared according to the method described above. A small volume (50 µL) of the NP solution was withdrawn and mixed with 20-fold DMSO. The fluorescence intensity of DY547-siRNA was measured using a Synergy HT multi-mode microplate reader (BioTek Instruments) and compared to the free DY-547 labelled GL3 siRNA solution (1 nmol/mL PBS solution).

Redox-Responsive Behavior of the NPs

The siRNA loaded NPs were prepared as described above and dispersed in PBS containing 10 mM GSH. At predetermined time point, the particle size was examined by DLS and the particle morphology was observed on TEM. To evaluate the intracellular redox-responsive behavior, the NPs with Nile red and coumarin 6 encapsulated in their hydrophobic cores were prepared and then incubated with HeLa cells for different time. The fluorescence of Nile red and coumarin 6 was observed a FV1000 confocal laser scanning microscope (CLSM, Olympus). If the NPs respond to redox stimulus, the Nile red and coumarin 6 will release and only green fluorescence of coumarin 6 can be observed under CLSM. If the NPs are intact, the fluorescence of coumarin 6 will be quenched by Nile red and only red fluorescence can be observed under CLSM.

Evaluation of Endosomal Escape

Luc-HeLa cells (20,000 cells) were seeded in discs and incubated in 1 mL of RPMI 1640 medium containing 10% FBS for 24 h. Subsequently, the DY547-siRNA-loaded NPs were added, and the cells were allowed to incubate for 1 or 2 h. After removing the medium and subsequently washing with PBS (pH 7.4) solution thrice, the endosomes and nuclei were stained with lysotracker green and Hoechst 33342, respectively. The cells were then viewed under CLSM.

In Vitro siRNA Release

DY547-siRNA-loaded NPs were prepared as described above. Subsequently, the NPs were dispersed in 1 mL of PBS (pH 7.4) and then transferred to a Float-a-lyzer G2 dialysis device (MWCO 100 kDa, Spectrum) that was immersed in PBS (pH 7.4) at 37° C. At a predetermined interval, 5 µL of the NP solution was withdrawn and mixed with 20-fold DMSO. The fluorescence intensity of DY547-siRNA was determined by Synergy HT multi-mode microplate reader.

PC3 Xenograft Tumor Model

The tumor model was constructed by subcutaneous injection with 200 µL of LNCaP cell suspension (a mixture of RPMI 1640 medium and Matrigel in 1:1 volume ratio) with a density of 2×10$^6$ cells/mL into the back region of healthy male BALB/c nude mice. When the volume of the PC3 tumor xenograft reached ~50 mm$^3$, the mice were used for the following in vivo experiments.

Pharmacokinetics Study

Healthy male BALB/c mice were randomly divided into two groups (n=3) and given an intravenous injection of either (i) free DY647-labelled GL3 siRNA (DY647-siRNA) and (ii) DY647-siRNA-loaded NPs at a 650 µg/kg siRNA dose. At predetermined time intervals, orbital vein blood (20 µL) was withdrawn using a tube containing heparin, and the wound was pressed for several seconds to stop the bleeding. The fluorescence intensity of DY-647 labelled siRNA in the blood was determined using a microplate reader. The blood circulation half-life (t1/2) was calculated by first-order decay fit.

Biodistribution

PC3 tumor-bearing male BALB/c nude mice were randomly divided into two groups (n=3) and given an intravenous injection of either (i) free DY677-labelled GL3 siRNA (DY677-siRNA) or (ii) DY677-siRNA-loaded NPs at a 650 μg/kg siRNA dose. Twenty-four hours after the injection, the mice were imaged using the Maestro 2 In-Vivo Imaging System (Cri Inc). Main organs and tumors were then harvested and imaged. To quantify the accumulation of NPs in tumors and organs, the fluorescence intensity of each tissue was quantified by Image-J.

Results

Redox-responsive hydrophobic polymer was synthesized which could co-assemble with lipid-PEG to form spherical NPs for gene delivery and cancer therapy. The intracellular levels of glutathione (GSH) are 100-1000 fold higher in cancer cells than in normal tissue. Redox-sensitive approach is particularly promising to enhance the exposure of cancer cells to therapeutic molecules. In this example, L-cystine dimethyl ester and fatty diacid were used to synthesize a library of L-cystine-based poly(disulfide amide) polymers (PDSA). The success in the polymer synthesis was confirmed by $^1$HNMR spectrum.

Figure 4:
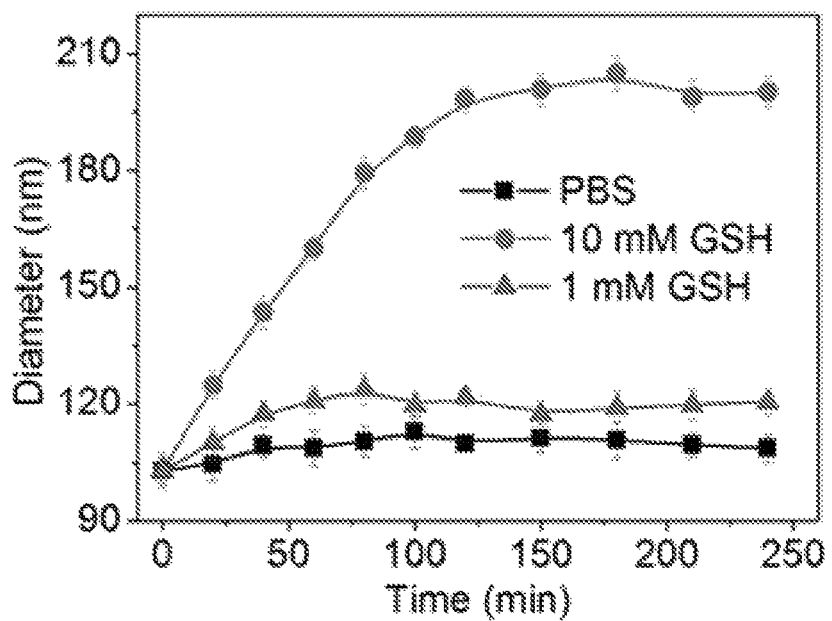
FIG. 4 is a graph showing size change profile (Diameter) of siRNA loaded PDSA8-1 NPs incubated in PBS (■), or 1 mM (▲) or 10 mM (●) GSH solution.
Figure 5A:
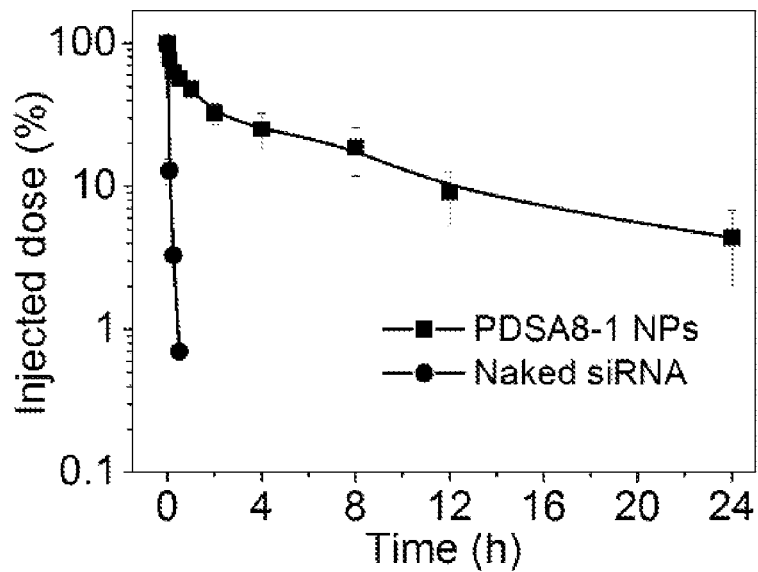
FIGS. 5A and 5B are graphs showing (FIG. 5A) pharmacokinetics of naked DY647-siRNA (●), and DY647-siRNA loaded PDSA8-1 NPs (■)
Figure 5B:
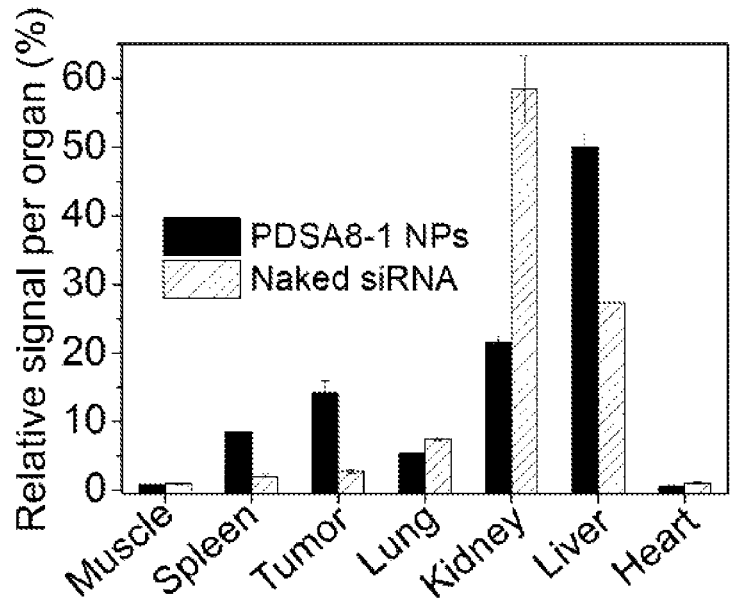

Feed compositions and molecular weight of the PDSA polymers are summarized in Table 6. Taking PDSA8-1, for example, with the presence of many disulfide bonds, there is a significant decrease in the molecule weight of PDSA8-1 after incubation in 10 mM glutathione (GSH) solution for 4 hours, shifting from 5700 (PDI=1.43) to 870 (PDI=1.65) based on the retention time on GPC. When mixing this redox-responsive polymer with DSPE-PEG3000, siRNA and cationic lipid (Xu X et al. *Proc Natl Acad Sci USA*, 110, 18638-18643 (2013)) in water miscible solvent such as DMF, DMSO, THF, etc., spherical NPs with an average size of ~100 nm (FIG. 3) can be formed via nanoprecipitation method, in which hydrophilic PEG chains are on the outer shell and siRNA is encapsulated in the hydrophobic core. The physiochemical properties of other PDSA polymers are summarized in Table 7. With the redox-responsive characteristic to induce the breakage of the NPs of PDSA8-1, the size of NPs increases when incubated in 10 mM glutathione (GSH) solution (FIG. 4). In vitro experiment results show that the siRNA loaded NPs of PDSA8-1 have efficient endosomal escape ability as seen in fluorescent images of HeLa cells incubated with the siRNA loaded NPs of PDSA8-1 at 4 hour time point. In vivo experiment results demonstrated that these NPs have a long blood circulation (FIG. 5A) and show high accumulation in PC3 xenograft tumor of mice as seen in overlaid fluorescent image of the PC3 xenograft tumor-bearing nude mice 24 h post systemic injection of naked DY677-siRNA, and DY677-siRNA loaded NPs of PDSA8-1 (FIG. 5B).

TABLE 6

Feed compositions and molecular weight of the PDSA polymers.

| | Poly(disulfide amide) | $M_n{}^a$ | $M_w{}^a$ | Polydispersity$^a$ |
|---|---|---|---|---|
| m = 4 | PDSA4 | 2900 | 4300 | 1.48 |
| m = 6 | PDSA6 | 3900 | 5700 | 1.46 |
| m = 8 | PDSAB-1 | 5700 | 7300 | 1.43 |
| m = 10 | PDSA10 | 9100 | 13200 | 1.45 |
| m = 8 | PDSA8-2 | 4700 | 7800 | 1.66 |
| m = 8 | PDSAB-3 | 9300 | 15200 | 1.63 |
| m = 8 | PDSA8-4 | 11700 | 16600 | 1.42 |

$^a$Determined by GPC using DMF as the eluent.

TABLE 7

Size, siRNA encapsulation efficiency (EE %) and zeta potential of the NPs of PDSA polymers.

| | PDSA4 | PDSA6 | PDSA8-1 | PDSA10 | PDSA8-2 | PDSA8-3 | PDSA8-4 |
|---|---|---|---|---|---|---|---|
| Size (nm)$^a$ | 155.7 | 134.5 | 102.9 | 87.6 | 118.9 | 99.4 | 93.4 |
| EE %$^b$ | 29.7 | 35.1 | 55.9 | 82.9 | 46.3 | 79.4 | 88.2 |
| ζ (mV) | −6.79 | −8.08 | −11.21 | −15.05 | −9.79 | −12.05 | −20.01 |

$^a$ N:P ratio is 20:1;
$^b$ siRNA encapsulation efficiency.

Example 2: Ultra pH-Responsive and Tumor-Penetrating Polymeric Nanoparticles

Methods and Materials

Materials

Methoxyl-polyethylene glycol (Meo-PEG113-OH) and hydroxyl polyethylene glycol carboxylic acid (HO-PEG113-COOH) were purchased from JenKem Technology and used as received. Internalizing RGD (iRGD) with the sequence CRGDRGPDC (SEQ ID NO: 3) was obtained from GL Biochem Ltd. 2-(Diisopropyl amino) ethyl methacrylate (DPA-MA), glycidyl methacrylate (GMA), and methyl methacrylate (MMA) were provided by Sigma-Aldrich and passed over an alumina column before use in order to remove the hydroquinone inhibitors. □-Bromoisobutyryl bromide, triethylamine (TEA), N,N,N',N',N'-pentamethyldiethylenetriamine (PMDETA), copper (I) bromide (CuBr), N,N'-dimethylformamide (DMF), tetraethylenepentamine (TEPA), 1,2-epoxyhexadecane, isopropyl alcohol, and dichloromethane (DCM) were acquired from Sigma-Aldrich and used directly. Lipofectamine 2000 (Lipo2K) was purchased from Invitrogen. Steady-Glo luciferase assay system was provided by Promega. GL3, fluorescent dye (DY547, DY647 and DY677) labeled GL3 siRNAs were acquired from Dharmacon. The siRNA sequences are as follows: GL3 siRNA, 5'-CUU ACG CUG AGU ACU UCG AdTdT-3' (SEQ ID NO: 4) (sense) and 5'-UCG AAG UAC UCA GCG UAA GdTdT-3' (SEQ ID NO: 5) (antisense); The fluorescent dyes DY547 and DY647 were labeled at the 5'-end of the sense strand of GL3 siRNA. DY677 was labeled at the 5'-end of both the sense and antisense strands of GL3 siRNA. HeLa cells stably expressing firefly and Renilla luciferase (Luc-HeLa) were obtained from Alnylam Pharmaceuticals, Inc. The cells were incubated in RPMI-1640 medium (Invitrogen) with 10% fetal bovine serum (FBS, Sigma-Aldrich) and 1% penicillin/streptomycin (Sigma-Aldrich). All other reagents and solvents are of analytical grade and used without further purification.

Synthesis of Meo-PEG-Br and Br-PEG-COOH

Meo-PEG113-OH (8 g, 1.6 mmol) and TEA (1.3 mL, 9.6 mmol) were dissolved in 250 mL of DCM. In an ice-salt bath, α-bromoisobutyryl bromide (1 mL, 8 mmol) dissolved in 10 mL of DCM was added dropwise. After stirring for 24 h, the mixture was washed with 1 M NaOH (3×50 mL), 1 M HCl (3×50 mL), and deionized water (3×50 mL), respectively. After drying over anhydrous $MgSO_4$, the solution was concentrated, and cold ether was added to precipitate the product. After re-precipitation thrice, the product was collected as white powder after drying under vacuum. The synthesis of Br-PEG-COOH was carried out according to a method similar to that described above, by changing Meo-PEG113-OH with HO-PEG113-COOH. The synthesis scheme of Br-PEG-COOH is shown below.

Synthesis of methoxyl-polyethylene glycol-b-poly (2-(diisopropylamino) ethylmethacrylate-co-glycidyl methacrylate) (Meo-PEG-b-P(DPA-co-GMA))

Meo-PEG-b-P(DPA-co-GMA) copolymers with different compositions were synthesized by atom transfer radical polymerization (ATRP). Meo-PEG113-b-P(DPA80-co-GMA5) is used as an example to illustrate the procedure. DPA-MA (2.6 g, 12 mmol), GMA (0.11 g, 0.75 mmol), Meo-PEG-Br (0.75 g, 0.15 mmol), and PMDETA (31.5 μL, 0.15 mmol) were added to a polymerization tube. DMF (3 mL) and 2-propanol (3 mL) were then added to dissolve the monomer and initiator. After three cycles of freeze-pump-thaw to remove oxygen, CuBr (21.6 mg, 0.15 mmol) was added under nitrogen atmosphere and the polymerization tube was sealed under vacuum. After polymerization at 40° C. for 24 h, tetrahydrofuran (THF) was added to dilute the product, which was then passed through a neutral $Al_2O_3$ column to remove the catalyst. The resulting THE solution was concentrated and the residue was dialyzed against THE, followed by deionized water. The expected copolymer was collected as a white powder after freeze-drying under vacuum. The synthesis scheme is shown below. The feed compositions of the copolymers are summarized in Table 8.

TABLE 8

Feed compositions and characterizations of Meo-PEG-b-P(DPA-co-GMA)

| No. | Repeat unit (DPA) a | Repeat unit (GMA) a | Mn, GPC ($\times 10^{-4}$ Da) b | PDI b | Mn, NMR ($\times 10^{-4}$ Da) a | pKa c |
|---|---|---|---|---|---|---|
| PDPA40-GMA5 | 39 | 5 | 1.44 | 1.19 | 1.42 | 6.34 |
| PDPA50-GMA5 | 50 | 5 | 1.68 | 1.12 | 1.66 | 6.31 |
| PDPA60-GMA5 | 58 | 5 | 1.69 | 1.18 | 1.83 | 6.29 |
| PDPA70-GMA5 | 69 | 5 | 1.94 | 1.24 | 2.06 | 6.26 |
| PDPA80-GMA5 | 80 | 5 | 2.19 | 1.29 | 2.29 | 6.24 |
| PDPA100- | 99 | 5 | 2.87 | 1.14 | 2.71 | 6.21 | a Determined by 1HNMR using CDC13 as solvent.
b Number-averaged (Mn) and polydispersity index (PDI) were determined by GPC using THE as the eluent.

Synthesis of Meo-PEG-b-P(DPA-co-GMA-TEPA)

Meo-PEG-b-P(DPA-co-GMA-TEPA) was synthesized via the ring opening reaction between TEPA and the epoxy group of GMA repeating unit. In brief, Meo-PEG-b-P(DPA-co-GMA) (1.5 g) dissolved in DMF (20 mL) was added dropwise to the DMF solution (5 mL) of TEPA (30-fold molar excess relative to the GMA repeating unit). After reaction at 60° C. for 7 h, the mixture was transferred to a dialysis tube and then dialyzed against deionized water. The Meo-PEG-b-P(DPA-co-GMA-TEPA) was finally collected as a white powder after freeze-drying under vacuum. The synthesis route of Meo-PEG-b-P(DPA-co-GMA-TEPA) is shown below.

Synthesis of Meo-PEG-b-P(DPA-co-GMA-TEPA-C14)

Meo-PEG-b-P(DPA-co-GMA-TEPA) (1 g) and 1,2-epoxyhexadecane (equal molar amount relative to TEPA repeating unit) were dissolved in DMF (20 mL) and the solution was stirred at 70° C. for 5 h. Subsequently, the solution was transferred to a dialysis tube and then dialyzed against DMF, followed by deionized water. The Meo-PEG-b-P(DPA-co-GMA-TEPA-C14) was obtained as a white powder after freeze-drying under vacuum. The detailed synthesis of Meo-PEG-b-P(DPA-co-GMA-TEPA-C14) is shown below.

Synthesis of Meo-PEG-b-P(DPA-co-GMA-TEPA-Cy5.5)

Meo-PEG-b-P(DPA-co-GMA-TEPA) (0.2 g) and Cy5.5 NHS ester (1.5-fold molar excess relative to the TEPA repeating unit) were well dissolved in 5 mL of THF. After constantly stirring in dark for 48 h, the solution was dialyzed against deionized water and the product was collected after freeze-drying. The synthesis of Meo-PEG-b-P(DPA-co-GMA-TEPA-Cy5.5) is shown below.

Scheme 2: Synthesis of Meo-PEG-b-P(DPA-co-GMA-TEPA-Cy5.5).

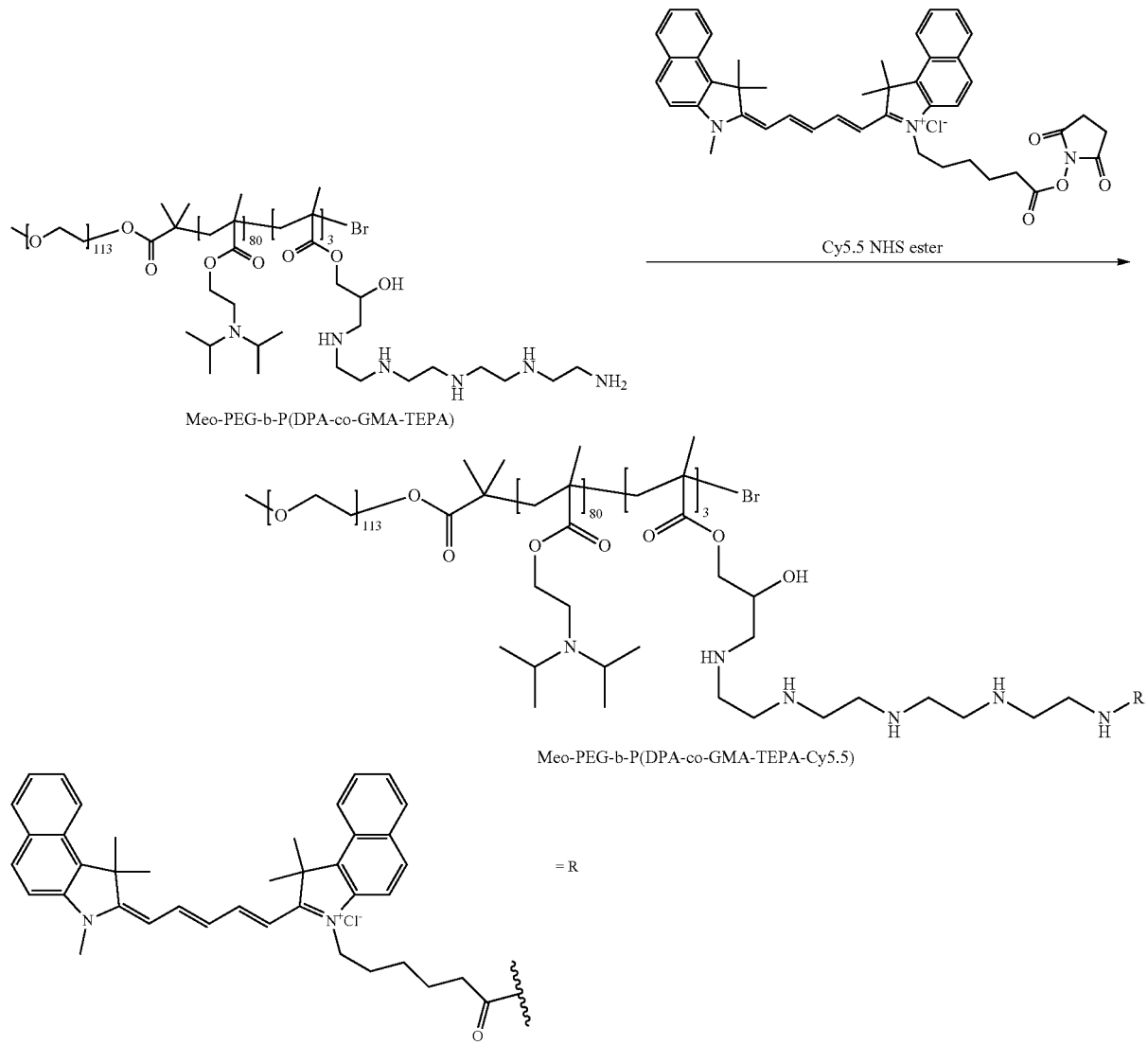

Synthesis of HOOC-PEG-b-PDPA

HOOC-PEG-b-PDPA copolymers were also synthesized by the ATRP method. DPA-MA (1.73 g, 8 mmol), Br-PEG-COOH (0.5 g, 0.1 mmol), and PMDETA (21 μL, 0.1 mmol) were added to a polymerization tube. Subsequently, DMF (2 mL) and 2-propanol (2 mL) were added to dissolve the monomer and initiator. After three cycles of freeze-pump-thaw to remove oxygen, CuBr (14.4 mg, 0.1 mmol) was added under nitrogen atmosphere and the polymerization tube was sealed under vacuum. After polymerization at 40° C. for 24 h, tetrahydrofuran (THF) was added to dilute the product, which was then passed through a neutral $Al_2O_3$ column to remove the catalyst. The obtained THE solution was concentrated and the residue was dialyzed against deionized water. The HOOC-PEG-b-PDPA was obtained as a white powder after freeze-drying under vacuum. The synthesis scheme is shown below. The feed compositions are summarized in Table 9.

TABLE 9

Feed compositions and characterizations of HOOC-PEG-b-PDPA

| No. | Repeat unit (DPA) a | Mn,GPC (×10−4 Da) b | PDI b | Mn, NMR (×10−4 Da) a |
|---|---|---|---|---|
| HOOC-PEG-b-PDPA40 | 36 | 1.31 | 1.34 | 1.27 |
| HOOC-PEG-b-PDPA50 | 45 | 1.49 | 1.28 | 1.48 |
| HOOC-PEG-b-PDPA60 | 55 | 1.76 | 1.29 | 1.69 |
| HOOC-PEG-b-PDPA70 | 64 | 1.92 | 1.27 | 1.89 |
| HOOC-PEG-b-PDPA80 | 76 | 2.04 | 1.24 | 2.14 |
| HOOC-PEG-b-PDPA100 | 92 | 2.57 | 1.19 | 2.48 | a Determined by 1HNMR using CDCl3 as solvent.
b Number-averaged (Mn) and polydispersity index (PDI) were determined by GPC using THF as the eluent.

Synthesis of iRGD-PEG-b-PDPA

HOOC-PEG-b-PDPA copolymer (0.2 g), iRGD peptide (1.5-fold molar excess relative to the terminal carboxylic acid group), EDC·HCl (3-fold molar excess relative to the terminal carboxylic acid group), and NHS (3-fold molar excess relative to the terminal carboxylic acid group) were well dissolved in pH 5.0 water. The mixture was stirred at room temperature for 48 h. The solution was subsequently dialyzed against deionized water and the expected iRGD-PEG-PDPA was collected after freeze-drying.

Scheme 3: Synthesis of iRGD-PEG-b-PDPA.

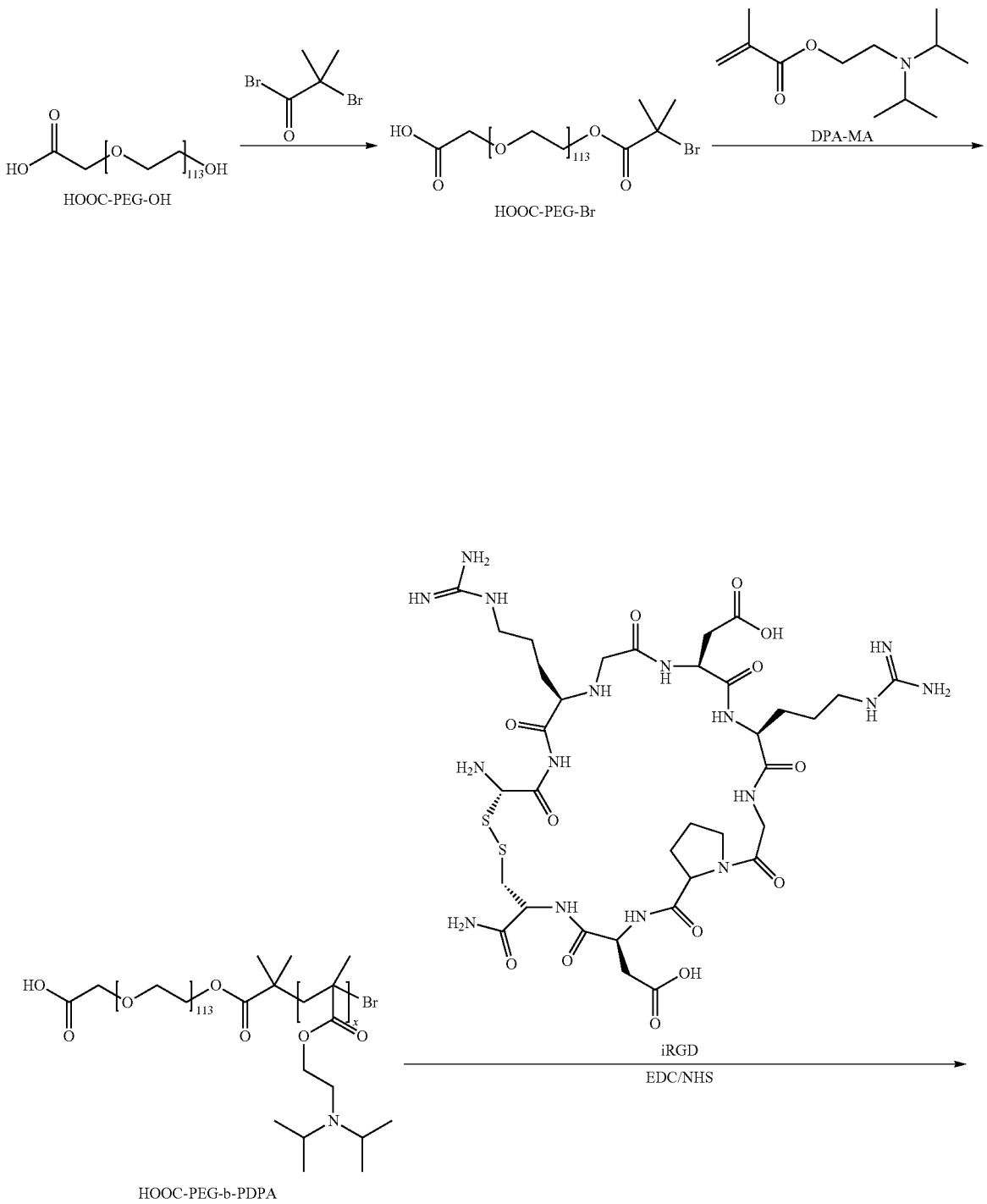

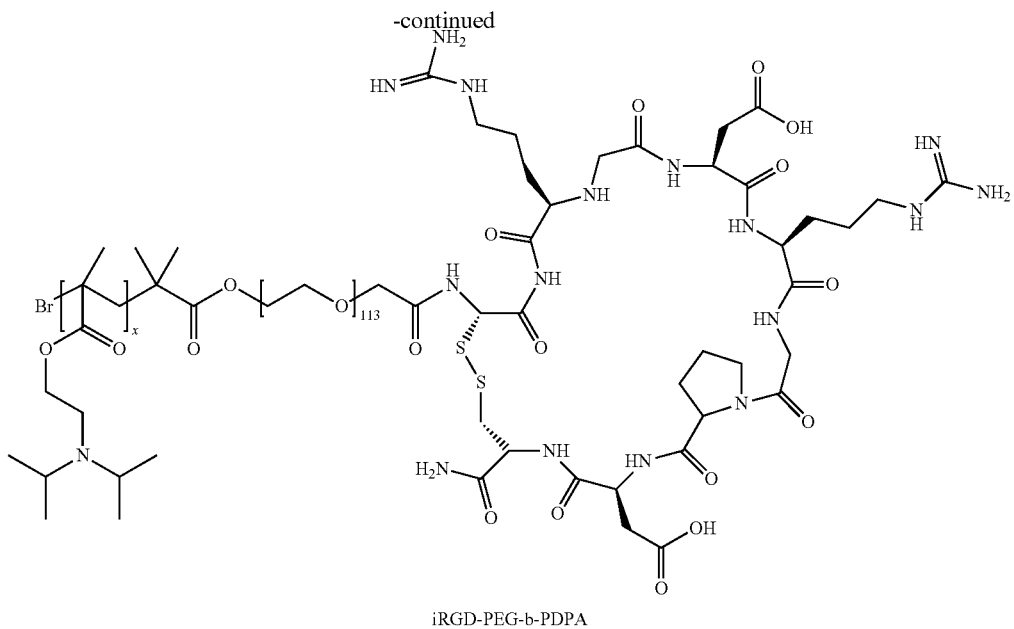

iRGD-PEG-b-PDPA

Synthesis of Control Copolymers

The control copolymers, methoxyl-polyethylene glycol-b-poly(methyl methacrylate-co-glycidyl methacrylate) (Meo-PEG113-b-P(MMA80-co-GMA5)) Meo-PEG113-b-P(MMA80-co-GMA5-TEPA5), HOOC-PEG113-b-PMMA80, iRGD-PEG113-b-PMMA80, and Meo-PEG113-b-P (MMA80-co-GMA5-TEPA5-C145) were synthesized according to the method described above, by changing the monomer DPA-MA with MMA. The chemical structure of iRGD-PEG113-b-PMMA80 and Meo-PEG113-b-P (MMA80-co-GMA5-TEPA5-C145) is shown below.

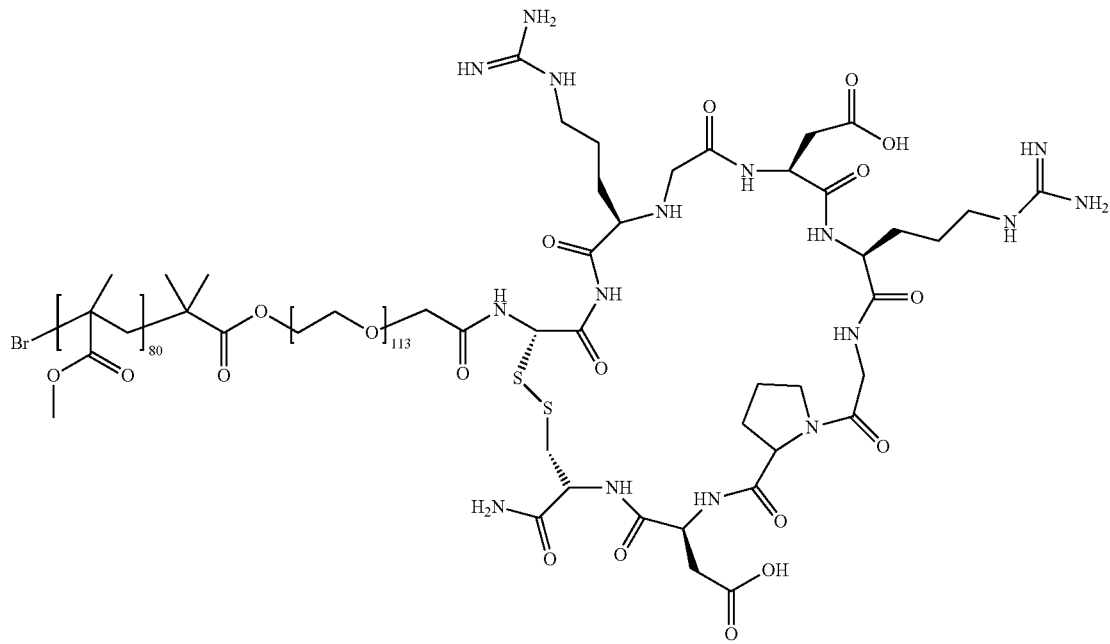

iRGD-PEG$_{113}$-b-PMMA$_{80}$

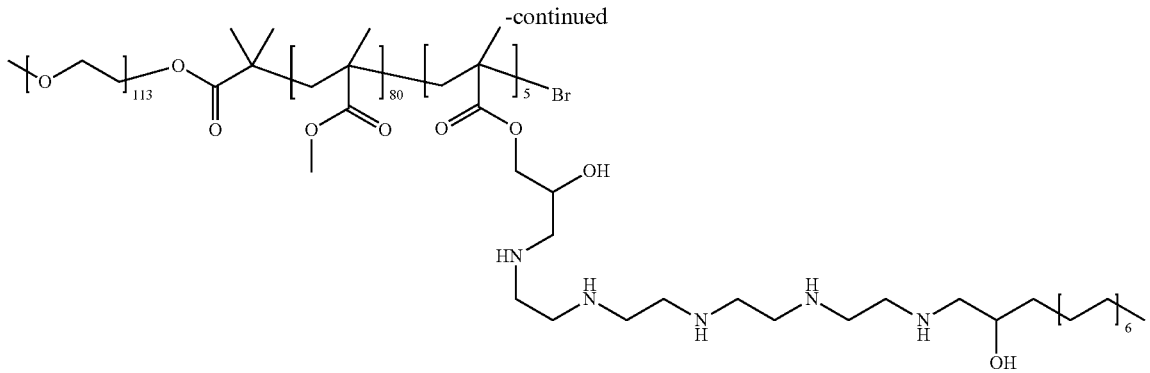

Meo-PEG$_{113}$-b-P(MMA$_{80}$-co-GMA$_5$-TEPA-C14)

Formula I: iRGD-PEG113-b-PMMA80 and Meo-PEG113-b-P (MMA80-co-GMA5-TEPA5-C145

Gel Permeation Chromatography (GPC)

Number- and weight-average molecular weights (Mn and Mw, respectively) of the polymers were determined by a gel permeation chromatographic system equipped with a Waters 2690D separations module and a Waters 2410 refractive index detector. THF was used as the eluent at a flow rate of 0.3 mL/min. Waters millennium module software was used to calculate molecular weight on the basis of a universal calibration curve generated by polystyrene standard of narrow molecular weight distribution.

$^1$H Nuclear magnetic resonance ($^1$HNMR)

The 1HNMR spectra of the polymers were recorded on a Mercury VX-300 spectrometer at 400 MHZ (Varian, USA), using CDCl3 as a solvent and TMS as an internal standard.

Acid-Base Titration

Meo-PEG-b-P(DPA-co-GMA-TEPA-C14) was dispersed in deionized water, and a concentrated HCl aqueous solution was added until complete dissolution of the copolymer (1 mg/mL). Subsequently, 1 M NaOH aqueous solution was added in 1-5 µL increments. After each addition, the solution was constantly stirred for 3 min, and the solution pH was measured using a pH meter. The pKa of the copolymer was determined as the pH at which 50% copolymer turns ionized.

Preparation and Characterization of Nanoparticles (NPs)

Meo-PEG-b-P(DPA-co-GMA-TEPA-C14) was dissolved in THF to form a homogenous solution with a concentration of 4 mg/mL. Subsequently, a certain volume of this THF solution was taken and mixed with 1 nmol siRNA (0.1 nmol/µL aqueous solution) in a N/P molar ratio of 40:1. Under vigorous stirring (1000 rpm), the mixture was added dropwise to 2.5 mL of deionized water. The NP dispersion formed was transferred to an ultrafiltration device (EMD Millipore, MWCO 100 K) and centrifuged to remove the organic solvent and free compounds. After washing with PBS (pH 7.4) solution (3×5 mL), the siRNA loaded NPs were dispersed in 1 mL of phosphate buffered saline (PBS, pH 7.4) solution. Size and zeta potential were determined by dynamic light scattering (DLS, Brookhaven Instruments Corporation). The morphology of NPs was visualized on a Tecnai G2 Spirit BioTWIN transmission electron microscope (TEM). Before observation, the sample was stained with 1% uranyl acetate and dried under air. To determine siRNA encapsulation efficiency, DY547-labelled GL3 siRNA loaded NPs were prepared according to the method described above. A small volume (50 µL) of the NP solution was withdrawn and mixed with 20-fold DMSO. The fluorescence intensity of DY547-labelled GL3 siRNA was measured using a Synergy HT multi-mode microplate reader (BioTek Instruments) and compared to the free DY547-labelled GL3 siRNA solution (1 nmol/mL PBS solution).

To prepare the iRGD-NPs, Meo-PEG-b-P(DPA-co-GMA-TEPA-C14) (4 mg/mL in THF) was mixed with 1 nmol siRNA (0.1 nmol/µL aqueous solution) in a N/P molar ratio of 40:1. Then iRGD-PEG-b-PDPA (4 mg/mL in THF, 10 mol % compared to Meo-PEG-b-P(DPA-co-GMA-TEPA-C14)) was added, and the mixture was added dropwise to 2.5 mL of deionized water. The iRGD-NPs were purified by an ultrafiltration device (EMD Millipore, MWCO 100 K) and finally dispersed in 1 mL of PBS. The siRNA encapsulation efficiency was examined by replacing the siRNA with DY547-labelled GL3 siRNA.

Evaluation of pH Responsiveness

The THF solution of Meo-PEG-b-P(DPA-co-GMA-TEPA-C14) (4 mg/mL) and Meo-PEG-b-P(DPA-co-GMA-TEPA-Cy5.5) (4 mg/mL) was mixed in a volume ratio of 8:2. Under vigorously stirring (1000 rpm), 0.5 mL of the mixture was added dropwise to 5 mL of deionized water. After collection and purification by an ultrafiltration device (EMD Millipore, MWCO 100 kDa), the NPs formed were dispersed in 1 mL of deionized water. Subsequently, 1 M NaOH or HCl was added in 1-5 µL increments, and the fluorescence intensity of the NPs was measured on a Synergy HT multi-mode microplate reader. The normalized fluorescence intensity (NFI) vs. pH profile was used to quantitatively assess the pH responsiveness. NFI is calculated as follows:

$$NFI = (F - Fmin)/(Fmax - Fmin)$$

where F is the fluorescence intensity of the NPs at any given pH value and Fmax and Fmin are the maximal and minimal fluorescence intensity of the NPs, respectively.

In Vitro siRNA Release

DY547-labelled GL3 siRNA-loaded NPs were prepared as described above. Subsequently, the NPs were dispersed in 1 mL of PBS (pH 7.4) and then transferred to a Float-a-lyzer G2 dialysis device (MWCO 100 kDa, Spectrum) that was immersed in PBS (pH 7.4) at 37° C. At a predetermined interval, 5 µL of the NP solution was withdrawn and mixed with 20-fold DMSO. The fluorescence intensity of DY547-labelled siRNA was determined by Synergy HT multi-mode microplate reader.

Cell Culture

Human cervical cancer cell line with the expression of luciferase (Luc-HeLa) and prostate cancer cell line (PC3) were incubated in RPMI1640 medium with 10% FBS at 37° C. in a humidified atmosphere containing 5% $CO_2$.

Determination of the Expression of Integrins $\alpha v \beta 3$ and $\alpha v \beta 5$ Luc-HeLa and PC3 cells were seeded in 6-well plates (50,000 cells per well) and incubated in 1 mL of RPMI1640 medium containing 10% FBS for 24 h. Thereafter, 10 μL of FITC-conjugated anti-human CD51/61 antibody (BioLegend) or FITC-conjugated anti-human integrin $\alpha v \beta 5$ antibody (EMD Millipore) were added, and the cells were allowed to incubate for another 4 h. After removing the medium and washing with PBS (pH 7.4) solution thrice, the cells were collected for flow cytometry quantitative analysis (BD FACSAria™ III, USA).

Confocal Laser Scanning Microscope (CLSM)

Luc-HeLa and PC3 cells (20,000 cells) were seeded in discs and incubated in 1 mL of RPMI1640 medium containing 10% FBS for 24 h. Subsequently, the DY547-labelled GL3 siRNA-loaded NPs or iRGD-NPs were added, and the cells were allowed to incubate for 1 or 4 h. After removing the medium and subsequently washing with PBS (pH 7.4) solution thrice, the endosomes and nuclei were stained by lysotracker green and Hoechst 33342, respectively. The cells were then viewed under a FV1000 CLSM (Olympus).

Flow Cytometry

Luc-HeLa and PC3 cells were seeded in 6-well plates (50,000 cells per well) and incubated in 1 mL of RPMI1640 medium containing 10% FBS for 24 h. Subsequently, the DY547-labelled GL3 siRNA-loaded NPs or iRGD-NPs were added, and the cells were allowed to incubate for another 4 h. After removing the medium and subsequently washing with PBS (pH 7.4) solution thrice, the cells were collected for flow cytometry quantitative analysis.

Animals

Healthy male BALB/c mice (4-5 weeks old) were purchased from Charles River Laboratories. All in vivo studies were performed in accordance with National Institutes of Health animal care guidelines and in strict pathogen-free conditions in the animal facility of Brigham and Women's Hospital. Animal protocol was approved by the Institutional Animal Care and Use Committees on animal care (Harvard Medical School).

PC3 Xenograft Tumor Model

The tumor model was constructed by subcutaneous injection with 200 μL of PC3 cell suspension (a mixture of RPMI 1640 medium and Matrigel in 1:1 volume ratio) with a density $1 \times 10^7$ cells/mL into the back region of healthy male BALB/c nude mice. When the volume of the PC3 tumor xenograft reached ~100 mm³, the mice were used for the following in vivo experiments.

Pharmacokinetics Study

Healthy male BALB/c mice were randomly divided into three groups (n=3) and given an intravenous injection of either (i) free DY647-labelled GL3 siRNA, (ii) DY647-labelled GL3 siRNA-loaded NPs, or (iii) DY647-labelled GL3 siRNA-loaded iRGD-NP at 650 μg siRNA dose per kg mouse weight. At predetermined time intervals, orbital vein blood (20 μL) was withdrawn using a tube containing heparin, and the wound was pressed for several seconds to stop the bleeding. The fluorescence intensity of DY647-labelled siRNA in the blood was determined by microplate reader. The blood circulation half-life (t1/2) was calculated by first-order decay fit.

Biodistribution

PC3 tumor-bearing male BALB/c nude mice were randomly divided into three groups (n=3) and given an intravenous injection of either (i) free DY677-labelled GL3 siRNA, (ii) DY677-labelled GL3 siRNA-loaded NPs or (iii) DY677-labelled GL3 siRNA-loaded iRGD-NPs at 650 μg siRNA dose per kg mouse weight. Twenty-four hours after the injection, the mice were imaged using the Maestro 2 In-Vivo Imaging System (Cri Inc). Organs and tumors were then harvested and imaged. To quantify the accumulation of NPs in tumors and organs, the fluorescence intensity of each tissue was quantified by Image-J.

Immunofluorescence Staining

PC3 tumor-bearing male BALB/c nude mice were randomly divided into three groups (n=3) and intravenously injected with either (i) free DY677-labelled GL3 siRNA, (ii) DY677-labelled GL3 siRNA-loaded NPs or (iii) DY677-labelled GL3 siRNA-loaded iRGD-NPs at 650 μg siRNA dose per kg mouse weight. Four hours after injection, the mice were sacrificed and the tumors were harvested, followed by fixing with 4% paraformaldehyde, embedding in paraffin, and cutting into sections. To image the tumor vasculature, the slices were heated at 60° C. for 1 h and washed with xylene, ethanol, and PBS thrice. After blocking with 10% FBS for 1.5 h, the slices were incubated with rat anti-mouse CD31 antibody (Abcam) at 4° C. for 1 h. After washing with PBS/0.2% triton X-100 thrice, Alexa Flour 488-conjugated secondary antibody (Goat anti-rat IgG, Abcam) was added for 1 h to stain the slices. Thereafter, the slices were washed with PBS thrice and then stained with Hoechst 33342. The images of the tumor vasculature were viewed on a FLV1000 CLSM.

Results

A long-circulating, optionally cell-penetrating, and stimuli-responsive NP platform for effective in vivo delivery of therapeutic, prophylactic and/or diagnostic agents is made of an amphiphilic polymer, most preferably a PEGylated polymer, which shows a response to a stimulus such as pH, temperature, or light, such as an ultra pH-responsive characteristic with a pKa close to the endosomal pH (6.0-6.5) (Wang Y et al, *Nat Mater,* 13, 204-212 (2014)). The polymer may include a targeting or cell penetrating or adhesion molecule such as a tumor-penetrating peptide iRGD.

Figure 6B:
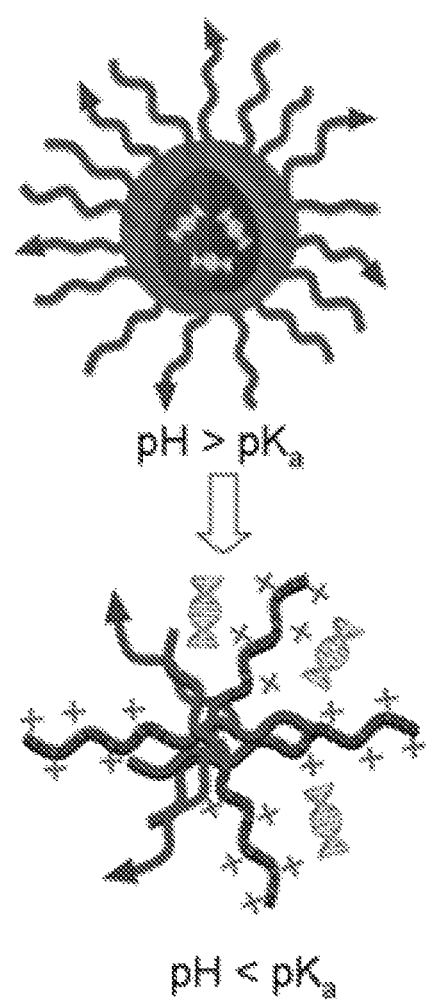

As demonstrated by example 2, after encapsulating the agent(s) to be delivered, the resulting delivery system shows four unique features (FIGS. 6A-6B):
  i) the surface-encoded iRGD peptide endows the NPs with tumor-targeting and tumor-penetrating abilities;
  ii) the hydrophilic PEG shells prolong the blood circulation;
  iii) a small population of cationic lipid-like grafts randomly dispersed in the hydrophobic poly(2-(diisopropylamino) ethylmethacrylate) (PDPA) segment can entrap siRNA in the hydrophobic cores of the NPs; and
  iv) the rapid protonation of the ultra pH-responsive PDPA segment induces the endosomal swelling via the "proton sponge" effect, which synergizes with the insertion of the cationic lipid-like grafts into endosomal membrane to induce membrane destabilization (Zhu X et al., *Proceedings of the National Academy of Sciences,* 112, 7779-7784 (2015)) and efficient endosomal escape.

The amphiphilic polymer, methoxyl-polyethylene glycol-b-poly(2-(diisopropylamino) ethylmethacrylate-co-glycidyl methacrylate) (Meo-PEG-b-P(DPA-co-GMA)) was first synthesized (Table 8), which was further grafted by tetraethylenepentamine (TEPA) and 1,2-epoxyhexadecane to obtain Meo-PEG-b-P(DPA-co-GMA-TEPA-C14).

Scheme 4: Synthesis of Meo-PEG-b-P(DPA-co-GMA-TEPA-C14).

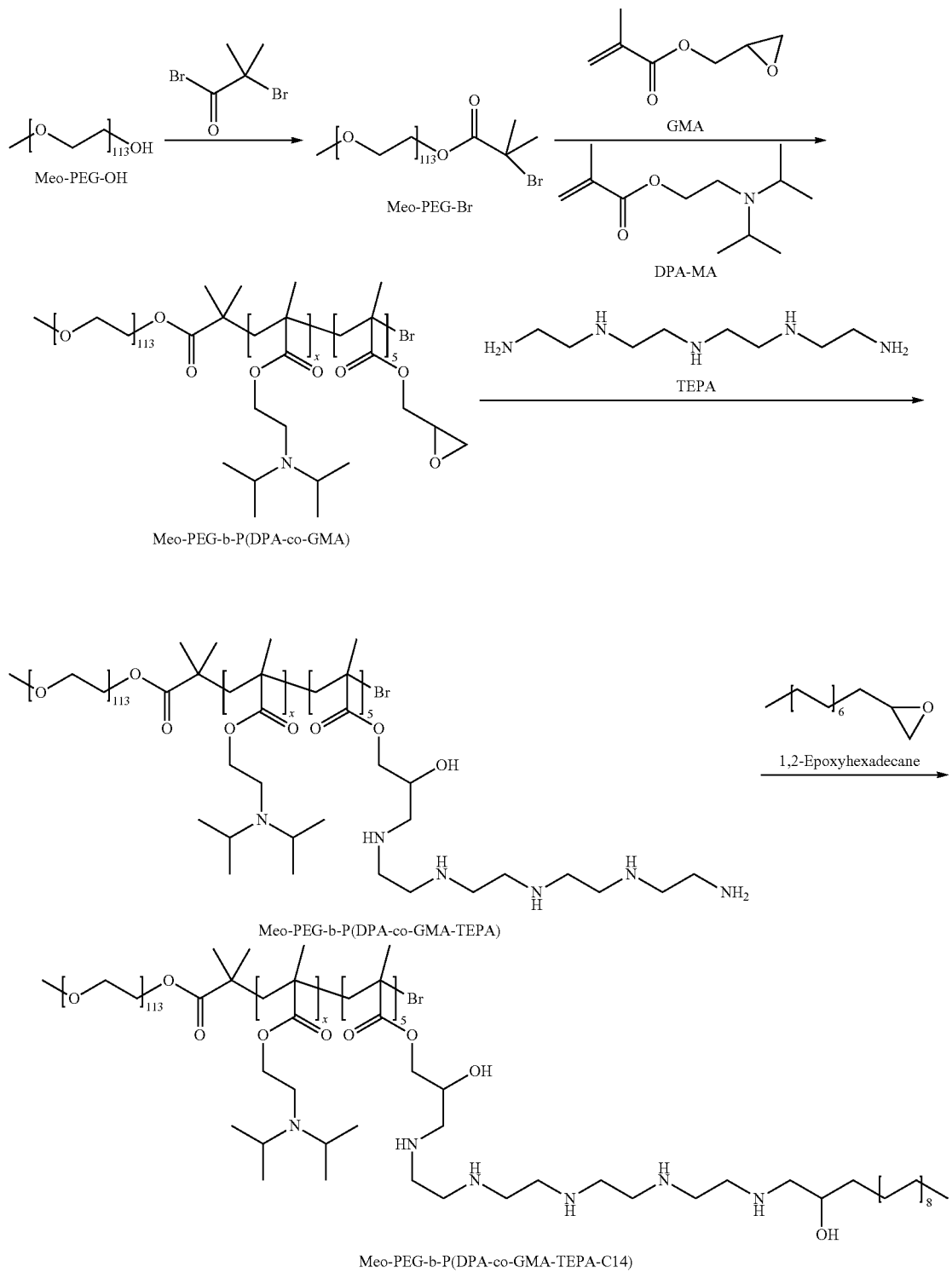

The length of PDPA segment was varied to adjust siRNA encapsulation efficiency (EE %). As the PDPA length increases, the EE % and size of the resulting NPs increase (Table 10), possibly because the increased PDPA length leads to an increase in the size of the hydrophobic core. Specifically, the EE % reaches almost 100% for the polymer with 80 (PDPA80) or 100 (PDPA100) DPA repeat units. Notably, using a mixture of Meo-PEG-b-P(DPA-co-GMA-TEPA-C14) (90 mol %) and tumor-penetrating polymer (iRGD-PEG-b-PDPA, 10 mol %) to prepare NPs does not cause obvious change in the EE % or particle size (Table 11).

TABLE 10

Size, zeta potential, siRNA encapsulation efficiency (EE %), and pH responsiveness of the NPs prepared from Meo-PEG-b-P(DPA-co-GMA-TEPA-C14)

| No. | Polymer abbreviation | DPA repeating units [a] | pKa of polymer [b] | Size (nm) c | Zeta potential (mv) | EE % [d] | $\Delta pH_{10\%\text{-}90\%}$ |
|---|---|---|---|---|---|---|---|
| NPs40 | PDPA40 | 39 | 6.34 | 62.5 | 4.79 | 54.6 | 0.45 |
| NPs50 | PDPA50 | 50 | 6.31 | 69.6 | 5.26 | 59.6 | 0.40 |
| NPs60 | PDPA60 | 58 | 6.29 | 75.9 | 3.13 | 65.6 | 0.37 |
| NPs70 | PDPA70 | 69 | 6.26 | 66.0 | 6.44 | 69.7 | 0.35 |
| NPs80 | PDPA80 | 80 | 6.24 | 69.7 | 3.81 | 99.7 | 0.34 |
| NPs100 | PDPA100 | 99 | 6.21 | 82.3 | 9.26 | 100 | 0.33 |

[a] Determined by 1HNMR shown in Table 8.
[b] Determined by acid-base titration
c Determined by dynamic light scattering (DLS).
[d] DY547-labelled GL3 siRNA was used to examine the EE %.

Figure 7A:
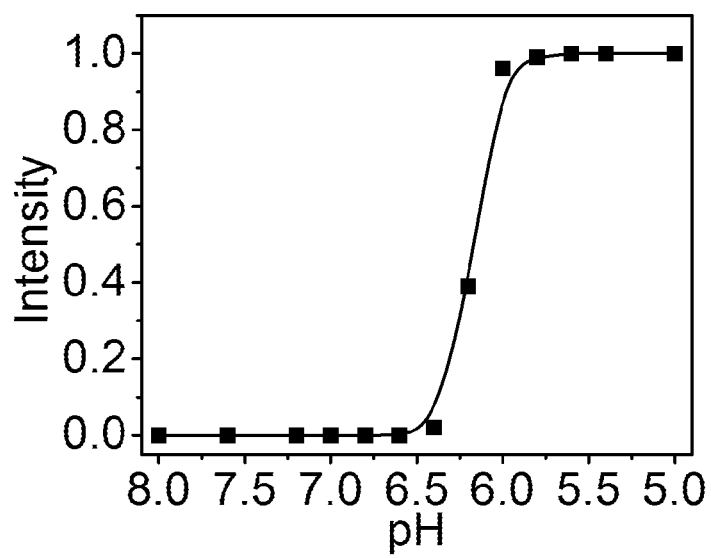
FIGS. 7A and 7B are graphs showing (FIG. 7A) normalized fluorescence intensity as a function of pH for the Cy.5.5-labelled NPs of PDPA80.
Figure 7B:
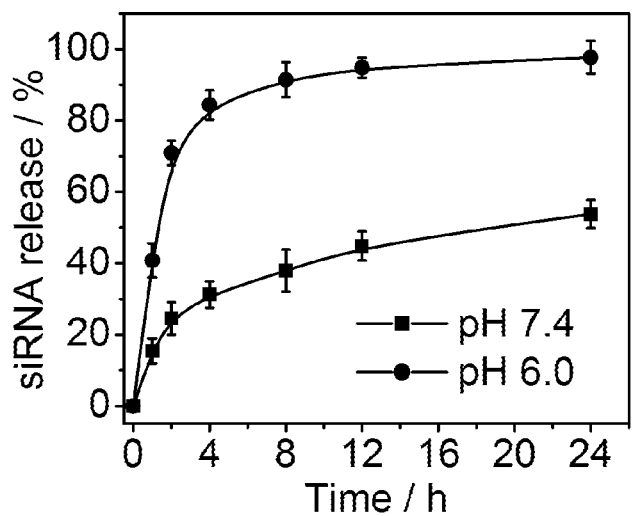

The polymer, PDPA80 (pKa 6.24, Table 10), was chosen for pH response evaluation by incorporating a near-infrared dye, Cy5.5, into its PDPA segment. Due to the quenching of the aggregated fluorophores inside the hydrophobic cores of the NPs (Wang Y et al, Nat Mater, 13, 204-212 (2014)), there is no fluorescence signal at a pH above pKa of PDPA80 (FIG. 7A). In contrast, at a pH below pKa, the protonated PDPA segment induces the disassembly of the NPs and a dramatic increase in the fluorescence signal. Measurement of the fluorescence intensity upon pH change reveals that the pH difference from 10 to 90% fluorescence activation ($\Delta pH_{10\text{-}90\%}$) is 0.34 (Wang Y et al, Nat Mater, 13, 204-212 (2014)) (FIG. 7A), which is much smaller than that of small molecule dyes (about 2 pH units) (Urano Y et al., Nat Med, 15, 104-109 (2009)), indicating the ultra-fast pH response of PDPA80. This characteristic is confirmed by transmission electron microscope (TEM). The spherical siRNA-loaded NPs could be visualized at a pH of 6.5, with an average size of 69.7 nm determined by dynamic light scattering (DLS, Table 10). If altering pH to 6.0, there are no observable NPs after 20 min incubation. With this morphological change, the NPs offer super-fast release of DY547-labelled GL3 siRNA (DY547-siRNA). Around 90% loaded siRNA has been released within 4 h at a pH of 6.0. Within the same time frame, less than 30% of the loaded siRNA is released at a pH of 7.4 (FIG. 7B).

TABLE 11

Size, zeta potential and siRNA encapsulation efficiency (EE %) of the iRGD-NPs of prepared from the mixture of Meo-PEG-b-P(DPA-co-GMA-TEPA-C14) and iRGD-PEG-b-PDPA [a]

| No. | Size (nm) [b] | Zeta potential (mv) | EE % [c] |
|---|---|---|---|
| iRGD-NPs40 | 64.2 | 3.26 | 55.1 |
| iRGD-NPs50 | 68.3 | 3.98 | 59.7 |
| iRGD-NPs60 | 82.1 | 5.69 | 66.4 |
| iRGD-NPs70 | 76.5 | 7.18 | 69.6 |
| iRGD-NPs80 | 70.7 | 5.26 | 99.8 |
| iRGD-NPs100 | 86.3 | 8.93 | 100 | a The molar ratio of Meo-PEG-b-P(DPA-co-GMA-TEPA-C14) and iRGD-PEG-b-PDPA is 9:1.
b Determined by dynamic light scattering (DLS).
c DY547-labelled GL3 siRNA was used to examine the EE %.

Figure 8A:
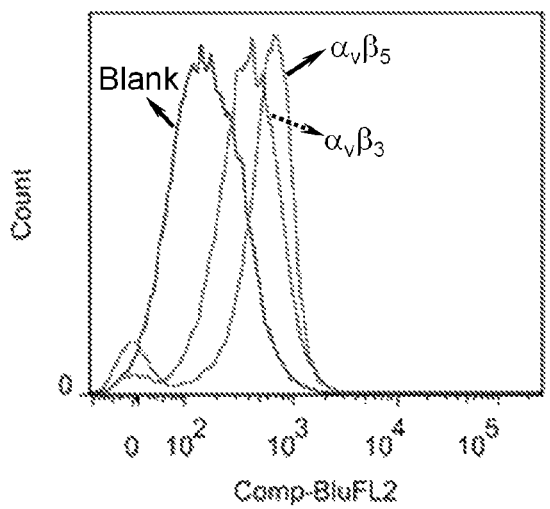
FIGS. 8A and 8B are graphs showing expression of integrins $\alpha v \beta 3$ and $\alpha v \beta 5$ on Luc-HeLa (FIG. 8A) and PC3 (FIG. 8B) cells determined by flow cytometry analysis.
Figure 8B:
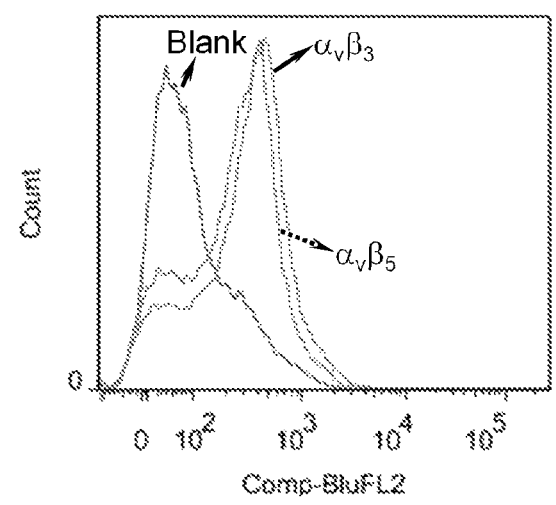
Figure 9A:
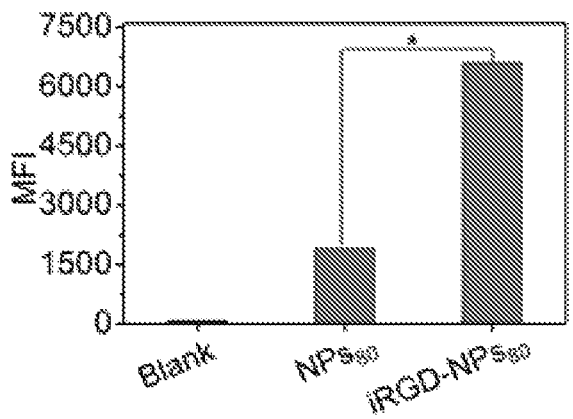
FIGS. 9A and 9B are bar graphs showing mean fluorescence intensity (MFI) of Luc-HeLa (FIG. 9A) and PC3 (FIG. 9B) cells incubated with DY547-siRNA-loaded NPs80 and iRGD-NPs80 for 4 h at a 10 nM siRNA dose. *p<0.05
Figure 9B:
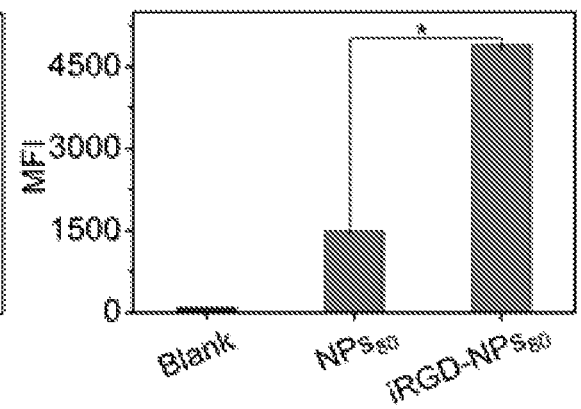

Flow cytometry was employed to evaluate its in vitro tumor-targeting ability. With the specific recognition between integrins ($\alpha v\beta 3$ and $\alpha v\beta 5$, FIGS. 8A-8B) on Luc-HeLa cells and iRGD, the uptake of DY547-siRNA-loaded iRGD-NPs80 is 3-fold higher than that of iRGD-absent NPs80 (FIGS. 9A-9B), demonstrating the excellent tumor-targeting ability of iRGD-NPs80. Endosomal escape ability was assessed by staining the endosomes with lysotracker green. Fluorescent images of Luc-HeLa cells incubated with the siRNA-loaded iRGD-NPs80 showed that a majority of the internalized siRNA-loaded NPs entered the cytoplasm after 4 h incubation, indicating the effective endosomal escape of the iRGD-NPs80.

Figure 10A:
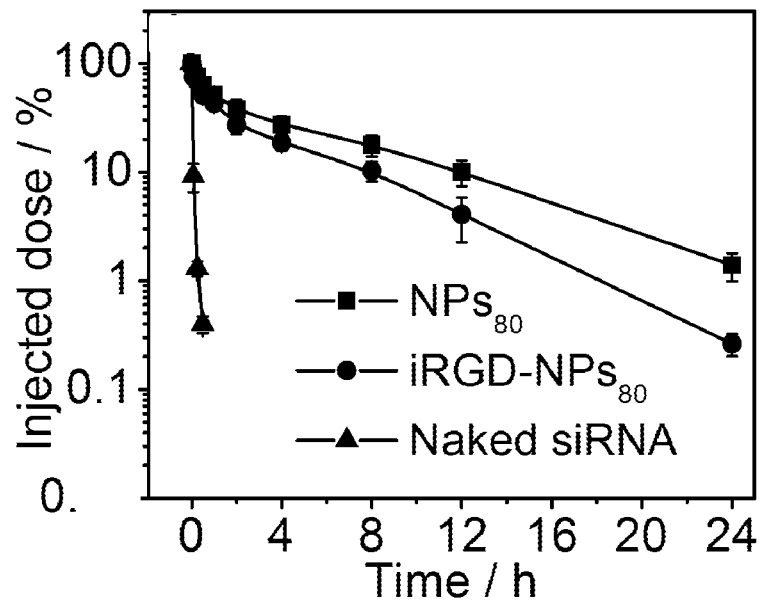
FIGS. 10A and 10B are graphs showing (FIG. 10A) pharmacokinetics of naked siRNA (▲), Nanoparticles (NPs) (■), and siRNA-loaded NPs (●)
Figure 10B:
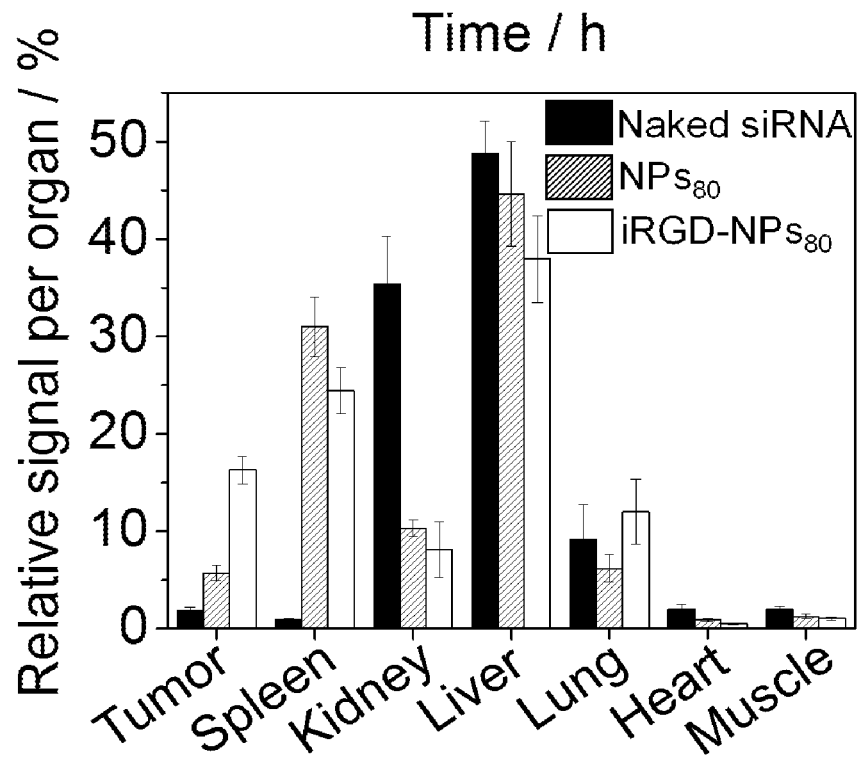

After validating the in vitro tumor-targeting ability of these ultra pH-responsive NPs, their in vivo tumor-targeting ability was assessed. Pharmacokinetics was first examined by intravenous injection of DY647-siRNA-loaded NPs. The blood half-life ($t_{1/2}$) of iRGD-NPs80 is around 3.56 h (FIG. 10A), which is far longer than that of naked siRNA ($t_{1/2}$<30 min). This prolonged blood circulation is mainly due to the protection of PEG outer layer and small particle size (Knop K et al., Angewandte Chemie International Edition, 49, 6288-6308 (2010)). The in vivo tumor-targeting ability was evaluated by intravenously injecting DY677-siRNA-loaded NPs into PC3 xenograft tumor-bearing mice. Overlaid fluorescent image of PC3 xenograft tumor-bearing mice at 24 h post-injection of naked siRNA and siRNA-loaded NPs showed that, with the iRGD-mediated tumor-targeting, the iRGD-NPs80 show a much higher tumor accumulation than that of NPs80 at 24 h post-injection. The tumors and main organs were harvested. Naked siRNA has a characteristic biodistribution, i.e., high accumulation in kidney but extremely low accumulation in tumor. With the specific recognition between iRGD and integrins $\alpha v\beta 3$ and $\alpha v\beta 5$ over-expressed on tumor cells and angiogenic tumor vasculature (Wang Y et al., Nat Mater, 13, 204-212 (2014); Sugahara K N et al., Cancer Cell, 16, 510-520 (2009)), the tumor accumulation of the iRGD-NPs80 is around 3-fold higher that of NPs80 (FIG. 10B).

To evaluate the tumor-penetrating ability of the iRGD-NPs80, the tumors were collected at 4 h post-injection of the DY677-siRNA-loaded NPs and then sectioned for immunofluorescence staining. There is nearly no naked siRNA in the tumor section. For the NPs80, the number of NPs in tumor section is very low. Additionally, most of these NPs are positioned in the tumor vessels, and only a small number reach the extravascular tumor parenchyma. In contrast, highly concentrated iRGD-NPs80 with bright red fluorescence could be visualized in the tumor section. Remarkably, a majority of these NPs can cross tumor vessels and reach the extravascular tumor parenchyma, strongly demonstrating the deep tumor-penetrating characteristic of iRGD-NPs80.

In summary, an ultra pH-responsive and tumor-penetrating nanoplatform for targeted systemic gene delivery has been developed. The in vitro and in vivo results demonstrate that this polymeric NP has a long blood circulation, and can efficiently target tumor and penetrate tumor parenchyma.

Example 3: Ultra pH-Responsive, Membrane-Penetrating, and Prostate Cancer Specific Polymeric Nanoparticles Methods and Materials Materials Methoxyl-polyethylene glycol (Meo-PEG113-OH) and hydroxyl polyethylene glycol carboxylic acid (HO-PEG113-COOH) were purchased from JenKem Technology and used as received. Oligoarginine (NH2-Rn—CONH2, n=6, 8, 10, 20, 30) was provided by MIT Biopolymer facility. Allyl protected S,S-2-[3-[5-amino-1-carboxypentyl]-ureido]-pentanedioic acid (ACUPA) was kindly provided by BIND Therapeutics as a gift. 2-(Diisopropyl amino) ethyl methacrylate (DPA-MA) and glycidyl methacrylate (GMA) were provided by Sigma-Aldrich and passed over an alumina column before use in order to remove the hydroquinone inhibitors. □-Bromoisobutyryl bromide, N,N'-dimethylformamide (DMF), triethylamine (TEA), N,N,N',N',N'-pentamethyldiethylenetriamine (PMDETA), copper (I) bromide (CuBr), tetraethylenepentamine (TEPA), isopropyl alcohol, p-toluenesulfinate tetrahydrate (PTSF), tetrakis(triphenylphosphine) palladium (Pd(PPh3)4) and dichloromethane (DCM) were acquired from Sigma-Aldrich and used directly. Lipofectamine 2000 (Lipo2K) was purchased from Invitrogen. Steady-Glo luciferase assay system was provided by Promega. GL3, fluorescent dye (DY547, DY647 and Cy5.5) labeled GL3 and PHB1 siRNAs were acquired from Dharmacon. The siRNA sequences are as follows: GL3 siRNA, 5'-CUU ACG CUG AGU ACU UCG AdTdT-3' (SEQ ID NO: 4) (sense) and 5'-UCG AAG UAC UCA GCG UAA GdTdT-3' (SEQ ID NO: 5) (antisense). The fluorescent dyes DY-547 and DY-647 were labeled at the 5'-end of the sense strand of GL3 siRNA. Cy5.5 was labeled at the 5'-end of both the sense and antisense strands of GL3 siRNA. HeLa cells stably expressing firefly and Renilla luciferase (Luc-HeLa) were obtained from Alnylam Pharmaceuticals, Inc. The cells were incubated in RPMI 1640 medium (Invitrogen) with 10% fetal bovine serum (FBS, Sigma-Aldrich). All other reagents and solvents are of analytical grade and used without further purification.

Synthesis of Meo-PEG-Br and Br-PEG-COOH

Meo-PEG113-OH (8 g, 1.6 mmol) and TEA (1.3 mL, 9.6 mmol) were dissolved in 250 mL of DCM. In an ice-salt bath, □□ bromoisobutyryl bromide (1 mL, 8 mmol) dissolved in 10 mL of DCM was added dropwise. After stirring for 24 h, the mixture was washed with 1 M NaOH (3×50 mL), 1 M HCl (3×50 mL), and deionized water (3×50 mL). After drying over anhydrous MgSO4, the solution was concentrated, and cold ether was added to precipitate the product. After re-precipitating thrice, the product was collected as white powder after drying under vacuum. The synthesis of Br-PEG-COOH was carried out according to a method similar to that described above, by changing Meo-PEG113-OH with HO-PEG113-COOH. The synthesis scheme of Meo-PEG-Br is shown below.

Synthesis of methoxyl-polyethylene glycol-b-poly (2-(diisopropylamino) ethylmethacrylate-co-glycidyl methacrylate) (Meo-PEG-b-P(DPA-co-GMA))

Meo-PEG-b-P(DPA-co-GMA) copolymer was synthesized by atom transfer radical polymerization (ATRP). DPA-MA (2.6 g, 12 mmol), GMA (0.07 g, 0.45 mmol), Meo-PEG-Br (0.75 g, 0.15 mmol), and PMDETA (31.5 μL, 0.15 mmol) were added to a polymerization tube. DMF (3 mL) and 2-propanol (3 mL) were then added to dissolve the monomer and initiator. After three cycles of freeze-pump-thaw to remove oxygen, CuBr (21.6 mg, 0.15 mmol) was added under nitrogen atmosphere and the polymerization tube was sealed under vacuum. After polymerization at 40° C. for 24 h, tetrahydrofuran (THF) was added to dilute the product, which was then passed through a neutral Al2O3 column to remove the catalyst. The resulting THE solution was concentrated and the residue was dialyzed against THE, followed by deionized water. The expected copolymer was collected as a white powder after freeze-drying under vacuum. The synthesis scheme is shown below.

Synthesis of Meo-PEG-b-P(DPA-co-GMA-Rn)

Meo-PEG-b-P(DPA-co-GMA-Rn) was synthesized via the ring opening reaction between the amino group of NH2-Rn—CONH2 and the epoxy group of the GMA repeating unit. In brief, Meo-PEG-b-P(DPA-co-GMA) (1 g) dissolved in DMF (15 mL) was added dropwise to the DMF solution (10 mL) of NH2-Rn—CONH2 (10-fold molar excess relative to the GMA repeating unit). After reaction at 60° C. for 7 h, the mixture was transferred to a dialysis tube and then dialyzed against deionized water. The Meo-PEG-b-P(DPA-co-GMA-Rn) was finally collected as a white powder after freeze-drying under vacuum.

The synthesis route of Meo-PEG-b-P(DPA-co-GMA-Rn) is shown below.

Scheme 5: Synthesis of Meo-PEG-b-P(DPA-co-GMA-Rn)

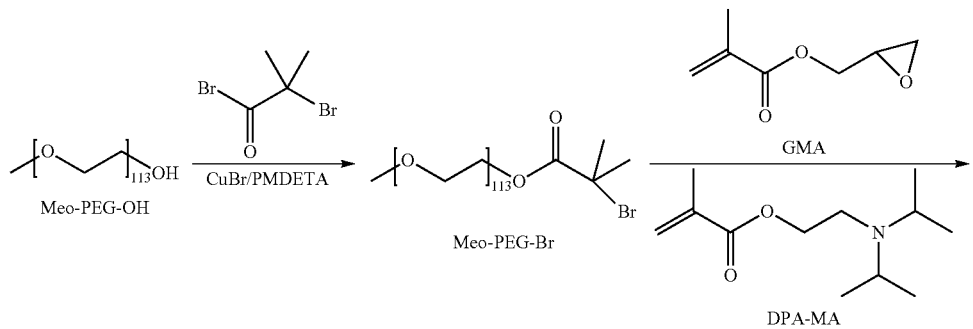

-continued

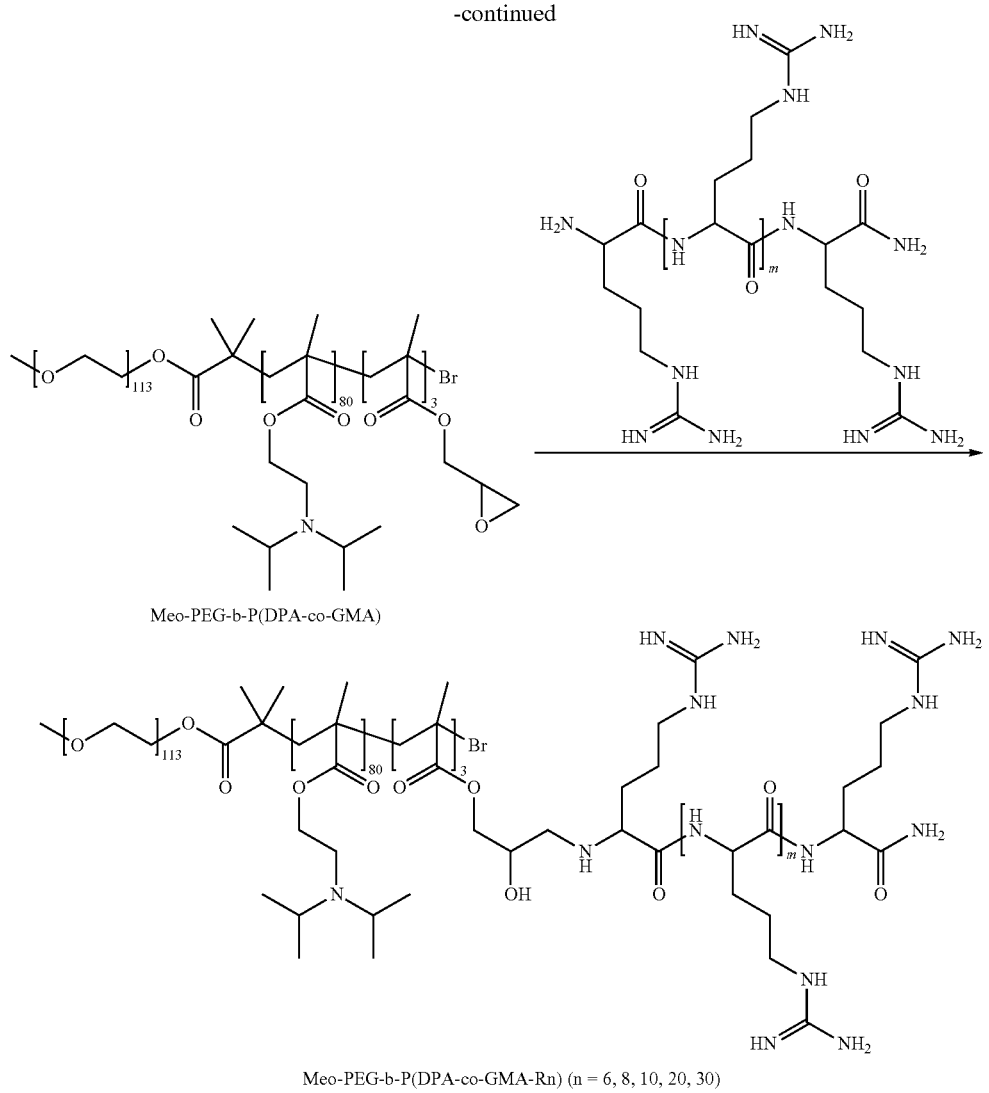

Meo-PEG-b-P(DPA-co-GMA)

Meo-PEG-b-P(DPA-co-GMA-Rn) (n = 6, 8, 10, 20, 30)

Synthesis of Meo-PEG-b-P(DPA-co-GMA-TEPA)

Meo-PEG-b-P(DPA-co-GMA-TEPA) was synthesized via the ring opening reaction between TEPA and the epoxy group of the GMA repeating unit. In brief, Meo-PEG-b-P(DPA-co-GMA) (1 g) dissolved in DMF (15 mL) was added dropwise to the DMF solution (5 mL) of TEPA (30-fold molar excess relative to the GMA repeating unit). After reacting at 60° C. for 7 h, the mixture was transferred to a dialysis tube and then dialyzed against deionized water. The Meo-PEG-b-P(DPA-co-GMA-TEPA) was finally collected as a white powder after freeze-drying under vacuum. The synthesis route of Meo-PEG-b-P(DPA-co-GMA-TEPA) is shown below.

Scheme 6: Synthesis of Meo-PEG-b-P(DPA-co-GMA-TEPA)

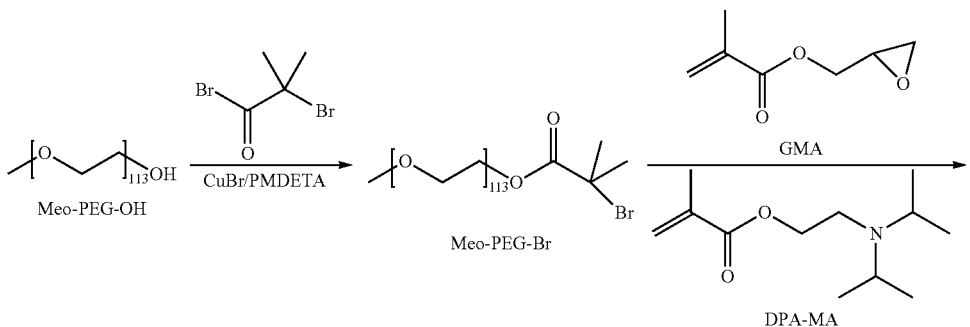

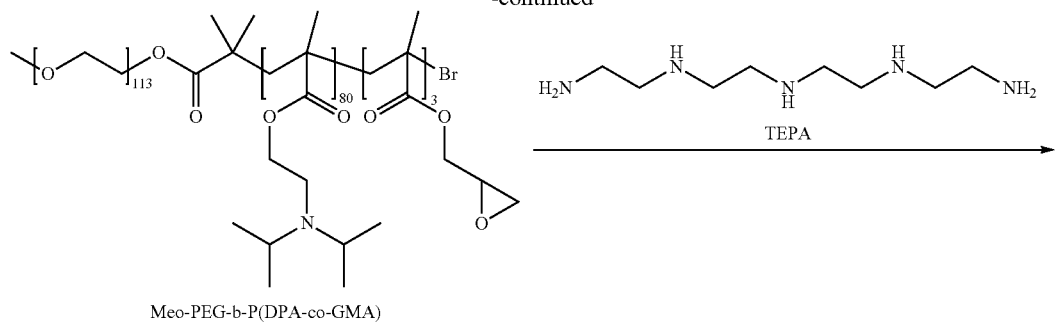

Meo-PEG-b-P(DPA-co-GMA)

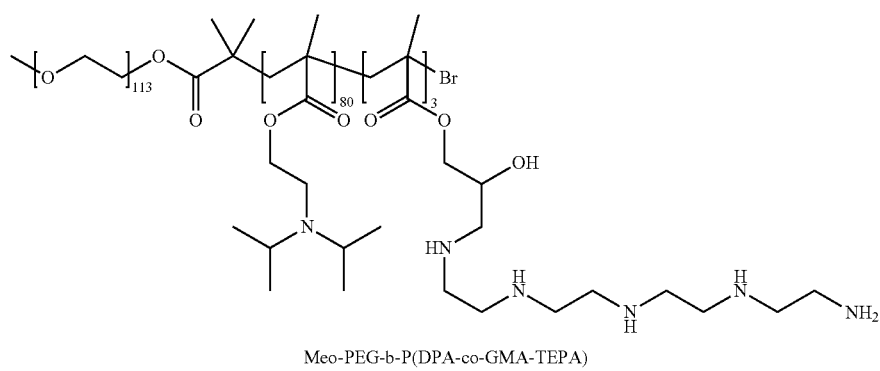

Meo-PEG-b-P(DPA-co-GMA-TEPA)

Synthesis of Meo-PEG-b-P(DPA-co-GMA-TEPA-Cy5.5)

Meo-PEG-b-P(DPA-co-GMA-TEPA) (0.2 g) and Cy5.5 NHS ester (1.5-fold molar excess relative to the TEPA repeating unit) were well dissolved in 5 mL of THF. After constantly stirring in dark for 48 h, the solution was dialyzed against deionized water and the product was collected after freeze-drying.

The synthesis of Meo-PEG-b-P(DPA-co-GMA-TEPA-Cy5.5) is shown below.

Scheme 7: Synthesis of Meo-PEG-b-P(DPA-co-GMA-TEPA-Cy5.5)

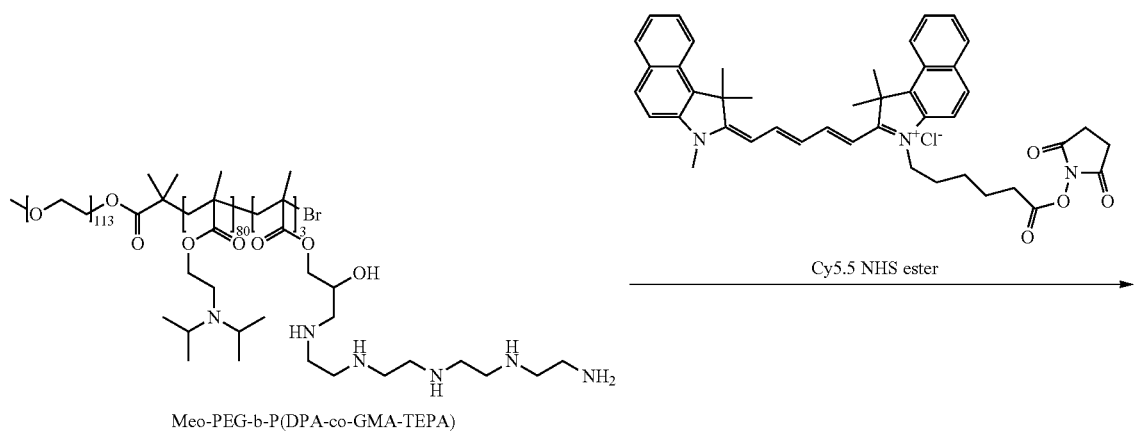

Meo-PEG-b-P(DPA-co-GMA-TEPA)

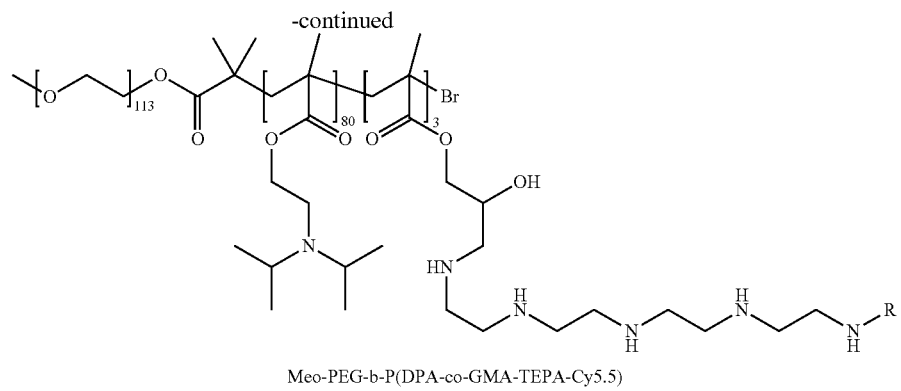

Meo-PEG-b-P(DPA-co-GMA-TEPA-Cy5.5)

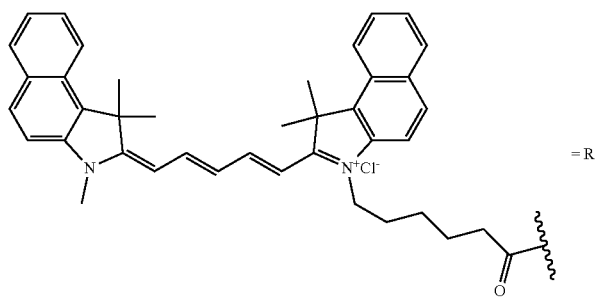

= R

Synthesis of HOOC-PEG-b-PDPA

HOOC-PEG-b-PDPA copolymers were also synthesized by the ATRP method. For example, DPA-MA (1.73 g, 8 mmol), Br-PEG-COOH (0.5 g, 0.1 mmol), and PMDETA (21 μL, 0.1 mmol) were added to a polymerization tube. Subsequently, DMF (2 mL) and 2-propanol (2 mL) were added to dissolve the monomer and initiator. After three cycles of freeze-pump-thaw to remove oxygen, CuBr (14.4 mg, 0.1 mmol) was added under nitrogen atmosphere and the polymerization tube was sealed under vacuum. After polymerization at 40° C. for 24 h, tetrahydrofuran (THF) was added to dilute the product, which was then passed through a neutral $Al_2O_3$ column to remove the catalyst. The obtained THF solution was concentrated and the residue was dialyzed against deionized water. The HOOC-PEG-b-PDPA was obtained as a white powder after freeze-drying under vacuum. The synthesis route of HOOC-PEG-b-PDPA is shown below.

Synthesis of Allyl-protected ACUPA-PEG-b-PDPA

HOOC-PEG-b-PDPA copolymer (1 g), allyl protected ACUPA (5-fold molar excess relative to the terminal carboxylic acid group), EDC.HCl (3-fold molar excess relative to the terminal carboxylic acid group), and NHS (3-fold molar excess relative to the terminal carboxylic acid group) were well dissolved in 15 mL of THF. The mixture was stirred at room temperature for 48 h. The solution was subsequently dialyzed against DMF for 48 h followed by deionized water. The expected allyl-protected ACUPA-PEG-PDPA was collected after freeze-drying. The synthesis route of Allyl-protected ACUPA-PEG-b-PDPA is shown below.

Synthesis of ACUPA-PEG-b-PDPA

Allyl-protected ACUPA-PEG-PDPA (1 g) was well dissolved in 15 mL of THF and Pd(PPh3)$_4$ (42 mg) was added. Under stirring, PTSF (155 mg) dissolved in 2.5 mL of methanol was added to the suspension of Allyl protected ACUPA-PEG-PDPA and Pd(PPh3)$_4$. After reacting in dark for 2 h, the suspension was transferred to a dialysis tube (MWCO 3500) and dialyzed against toluene for 48 h. Thereafter, the solution was removed by rotary evaporation and the residue was dissolved in 15 mL of THF. After dialyzing against deionized water for 48 h, the ACUPA-PEG-PDPA was collected through freeze-drying.

The synthesis route of ACUPA-PEG-b-PDPA is shown below.

Scheme 8: Synthesis of ACUPA-PEG-b-PDPA

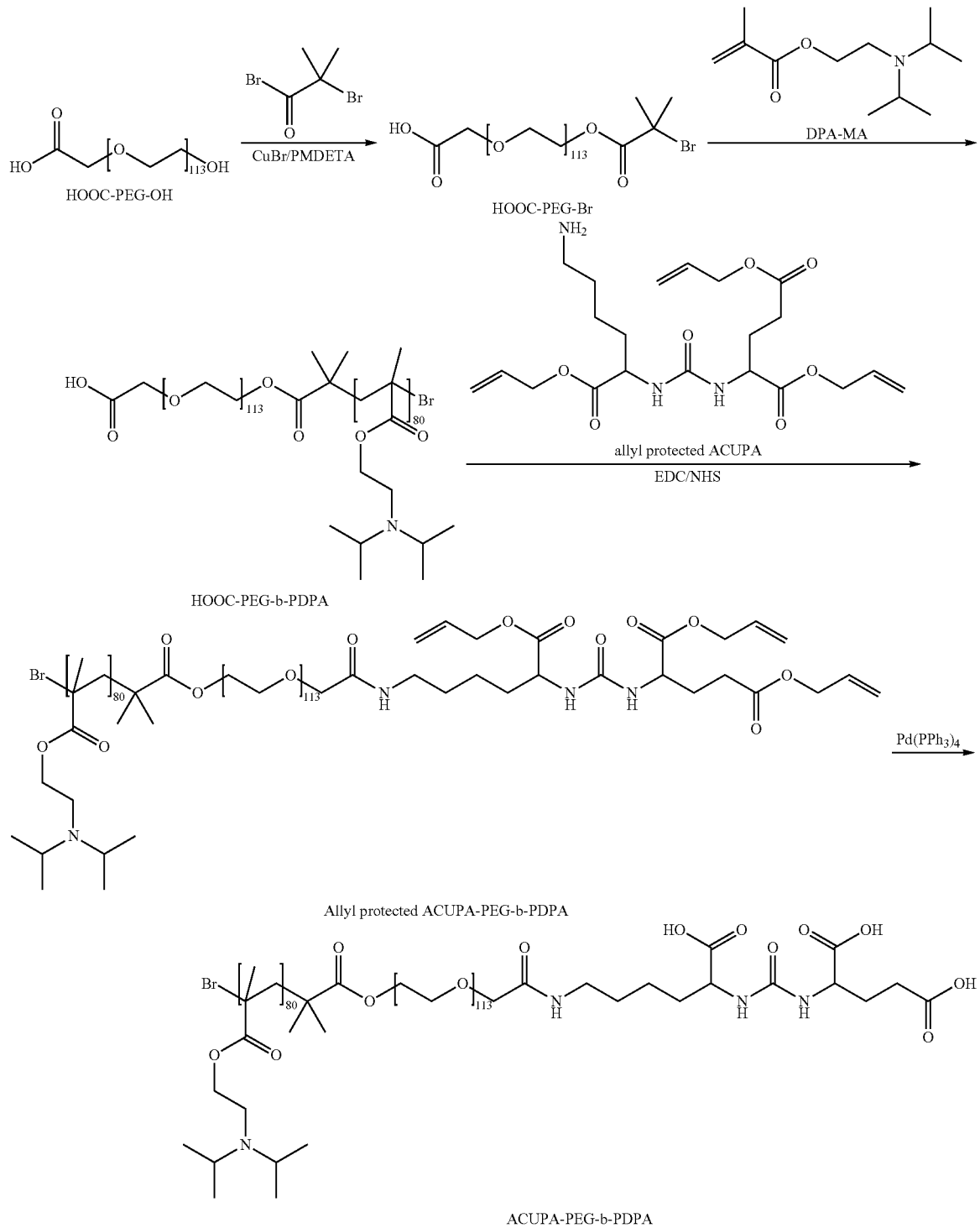

Gel Permeation Chromatography (GPC)

Number- and weight-average molecular weights (Mn and Mw, respectively) of the polymers were determined by a gel permeation chromatographic system equipped with a Waters 2690D separations module and a Waters 2410 refractive index detector. THF was used as the eluent at a flow rate of 0.3 mL/min. Waters millennium module software was used to calculate molecular weight on the basis of a universal calibration curve generated by polystyrene standard of narrow molecular weight distribution.

$^1$H Nuclear Magnetic Resonance ($^1$HNMR)

The 1HNMR spectra of the polymers were recorded on a Mercury VX-300 spectrometer at 400 MHZ (Varian, USA), using CDCl3 as a solvent and TMS as an internal standard.

Acid-Base Titration

Meo-PEG-b-P(DPA-co-GMA-Rn) was dispersed in deionized water, and a concentrated HCl aqueous solution was added until the copolymer was completely dissolved (1 mg/mL). Subsequently, 1 M NaOH aqueous solution was added in 1-5 µL increments. After each addition, the solution was constantly stirred for 3 min, and the solution pH was measured using a pH meter. The pKa of the copolymer was determined as the pH at which 50% of the copolymer turns ionizes.

Preparation and Characterization of Nanoparticles (NPs)

Meo-PEG-b-P(DPA-co-GMA-Rn) was dissolved in THF to form a homogenous solution with a concentration of 4 mg/mL. Subsequently, a certain volume of this THE solution was taken and mixed with 1 nmol siRNA (0.1 nmol/µL aqueous solution) in an N/P molar ratio of 80:1. Under vigorously stirring (1000 rpm), the mixture was added dropwise to 4 mL of deionized water. The NP dispersion formed was transferred to an ultrafiltration device (EMD Millipore, MWCO 100 K) and centrifuged to remove the organic solvent and free compounds. After washing with PBS (pH 7.4) solution (3×5 mL), the siRNA loaded NPs were dispersed in 1 mL of phosphate buffered saline (PBS, pH 7.4) solution. Size and zeta potential were determined by dynamic light scattering (DLS, Brookhaven Instruments Corporation). The morphology of NPs was visualized on a Tecnai G2 Spirit BioTWIN transmission electron microscope (TEM). Before observation, the sample was stained with 1% uranyl acetate and dried under air. To determine the siRNA encapsulation efficiency, DY547-labelled GL3 siRNA (DY547-siRNA) loaded NPs were prepared according to the method described above. A small volume (50 µL) of the NP solution was withdrawn and mixed with 20-fold DMSO. The fluorescence intensity of DY547-siRNA was measured using a Synergy HT multi-mode microplate reader (BioTek Instruments) and compared to the free DY-547 labelled GL3 siRNA solution (1 nmol/mL PBS solution).

To prepare the ACUPA-NPs, Meo-PEG-b-P(DPA-co-GMA-Rn) (4 mg/mL in THF) was mixed with 1 nmol siRNA (0.1 nmol/µL aqueous solution) in a N/P molar ratio of 80:1. Then ACUPA-PEG-b-PDPA (4 mg/mL in THF, 10 mol % compared to Meo-PEG-b-P(DPA-co-GMA-Rn)) was added, and the mixture was added dropwise to 4 mL of deionized water. The ACUPA-NPs were purified by an ultrafiltration device (EMD Millipore, MWCO 100 K) and finally dispersed in 1 mL of PBS. The siRNA encapsulation efficiency was examined by replacing the siRNA with DY-547 labelled GL3 siRNA.

Evaluation of pH Sensitivity

The THF solution of Meo-PEG-b-P(DPA-co-GMA-Rn) (4 mg/mL) and Meo-PEG-b-P(DPA-co-GMA-TEPA-Cy5.5) (4 mg/mL) was mixed in a volume ratio of 8:2. Under vigorously stirring (1000 rpm), 0.2 mL of the mixture was added dropwise to 2 mL of deionized water. After collection and purification by an ultrafiltration device (EMD Millipore, MWCO 100 kDa), the NPs formed were dispersed in 1 mL of deionized water. Subsequently, 1 M NaOH or HCl was added in 1-5 L increments, and the fluorescence intensity of the NPs was measured on a Synergy HT multi-mode microplate reader. The normalized fluorescence intensity (NFI) vs. pH profile was used to quantitatively assess the pH responsiveness. NFI is calculated as follows:

$$NFI = (F - F\min)/(F\max - F\min)$$

where F is the fluorescence intensity of the NPs at any given pH value and Fmax and Fmin are the maximal and minimal fluorescence intensity of the NPs, respectively.

In Vitro siRNA Release

DY547-siRNA-loaded NPs were prepared as described above. Subsequently, the NPs were dispersed in 1 mL of PBS (pH 7.4) and then transferred to a Float-a-lyzer G2 dialysis device (MWCO 100 kDa, Spectrum) that was immersed in PBS (pH 7.4) at 37° C. At a predetermined interval, 5 µL of the NP solution was withdrawn and mixed with 20-fold DMSO. The fluorescence intensity of DY547-siRNA was determined by Synergy HT multi-mode microplate reader.

Cell Culture

Human cervical cancer cell line with the expression of luciferase (Luc-HeLa) and prostate cancer (PCa) cell lines (LNCaP, PC3, DU145, 22RV1) were incubated in RPMI 1640 medium with 10% FBS at 37° C. in a humidified atmosphere containing 5% $CO_2$.

Determination of the Expression of Prostate Specific Membrane Antigen (PSMA)

The PCa cell lines were seeded in 6-well plates (50,000 cells per well) and incubated in 1 mL of RPMI 1640 medium containing 10% FBS for 24 h. Thereafter, 10 µL of PE-conjugated anti-human PSMA antibody (BioLegend) was added, and the cells were allowed to incubate for another 4 h. After removing the medium and washing with PBS (pH 7.4) solution thrice, the cells were collected for flow cytometry quantitative analysis (DXP11 Analyzer).

Evaluation of Endosomal Escape

Luc-HeLa cells (20,000 cells) were seeded in discs and incubated in 1 mL of RPMI 1640 medium containing 10% FBS for 24 h. Subsequently, the DY547-siRNA-loaded NPs were added, and the cells were allowed to incubate for 1 or 2 h. After removing the medium and subsequently washing with PBS (pH 7.4) solution thrice, the endosomes and nuclei were stained with lysotracker green and Hoechst 33342, respectively. The cells were then viewed under a FV1000 confocal laser scanning microscope (CLSM, Olympus).

Flow Cytometry

Luc-HeLa and PCa cell lines (LNCaP, PC3, DU145) were seeded in 6-well plates (50,000 cells per well) and incubated in 1 mL of RPMI 1640 medium containing 10% FBS for 24 h. Subsequently, the DY547-siRNA-loaded NPs or ACUPA-NPs were added, and the cells were allowed to incubate for another 4 h. After removing the medium and subsequently washing with PBS (pH 7.4) solution thrice, the cells were collected for flow cytometry quantitative analysis.

Animals

Healthy male BALB/c mice (4-5 weeks old) were purchased from Charles River Laboratories. All in vivo studies were performed in accordance with National Institutes of Health animal care guidelines and in strict pathogen-free conditions in the animal facility of Brigham and Women's Hospital. Animal protocol was approved by the Institutional Animal Care and Use Committees on animal care (Harvard Medical School).

LNCaP Xenograft Tumor Model

The tumor model was constructed by subcutaneous injection with 200 µL of LNCaP cell suspension (a mixture of RPMI 1640 medium and Matrigel in 1:1 volume ratio) with a density of $3 \times 10^7$ cells/mL into the back region of healthy male BALB/c nude mice. When the volume of the PC3 tumor xenograft reached ~50 $mm^3$, the mice were used for the following in vivo experiments.

Pharmacokinetics Study

Healthy male BALB/c mice were randomly divided into three groups (n=3) and given an intravenous injection of either (i) free DY647-labelled GL3 siRNA (DY647-siRNA), (ii) DY647-siRNA-loaded NPs, or (iii) DY647-siRNA-loaded ACUPA-NPs at a 650 µg/kg siRNA dose. At predetermined time intervals, orbital vein blood (20 µL) was withdrawn using a tube containing heparin, and the wound was pressed for several seconds to stop the bleeding. The fluorescence intensity of DY-647 labelled siRNA in the blood was determined using a microplate reader. The blood circulation half-life (t1/2) was calculated by first-order decay fit.

Biodistribution

LNCaP tumor-bearing male BALB/c nude mice were randomly divided into four groups (n=3) and given an intravenous injection of either (i) free Cy5.5-labelled GL3 siRNA (Cy5.5-siRNA), (ii) Cy5.5-siRNA-loaded NPs, (iii) Cy5.5-siRNA-loaded ACUPA-NPs or (iv) PSMA antibody (5 mg/kg dose) 15 min followed by Cy5.5-siRNA loaded ACUPA-NPs at a 650 µg/kg siRNA dose. Twenty-four hours after the injection, the mice were imaged using the Maestro 2 In-Vivo Imaging System (Cri Inc). Main organs and tumors were then harvested and imaged. To quantify the accumulation of NPs in tumors and organs, the fluorescence intensity of each tissue was quantified by Image-J.

Results

A high loading, biosafe and long-circulating siRNA delivery nanoplatform that shows high prostate specificity and excellent endosomal escape capability for PCa therapy is developed. To construct this robust nanoplatform, a library of ultra pH-responsive PEGylated polymers were developed, containing membrane-penetrating oligoarginine grafts and an S,S-2-[3-[5-amino-1-carboxypentyl]-ureido]-pentanedioic acid (ACUPA) terminus. ACUPA is a small molecule target ligand that can specifically bind to prostate specific membrane antigen (PSMA), which is abundantly expressed in PCa, in both its metastatic form and the hormone-refractory form (Israeli, R et al., *Cancer Research*, 53, (2), 227-230 (1993); Murphy, G P et al., *Cancer*, 83, (11), 2259-2269 (1998); Dhar, S et al., *Proceedings of the National Academy of Sciences*, 105, (45), 17356-17361 (2008)). The resulting polymeric nanoplatform is expected to have the following unique features (FIGS. 11A-11B): i) the surface-encoded ACUPA moieties endow the NPs with high PCa specificity and selectivity; ii) the hydrophilic PEG shells allow the NPs to escape immunological recognition, thus improving blood circulation (Knop, K et al., *Angewandte Chemie International Edition*, 49, (36), 6288-6308 (2010); Guo, X et al., *Accounts of Chemical Research*, 45, 971-979 (2012); Bertrand, N et al., *Advanced Drug Delivery Reviews*, 66, 2-25 (2014); iii) a small population of cationic membrane-penetrating oligoarginine grafts randomly dispersed in the hydrophobic poly(2-(diisopropylamino) ethylmethacrylate) (PDPA) segment can strongly entrap a high amount of siRNA into the hydrophobic cores of the NPs; iv) the rapid protonation of the ultra pH-responsive PDPA segment with a pKa close to endosomal pH (6.0-6.5) causes the swelling of endosomes via the "proton sponge" effect (Yu, H et al., *ACS Nano*, 5, 9246-9255 (2011); Zhou, K et al., *Angewandte Chemie International Edition*, 50, 6109-6114 (2011)), which works alongside the membrane-penetrating oligoarginine grafts to induce efficient and fast release of siRNA in cytoplasm to inhibit tumor growth (Chen, J X et al., *ACS Applied Materials & Interfaces*, 6, (1), 593-598 (2014); Chen, J X et al., *Biomaterials*, 32, (6), 1678-1684 (2011); Lim, Y B et al., *M. Angewandte Chemie International Edition*, 46, 9011-9014 (2007).

Atom-transfer radical polymerization (ATRP) was employed to synthesize the PEGlyated polymer, methoxyl-polyethylene glycol-b-poly(2-(diisopropylamino) ethyl-methacrylate-co-glycidyl methacrylate) (Meo-PEG-b-P (DPA-co-GMA)). The epoxy group was subsequently subjected to attack by oligoarginine (Rn, n=6, 8, 10, 20, 30) to endow the resulting polymer (Meo-PEG-b-P(DPA-co-GMA-Rn) with siRNA loading and endosomal membrane-penetrating abilities. The PCa-specific PEGylated polymer, ACUPA-PEG-b-PDPA was also prepared by ATRP, followed by conjugation with ACUPA.

Figure 12A:
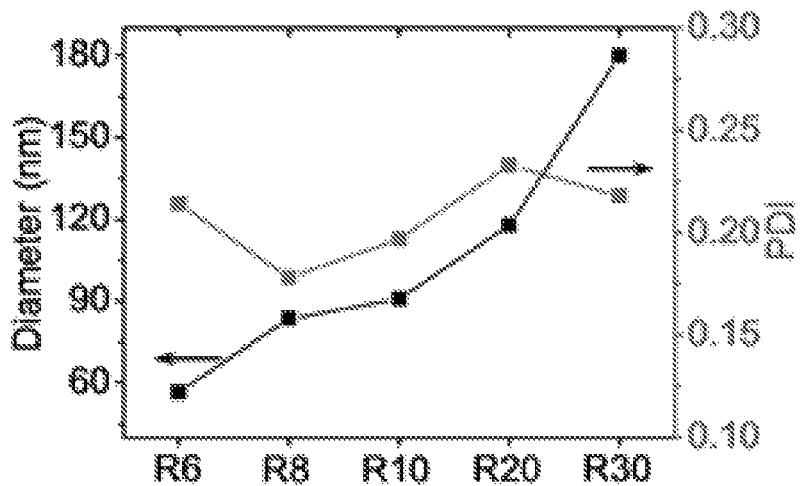
FIGS. 12A, 12B and 12C are graphs showing (FIG. 12A) size and polydispersity (PDI) of GL3 siRNA loaded NPs of Meo-PEG-b-P(DPA-co-GMA-Rn)
Figure 12B:
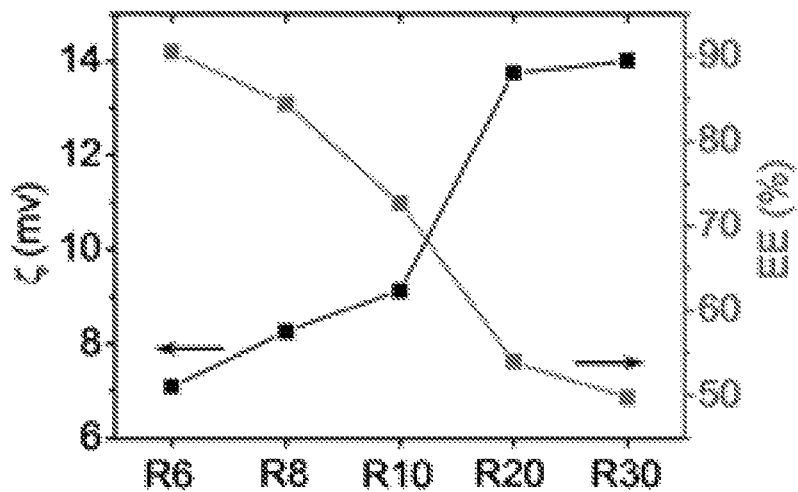

The length of the oligoarginine grafts was varied to adjust the siRNA loading ability and physiochemical properties of the NPs. The siRNA-loaded NPs were prepared by mixing siRNA aqueous solution with the tetrahydrofuran (THF) solution of Meo-PEG-b-P(DPA-co-GMA-Rn) at a N/P molar ratio of 80:1. The amphiphilic nature of the polymers induces self-assembly into NPs with siRNA entrapped in the hydrophobic cores. As the number of arginine residues increases from 6 to 30, the size of the resulting NPs increases from 56.6 to 179.9 nm (Table 12, FIG. 12A), but siRNA encapsulation efficiency (EE %) decreases from 90.6% to 49.7% (Table 12, FIG. 12B). One possible reason is that enhancing the whole hydrophilicity of the amphiphilic polymers by increasing the length of the oligoarginine grafts leads to the formation of looser NPs with weaker siRNA loading ability. This also results in an increased zeta potential. Notably, there is no obvious change in the EE % or size of the NPs made with the mixture of Meo-PEG-b-P(DPA-co-GMA-Rn) (90 mol %) and ACUPA-PEG-b-PDPA (10 mol %) (Table 13).

TABLE 12

Size, zeta potential, siRNA encapsulation efficiency (EE %), and pH responsiveness of the NPs prepared from Meo-PEG-b-P(DPA-co-GMA-Rn)

| No. | Size (nm)[a] | Zeta potential (mv) | EE %[b] | pKa[c] | $\Delta pH_{10\text{-}90\%}$ |
|---|---|---|---|---|---|
| NPsR6 | 56.6 | 7.09 | 90.6 | 6.24 | 0.32 |
| NPsR8 | 83.4 | 8.26 | 84.4 | 6.27 | 0.36 |
| NPsR10 | 90.8 | 9.13 | 72.7 | 6.31 | 0.39 |
| NPsR20 | 117.8 | 13.74 | 54 | 6.42 | 0.46 |
| NPsR30 | 179.9 | 14.01 | 49.7 | 6.49 | 0.51 |

[a] Determined by dynamic light scattering (DLS).
[b] DY-547-labelled GL3 siRNA was used to examine the EE %.
[c] Corresponding to the pKa of the polymer determined by acid-base titration.

TABLE 13

Size, zeta potential and siRNA encapsulation efficiency (EE %) of the iRGD-NPs of prepared from the mixture of Meo-PEG-b-P(DPA-co-GMA-Rn) and ACUPA-PEG-b-PDPA[a]

| No. | Size (nm)[b] | Zeta potential (mv) | EE %[c] |
|---|---|---|---|
| ACUPA-NPsR6 | 58.7 | 6.97 | 92.1 |
| ACUPA-NPsR8 | 85.9 | 7.92 | 86.9 |
| ACUPA-NPsR10 | 93.6 | 8.87 | 76.1 |
| ACUPA-NPsR20 | 119.4 | 13.46 | 58.2 |
| ACUPA-NPsR30 | 184.1 | 13.78 | 51.8 |

[a] The molar ratio of Meo-PEG-b-P(DPA-co-GMA-Rn) and ACUPA-PEG-b-PDPA is 9:1.
[b] Determined by dynamic light scattering (DLS).
[c] DY-547-labelled GL3 siRNA was used to examine the EE %.

Figure 12C:
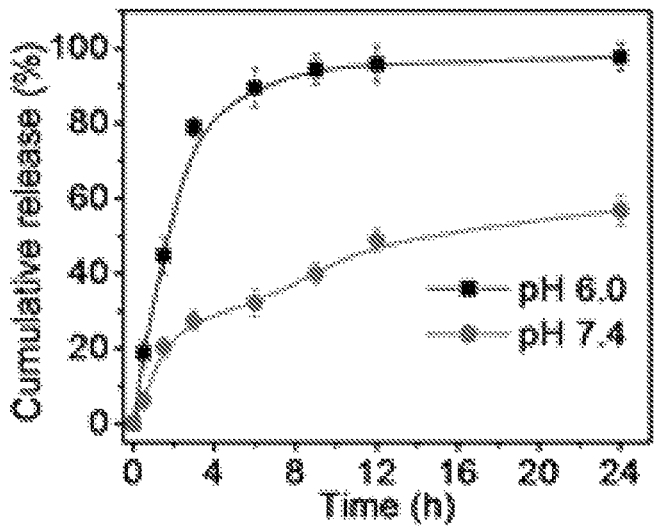
Figure 13:
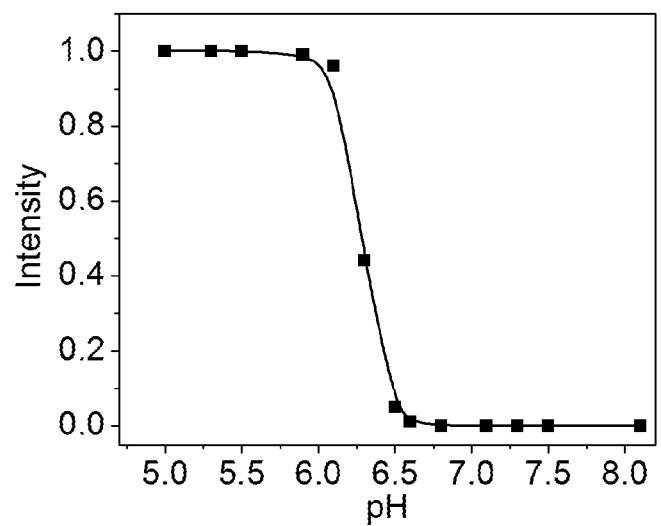
FIG. 13 is a graph showing normalized fluorescence intensity as a function of pH for the Cy.5.5-labelled NPs R10.

The amphiphilic polymer, Meo-PEG-b-P(DPA-co-GMA-R10) (pKa 6.31) was used to investigate its pH sensitivity. The transmission electron microscope (TEM) image of the GL3 siRNA-loaded NPs of Meo-PEG-b-P(DPA-co-GMA-R10) incubated in PBS buffer at a pH of 6.5 indicated that this amphiphilic copolymer was able to assemble with siRNA to form spherical NPs at a pH of 6.5, with an average size of 90.8 nm determined by dynamic light scattering (DLS). When the solution pH decreases to 6.0, there are no observable NPs after 20 min incubation using TEM imaging, indicating a very fast pH sensitivity. To further evaluate the pH sensitivity, a near-infrared dye, Cy5.5-conjugated PEGylated polymer, was mixed with Meo-PEG-b-P(DPA-co-GMA-R10) to prepare the NPs with the aggregation of fluorophores inside the hydrophobic cores. Fluorescent images of the Cy.5.5 labelled NPs of Meo-PEG-b-P(DPA-co-GMA-R10) at different pH indicated that, with the quenching of the fluorophores, fluorescence signal is absent at a pH above pKa. However, protonation of the PDPA segment at pH below pKa causes the NPs to disassemble, leading to a dramatic increase in the fluorescence signal. Measuring the fluorescence intensity upon the pH change reveals that the pH difference from 10 to 90% fluorescence activation ($\Delta pH_{10-90\%}$) is 0.39 (FIG. 13) (Wang, Y et al., *Nat Mater*, 13, (2), 204-212 (2014)). This value is much smaller than that of small molecule dyes (about 2 pH units) with the same degree of fluorescence intensity change (Urano, Y et al., *Nat Med*, 15, (1), 104-109 (2009)), demonstrating the ultra-fast pH response rate of Meo-PEG-b-P(DPA-co-GMA-R10). This characteristic allows the NPs of this polymer to show a super-fast release of DY547-labelled GL3 siRNA (DY547-siRNA) at a pH below pKa. Around 80% of the loaded siRNA has been released within 3 h at a pH of 6.0. Within the same time frame, less than 30% of the loaded siRNA is released at a pH of 7.4 (FIG. 12C).

To validate the ultra pH-sensitivity of the NPs, their endosomal escape ability was examined by using lysotracker green the endosomes. The confocal laser scanning microscope (CLSM) images of Luc-HeLa cells incubated with the DY547-siRN-loaded NPsR10 for 2 h showed that a majority of the internalized siRNA-loaded NPs enter the cytoplasm after 2 h incubation, clearly demonstrating the excellent endosomal escape ability of the NPs.

Figure 14:
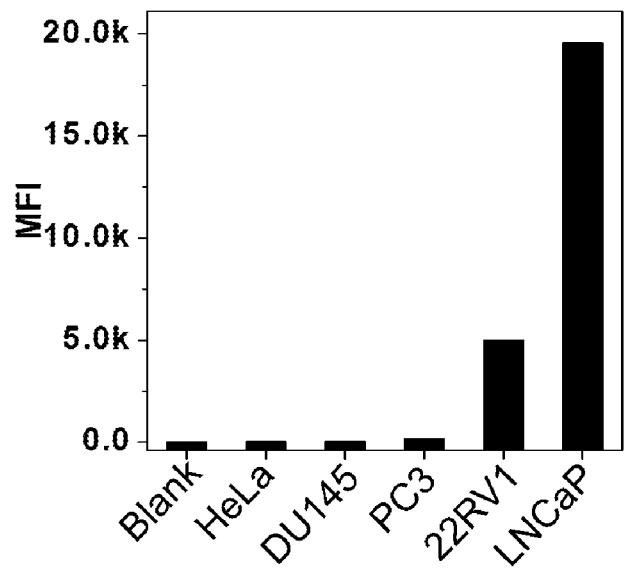
FIG. 14 is a bar graph showing the fluorescence intensity of PSMA in Luc-HeLa, PC3, DU145, 22RV1, and LNCaP cells. Blank: cells incubated with free medium; MFI-mean fluorescence intensity.

After demonstrating the excellent endosomal escape ability of the NPs, their PCa specificity was evaluated. LNCaP cells, a PCa cell line with over-expressed PSMA (FIG. 14) (Farokhzad, O C et al., *Proceedings of the National Academy of Sciences*, 103, (16), 6315-6320 (2006)), were chosen for incubation with the NPs. LNCaP cells show around 5-fold stronger uptake of the DY547-siRNA-loaded ACUPA-NPsR10 than that of NPsR10 (FIG. 15). If the cells are pre-treated with the PSMA antibody, there is no obvious difference in cellular uptake between ACUPA-NPsR10 and NPsR10 (FIG. 15), indicating that the high cellular uptake of ACUPA-NPsR10 is built on the specific recognition between the ACUPA ligand and the over-expressed PSMA on LNCaP cells. To further validate this ACUPA-mediated PCa specificity, two other PCa cell lines with extremely low PSMA expression, PC3 and DU145 cells, were also incubated with the DY547-siRNA-loaded NPs. With the absence of specific interaction between the ACUPA ligand and PSMA, these two cell lines show similar ability to internalize the ACUPA-NPsR10 and NPsR10 (FIGS. 16A-16B).

Figure 17A:
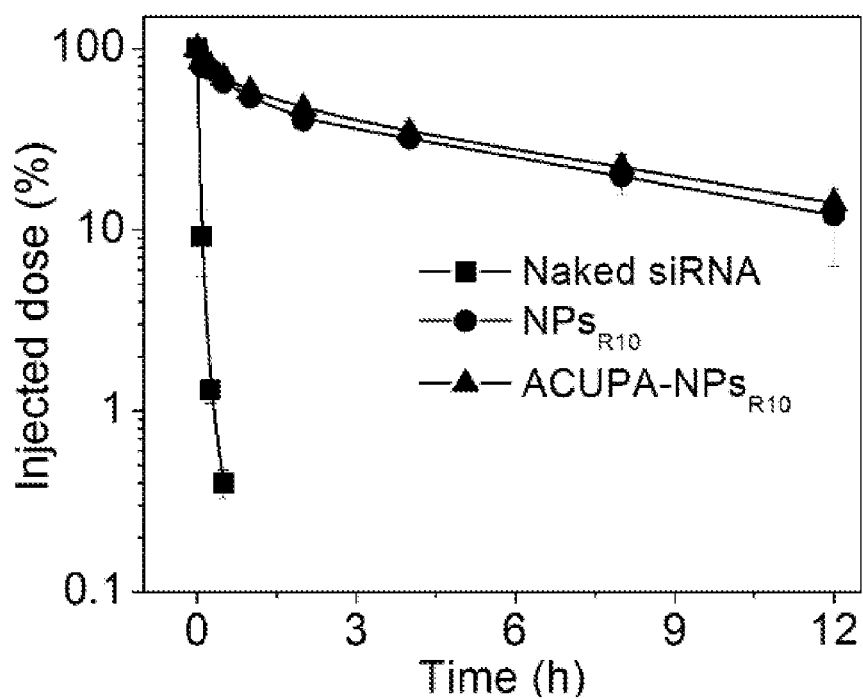
FIGS. 17A-17B are graphs showing (FIG. 17A) pharmacokinetics of Nanoparticles (NPs) (●), naked DY647-siRNA (■), and DY647-siRNA loaded NPsR10 and ACUPA-NPsR10 (▲)
Figure 17B:
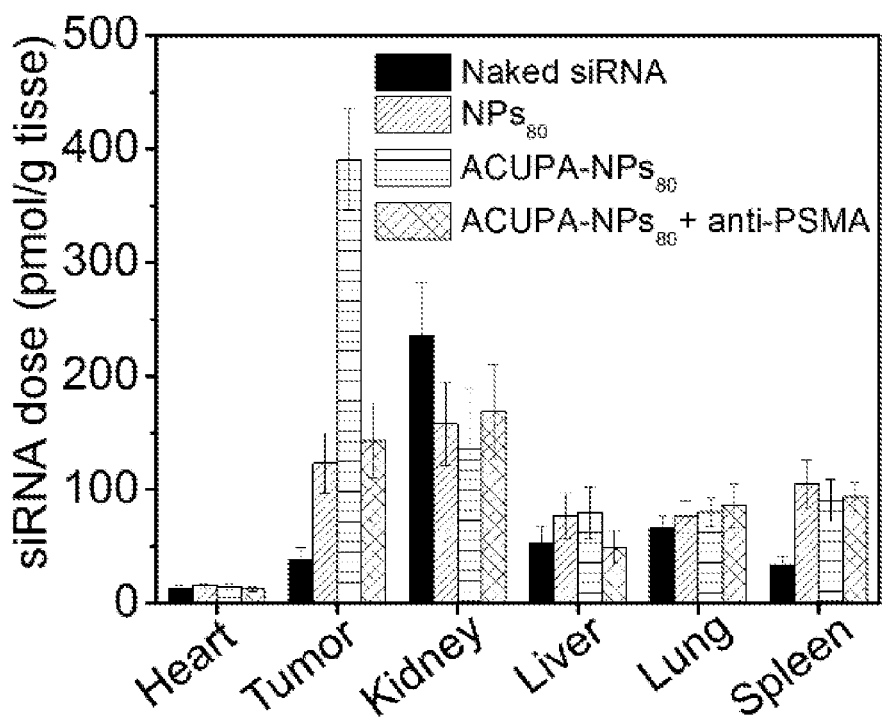

After proving the in vitro PCa-specificity of the ACUPA-NPsR10, their pharmacokinetics and in vivo PCa-specificity was evaluated. The pharmacokinetics of the ACUPA-NPsR10 was examined by intravenous injection of DY647 labelled GL3 siRNA (DY647-siRNA) loaded NPs to healthy mice (650 µg/kg siRNA dose, n=3). The blood half-life ($t_{1/2}$) of ACUPA-NPsR10 is around 4.56 h (FIG. 17A), far longer than naked siRNA ($t_{1/2}$<30 min). This better stability is mainly attributed to protection by the PEG outer layer and small particle size (Knop, K et al., *Angewandte Chemie International Edition*, 49, 6288-6308 (2010); Guo, X et al., *Accounts of Chemical Research*, 45, 971-979 (2012); Bertrand, N et al., *Advanced Drug Delivery Reviews*, 66, 2-25 (2014). Moreover, due to the negative nature of the surface-encoded ACUPA ligand with three carboxylic acid groups, the ACUPA-NPsR10 show longer blood circulation than NPsR10 ($t_{1/2}$=4.18 h). The in vivo PCa-specificity of ACUPA-NPsR10 was assessed by intravenously injecting Cy5.5 labelled GL3 siRNA (Cy5.5-siRNA) loaded NPs to LNCaP xenograft tumor-bearing mice (650 µg/kg siRNA dose, n=3). Overlaid fluorescent images of the LNCaP xenograft tumor-bearing nude mice 24 h post-injection of naked Cy5.5-siRNA, Cy5.5-siRNA-loaded NPsR10 and ACUPA-NPsR10, and PSMA antibody followed by Cy5.5-siRNA-loaded ACUPA-NPsR10 show that there is almost no accumulation of naked siRNA in the tumor. However, the ACUPA-NPsR10 shows high accumulation in the tumor corresponding to the bright fluorescence. In the absence of the PSMA-specific ACUPA ligand, the accumulation of NPsR10 in the tumor is much lower compared to ACUPA-NPsR10. If first injecting the PSMA antibody (5 mg/kg dose) followed by ACUPA-NPsR10, the blocked PSMA leads to a decrease in the accumulation of ACUPA-NPsR10 in tumor, highlighting the important effect of specific interaction between PSMA and the ACUPA ligand on the PCa-specificity of ACUPA-NPsR10. To analyze the accumulation of NPs in tumor and other organs, the tumor and main organs of mice were harvested 24 h post-injection of DY677-siRNA loaded ACUPA-NPsR10 and NPsR10, PSMA antibody followed by DY677-siRNA loaded ACUPA-NPsR10, and naked DY677-siRNA and the biodistribution of the NPs determined (FIG. 17B). The naked siRNA presents a characteristic biodistribution, i.e., high accumulation in kidney but extremely low accumulation in tumor (Zhu X et al., *Proceedings of the National Academy of Sciences*, 112, (25), 7779-7784 (2015)). With the specific recognition between the ACUPA ligand and PSMA over-expressed on LNCaP xenograft tumor, the accumulation of ACUPA-NPsR10 in tumor is around 3-fold higher than that of NPsR10 or that found in mice pre-treated with PSMA antibody (FIG. 17B).

In conclusion, a PCa-specific and ultra pH-responsive nanoplatform has been developed. This nanoplatform can specifically deliver cargos such as siRNA to PCa through the recognition between the ACUPA ligand and over-expressed PSMA on PCa cells. With the endosome swelling induced by ultra pH-responsive characteristic along with the oligoarginine-mediated endosomal membrane penetration, this nanoplatform can efficiently escape from endosomes and rapidly release therapeutic molecules in the cytoplasm. The targeted membrane-penetrating and ultra pH-responsive nanoplatform is effective as a robust delivery vehicle for PCa-specific therapy.

Example 4: Redox-Responsive Nanoparticle-Mediated Systemic siRNA and mRNA Co-Delivery for Concurrent Upregulation and Suppression of Genetic Causes of Cancer Methods Synthesis of the L-Cystine-Based poly(disulfide) (PDSA) Polymers PDSA polymers were prepared by using the same method described former example 1.

Preparation and Characterization of Nanoparticles (NPs)

The PDSA polymers were dissolved in DMF or DMSO to form a homogenous solution with a concentration of 20 mg/mL. Subsequently, 200 µL of this solution was taken and mixed with 140 µL of DSPE-PEG3000 (20 mg/mL in DMF), 50 µL of G0-C14 (5 mg/mL in DMF) and 1 nmol siRNA (0.1 nmol/µL aqueous solution). Under vigorously stirring (1000 rpm), the mixture was added dropwise to 5 mL of deionized water. The NP dispersion formed was transferred to an ultrafiltration device (EMD Millipore, MWCO 100 K) and centrifuged to remove the organic solvent and free compounds. After washing with PBS (pH 7.4) solution (3×5 mL), the siRNA loaded NPs were dispersed in 1 mL of phosphate buffered saline (PBS, pH 7.4) solution. Size and zeta potential were determined by DLS. The morphology of NPs was visualized on TEM. To determine the siRNA encapsulation efficiency, DY547-labelled GL3 siRNA (DY547-siRNA) loaded NPs were prepared according to the method described above. A small volume (50 µL) of the NP solution was withdrawn and mixed with 20-fold DMSO. The fluorescence intensity of DY547-siRNA was measured using a Synergy HT multi-mode microplate reader (BioTek Instruments) and compared to the free DY-547 labelled GL3 siRNA solution (1 nmol/mL PBS solution).

Redox-Responsive Behavior of the NPs

The siRNA loaded NPs were prepared as described above and dispersed in PBS containing 10 mM GSH. At predetermined time point, the particle size was examined by DLS and the particle morphology was observed on TEM. To evaluate the intracellular redox-responsive behavior, the NPs with Nile red and coumarin 6 encapsulated in their hydrophobic cores were prepared and then incubated with HeLa cells for different time. The fluorescence of Nile red and coumarin 6 was observed a FV1000 confocal laser scanning microscope (CLSM, Olympus). If the NPs respond to redox stimulus, the Nile red and coumarin 6 will release and only green fluorescence of coumarin 6 can be observed under CLSM. If the NPs are intact, the fluorescence of coumarin 6 will be quenched by Nile red and only red fluorescence can be observed under CLSM.

Luciferase Silencing

Luc-HeLa cells were seeded in 96-well plates (5,000 cells per well) and incubated in 0.1 mL of RPMI 1640 medium with 10% FBS for 24 h. Thereafter, the GL3 siRNA-loaded NPs were added. After incubating for 24 h, the cells were washed with fresh medium and allowed to incubate for another 48 h. The expression of firefly luciferase in HeLa cells was determined using Steady-Glo luciferase assay kits. Cytotoxicity was measured using the Alamarblue assay according to the manufacturer's protocol. The luminescence or fluorescence intensity was measured using a microplate reader, and the average value of five independent experiments was collected. As a control, the silencing effect of Lipo2K/GL3 siRNA complexes was also evaluated according to the procedure described above and compared to that of GL3 siRNA-loaded NPs.

Preparation and Characterization of siRNA/mRNA Co-Loaded NPs

The PDSA polymers were dissolved in DMF or DMSO to form a homogenous solution with a concentration of 20 mg/mL. Subsequently, 200 µL of this solution was taken and mixed with 140 µL of DSPE-PEG3000 (20 mg/mL in DMF), 50 µL of G0-C14 (5 mg/mL in DMF), 1 nmol siRNA (0.1 nmol/µL aqueous solution) and 10 µg mRNA (1 mg/mL aqueous solution). Under vigorously stirring (1000 rpm), the mixture was added dropwise to 5 mL of deionized water. The NP dispersion formed was transferred to an ultrafiltration device (EMD Millipore, MWCO 100 K) and centrifuged to remove the organic solvent and free compounds. After washing with PBS (pH 7.4) solution (3×5 mL), the siRNA loaded NPs were dispersed in 1 mL of phosphate buffered saline (PBS, pH 7.4) solution. Size and zeta potential were determined by DLS. The morphology of NPs was visualized on TEM. To determine the encapsulation efficiency of siRNA and mRNA, DY547-labelled GL3 siRNA (DY547-siRNA) and Cy5-labelled GFP mRNA (Cy5-mRNA) were used and siRNA/mRNA co-loaded NPs were prepared according to the method described above. A small volume (50 µL) of the NP solution was withdrawn and mixed with 20-fold DMSO. The fluorescence intensity of DY547-siRNA and Cy5-mRNA was measured using a Synergy HT multi-mode microplate reader (BioTek Instruments) and compared to the free DY-547 siRNA (1 nmol/mL PBS solution) and Cy5.5-mRNA solution (10 □g/mL PBS solution).

In Vitro siRNA and mRNA Release

DY547-siRNA/Cy5-mRNA co-loaded NPs were prepared as described above. Subsequently, the NPs were dispersed in 1 mL of PBS (pH 7.4) and then transferred to a Float-a-lyzer G2 dialysis device (MWCO 100 kDa, Spectrum) that was immersed in PBS (pH 7.4) at 37° C. At a predetermined interval, 5 µL of the NP solution was withdrawn and mixed with 20-fold DMSO. The fluorescence intensity of DY547-siRNA and Cy5-mRNA was determined by Synergy HT multi-mode microplate reader.

Luciferase Silencing and GFP Expression

Luc-HeLa cells were seeded in 96-well plates (5,000 cells per well) and incubated in 0.1 mL of RPMI 1640 medium with 10% FBS for 24 h. Thereafter, the GL3 siRNA loaded NPs, GFP mRNA loaded NPs and GL3 siRNA/GFP mRNA co-loaded NPs were added. After incubating for 24 h, the cells were washed with fresh medium and allowed to incubate for another 48 h. The expression of firefly luciferase in HeLa cells was determined using Steady-Glo luciferase assay kits. Cytotoxicity was measured using the alamarBlue assay according to the manufacturer's protocol. The luminescence or fluorescence intensity was measured using a microplate reader, and the average value of five independent experiments was collected. To examine the GFP expression, the cells were digested by trypsin and flow cytometry was employed to examine the GFP expression in the collected cells.

In Vitro PHB1 Silencing and PTEN Expression

PHB1-positive and PTEN negative Lung cancer cells (NCI-1650 cells) were seeded in 6-well plates (50,000 cells per well) and incubated in 2 mL of RPMI 1640 medium containing 10% FBS for 24 h. Subsequently, the cells were transfected with the PHB1 siRNA loaded NPs, PTEN mRNA loaded NPs, and PHB1 siRNA/PTEN mRNA co-loaded NPs for 24 h. After washing the cells with PBS thrice, the cells were further incubated in fresh medium for another 48 h. Thereafter, the cells were digested by trypsin and the proteins were extracted using modified radioimmunoprecipitation assay lysis buffer (50 mM Tris-HCl pH 7.4, 150 mM NaCl, 1% NP-40 substitute, 0.25% sodium deoxycholate, 1 mM sodium fluoride, 1 mM Na3VO4, 1 mM EDTA), supplemented with protease inhibitor cocktail and 1 mM phenylmethanesulfonyl fluoride (PMSF). The expression of PHB1 and PTEN was examined using the western blot analysis.

In Vitro AR Silencing and PTEN Expression

AR-positive and PTEN-negative Pprostate cancer cells (LNCaP) were seeded in 6-well plates (50,000 cells per well) and incubated in 2 mL of RPMI 1640 medium containing 10% FBS for 24 h. Subsequently, the cells were transfected with the AR siRNA loaded NPs, PTEN mRNA loaded NPs and AR siRNA/PTEN mRNA co-loaded NPs for 24 h. After washing the cells with PBS thrice, the cells were further incubated in fresh medium for another 48 h. Thereafter, the cells were digested by trypsin and the proteins were extracted using modified radioimmunoprecipitation assay lysis buffer (50 mM Tris-HCl pH 7.4, 150 mM NaCl, 1% NP-40 substitute, 0.25% sodium deoxycholate, 1 mM sodium fluoride, 1 mM Na3VO4, 1 mM EDTA), supplemented with protease inhibitor cocktail and 1 mM phenylmethanesulfonyl fluoride (PMSF). The expression of AR and PTEN was examined using the western blot analysis.

In Vitro NCI-1650 Cell Proliferation

NCI-1650 cells were seeded in 6-well plates (20,000 cells per well) and incubated in 1 mL of RPMI 1640 medium containing 10% FBS for 24 h. Thereafter, the cells were transfected with the NPs loading PHB1 siRNA, PTEN mRNA, or PHB1 siRNA/PTEN mRNA for 24 h and then washed with fresh medium for further incubation. At predetermined intervals, the cytotoxicity was measured using the alamarBlue assay according to the manufacturer's protocol. After each measurement, the alamarBlue agent was removed and the cells were incubated in fresh medium for further proliferation.

In Vitro LNCaP Cell Proliferation

LNCaP cells were seeded in 6-well plates (20,000 cells per well) and incubated in 2 mL of RPMI 1640 medium containing 10% FBS for 24 h. Thereafter, the cells were transfected with the AR siRNA loaded NPs, PTEN mRNA loaded NPs and AR siRNA/PTEN mRNA co-loaded NPs for 24 h, and then washed with fresh medium for further incubation. At predetermined intervals, the cytotoxicity was measured using the AlamarBlue assay according to the manufacturer's protocol. After each measurement, the alamarBlue agent was removed and the cells were incubated in fresh medium for further proliferation.

Pharmacokinetics Study

Healthy male BALB/c mice were randomly divided into two groups (n=3) and given an intravenous injection of either (i) naked DY677-labelled GL3 siRNA (DY677-siRNA), (ii) naked Cy5-labelled GFP mRNA (Cy5-mRNA), and (iii) DY677-siRNA/Cy5-mRNA co-loaded NPs at a 650 µg/kg siRNA dose and 500 µg/kg mRNA dose. At predetermined time intervals, orbital vein blood (20 µL) was withdrawn using a tube containing heparin, and the wound was pressed for several seconds to stop the bleeding. The fluorescence intensity of DY677-siRNA and Cy5-mRNA in the blood was determined using a microplate reader. The blood circulation half-life ($t_{1/2}$) was calculated by first-order decay fit.

NCI-1650 Xenograft Tumor Model

The tumor model was constructed by subcutaneous injection with 200 µL of NCI-1650 cell suspension (a mixture of RPMI 1640 medium and Matrigel in 1:1 volume ratio) with a density of $2 \times 10^6$ cells/mL into the back region of healthy male BALB/c nude mice. When the volume of the NCI-1650 tumor xenograft reached ~50 mm$^3$, the mice were used for the following in vivo experiments.

LNCaP Xenograft Tumor Model

The tumor model was constructed by subcutaneous injection with 200 µL of LNCaP cell suspension (a mixture of RPMI 1640 medium and Matrigel in 1:1 volume ratio) with a density of $2 \times 10^6$ cells/mL into the back region of healthy male BALB/c nude mice. When the volume of the LNCaP tumor xenograft reached ~50 mm$^3$, the mice were used for the following in vivo experiments.

Biodistribution in NCI-1650 Tumor-Bearing Mice

NCI-1650 tumor-bearing male BALB/c nude mice were randomly divided into two groups (n=3) and given an intravenous injection of either (i) DY677-siRNA-loaded NPs, (ii) Cy5-mRNA-loaded NPs, or (iii) Dy677-siRNA/Cy5-mRNA co-loaded NPs at a siRNA dose of 650 µg/kg and mRNA dose of 500 µg/kg. Twenty-four hours after the injection, the mice were imaged using the Maestro 2 In-Vivo Imaging System (Cri Inc). Main organs and tumors were then harvested and imaged. To quantify the accumulation of NPs in tumors and organs, the fluorescence intensity of each tissue was quantified by Image-J.

Biodistribution in LNCaP Tumor-Bearing Mice

LNCaP tumor-bearing male BALB/c nude mice were randomly divided into two groups (n=3) and given an intravenous injection of either (i) naked DY677-siRNA, (ii) naked Cy5-mRNA or (iii) DY677-siRNA/Cy5-mRNA co-loaded NPs at a 650 µg/kg siRNA dose and 500 µg/kg mRNA dose. Twenty-four hours after the injection, the mice were imaged using the Maestro 2 In-Vivo Imaging System (Cri Inc). Main organs and tumors were then harvested and imaged. To quantify the accumulation of NPs in tumors and organs, the fluorescence intensity of each tissue was quantified by Image-J.

In Vivo PBBI Silencing and PTEN Expression

NCI-1650 tumor-bearing male BALB/c nude mice were randomly divided into two groups (n=3) and intravenously injected with (i) PHB1 siRNA-loaded NPs, (ii) PTEN mRNA-loaded NPs or (iii) PHB1 siRNA/PTEM mRNA co-loaded NPs at a siRNA dose of 650 µg/kg and mRNA dose of 500 µg/kg for three consecutive days. Twenty-four hours post the final injection, mice were sacrificed and tumors were harvested. The proteins in the tumor were extracted using modified radioimmunoprecipitation assay lysis buffer (50 mM Tris-HCl pH 7.4, 150 mM NaCl, 1% NP-40 substitute, 0.25% sodium deoxycholate, 1 mM sodium fluoride, 1 mM Na3 VO4, 1 mM EDTA), supplemented with protease inhibitor cocktail and 1 mM phenylmethanesulfonyl fluoride (PMSF). The expression of PHB1 and PTEN was examined using the aforementioned western blot analysis.

In Vivo AR Silencing and PTEN Expression

LNCaP tumor-bearing male BALB/c nude mice were randomly divided into three groups (n=3) and intravenously injected with (i) AR siRNA-loaded NPs, (ii) PTEN mRNA-loaded NPs or (iii) AR siRNA/PTEN mRNA co-loaded NPs at a 650 µg/kg siRNA dose and 500 µg/kg mRNA dose for three consecutive days. Twenty-four hours post the final injection, mice were sacrificed and tumors were harvested. The proteins in the tumor were extracted using modified radioimmunoprecipitation assay lysis buffer (50 mM Tris-HCl pH 7.4, 150 mM NaCl, 1% NP-40 substitute, 0.25% sodium deoxycholate, 1 mM sodium fluoride, 1 mM Na3 VO4, 1 mM EDTA), supplemented with protease inhibitor cocktail and 1 mM phenylmethanesulfonyl fluoride (PMSF). The expression of AR and PTEN was examined using the aforementioned western blot analysis.

In Vivo Toxicity

Healthy male BALB/c mice were randomly divided into two groups (n=3) and administered by intravenous injections of either (i) PBS or (ii) PDSA NPs. Twenty-four hours after the injection, the main organs were collected, fixed with 4% paraformaldehyde, and embedded in paraffin. Tissue sections were stained with hematoxylin-eosin (H&E) and viewed under an optical microscope.

Results

Figure 18:
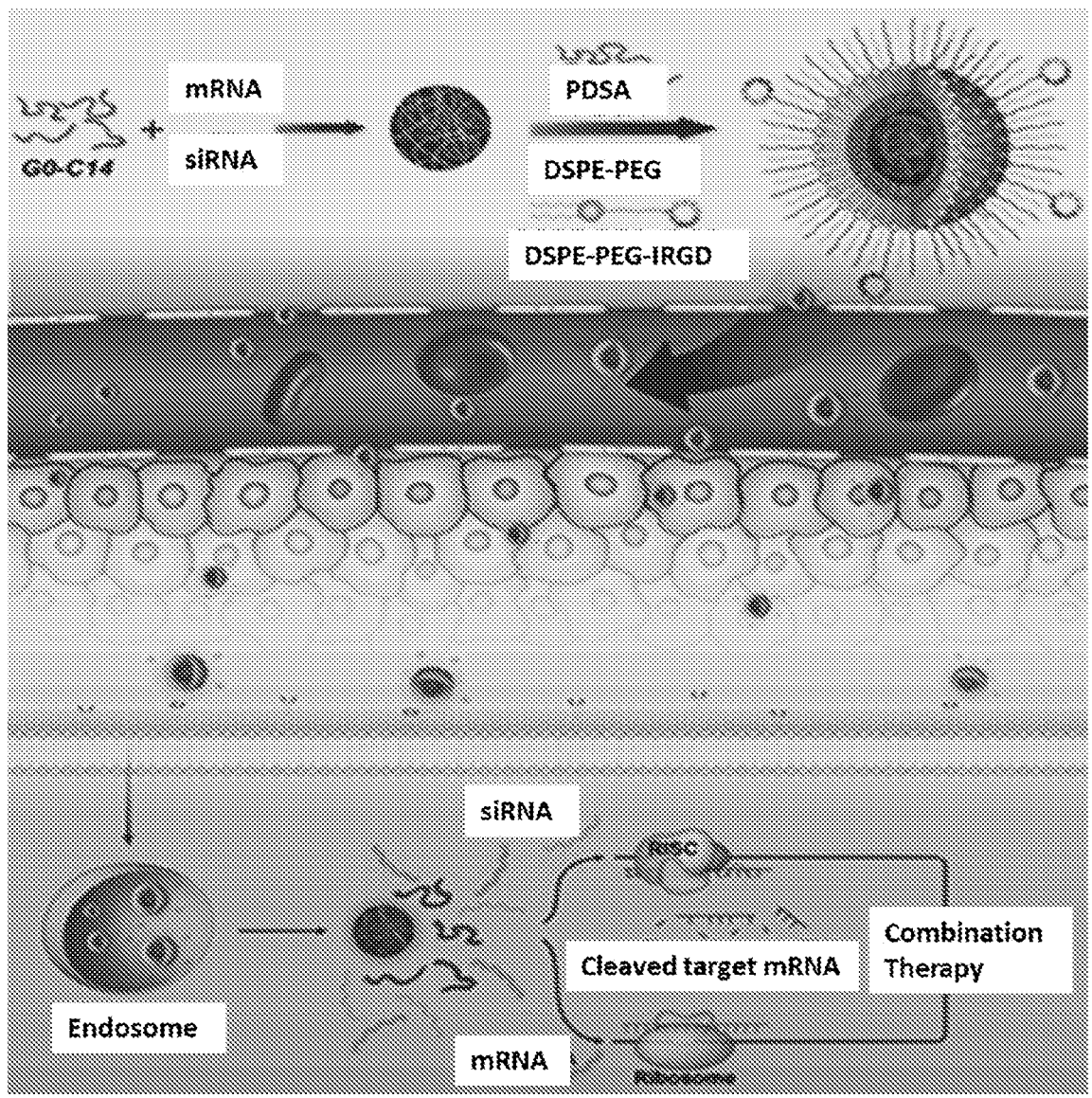
FIG. 18 is a schematic illustration of the redox-responsive nanoparticle-mediated systemic siRNA and mRNA co-delivery for concurrent upregulation and suppression of genetic causes of cancer.
Figure 19:
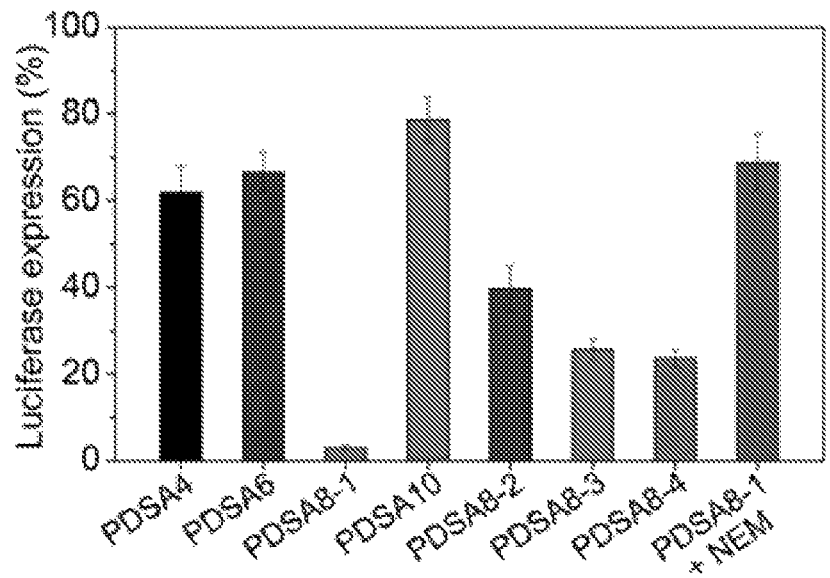
FIG. 19 is a graph showing Luciferase expression in Luc-HeLa cells transfected with Luc siRNA loaded PDSA NPs at a 1 nM siRNA dose.

FIG. 18 shows the scheme of redox-responsive nanoparticle-mediated systemic siRNA and mRNA co-delivery for concurrent upregulation and suppression of genetic causes of cancer. With the redox-responsive characteristic to induce the breakage of the NPs of PDSA8-1, the siRNA loaded NPs of PDSA8-1 show the highest efficacy in down-regulation of luciferase expression in HeLa cells (FIG. 19, >90% knockdown at 1 nM siRNA dose).

Figure 20A:
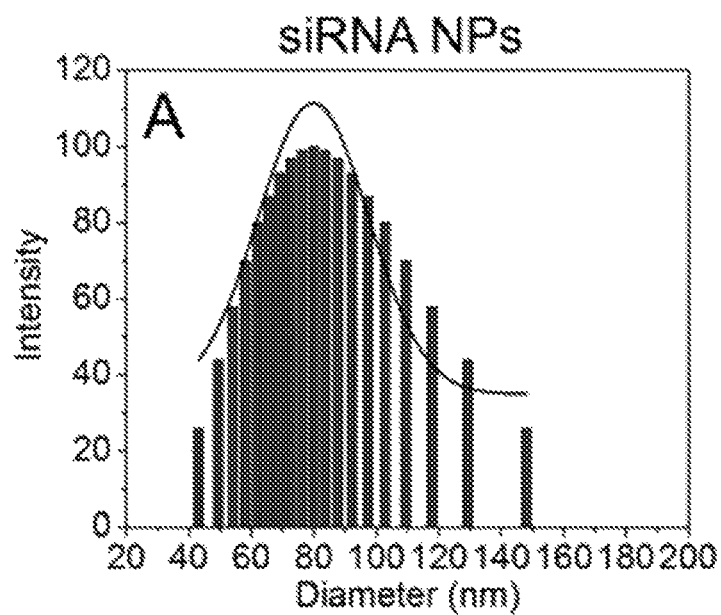
FIGS. 20A-20C are plots showing the size (diameter in nm) distribution (intensity) of the redox-responsive PDSA8-1 nanoparticles loaded with siRNA only (FIG. 20A), mRNA only (FIG. 20B), or co-loaded with siRNA/mRNA (FIG. 20C).
Figure 20B:
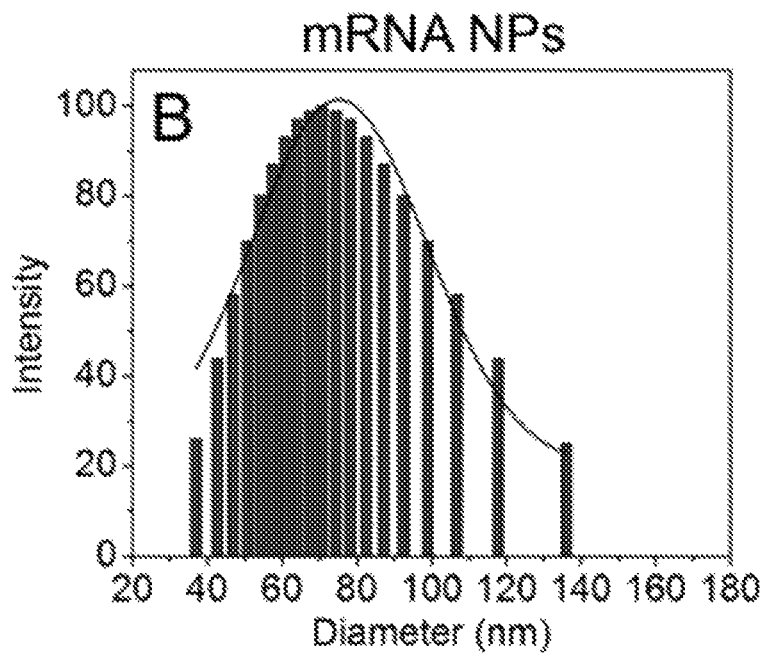
Figure 20C:
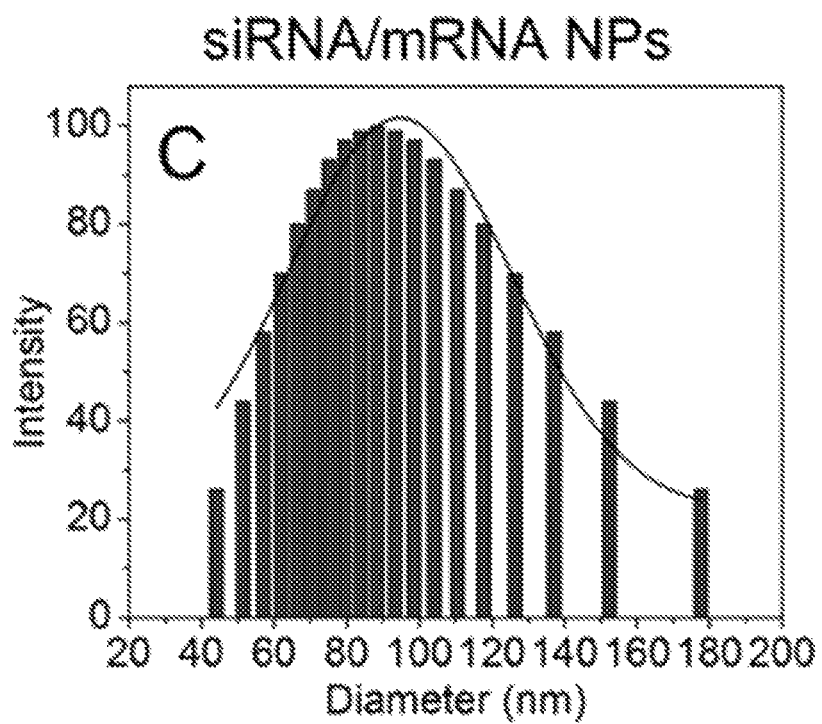
Figure 21:
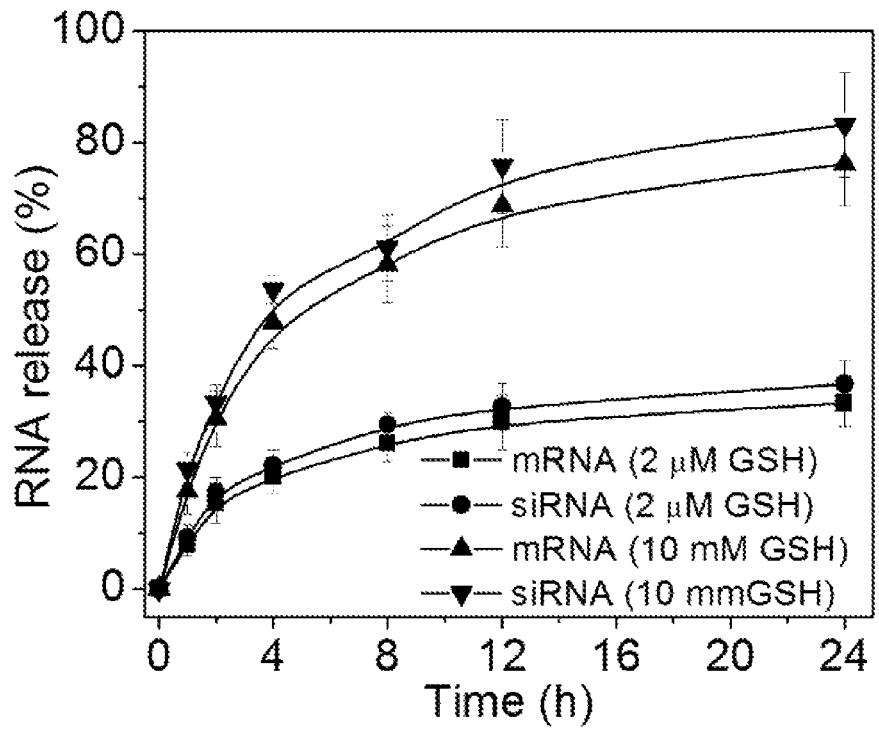
FIG. 21 is a bar graph showing the siRNA and mRNA release from the siRNA/mRNA co-loaded NPs with the addition of different concentrations of GSH. Including 2 μM GSH mRNA (■), 2 μM GSH siRNA (●), 10 mM GSH mRNA (▲) and 10 mM GSH sRNA (▼).
Figure 22:
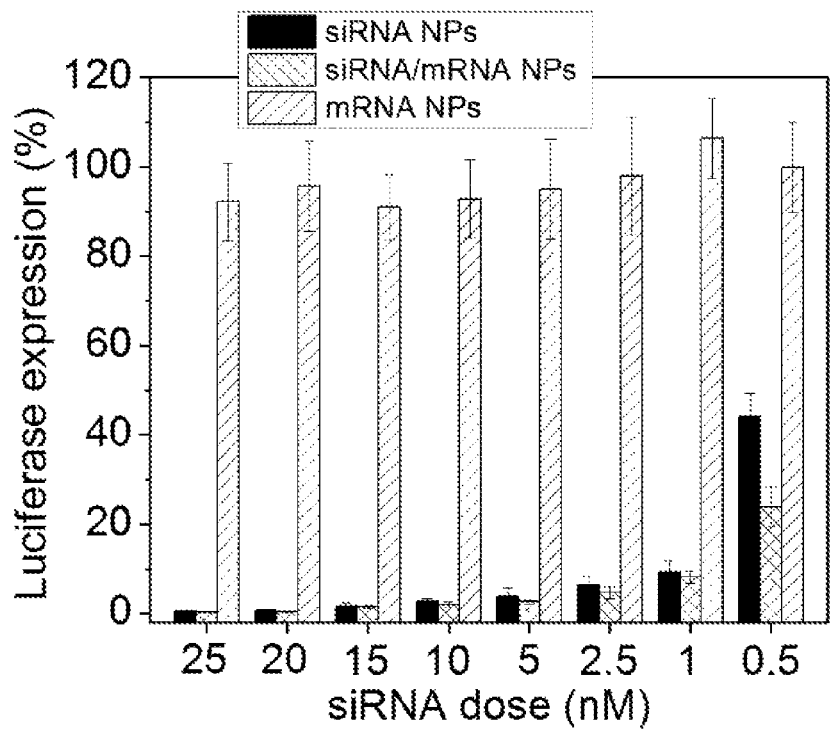
FIG. 22 is a bar graph showing luciferase expression (%) in luciferase-expressing HeLa cells treated with mRNA only (left bar in each dosage cluster), siRNA/mRNA (center bar in each dosage cluster), and siRNA only (right bar in each dosage cluster) nanoparticle as a function of siRNA dose (nM).
Figure 23:
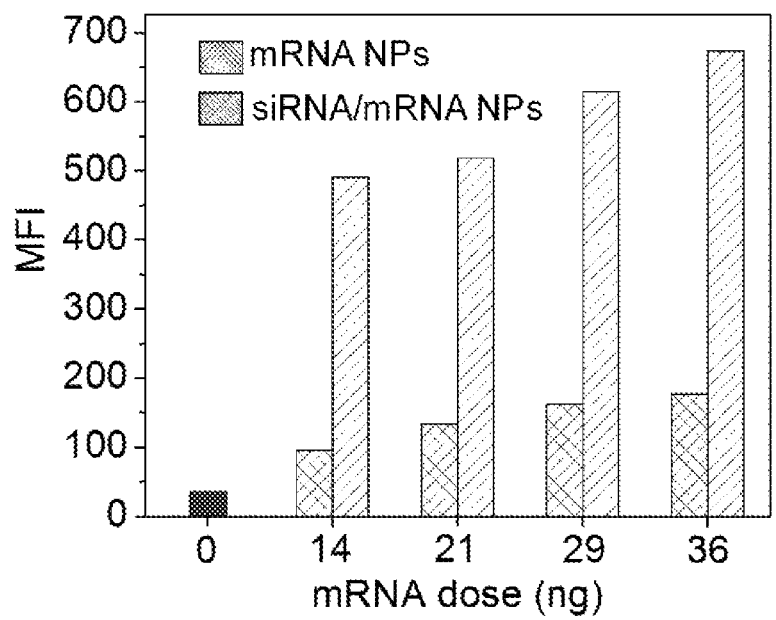
FIG. 23 is a bar graph showing GFP expression in HeLa cells treated with mRNA only (left bar in each dosage cluster) and siRNA/mRNA (right bar in each dosage cluster) as a function of mRNA dose (ng).

After obtaining the best gene silencing platform (PDSA8-1), it was used to co-deliver siRNA and mRNA. Luciferase-expressing HeLa cells were incubated with redox-responsive nanoparticles loaded with a combination of siRNA targeting luciferase mRNA and mRNA encoding GFP ("siRNA/mRNA NPs"). FIGS. 20A-20C shows the change in size distribution of these three types of particles. The size of siRNA/mRNA NPs (FIG. 20C) are slightly larger than that of siRNA (FIG. 20A) or mRNA (FIG. 20B) loaded NPs. FIG. 21 shows the siRNA and mRNA release profile of the co-delivery NPs. With the addition of 10 mM GSH (intracellular GSH concentration) to provide redox stimulus, the co-delivery NPs show fast siRNA and mRNA release.

siRNA/mRNA means that there are both siRNA and mRNA in each NP. The final NPs are homogeneous. Three experiments were performed using single siRNA or mRNA loaded NPs. There is a significant difference in the gene silencing (FIG. 22) and GFP expression (FIG. 23). The siRNA/mRNA co-loaded NPs improved the gene silencing efficacy and GFP expression compared to single siRNA or mRNA loaded NPs. FIG. 22 shows the luciferase expression in HeLa cells treated with the three types of NPs. This is a bar graph illustrating the relative reduction in luciferase expression in cells induced by transfection with each particle population. From left to right each cluster of bars grouped by siRNA dose (nM) represents siRNA only (left bar), siRNA/mRNA (center bar), and mRNA only (right bar) nanoparticle populations. The results indicate that the encapsulation of mRNA in the NPs can improve the silencing efficacy of siRNA. The result is seen most dramatically at a siRNA dose of 0.5 nM (right-most cluster of bars), where siRNA efficacy when co-delivered with mRNA is about twice that of siRNA delivered alone.

FIG. 23 is a bar graph illustrating the relative expression of GFP in Luc-HeLa cells treated with the NPs loading mRNA (mRNA NPs and siRNA/mRNA NPs). The bar at "0" mRNA dose (ng) shows the mean fluorescence intensity (MFI) of control cells that not transfected with mRNA. From left to right beginning at 14 ng dose of mRNA, each pair of bars shows mRNA only (left bar) and siRNA/mRNA (right bar) nanoparticle populations. The results indicate that siRNA improved the transfection or expression of mRNA, when the two RNAs are co-delivered to cells. The result was evident at each dosage illustrated.

Protein expression of PHB1 in NCI-1650 cells treated by PHB1 siRNA loaded NPs, and PHB1 siRNA/PTEN mRNA co-loaded NPs demonstrated that both of these NPs suppressed PHB1 expression using western blotting analysis. The siRNA/mRNA NPs showed relatively higher suppression efficacy in PHB1 expression at each PHB1 siRNA dosage (10 nM, 15 nM, 20 nM, and 25 nM). Protein expression of PTEN in NCI-1650 cells treated by PTEN mRNA loaded NPs, and PHB1 siRNA/PTEN mRNA co-loaded NPs demonstrated that both of these NPs improved PTEN expression using western blotting analysis. The siRNA/mRNA NPs showed relatively higher gene transfection efficacy and/or gene translation in NCI-1650 cells at each PTEN mRNA dosage (14 ng, 21 ng, 29 ng, and 36 ng).

Expression of AR in LNCaP cells treated by AR siRNA loaded NPs and AR siRNA/PTEN mRNA co-loaded NPs demonstrates that both of these NPs can suppress AR expression. The siRNA/mRNA NPs especially show relatively higher suppression efficacy in AR expression.

Expression of PTEN in the LNCaP cells treated by PTEN mRNA loaded NPs and AR siRNA/PTEN mRNA co-loaded NPs demonstrates that both of these NPs can improve PTEN expression. The siRNA/mRNA NPs show especially relatively higher gene transfection in the LNCaP cells.

Figure 24:
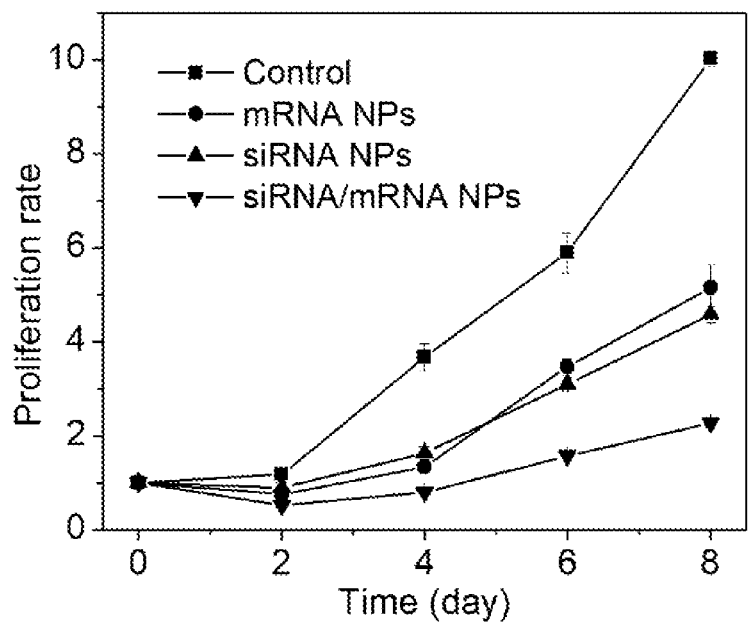
FIG. 24 is a graph showing proliferation rate of NCI-1650 cells over a period of 8 days post transfection with control NPs (Control ■), PTEN mRNA loaded NPs (mRNA NPs ●), PHB1 siRNA loaded NPs (siRNA NPs 4), and PHB1 siRNA/PTEN mRNA loaded NPs (siRNA/mRNA NPs ▼).
Figure 25:
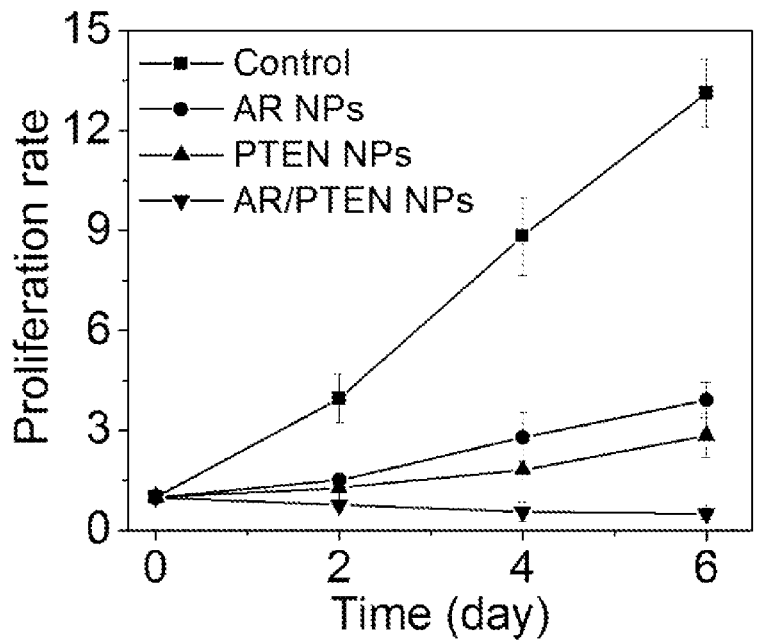
FIG. 25 is a bar graph showing the proliferation of LNCaP cells treated with the AR siRNA loaded, PTEN mRNA loaded and AR siRNA/PTEN mRNA co-loaded NPs.

Proliferation of NCI-1650 cells over a period of 8 days post transfection indicated that although single RNA NPs including PHB1 siRNA loaded NPs, and PTEN mRNA loaded NPs significantly reduced the rate of proliferation of NCI-1650 cells, siRNA/mRNA NPs were most effective in reducing the rate of proliferation of these cells compared to these single RNA loaded NPs (FIG. 24). The similar result can be observed for LNCaP cells treated with the co-delivery NPs. FIG. 25 shows the proliferation of the LNCaP cells incubated with the AR siRNA/PTEN mRNA co-loaded NPs. Compared with single RNA loaded NPs, the co-delivery NPs show better inhibition of the LNCaP cell growth.

Figure 26:
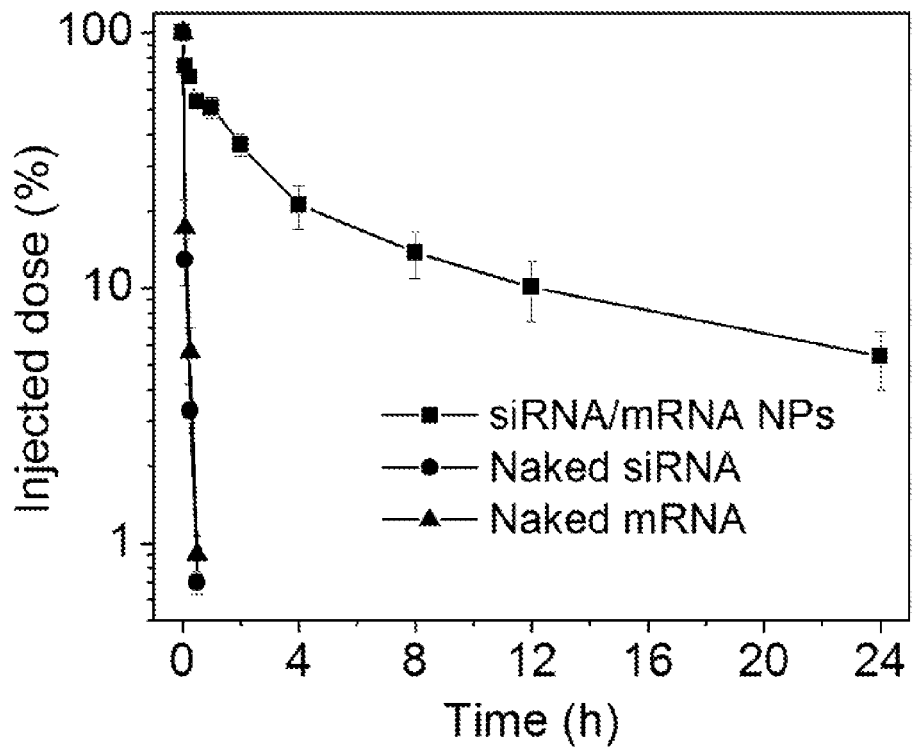
FIG. 26 is a bar graph showing the blood circulation time of the free siRNA, free mRNA, and siRNA/mRNA co-loaded NPs.

FIG. 26 shows the blood circulation ability of the co-delivery NPs. Compared with the free siRNA or mRNA, the siRNA/mRNA co-loaded NPs show much longer blood circulation time.

Figure 27:
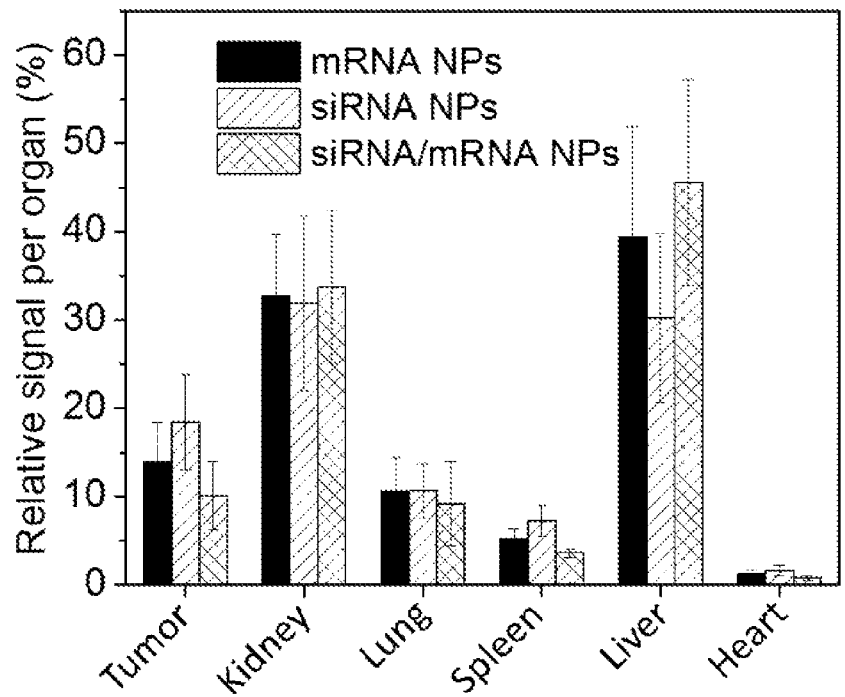
FIG. 27 is a bar graph showing biodistribution of DY677-siRNA loaded NPs, Cy5-mRNA loaded NPs, and DY677-siRNA/Cy5-mRNA co-loaded NPs in tissues and organs including tumor, kidney, lung, spleen, liver, and heart of the NCI-1650 xenograft tumor-bearing mice.
Figure 28:
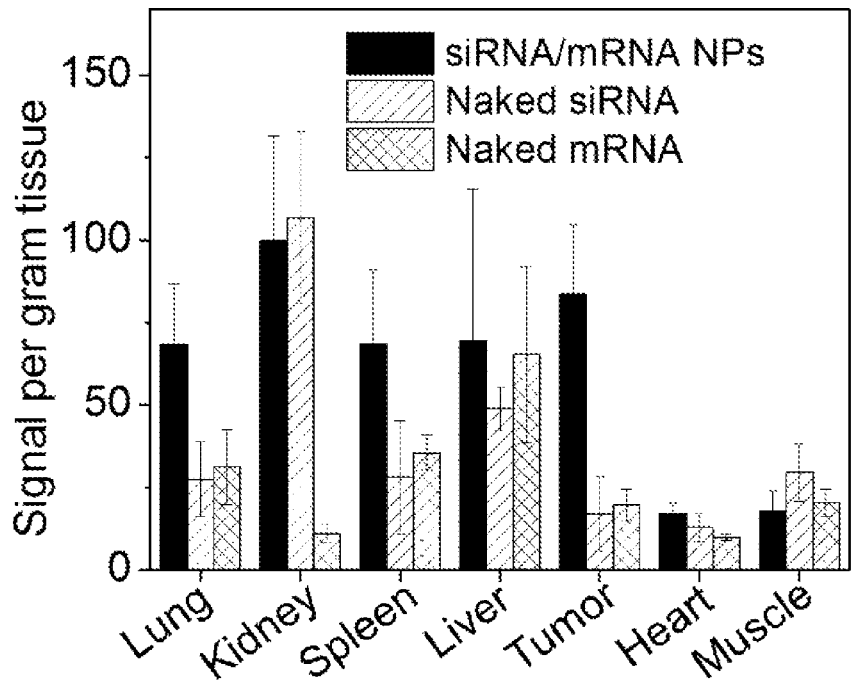
FIG. 28 is a bar graph showing the biodistribution of the naked DY677-siRNA, naked Cy5-mRNA, and DY677-siRNA/Cy5-mRNA co-loaded NPs in the tissues and organs including tumor, kidney, lung, spleen, liver, and heart of the LNCaP xenograft tumor-bearing mice.

Fluorescent imaging was carried out to determine the biodistribution of NPs in various tissues and organs including tumor, kidney, lung, spleen, liver, and heart of the NCI-1650 (FIG. 27) and LNCaP (FIG. 28) xenograft tumor-bearing mice. The co-delivery NPs have a higher tumor accumulation in the tumor tissues than naked siRNA and mRNA (FIG. 28). In addition, Western blotting analysis of in vivo protein levels of PHB1 and PTEN shows that co-delivery of PHB1 siRNA and PTEN mRNA in the same nanoparticles enhanced the efficiency of expression of PTEN as well as the suppression of PHB1 simultaneously compared to single RNA loaded NPs. Western blotting analysis of in vivo protein levels of AR and PTEN also shows that AR siRNA/PTEN mRNA co-loaded NPs have stonger AR silencing and higher PTEN expression in the tumor tissues compared to single RNA loaded NPs.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A nanoparticle formulation comprising redox-responsive polymeric nanoparticles encapsulating
an inhibitory functional nucleic acid,
wherein the inhibitory functional nucleic acid reduces or suppresses expression of an immune costimulatory molecule or signal, wherein the inhibitory functional nucleic acid is an inhibitory RNA,
and
a stimulatory nucleic acid species comprising an mRNA which enhances or increases an activity in a cell or encodes a protein or peptide,
wherein the stimulatory nucleic acid species encodes an antigen,
wherein the redox-responsive polymeric nanoparticles comprise a poly(disulfide) polymer comprising a disulfide bond linking two L-cysteine residues.

2. The nanoparticle formulation of claim 1,
wherein the inhibitory functional nucleic acid specifically inhibits or reduces expression of a target gene or product thereof in a cell, and the stimulatory nucleic acid increases or induces expression of an endogenous or heterologous protein or polypeptide.

3. The nanoparticle formulation of claim 1, wherein the inhibitory RNA is antisense, siRNA, miRNA, piRNA, Dicer siRNA or shRNA.

4. The nanoparticle formulation of claim 1, wherein the immune costimulatory molecule or signal is selected from the group consisting of B7/CD28 family members, Butyrophilins, LAIR Family members, Nectin and Nectin-like Ligand/Receptor co-signaling molecules, ILT/CD85 family proteins, TNF superfamily members, SLAM family members, and TIM family co-Signaling molecules.

5. The nanoparticle formulation of claim 1, wherein the immune costimulatory molecule or signal is selected from the group consisting of B7-1/CD80, B7-2/CD86, B7-H2, B7-H3, B7-H4, B7-H6, B7-H7/HHLA2, BTLA, CD28, CD30L, CTLA-4, ICOS, PD-1, PD-L1/B7-H1, PD-L2/B7-DC, PDCD6, TMIGD2/CD28H, VISTA/B7-H5/PD-1H, BTN1A1/Butyrophilin, NTB-A/SLAMF6, SLAM/CD150, TIM-1/KIM-1/HAVCR, TIM-3, TIM-4, CD7, CD160, CD200, CD300a/LMIR1, CD300d/LMIR4, CLECL1/DCAL-1, DAP12, Dectin-1/CLEC7A, DPPIV/CD26, EphB6, Integrin alpha 4 beta 1, Integrin alpha 4 beta 7/LPAM-1, LAG-3, and TSLP R.

6. The nanoparticle formulation of claim 1, wherein the antigen is a viral capsid protein from a virus selected from the group consisting of an Adeno-Associated Virus (AAV), a Herpesvirus, a retrovirus and a lentivirus.

7. The nanoparticle formulation of claim 6, wherein the viral capsid protein is a VP1, VP2, or VP3 capsid protein from an Adeno-Associated Virus (AAV) subtype selected from the group consisting of AAV1, AAV2, AAV3, AAV4, AAV5, AAV6, AAV7, AAV8, AAV9, and AAV10.

8. The nanoparticle formulation of claim 1, comprising an excipient for administration to an individual in need thereof.

9. The nanoparticle formulation of claim 8, wherein the nanoparticles have a diameter of between about 10 nm and about 500 nm, inclusive.

10. The nanoparticle formulation of claim 1, wherein the nanoparticles comprise one or more lipids in combination with polymer.

11. The nanoparticle formulation of claim 1, wherein the nanoparticles further comprise a ligand.

12. The nanoparticle formulation of claim 11, wherein the ligand is selected from the group consisting of a targeting ligand, an adhesion ligand, a cell-penetrating ligand, an endosomal-penetrating ligand, and combinations thereof.

13. The nanoparticle formulation of claim 1, wherein the L-cysteine based poly(disulfide) polymer is a linear polymer.

14. The nanoparticle formulation of claim 1, wherein the L-cysteine based poly(disulfide) polymer is a polyamide.

15. The nanoparticle formulation of claim 1, wherein the L-cysteine based poly(disulfide) polymer comprises L-cystine as a recurring unit.

16. The nanoparticle formulation of claim 1, wherein the L-cysteine based poly(disulfide) polymer comprises a fatty diacid.

* * * * *

SEQUENCE LISTING

<160> NUMBER OF SEQ ID NOS: 5

<210> SEQ ID NO 1
<211> LENGTH: 5
<212> TYPE: PRT
<213> ORGANISM: Artificial Sequence

```
<220> FEATURE:
<223> OTHER INFORMATION: Targeted peptide

<400> SEQUENCE: 1

Cys Arg Glu Lys Ala
1               5

<210> SEQ ID NO 2
<211> LENGTH: 9
<212> TYPE: PRT
<213> ORGANISM: Artificial Sequence
<220> FEATURE:
<223> OTHER INFORMATION: Targeted peptide

<400> SEQUENCE: 2

Cys Arg Lys Arg Leu Asp Arg Asn Cys
1               5

<210> SEQ ID NO 3
<211> LENGTH: 9
<212> TYPE: PRT
<213> ORGANISM: Artificial Sequence
<220> FEATURE:
<223> OTHER INFORMATION: Internalizing peptide

<400> SEQUENCE: 3

Cys Arg Gly Asp Arg Gly Pro Asp Cys
1               5

<210> SEQ ID NO 4
<211> LENGTH: 19
<212> TYPE: DNA
<213> ORGANISM: Artificial Sequence
<220> FEATURE:
<223> OTHER INFORMATION: GL3 siRNA
<220> FEATURE:
<221> NAME/KEY: misc_feature
<222> LOCATION: (19)..(19)
<223> OTHER INFORMATION: dTdT - deoxythymidine dinucleotide overhang TT

<400> SEQUENCE: 4
cuuacgcuga guacuucga                                              19

<210> SEQ ID NO 5
<211> LENGTH: 19
<212> TYPE: DNA
<213> ORGANISM: Artificial Sequence
<220> FEATURE:
<223> OTHER INFORMATION: GL3 siRNA (antisense)
<220> FEATURE:
<221> NAME/KEY: misc_feature
<222> LOCATION: (19)..(19)
<223> OTHER INFORMATION: dTdT - deoxythymidine dinucleotide overhang TT

<400> SEQUENCE: 5
ucgaaguacu cagcguaag                                              19
```